United States Patent
Azdoud et al.

(10) Patent No.: US 12,539,407 B2
(45) Date of Patent: Feb. 3, 2026

(54) ROBOTIC TATTOOING AND RELATED TECHNOLOGIES

(71) Applicant: Blackdot, Inc., Austin, TX (US)

(72) Inventors: Yan Azdoud, Austin, TX (US); Joel Richard Pennington, Austin, TX (US); Eric Nelson Watts, Austin, TX (US); Deniz Ozturk, Philadelphia, PA (US); Christopher Kelley, Georgetown, TX (US)

(73) Assignee: Blackdot, Inc., Austin, TX (US)

( * ) Notice: Subject to any disclaimer, the term of this patent is extended or adjusted under 35 U.S.C. 154(b) by 733 days.

(21) Appl. No.: 17/584,011

(22) Filed: Jan. 25, 2022

(65) Prior Publication Data

US 2022/0323736 A1 Oct. 13, 2022

Related U.S. Application Data

(60) Provisional application No. 63/141,438, filed on Jan. 25, 2021.

(51) Int. Cl.
*A61B 34/30* (2016.01)
*A61B 5/00* (2006.01)
(Continued)

(52) U.S. Cl.
CPC ....... *A61M 37/0084* (2013.01); *A61B 5/0064* (2013.01); *A61B 5/0075* (2013.01);
(Continued)

(58) Field of Classification Search
USPC .................................................. 700/245–264
See application file for complete search history.

(56) References Cited

U.S. PATENT DOCUMENTS

| | | | |
|---|---|---|---|
| 2,735,780 | A | 2/1956 | Le Compte et al. |
| 3,640,889 | A | 2/1972 | Stewart |

(Continued)

FOREIGN PATENT DOCUMENTS

| | | |
|---|---|---|
| WO | 2008085758 | 7/2008 |
| WO | 2015193513 | 12/2015 |

(Continued)

OTHER PUBLICATIONS

ISA: United States Patent and Trademark Office, International Search Report and Written Opinion, PCT Application No. PCT/US2020/043588, mailed Oct. 30, 2020, 13 pages.

(Continued)

*Primary Examiner* — Jonathan L Sample
(74) *Attorney, Agent, or Firm* — Perkins Coie LLP

(57) ABSTRACT

An automatic tattoo apparatus can be used to robotically apply tattoos. A customer can shop on an online tattoo marketplace to select designs created by various artists located anywhere. The online tattoo marketplace can process and manage payments, artist and/or customer profiles, bookings, tattoo design uploads, browsing and design selection, design changes, and/or perform other actions. The automatic tattoo device can apply tattoos precisely, quickly, and may with reduced pain. The tattoo apparatus can apply a wide range of different types of tattoos, including but not limited to micro tattoos, dotwork, blackwork tattoos, realism tattoos, fine-line tattoos, etc.

19 Claims, 52 Drawing Sheets

(5 of 52 Drawing Sheet(s) Filed in Color)

(51) Int. Cl.
*A61B 34/32* (2016.01)
*A61M 37/00* (2006.01)

(52) U.S. Cl.
CPC .............. *A61B 5/442* (2013.01); *A61B 5/443* (2013.01); *A61B 5/445* (2013.01); *A61B 34/32* (2016.02); *A61M 37/0076* (2013.01); *A61M 2205/3306* (2013.01)

(56) References Cited

U.S. PATENT DOCUMENTS

| | | |
|---|---|---|
| 3,873,687 A | 3/1975 | Demko |
| 4,155,886 A | 5/1979 | DeGoler |
| 4,204,438 A | 5/1980 | Binaris et al. |
| 4,610,806 A | 9/1986 | Rosen |
| 4,894,547 A | 1/1990 | Leffell et al. |
| 5,401,242 A | 3/1995 | Yacowitz |
| 6,013,122 A | 1/2000 | Klitzman et al. |
| 6,207,874 B1 | 3/2001 | Felton et al. |
| 6,208,749 B1 | 3/2001 | Gutkowicz-Krusin et al. |
| 6,299,307 B1 | 10/2001 | Oltean et al. |
| 6,341,831 B1 | 1/2002 | Weber et al. |
| 6,470,891 B2 | 10/2002 | Carroll |
| 6,550,356 B1 | 4/2003 | Underwood |
| 6,800,122 B2 | 10/2004 | Anderson et al. |
| 6,890,319 B1 | 5/2005 | Crocker |
| 7,024,033 B2 | 4/2006 | Li et al. |
| 7,207,242 B1 | 4/2007 | Daigle |
| 7,249,712 B2 | 7/2007 | Ingalls |
| 7,344,587 B2 | 3/2008 | Khan et al. |
| 7,510,603 B2 | 3/2009 | Michel |
| 7,634,142 B1 | 12/2009 | Bourdev et al. |
| 7,738,032 B2 | 6/2010 | Kollias et al. |
| 7,922,688 B2 | 4/2011 | Bodduluri et al. |
| 7,945,302 B2 | 5/2011 | McAdams |
| 8,036,448 B2 | 10/2011 | Gildenberg |
| 8,083,422 B1 | 12/2011 | Simmons et al. |
| 8,090,224 B2 | 1/2012 | Lapstun et al. |
| 8,189,905 B2 | 5/2012 | Eaton et al. |
| 8,452,778 B1 | 5/2013 | Song et al. |
| 8,679,096 B2 | 3/2014 | Farritor et al. |
| 8,811,680 B2 | 8/2014 | Takiguchi |
| 8,819,024 B1 | 8/2014 | Toderici et al. |
| 9,022,949 B2 | 5/2015 | Herndon |
| 9,087,297 B1 | 7/2015 | Filippova et al. |
| 9,364,171 B2 | 6/2016 | Harris et al. |
| 9,371,957 B2 | 6/2016 | Dallarosa |
| 9,445,087 B2 | 9/2016 | Hillebrand et al. |
| 9,452,281 B2 | 9/2016 | Chan et al. |
| 9,486,290 B2 | 11/2016 | Zingaretti et al. |
| 9,505,134 B2 | 11/2016 | Guo et al. |
| 9,589,190 B2 | 3/2017 | Ramakrishnan et al. |
| 9,772,270 B2 | 9/2017 | Hyde et al. |
| 10,052,469 B2 | 8/2018 | Chan et al. |
| 10,130,260 B2 | 11/2018 | Patwardhan |
| 10,198,821 B2 | 2/2019 | Hougen et al. |
| 10,229,322 B2 | 3/2019 | Fridental et al. |
| 10,455,808 B1 | 10/2019 | Heath et al. |
| 10,692,220 B2 | 6/2020 | Gao et al. |
| 10,799,129 B2 | 10/2020 | Shiono et al. |
| 11,058,857 B2 | 7/2021 | Brown |
| 11,547,841 B2 | 1/2023 | Azdoud et al. |
| 11,839,734 B2 | 12/2023 | Azdoud et al. |
| 11,890,441 B2 | 2/2024 | Azdoud et al. |
| 2002/0110672 A1 | 8/2002 | Muratore-Pallatino |
| 2003/0095582 A1 | 5/2003 | Ackley |
| 2004/0146290 A1 | 7/2004 | Kollias et al. |
| 2004/0267121 A1 | 12/2004 | Sarvazyan et al. |
| 2005/0172852 A1 | 8/2005 | Anderson et al. |
| 2005/0234751 A1 | 10/2005 | Alls |
| 2007/0004972 A1 | 1/2007 | Cole et al. |
| 2007/0006497 A1 | 1/2007 | Alberts |
| 2007/0032846 A1 | 2/2007 | Ferren et al. |
| 2007/0060867 A1 | 3/2007 | Xu |
| 2007/0106306 A1* | 5/2007 | Bodduluri ............... A61B 34/70 606/133 |
| 2008/0027279 A1 | 1/2008 | Kheir |
| 2008/0033356 A1 | 2/2008 | Kluge et al. |
| 2008/0039827 A1 | 2/2008 | Ferren et al. |
| 2008/0078271 A1 | 4/2008 | Atkinson |
| 2008/0167674 A1* | 7/2008 | Bodduluri ......... A61M 37/0069 606/187 |
| 2008/0195043 A1 | 8/2008 | Schwach et al. |
| 2008/0208236 A1 | 8/2008 | Hobbs et al. |
| 2008/0214987 A1 | 9/2008 | Xu |
| 2008/0247637 A1* | 10/2008 | Gildenberg ............ A61B 34/70 901/41 |
| 2008/0273748 A1 | 11/2008 | Meiring et al. |
| 2008/0300615 A1 | 12/2008 | Colton et al. |
| 2009/0000513 A1 | 1/2009 | Michel |
| 2009/0183602 A1 | 7/2009 | Crockett |
| 2009/0227994 A1 | 9/2009 | Grundfest et al. |
| 2010/0030111 A1 | 2/2010 | Perriere |
| 2010/0245823 A1 | 9/2010 | Chhibber et al. |
| 2011/0148132 A1 | 6/2011 | Park et al. |
| 2011/0230833 A1 | 9/2011 | Landman et al. |
| 2011/0242132 A1 | 10/2011 | Bailey et al. |
| 2011/0246878 A1 | 10/2011 | Dowdell |
| 2011/0272976 A1 | 11/2011 | Wei |
| 2011/0288575 A1 | 11/2011 | Colton et al. |
| 2012/0040314 A1 | 2/2012 | Rubino, Jr. |
| 2012/0192681 A1 | 8/2012 | Klebs et al. |
| 2012/0300050 A1 | 11/2012 | Korichi et al. |
| 2013/0046324 A1 | 2/2013 | Williams |
| 2013/0098265 A1 | 4/2013 | Story et al. |
| 2013/0278716 A1 | 10/2013 | Kennedy et al. |
| 2014/0171963 A1* | 6/2014 | Bahls ..................... A61B 34/30 606/186 |
| 2014/0324089 A1 | 10/2014 | Chan et al. |
| 2016/0030134 A1 | 2/2016 | Shapter et al. |
| 2016/0067739 A1 | 3/2016 | Jones |
| 2016/0324586 A1* | 11/2016 | Zingaretti .......... A61B 17/3468 |
| 2016/0328644 A1 | 11/2016 | Lin et al. |
| 2017/0259599 A1 | 9/2017 | Shinoda |
| 2018/0000419 A1* | 1/2018 | Rassman .................. A61B 5/01 |
| 2018/0147400 A1 | 5/2018 | Brown |
| 2018/0177992 A1 | 6/2018 | Smith |
| 2018/0361589 A1 | 12/2018 | Paquin et al. |
| 2019/0294924 A1 | 9/2019 | Gould et al. |
| 2020/0311945 A1 | 10/2020 | Lim |
| 2020/0376855 A1 | 12/2020 | Lee et al. |
| 2020/0398036 A1 | 12/2020 | Wittendorff et al. |
| 2021/0060325 A1 | 3/2021 | Xiao |
| 2021/0145514 A1* | 5/2021 | Grossman ............... A61B 90/50 |
| 2021/0386987 A1* | 12/2021 | Azdoud ................ G06V 10/225 |
| 2021/0401489 A1* | 12/2021 | Ebbers .................... A61B 34/32 |
| 2022/0152371 A1 | 5/2022 | Azdoud et al. |
| 2022/0323736 A1 | 10/2022 | Asdoud et al. |
| 2022/0370778 A1 | 11/2022 | Azdoud et al. |

FOREIGN PATENT DOCUMENTS

| | | | |
|---|---|---|---|
| WO | 2016109746 | 7/2016 | |
| WO | 2018073439 | 4/2018 | |
| WO | 2020178818 | 9/2020 | |
| WO | WO-2020178818 A1 * | 9/2020 | ........ A61M 37/0076 |
| WO | 2021016590 | 1/2021 | |

OTHER PUBLICATIONS

U.S. Appl. No. 62/813,085, filed Mar. 3, 2019, 34 pages.
ISA: United States Patent and Trademark Office, International Search Report and Written Opinion, PCT Patent Application No. PCT/US2022/013691, mailed Jun. 6, 2022, 14 pages.

* cited by examiner

Digital Representation

Image from Image Capture Device

Machine Vision Algorithm

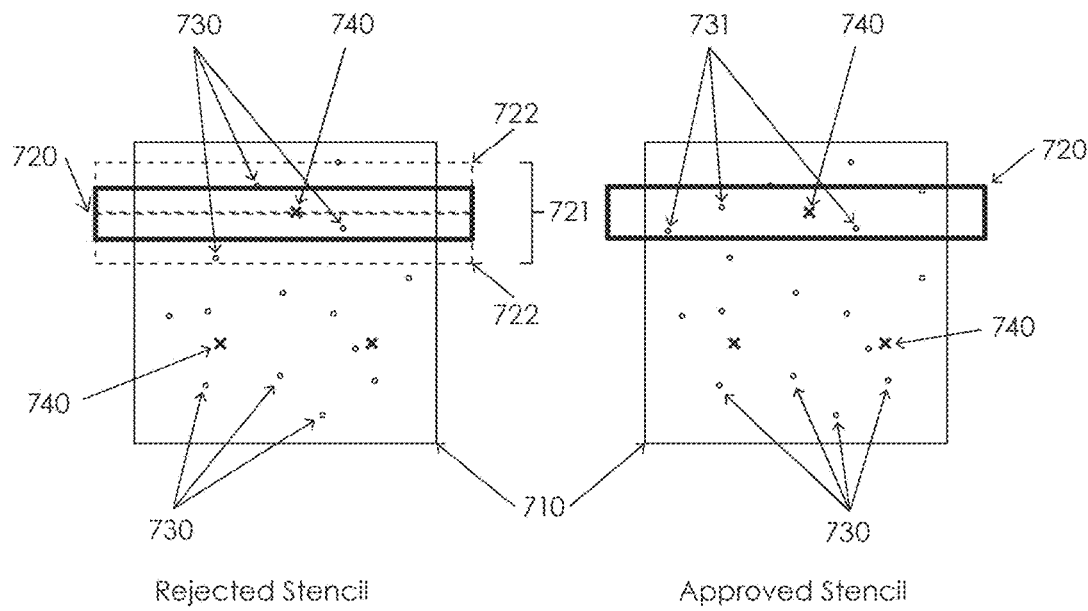
Rejected Stencil  
FIG. 11A
Approved Stencil  
FIG. 11B
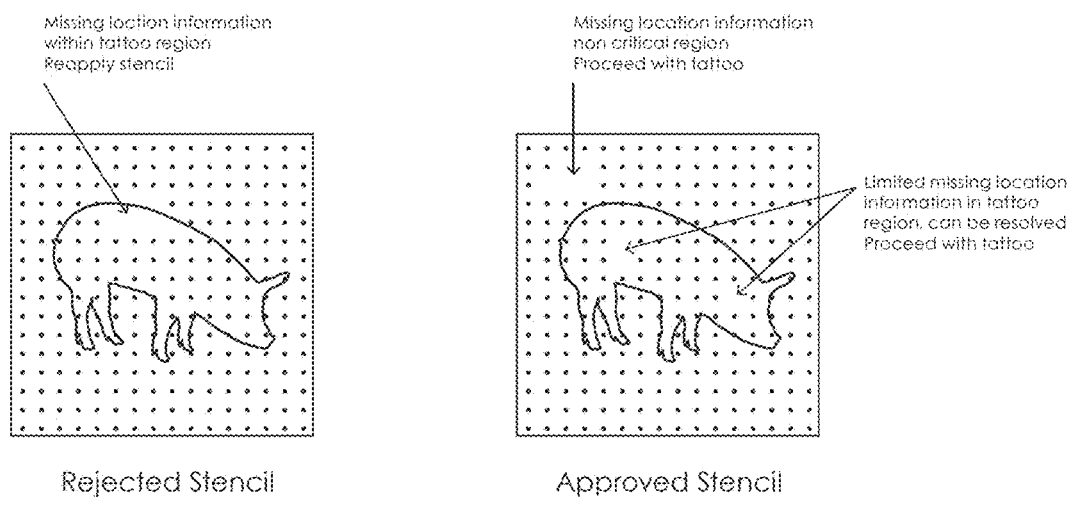
Rejected Stencil  
FIG. 11C
Approved Stencil  
FIG. 11D FIG. 24 A  Side view
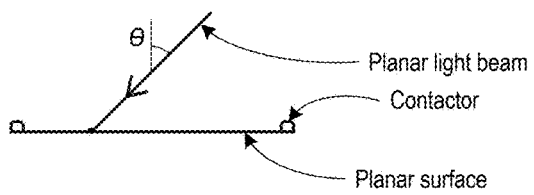
FIG. 24 B  Top view (camera image)
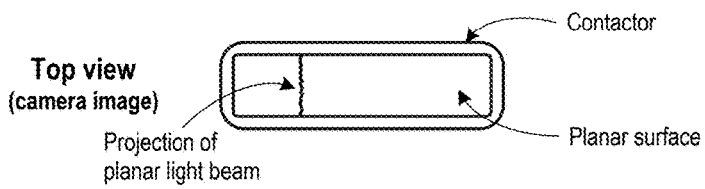
FIG. 24 C  Oblique view
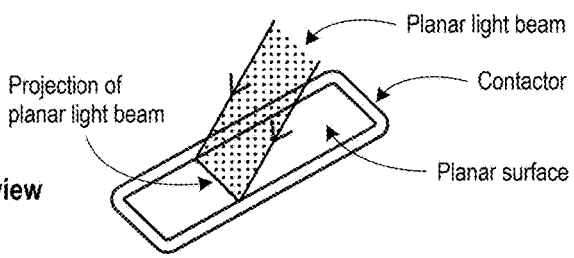
FIG. 25 A
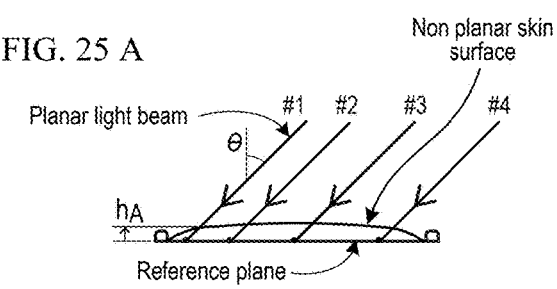
FIG. 26 A
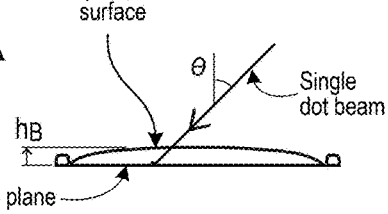
FIG. 25 B
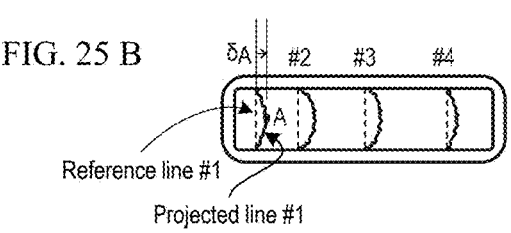
FIG. 26 B
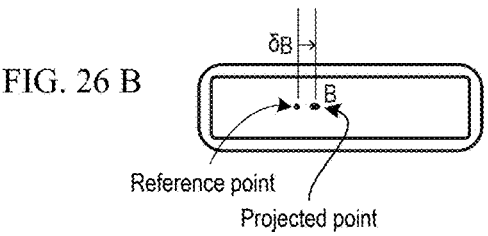
FIG. 25 C
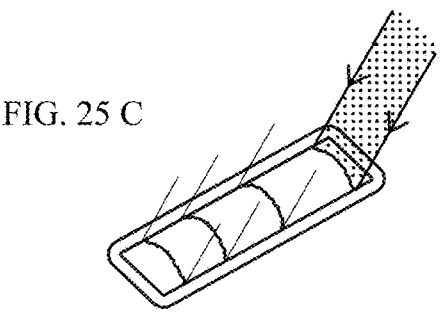
FIG. 26 C Existing tattoo- yellow banana w/ black linework

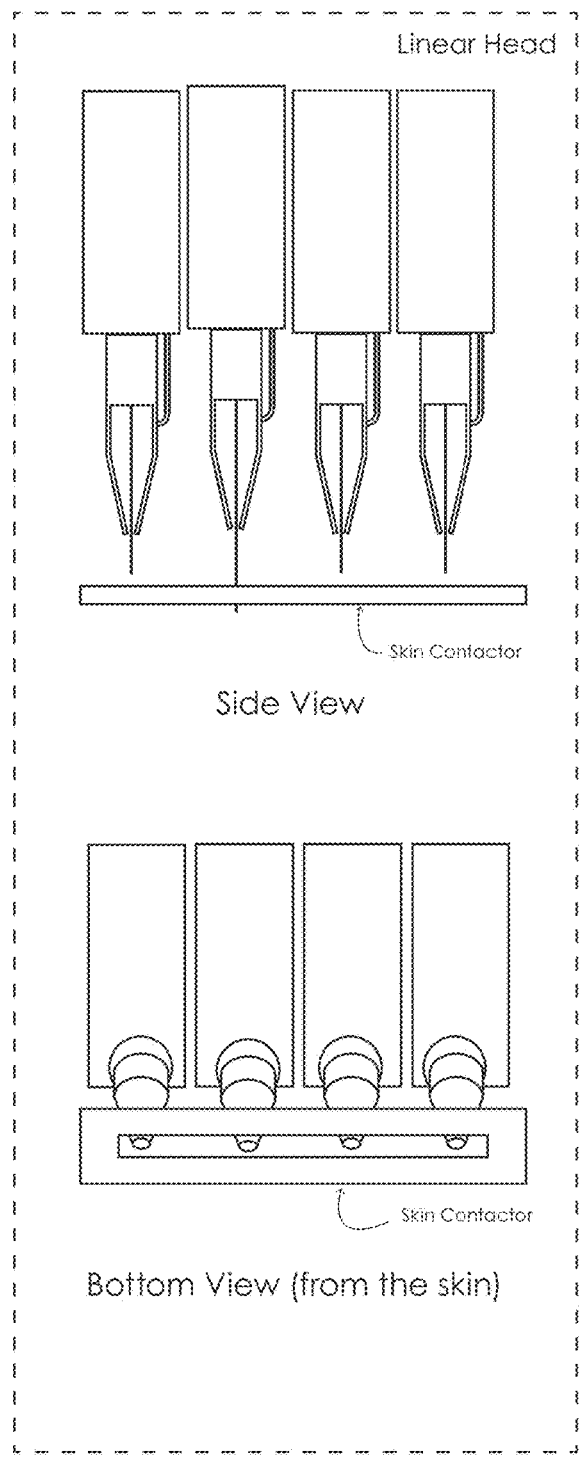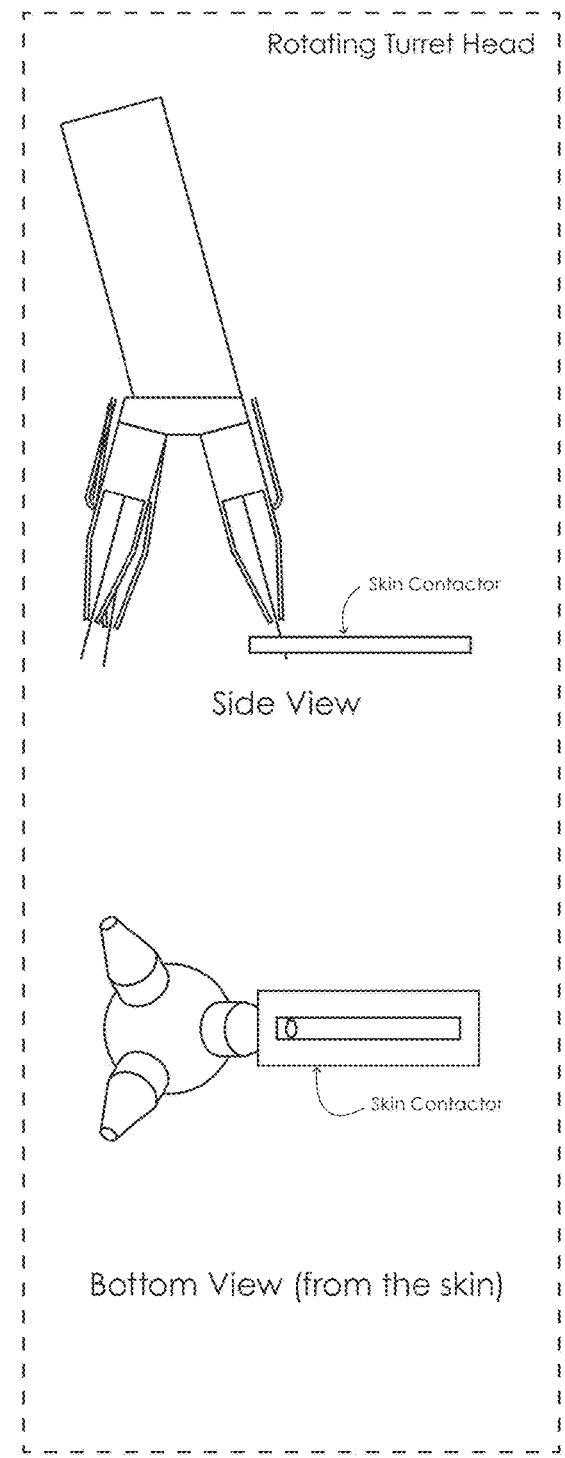
FIG. 31 A
FIG. 31 B

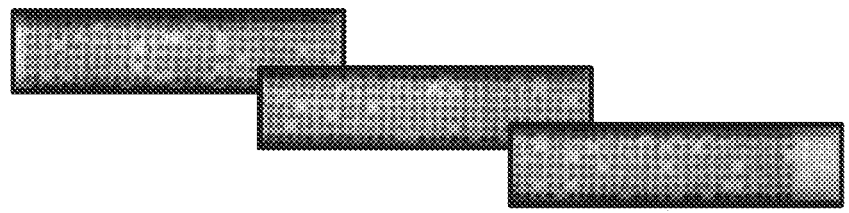
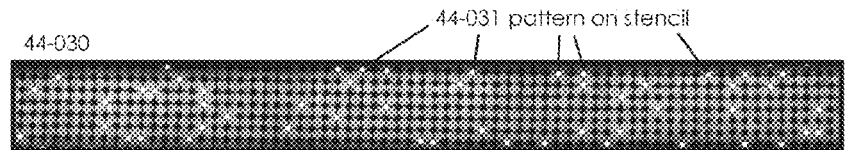
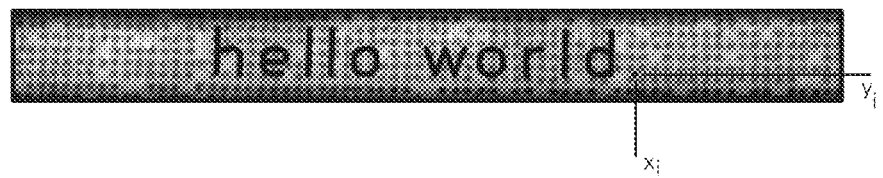
FIG. 44

ROBOTIC TATTOOING AND RELATED TECHNOLOGIES

CROSS-REFERENCE TO RELATED APPLICATION

The present application claims priority to and the benefit of U.S. Provisional Application No. 63/141,438, filed Jan. 25, 2021, which is hereby incorporated by reference in its entirety for all purposes.

TECHNICAL FIELD

The present disclosure relates generally to systems, devices, and methods for tattooing and applying substances to skin.

BACKGROUND

To apply a tattoo, a tattooing device is held by a tattoo artist while the tattooing device vibrates a needle to inject pigment into the skin. If the injection is too deep, it may have a different hue due to scattering or may look blurred due to subdermal diffusion. If it is too superficial, it may not be held in proper position and may migrate to produce a blurred image or be gradually removed to produce a faded image as the dermis is recycled. Unfortunately, artistic ability varies between tattoo artists, and a particular tattoo artist may be unable to apply visually appealing tattoos. Tattoo artists may develop an expertise applying particular types of tattoos, such as micro tattoos, dotwork, blackwork tattoos, realism tattoos, or fine-line tattoos. An individual may want a tattoo that cannot be produced by a local tattoo artist, so the individual may travel to visit tattoo artists at other locations. In-demand tattoo artists often have exceptional skill that cannot be adequately replicated by other tattoo artists, so they may require booking weeks, months, or years in advance and the tattoos can be expensive. Accordingly, conventional tattooing equipment and techniques have numerous drawbacks.

SUMMARY

In some embodiments, an automatic tattoo apparatus can be used to robotically apply tattoos. A customer can shop on an online tattoo marketplace to select designs created by various artists located anywhere. The online tattoo marketplace can manage payments, artist and/or customer profiles, bookings, tattoo design uploads, browsing and design selection, design changes, and/or perform other actions. The automatic tattoo device can apply tattoos quickly with reduced pain. The tattoo apparatus can apply a wide range of different types of tattoos, including but not limited to micro tattoos, dotwork, blackwork tattoos, realism tattoos, fine-line tattoos, etc.

The online tattoo marketplace can provide an augmented reality shopping experience enabling the customer to see how the tattoo will look at a particular target site on the body. Once a tattoo is selected, the online tattoo marketplace can notify a designated retail location of the purchase. The tattoo marketplace can supply the designated retail location with a token (e.g., a digital token, credit, etc.) or license to apply a tattoo design. An artist can receive payment for the application of the tattoo. The online tattoo marketplace can be used to provide graphics and designs from tattoo artists, non-tattoo artists such as visual artists, artistic celebrities, influencers, brands, artwork provided by customers themselves, or other sources. This allows customers to access artwork irrespective of an artist's physical location. In some embodiments, the artist can receive payment based on royalties, commissions, or other payment schemes. The online tattoo marketplace can include original designs, limited edition designs, resident designs, custom lettering, custom designs, customer provided designs, or other designs. Additionally, the online tattoo marketplace may offer other goods and services including but not limited to tattoo auctions or sale of artwork (e.g., original works and/or prints). After the tattoo apparatus has applied the art, one or more pictures can be supplied to the marketplace, tagged to the artists/studio. The pictures can either be taken by the tattoo machine or by a mobile phone, tablet, or other image capture device of the tattoo recipient, artist, etc.

The automatic tattoo apparatus can communicate with an artist or originator of the graphic and/or design via a network (e.g., a wide area network). A remote server can store the designs/graphics available via the online tattoo marketplace so the tattooing can be performed at any location (e.g., tattoo studio or retail location). For example, tattooing can be performed at retail locations with one or more automatic tattoo apparatuses that can be local and convenient for the customer. Each retail location may additionally provide other goods or services to offer an elevated tattooing experience, such as after-tattoo lotion and sunscreen, bandages, merchandise, etc. An operator of the automatic tattoo apparatus may require less and/or different expertise than a traditional tattoo artist. The automatic tattoo apparatus can apply tattoos visually the same as the originator of the graphic and/or design who can be an in-demand tattoo artist with exceptional skill. Individuals can obtain tattoos of artwork from an artist without having to travel to or book a session with that artist. This allows artwork to be reproduced at a wide range of locations. In some embodiments, the automatic tattoo apparatus is in the form of a tattoo robot capable of applying tattoos. The tattoo robot can include one or more controllers, robotic arms, tattoo needle assemblies, etc.

At least some embodiments can include a tattoo apparatus comprising a tattoo shuttle configured to carry a tattoo needle, at least one sensor configured to measure at least one characteristic of a portion of a customer's skin, a machine vision device positioned to obtain one or more images of the portion of skin, and at least one controller. The controller can be configured to calculate a skin position and/or a skin deformation based on the obtained images and/or sensor signals, and control a puncture depth based at least in part on at least one of: the skin position, the skin deformation, or other characteristic(s) of the portion of skin. The needle can be disposable. In some embodiments, the tattoo apparatus can apply tattoos to articles made of natural materials, synthetic materials, or combinations thereof. For example, the tattoos can be applied to belts, clothing, wallets, etc. In some embodiments, the tattoo apparatus is a portable handheld tattooing apparatus with integrated components.

In at least some embodiments, the sensor can be configured to measure information about a puncture operation on the portion of skin. The information can include a load applied to the needle structure during puncture, an acceleration of the needle structure, a speed of the needle structure, a velocity of the needle structure, an angular position of the needle structure, an impedance between the needle structure and skin while in contact with the portion of skin (absolutely or relative to an impedance of the portion of skin alone), and/or an amount of vibration. Accelerometers, gyroscopes, and position sensors can measure the acceleration, rotation, and/or position of the needle or other components. The characteristic(s) of the portion of skin can also include, but are not limited to, skin elasticity, impedance, and/or thickness (e.g., thickness of the skin, thickness of each layer of the skin, etc.). In some implementations, a force or pressure sensor is used to determine a load applied to skin by the tattoo apparatus and based on displacement output, properties relevant to skin elasticity are determined. Electrical sensors can monitor tissue impedance based on changes of measured impedance during skin punctures. Changes in impedance can be correlated to the passage of the needle through tissue, in general or at a particular depth. Identification of tissue layers, thicknesses of tissue layers, and other tissue information can be determined based on the output from such sensors.

The controller can be configured to determine a depth of a tissue layer interface based at least in part on a relationship between a force applied to the portion of skin and the depth of the tissue layer interface. Determination of the skin deformation can be based at least in part on an initial deflection of the portion of skin resulting from a force applied to the portion of skin. The controller can be configured to determine characteristics of leather and other materials, whether natural or synthetic.

At least some embodiments can include a tattoo device comprising at least one sensor configured to detect skin puncture events for various needles, at least one characteristic of a portion of skin, or the like. The characteristic can include a depth of a tissue layer interface, and a means for controlling a piercing depth based at least in part on the measured characteristic of the portion of skin. In some embodiments, the skin puncture event can relate to one or more of: (1) the initial contact with the skin, (2) the initial epidermis failure, (3) where the needle is at the junction of an epidermal and a dermal layer of the skin, (4) where the needle tip is at the junction between a dermal and a hypodermal layer of the skin, (5) where the needle is at its deepest position and/or (6) where the needle exits the skin. The characteristic of the skin can include at least one of a skin elasticity, impedance, or thickness. The characteristics of undeformed or deformed skin can be determined. An optical sensor can be used to determine one or more characteristics of undeformed skin whereas a galvanic sensor or an electrical sensor can be used to determine one or more characteristics of deformed skin. Characteristics of the skin in different states (e.g., deformed state, undeformed state, etc.) can be used to monitor a site before, during, and after application of the tattoo.

In some embodiments, the sensor can be configured to detect the depth of the needle when a puncture event occurs based, at least in part, on a relationship between a force applied to the portion of skin and the depth of the tissue layer interface. The sensor can be further configured to detect a deflection distance or initial deflection of the skin resulting from a force applied to the portion of skin. In some embodiments, the sensor measures the deflection of the skin caused by a needle.

In some embodiments, the sensor can detect the position and/or depth of the needle, when a puncture event occurs, based at least in part on impedance. For example, the sensor can detect the variation of a contact conductivity of the needle against the skin relative to the conductivity of the skin alone. The sensor can be further configured to detect a deflection distance (e.g., initial deflection to puncture) of the skin resulting from a force applied to the portion of skin. In some embodiments, the sensor measures, whether directly or indirectly, the deflection of the skin caused by a needle.

At least some embodiments can include a method for robotic tattooing that includes measuring at least one characteristic of a portion of skin corresponding to a dot position and controlling a piercing depth for the dot position based at least in part on the characteristic(s) of the portion of skin. In some embodiments, the dot position can be one of a plurality of dot positions, and the method can be repeated for each dot position. In some embodiments, the dot position can be one of a plurality of dot positions, and the measuring step can be repeated for some of the dot positions. The characteristic of a portion of skin for the remainder of the plurality of dot positions can be determined based at least on interpolation from the measured characteristic of the portion of skin of the measured dot positions. The measured characteristic of the portion of skin can include at least one of a skin elasticity, impedance, or thickness. In some embodiments, the measured characteristic can include one or more mechanical characteristics (e.g., elasticity of tissue, puncture strength, and/or tear strength), electrical characteristics (e.g., impedance), dimensions (e.g., position and/or layer thickness), or the like.

In at least some embodiments, the method can further comprise detecting a position and/or depth of the needle when a puncture event occurs based at least in part on a relationship between a force applied to the portion of skin and the depth of the tissue layer interface. In at least some other embodiments, the method may further comprise detecting a skin deformation of the portion of skin based at least in part on an initial deflection of the portion of skin resulting from a force applied to the portion of skin. The skin can be leather, skin of a living animal (e.g., a human, livestock, etc.), or the like. The method can also be used to apply tattoos to synthetic materials.

The method, in at least some embodiments, can further comprise detecting a position and/or depth of the needle when a puncture event occurs based at least in part on the variation of the contact conductivity of the needle against the skin relative to the conductivity of the skin alone. In some embodiments, the method may further comprise detecting a skin deformation of the portion of skin based at least in part on an initial deflection distance of the portion of skin resulting from a force applied to the portion of skin.

At least some embodiments can include a method for tattooing skin, comprising: acquiring at least one skin puncture property, updating a dot parameter table with a machine setting based on the acquired at least one skin puncture property, and controlling deposit of a substance into the skin based at least in part on the updated dot parameter table. In some embodiments, the method may further comprise applying a stencil (e.g., a stencil with a plurality of dot positions) prior to acquiring the skin puncture property. In some embodiments, the skin puncture property includes a skin deformation measurement. The skin deformation measurement can be based at least in part on an initial deflection of the skin resulting from a force applied to the skin.

The dot parameter table can include a plurality of dot positions and the updating can further include updating a machine setting for each of the plurality of dot positions. In some embodiments, updating the dot parameter table step further comprises determining the machine setting based on interpolation from the skin puncture property. The skin puncture property can include a skin elasticity, impedance, tissue layer depth, tissue layer thickness, and/or layer junction locations.

In at least some embodiments, the method can further comprise detecting a position and/or depth of the needle when a puncture event occurs based at least in part on a relationship between a force applied to the portion of skin and the depth of the tissue layer interface. The deposit of a substance can be controlled based at least in part on the position and/or depth of the needle when the puncture event occurs.

In at least some embodiments the method can further comprise detecting a position and/or depth of the needle when a puncture event occurs based at least in part on the variation of the contact conductance, relative to the conductivity of the skin alone. The deposit of a substance in the skin can be controlled based at least in part on the depth of the needle when a puncture event occurs. In some embodiments, the contact conductivity can be monitored to evaluate changes of the contact conductivity as the puncture depths increases, position of the needle changes, or the like.

At least some embodiments can include methods for managing a marketplace. The method can include providing a user interface illustrating one or more tattoo designs. The method can include receiving a selection of one or more designs and providing the one or more designs to an automatic tattooing apparatus at a retail location in association with a digital token. The automatic tattooing apparatus applies the one or more designs to a tattoo recipient in response to receiving an indication of the digital token. A user can select and receive a tattoo by browsing an online tattoo marketplace, selecting one or more designs, going to a retail location housing an automatic tattooing apparatus, and receiving a tattoo of the one or more selected designs from the automatic tattooing apparatus. The browsing and selecting steps can be performed by different users (e.g., a customer, an artist, or the like) through a mobile application, computer, website, or the like. In other embodiments, the browsing and selecting steps can be performed by a user through a computing device, such as a smartphone, an augmented reality device, a computer. In some embodiments, designs available on the online tattoo marketplace could have been contributed by one or more of: an artist, another user, company, or the user. A user can select a tattoo selection tool via an online tattoo marketplace, at the retail location, or any other suitable location. In some embodiments, the user can use the computing device to preview the location and the design of the selected tattoo. For example, the user can use augmented reality to view the location of the tattoo on his or her body. The user can then accept the location or reposition that tattoo. The tattoo system can lock the tattoo location based on the user's acceptance.

After receiving the tattoo, an artist who created at least one of the selected designs can receive payment for each created design that was received as a tattoo. In some embodiments, the retail location can be a location remote from an artist who created the design.

At least some embodiments are directed to an automated apparatus configured to analyze a site and to puncture a subject's skin at the site. The analysis can include, without limitation, one or more optical analyses, electrical analyses, mechanical analyses, chemical analyses, or combinations thereof. The apparatus can puncture the subject skin to apply one or more liquids, medications, substances, or combinations thereof. In some embodiments, the apparatus can perform multiple analyses to perform a task, such as applying one or more tattoos. The apparatus can perform analyses to position a piercing element (e.g., a needle, needle array, etc.) for injecting a fluid (e.g., liquid ink, pigment, dyes, etc.) into one or more layers of skin or other tissue. The apparatus can be used in tattooing applications, medical applications, aesthetic applications, or other suitable uses.

In tattooing applications, a temporary pigment can be injected into the epidermal layer to provide a reference feature (e.g., a temporary dot). A permanent pigment can be injected into the dermal or other layer using the reference feature. The subject's body can naturally cause the reference feature to break down and be absorbed into the subject's body leaving only the permanent features (e.g., tattoo dots). An optical analysis can include using machine vision or computer vision to identify reference features (e.g., applied and/or natural fiducials), landmarks, stenciling, applied dots (e.g., previously applied dots when applying the tattoo), skin features (e.g., moles, scars, hair, etc.), or the like. The apparatus can be programmed to identify such features and determine one or more of the following: position of stenciling, tattoo placement, puncture sites (e.g., interrogation sites), volume of ink to be applied at each puncture site, depth of puncture site, needle characteristics, and/or position information. If the subject's body part moves during a session, the apparatus can identify the movement and determine an appropriate protocol for continuing one or more tasks based on the new body position. This allows a tattoo to be robotically applied without disrupting the session. The apparatus can apply a wide range of substances, including fluids, gels, or other suitable substances. For example, during or after the session, the apparatus can inject one or more medicants, analgesics, pigment enhancing agents, antibacterial agents, or other substances in the dermal and/or epidermal layers to, for example, reduce discomfort, promote healing, inhibit infection, or combinations thereof. In a following session (e.g., a session days, weeks, or months after a tattoo is applied), the automated apparatus can analyze the tattoo and identify areas to be modified by, for example, reapplying dots, touching up dots, etc. Images of the applied tattoo can be compared to a virtual tattoo to identify the areas to be modified.

In non-tattoo applications, the apparatus can apply botulinum toxin (e.g., Botox®), anti-wrinkle agents, denervating agents, anti-acne agents, collagen, or the like. The apparatus can optically analyze a site and identify wrinkles (using a trained computer vision system similar to that described below) and target wrinkles located along the subject face (e.g., along the forehead, surrounding the eyes, etc.) or any other location. The apparatus can determine one or more puncture sites based on characteristics (e.g., size, depth, location, etc.) of the wrinkles. The apparatus can inject one or more anti-wrinkle agents at puncture sites to reduce or limit the appearance of the targeted wrinkles.

The apparatus can include one or more machine vision systems configured for imaging-based automatic inspection and analysis. The machine vision systems can be configured for one-dimensional, two-dimensional, or three-dimensional analysis and can include one or more image capture devices, such as digital cameras. The machine vision system can analyze non-planar surfaces, planar or flat surfaces, optically identifiable features, and other features. The non-planar surfaces can include, without limitation, curved surfaces (e.g., highly-contoured regions of skin), undulating surfaces, or the like. The flat surfaces can be generally flat areas of tissue. A frame can be pressed against the subject's tissue to flatten the site. The optically identifiable features can include, without limitation, dots, tattoos (e.g., portions of tattoos, entire tattoos, etc.), stenciling (e.g., dots, patterns of dots, etc.), body parts, or the like. In some embodiments, the machine vision systems can be configured to perform, without limitation, one or more line scans, area scans, triangulation data collection (e.g., 3D images suitable for triangulation), etc. The machine vision systems can capture images and generate one or more maps based on the captured images. For example, captured images can be combined to generate multi-dimensional maps (e.g., two-dimensional maps, three-dimensional maps, etc.), or the like. In some implementations, such a computer vision system can use a machine learning model or other suitable analytical models trained to identify desired features (e.g., skin landmarks, stenciling, applied tattoo dots, wrinkles, moles, scars, hair, etc.). For example, a neural network can be trained to identify such features with supervised learning, applying training items comprising images with parts tagged as having or not having these features. The training data can be based on human tagged images, medical databases, etc. In various implementations, different types of neural networks (e.g., deep neural networks, convolutional neural networks, etc.) can be used or other types of machine learning models (e.g., decision trees, support vector machines, etc.) can be used. Further, different types of training can be applied (e.g., supervised, unsupervised, applying different types of loss or activation functions, etc.).

In some embodiments, the apparatus can include one or more cameras, sensors (e.g., 2D or 3D sensors such as laser-displacement sensors, imaging sensors, calibration sensors, etc.) for outputting data for inspection, feature identification, surface topology, area evaluation, volume measurement, or the like. The output from the sensors can be used to produce, without limitation, images (e.g., digital images), maps of target sites, height maps (e.g., height maps generated from displacement of reflected lasers), or the like.

In some embodiments, a system can be used to analyze one or more interrogation sites to determine at least in part how to apply a tattoo or a portion thereof. The interrogation sites can be punctured to determine skin characteristics, including number of skin layers within a certain depth, dimensions of skin layers, characteristics of skin layers (e.g., elasticity, puncture characteristics, etc.), or the like. Puncture sites can be the same as or different from the interrogation sites. Puncture sites suitable for receiving dye can be selected based on, for example, target site characteristics, the tattoo design to be applied, stencils, etc. During the tattooing process, a tattoo site can be periodically or continuously analyzed to adaptively adjust the application of the tattoo to enhance application by, for example, compensating for, without limitation, skin stretch, appearances of applied dots, body part movement, or the like.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 11A and 11B are illustrative diagrams of an example rejection and example approval of a stencil position, respectively, in accordance with an embodiment of the disclosure.

FIGS. 11C and 11D are simplified illustrative diagrams of an example rejected stencil and an example approved stencil, respectively, in accordance with an embodiment of the disclosure.

FIGS. 24A-24C, 25A-25C and 26A-26C show processes of skin height measurement in accordance with embodiments of the disclosure.

FIGS. 31A and 31B show needle arrangements in accordance with embodiments of the disclosure.

FIG. 44 is an illustrative diagram of an embodiment of a machine vision process, in accordance with an embodiment of the disclosure.

DETAILED DESCRIPTION

Tattooing Environment and Systems

Figure 1A:
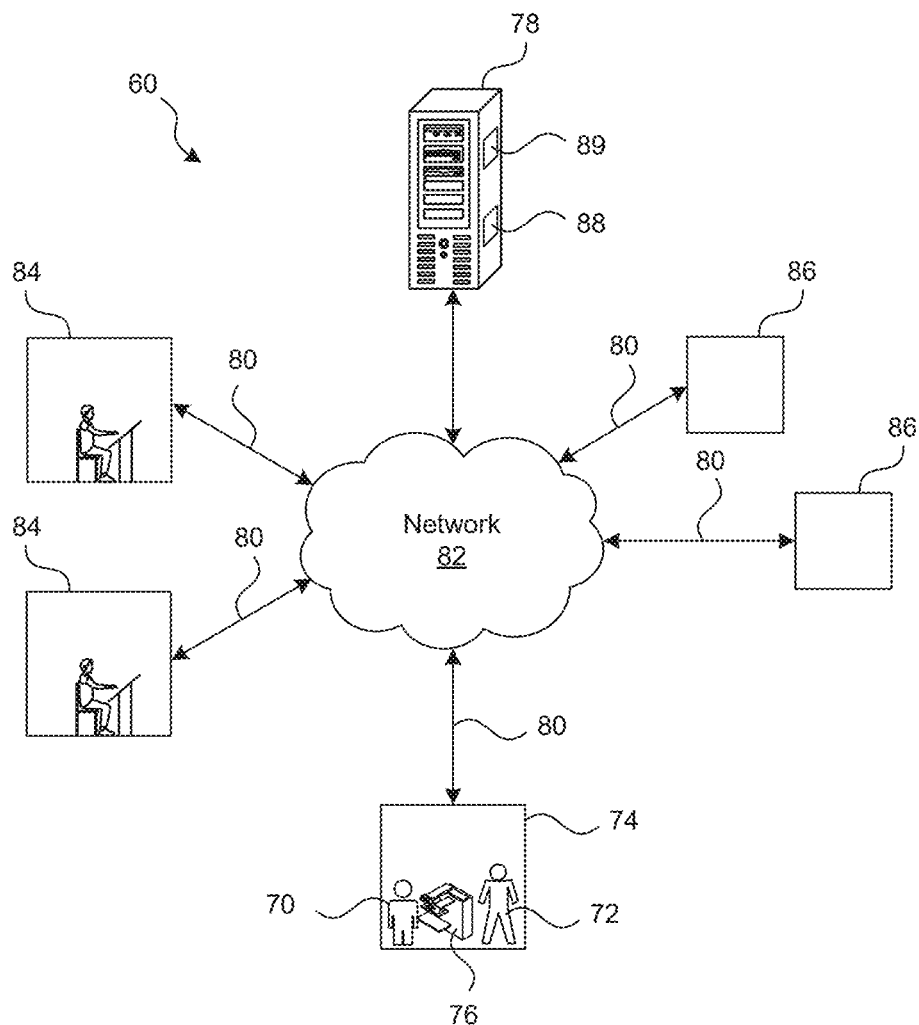
FIG. 1A is a network diagram of a tattooing environment and system in accordance with an embodiment of the disclosure.

FIG. 1A is a network diagram of a tattooing environment and system 60 in accordance with an embodiment of the disclosure. A client or subject 70 ("subject 70") and operator 72 can be located at a tattoo studio 74. The tattoo studio 74 can include one or more automated tattooing systems 76 configured to apply a tattoo based on artwork selected by the subject 70. The operator 72 can prepare the tattoo site and operate the automated tattooing system 76.

A tattoo assistance system 78 can include, without limitation, one or more computing devices and/or system and can provide data used by the automated tattooing systems 76. The tattoo assistance system 78 can perform one or more steps of a tattooing process, such as generating calibration protocols, determining skin puncture properties, generating tables (e.g., dot parameter tables, puncture data, etc.), processing images, generating stenciling, generating tattooing protocols, or the like. The tattoo assistance system 78 can include, for example, one or more servers, processors, and memory storing instructions executable by the one or more processors to perform the methods described herein. In some embodiments, the server implemented can be a distributed "cloud" computing system or facility across any suitable combination of hardware and/or virtual computing resources. The tattoo assistance system 78 can communicate with the automated tattooing systems 76, network 82, and other systems through communication channels 80.

The network 82 can be in communication with artwork providers 84 and users/clients 86. The artwork providers 84 can be artists that upload tattoo artwork to an online tattoo marketplace. In one embodiment, the online tattoo marketplace may be a global online tattoo marketplace where artwork providers 84 may upload, license, and/or sell their designs irrespective of their physical location. Artists may be paid a royalty based on selection and/or licensing of their designs by subjects through the app and/or website. The tattoo assistance system 78 can provide or support a user interface illustrating one or more tattoo designs. The tattoo assistance system 78 can receive a selection of one or more design and provide the one or more designs to an automated tattooing system 76 with a digital token. The automated tattooing systems can use one or more designs to a tattoo recipient (e.g., subject 70 in FIG. 1A) in response to receiving an indication of the digital token. The tattoo assistance system 78 can include features and functionality discussed in connection with FIGS. 20 and 21 and perform one or more of the steps (e.g., all of the steps) of algorithms discussed in connection with FIGS. 3A-7, 9, 12A-13, 17, and 19.

The subject 70 can purchase a tattoo from one of the artwork providers 84 who may be located at a remote location. The subject 70 can obtain artwork for generating a high-quality tattoo that appears similar to original artwork provided by the artist. The tattoo system 76 can reproduce artwork more consistently than a human tattoo artist. Accordingly, individuals across the world can purchase artwork form an artist and receive a tattoo of the artwork without requiring that the individual travel to the artist. The tattoo system 76 can replicate tattoos from an in-demand tattoo artist without requiring booking with that artist, thereby reducing the time to receive the tattoo and costs. Additionally, the tattoo system 76 can apply, for example, micro tattoos, dotwork, blackwork tattoos, realism tattoos, and/or fine-line tattoos. Tattoos can be applied based on artwork from individuals located throughout the world. The tattoo system 76 can include one or more robotic arms (e.g., multi-axis arms, etc.), linear actuators, rails, motors, gantries, controllers, and other suitable components for manipulating and positioning needles to produce the tattoo.

The tattoo assistance system 78 can include at least one database 88 and module 89. The database 88 can be configured to store artwork, protocols, tattoo data, skin data, stencil data, client data, or the like. The module 89 can be configured with one or more algorithms for performing processes disclosed herein and discussed in connection with FIGS. 3A-7, 9, 11A-13, 17-19, 24A-29, and 32A-32C. Some or all of the functionality described herein with respect to the module 89 may also be performed by the tattoo systems/apparatuses, and vice-versa. The module 89 can also include some or all of the functionality and features described herein with respect to the controller of FIG. 20 or other controllers disclosed herein. A remote server of the module 89 can store the designs/graphics available via the online tattoo marketplace so the tattooing can be performed at any location (e.g., tattoo studio or retail location). For example, tattooing can be performed at retail locations with one or more automatic tattoo apparatuses that can be local and convenient for the customer. In some embodiments, the tattoo assistance system 78 can communicate with an artist or originator of the graphic and/or design via the network 82 (e.g., a wide area network).

The subject 70 and users/clients 86 can use a user device to select artwork, purchase tattoos, input preferences, submit payment, manage credits/tokens, or the like. Browsing and selection of artwork may be done via a mobile app and/or website that allows access to the online tattoo marketplace, through which subjects may perform actions including, but not limited to, browsing, selecting, saving, rating designs, uploading, creating a profile, booking appointments, participating in auctions, or buying. In one embodiment, the online tattoo marketplace may be a global online tattoo marketplace where artists or users may upload, license, and/or sell their designs irrespective of their physical location. Artists may be paid a royalty based on selection and/or licensing of their designs by subjects through the app and/or website. Browsing, selection, and payment process may vary by location, as well as by individual artists. Exemplary user devices include, without limitation, a personal computer (PC), a laptop, a tablet computer, or a smartphone. Generally, the user device can include a display and/or one or more processors. The displays can offer the user a visual interface for interaction with the system, as discussed in connection with FIG. 9 (e.g., user device 509 of FIG. 9). The tattoo studio 74 can have different robotic tattooing machines disclosed herein for producing a wide range of different types of tattoos to the subject 70.

Figure 1B:
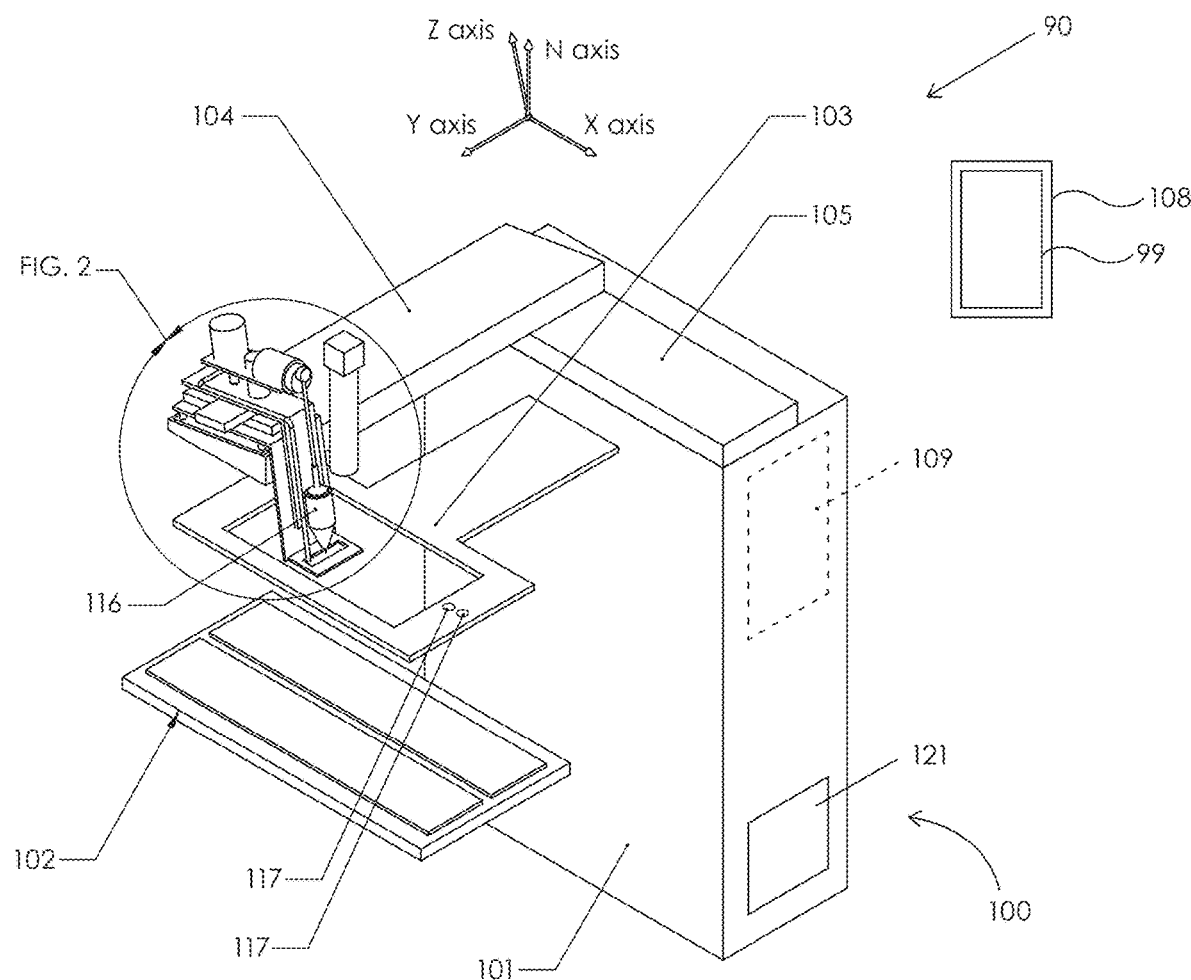
FIG. 1B is a schematic isometric view of a tattooing system in accordance with an embodiment of the disclosure.

FIG. 1B is a schematic isometric view of a tattooing system 90 in accordance with an embodiment of the disclosure. The tattooing system 90 is suitable for use in the environment of FIG. 1A and can include a tattooing apparatus 100 and at least one controller 108. The tattooing system 90 can determine a tattoo protocol or receive a tattoo protocol based on a target tattoo site on the subject. The tattooing apparatus 100 can apply the selected tattoo based on the tattoo protocol. During the tattoo session, the subject's body part can rest on a rest surface 102.

The tattooing apparatus 100 can include a cantilevered tattoo machine 101 ("tattoo machine 101"), a tattoo frame 103, and a tattoo shuttle 104 configured to carry a tattoo needle. The tattoo machine 101 can move the tattoo shuttle 104 while the tattoo frame 103 is against the target tattoo site. The tattooing apparatus 100 can also include one or more sensors 116 and at least one controller 109. The sensors 116 can be carried by the shuttle 104 and/or a component of the shuttle 104 and configured to measure at least one characteristic of a subject's skin. The tattooing process can be controlled based at least in part on the measured characteristic(s) of the portion of skin, such as skin elasticity, impedance, or thickness (including thicknesses of one or more skin layers).

The cantilevered tattoo machine 101 can be a structural element connected to the tattoo shop floor, which holds the rest surface 102, the tattoo frame 103, and the tattoo shuttle 104. The cantilevered tattoo machine 101 can be configured to provide structural support and stability to the tattooing system 90 and its components. In some embodiments, the cantilevered tattoo machine 101 can include motors (e.g., drive motors, stepper motors, etc.), robotic arms (e.g., multi-axis arms), gantry devices, linear slides, rails, sensors (e.g., position sensors, accelerometers, etc.), motors, rails, or the like.

With continued reference to FIG. 1B, the tattooing apparatus 100 can be actuated through a cantilevered X gantry 105 along an axis, illustrated as an X axis. The X gantry 105 may be a mechanical gantry that moves on the X axis and connects the tattoo shuttle 104 to the cantilevered tattoo machine 101. A Y axis may be orthogonal to the X axis in a plane of the tattoo frame 103. An N axis may be normal to a plane formed by the X and Y axes. A Z axis may be formed with a degree of inclination relative to the N axis. In one embodiment, the Z axis is not orthogonal to the plane formed by the X and Y axes. For example, the Z axis may have a 10 degree, 15 degree, or 20 degree inclination to the XY normal (N axis) in the XZ plane, and 0-degrees in the YZ plane. In another example, the Z axis may have more or less than a 15-degree inclination in the XZ plane, and more or less than about 0-degrees in the YZ plane. In another embodiment, the Z axis is orthogonal to the plane formed by the X and Y axes.

Figure 2:
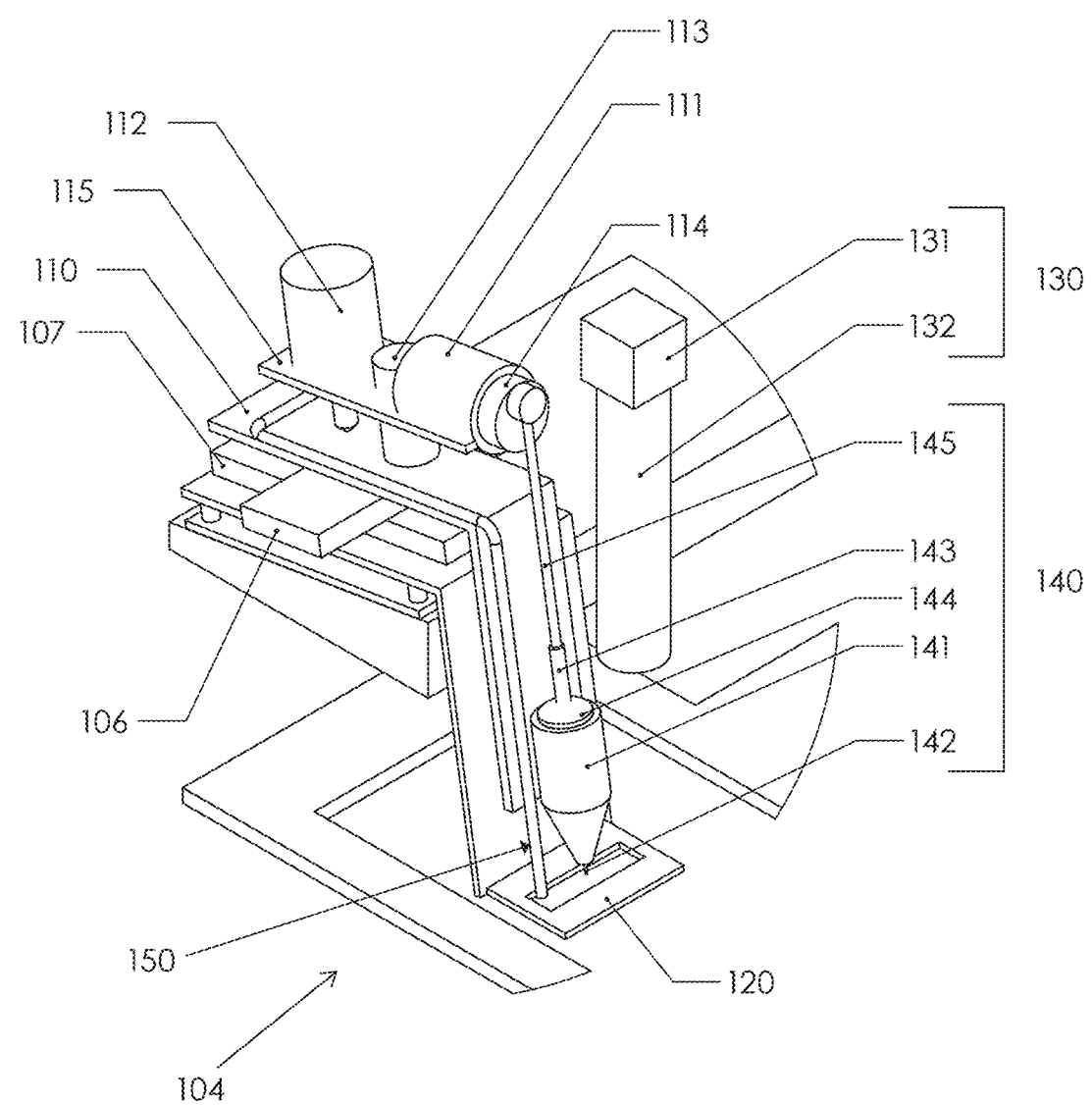
FIG. 2 is a schematic isometric view of a tattoo shuttle of the tattooing system of FIG. 1B in accordance with an embodiment of the disclosure.

The rest surface 102 can be a pad with a set of inflatable bladders or pneumatic actuator for precise alignment of a body part to be tattooed. For example, the pneumatic actuator may be configured to maintain a tattoo area of the body in contact with the tattoo frame 103, while applying low enough pressure as to not interrupt blood perfusion of the body part. The rest surface 102 may be configured to orient the body part to be tattooed in a relaxed position for the subject. The pad of the rest surface 102 may vary in size, shape, and configuration. For example, the pad may be larger or smaller than the tattoo frame 103. In a particular embodiment, the pad may be larger than the largest tattoo frame 103. In another example, the pad may comprise of multiple segments and/or shapes. The rest surface 102 can be raised or lowered so that its height is capable of being set manually, or automatically, with n degrees of freedom. For example, rest surface height can be set with 3+1 degrees of freedom. In another embodiment rest surface height can have more or less than 3+1 degrees of freedom. The rest surface 102 can be rotated manually and/or set monobloc with the cantilevered tattoo machine 101. In some embodiments, the pad 102 may not be actuated or necessary and the tattoo machine 100 may be positioned to apply the appropriate contact force to the body part regardless of its orientation and rest surface, such that the contactor 120 of FIG. 2 is in contact with the area to be tattooed and/or for the frame 103 to hold the body part of interest in place.

The tattoo frame 103 may be a flat frame surface in contact with the skin to isolate the area where the tattoo is to be applied. The tattoo frame 103 may be fixed in the YN direction and all rotations with respect to the tattoo shuttle 104, and/or also fixed with respect to the cantilevered tattoo machine 101. The tattoo frame 103 may comprise a variety of shapes and sizes. In one embodiment, the tattoo frame 103 can be generally rectangular with a window (e.g., a polygonal window, rectangular window, etc.) to isolate the area of skin where the tattoo is to be applied. In other embodiments, the tattoo frame may be, for example, circular, ovular, or any other shape. The tattoo frame 103 may be equal to, larger, or smaller than the rest surface 102. The size and shape of the tattoo frame 103 can generally correspond to an area of the body to be tattooed. For example, in one embodiment, an appropriate tattoo frame 103 may generally match the size of the area of the body to be tattooed. In some embodiments, the tattoo frame 103 size may be between about 20×20 mm to about 100×300 mm. Additionally, the tattooing apparatus 100 may have a plurality of tattoo frames 103 that maintain contact with the skin and expose a tattoo zone. In some embodiments, tattooing apparatus 100 may utilize one or more tattoo frames 103 that are interchangeable and chosen based on the desired tattoo. The tattoo zone can be rotated and repositioned to match a location of the tattoo. In some embodiments, the tattoo frame 103 can be omitted and other means can be employed to hold the body part of interest in place and/or at least detect movement of the body part of interest before, during, and/or after the tattooing process.

The controller 108 can be a computing device with one or more displays for displaying artwork, tattoo designs, stenciling, tattoo needle paths, tattoo session information (e.g., length of session, costs, color of inks to be applied, etc.), and/or visualization of artwork to be applied. In some embodiments, a display 99 can provide visualization of artwork selected by the client. The client can input location information such that the system virtually applies the tattoo using augmented reality or other visualization techniques. A user can specify a location by overlaying an image of the design on an image of their skin (e.g., via a live feed from their camera, a previously captured image, etc.). The system can then use computer vision techniques to identify position and orientation of the design in relation to, for example, the body party and/or one or more skin features, such as existing tattoos, moles, hairs, wrinkles, blemishes, etc. The position and orientation of the design, in relation to these skin features, can then be stored (e.g., stored by controllers 108 and/or 109), allowing the tattooing system 90 to recognize these skin features and apply the selected design with the same position and orientation characteristics.

If a color tattoo will be applied, the tattooing system 90 can automatically select recommended colors based on the tattoo design, skin characteristics (e.g., skin color, skin tone, etc.), and/or other tattoo parameters. For example, the tattooing system 90 can have a pre-determined mapping of skin characteristics to preferred or undesirable tattoo characteristics that it can use to make suggestions when a user identified to have such a skin characteristic selects a design with undesirable tattoo characteristics or without preferred tattoo characteristics. In some implementations, this mapping can include corrective measures, such as a change in color or tattoo position when such a suggestion is made. The client and/or operator can select the size the tattoo, color the tattoo, place in the tattoo, and/or parameters based on the displayed information. The display 99 can be a touchscreen to enable convenient input. Additional details of selecting, viewing designs, and input information about tattoos are discussed in connection with FIG. 9. A stencil can be applied to the customer to review the design's positioning on the skin before starting the tattooing operation. Positioning of the design and/or stencil may also be reviewed using augmented reality. In some embodiments, a final tattoo design can be overlaid on a camera image or live video, based on the positioning and deformation of the applied stencil on the image detected by machine vision.

Referring to FIG. 1B, a container 121 can be fluidically coupled to a needle structure (e.g., needle structure 140 of FIG. 2). The tattooing apparatus 100 (FIG. 1B) can include a fluidic system having one or more lines (e.g., hoses, multi-lumen conduits, etc.), pumps (e.g., peristaltic pumps, diaphragm, piston or centrifugal pumps, piezoelectric pumps, etc.), valves, manifolds, filters, sensors (e.g., pressure sensors, flow sensors, etc.), and other fluidic components. The container 121 can be a bottle, cartridge, or other container suitable for holding fluid. In some embodiments, the tattooing apparatus 100 is configured to hold multiple containers to apply color tattoos, avoiding downtown for replenishing fluid, or the like. The number of containers, volume of the containers, and configuration of the fluidic system can be selected based on the desired system functionality. The tattooing system 90 can include any number of pumping mechanisms, such as peristaltic pumps, diaphragm, piston or centrifugal pumping, piezoelectric pumping, capillary effects and so on. The configuration of the pumping mechanisms can be selected to provide the desired volume of ink to the needle tip when the tattoo is performed while not overflowing the needle reservoir.

FIG. 2 is a schematic isometric view of an embodiment of the tattoo shuttle 104 of the tattooing apparatus 100. The tattoo shuttle 104 can include an arm 110, a contactor 120, a target site analyzer or machine vision device 130 ("machine vision device 130"), and a needle structure 140. The X gantry 105 can connect the tattoo shuttle 104 to the cantilevered tattoo machine 101. In some embodiments, the tattoo shuttle 104 can slide relative to the cantilevered tattoo machine 101 on the N axis. The sliding relation may be provided by one or more spring mechanisms, linear slides, rail systems, or the like. The arm 110 can be part of the tattoo shuttle 104 and may be connected to the tattoo shuttle 104 through the Y gantry 106 and precision X gantry 107. The Y gantry 106 may be a mechanical gantry movable along the Y axis. The precision X gantry 107 may be a mechanical gantry movable along the X axis. Both the Y gantry 106 and the precision X gantry 107 may connect the arm 110 to the tattoo shuttle 104 to allow movement of the arm 110 along the X and Y axes.

The arm 110 may be further configured to hold actuators, such as, for example, a needle motor 111, an actuator 112 (e.g., zero stepper actuator), and an arm solenoid actuator 113. In one embodiment, needle motor 111 may be an electric motor configured to generate the rotational movement of a cam 114. In other embodiments, needle motor 111 may comprise of any other type of motor or method for generating rotational movement of cam 114. The needle motor 111 may also be connected to motor gantry 115, which is a structure that holds the needle motor 111 that can be lowered or raised by the action of the arm solenoid actuator 113. In one embodiment, the actuator 112 may be a stepper motor connected to the arm 110 and configured to set a needle maximum extension. In one embodiment, the arm solenoid actuator 113, may be a solenoid connected to the arm 110 which controls a position of the motor gantry 115. The arm 110 may be configured to be movable in the X, Y, and Z axes. In one embodiment, the arm 110 may also hold the needle structure 140.

In one embodiment, the contactor 120 may be a disposable component in contact with the skin and monobloc with the tattoo shuttle 104. The contactor 120 may comprise of a variety of shapes and sizes and may be configured to flatten the skin and keep excess ink and other fluid(s) from spreading. For example, in one embodiment the contactor 120 is generally rectangular and/or flat with a rectangular window configured to flatten and expose a portion of the skin to the needle structure 140. In other embodiments, however, the contactor can be shaped and/or sized in accordance with a contour of the area to be tattooed. In one embodiment, the contactor 120 is in contact with the skin and can move along the X axis. While in contact with the skin, the contactor 120 may apply a nominal force on the skin in the N axis direction, as referenced in FIG. 1B. The amount of force can vary, but in one example, the force may be between 1 lb and 10 lb. In some embodiments, the applied force can be less than about 1 lb, 2 lb, 3 lb, 4 lb, 5 lb, 6 lb, 7 lb, 8 lb, 9 lb, or 10 lb. The contactor 120 may contain a window that exposes a flattened area of skin. The window may comprise of a width and a length that varies in direction and magnitude. For example, the window length may be in the Y axis direction while the window width may be between 0.5 mm and 5 mm. In another embodiment, the window may span from one end of the tattoo frame 103 to the other end of the tattoo frame 103 in the Y axis direction.

The machine vision device 130 can be part of the shuttle 104 or a separate component of the apparatus 100. The machine vision device 130 can include an imaging device 131 and a lens 132 and be configured to obtain one or more images of a portion of skin. The imaging device 131 may be, for example, one or more sensors, cameras, or image capture elements connected to the lens 132. In other embodiments, the imaging device 131 may be a plurality of sensors or a digital camera. In one embodiment, the lens 132 may be a telecentric lens, such as a set of optical elements normal to the XY plane and focused on the window of contactor 120. The orientation of the telecentric lens 132 and its field of vision for the machine vision device 130 may vary, however. For example, the field of vision may span the entirety of a tattoo field. In another example, the machine vision device 130 may be kept at a fixed distance from the contactor 120 to keep the skin in the depth of field of the telecentric lens 132. Additionally, in another embodiment, the lens 132 may be fixed with respect to the contactor 120 and the tattoo shuttle 104. In some embodiments, the machine vision device 130 may additionally include an illumination system such as a light source (not shown). The illumination system may be positioned such as to minimize specular reflection toward the machine vision device 130.

In some embodiments, the needle structure 140 can include a needle cartridge 141, needle 142, needle piston 143, needle spring 144, plunger 145, and cam 114. The needle cartridge 141 may be a disposable component holding a tattoo needle and composed of the needle spring 144, needle piston 143, and needle 142. The needle cartridge 141 may be connected to the tattoo shuttle 104, but alternatively, may be configured to be removably coupled with the tattoo shuttle 104. The needle 142 may be a stainless-steel needle composed of a plurality of tapered and sharpened rods brazed together. The configuration of the needle 142 and cartridge 141 can be selected based on the tattoo to be applied, characteristics of the subject's tissue, or the like.

The needle piston 143 may be a plastic rod holding the tattoo needle 142. The needle spring 144 may be a plastic membrane connected to the needle piston 143. The plunger 145 may be a metal rod joined to the cam 114 and the needle piston 143. The cam 114 may be a metal cam with a fixed eccentricity transforming, together with the plunger 145, the rotational movement of the needle motor 111 to a linear movement of the needle piston 143, and subsequently the needle 142, along the Z axis. Alternatively, the components of the needle structure 140 may be of any suitable material aside from those mentioned for the embodiment described. In other embodiments, the components such as the needle motor 111 and cam 114 may be replaced by any other method suitable for generating movement (e.g., linear movement) of the needle piston 143.

Methods for Applying Tattoos

Figure 3A:
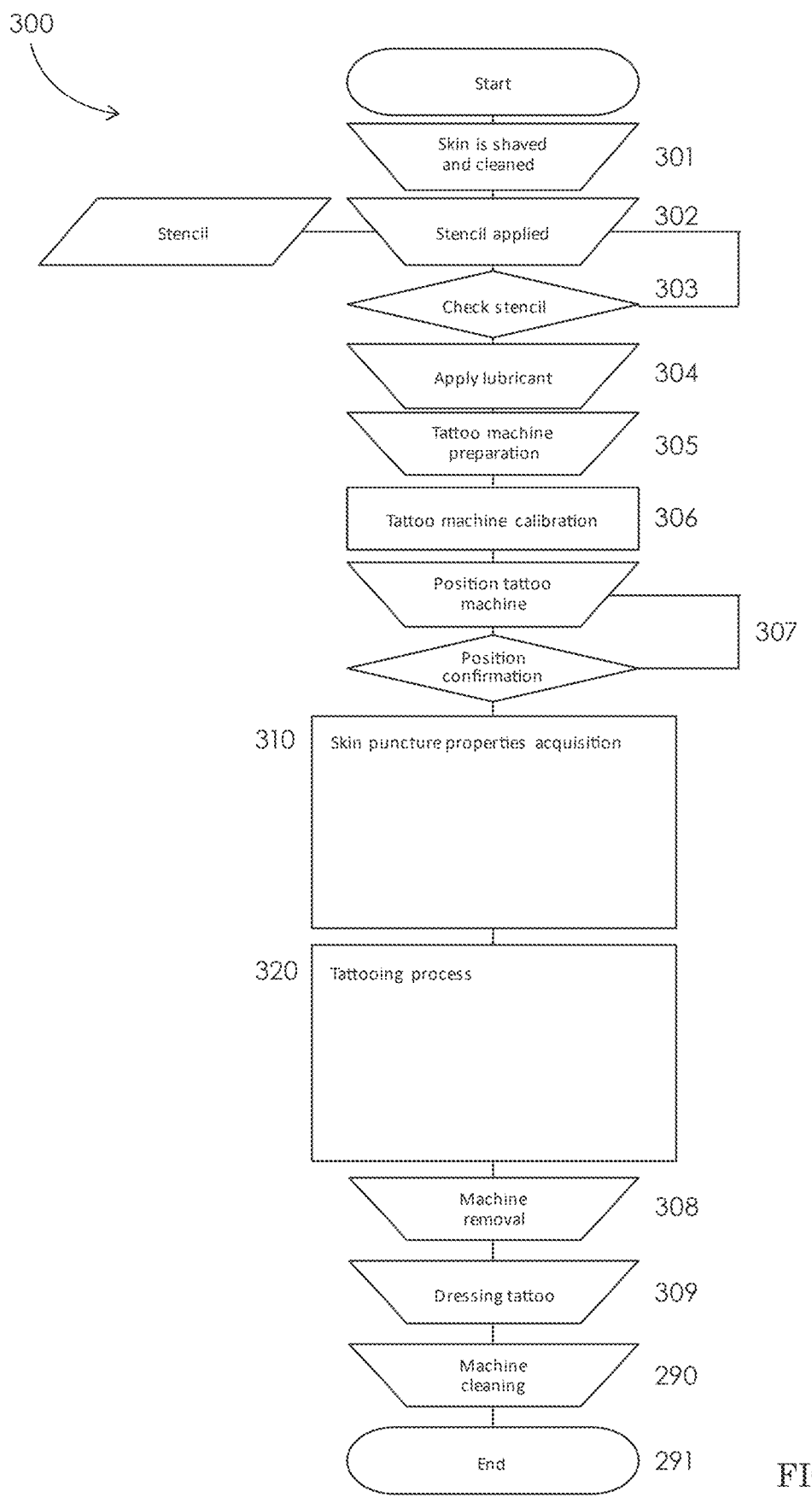
FIG. 3A is a block diagram of a tattooing process in accordance with an embodiment of the disclosure.

FIG. 3A is a block diagram of a tattooing process 300 in accordance with an embodiment of the disclosure. The tattooing process 300 can be used to apply tattoos (e.g., micro tattoos, dotwork, blackwork tattoos, realism tattoos, fine-line tattoos, etc.) and other permanent or temporary artwork. Although certain features of the method 300 are described with respect to embodiments of FIGS. 1A-2, it will be appreciated that the process 300 can be performed using any of the systems, devices, and technology discussed with respect to FIGS. 5A-19.

In step 301, a portion of skin that will receive the tattoo can be shaved and cleaned. For example, an operator (e.g., operator 72 of FIG. 1A) can manually clean and shave the site. The preparation protocol can be selected based on the subject's health, characteristics of the target tattoo site (e.g., amount of hair, skin condition, size of target site, appearance of skin, etc.), characteristics of tattoo site (e.g., a flat region, a curved region, etc.), or the like.

In step 302, a stencil can be applied to the portion of skin. The stencil may be a set of dots printed on transfer paper that serves as a positional fiduciary to identify the deformation of the skin during the tattooing process. Techniques for identifying deformation of the skin are discussed in connection with FIG. 7. In one embodiment, the stencil may also contain an outline or contours of the design for the subject to preview the placement of the tattoo. An algorithm may be used to generate the contour from a design. Generation of contours or outlines of a tattoo design is discussed in connection with FIG. 19. The stencil may also comprise of a subset of dots with variable shapes or patterns to encode dot positions. The size, shape, color, and density of the dots of the stencil may vary. In one embodiment, the dots may correspond to dot positions on a dot parameter table. The stenciling can be applied by an operator or the tattoo apparatus. In some embodiments, a stenciling protocol can be generated based on the tattoo design. The stenciling protocol can include, without limitation, generating a pattern of reference features (e.g., temporary dots) generated to assist with machine vision-based positioning of a tattoo device. For example, spacing between reference features can be reduced to apply micro tattoos. In some embodiments, automated and manual procedures are used to prepare the treatment site. For example, the stencil can be manually applied to the treatment site, and the tattoo apparatus can then apply a pattern-encoded set of reference features to the target site. In some embodiments, the stencil may be transferred to the skin by the intermediary of a flat substrate, such as paper, onto which the stencil design may have been printed using an appropriate dye to temporarily stain the skin. These stencil and reference features can be used to determine where to puncture the skin to produce the desired tattoo. The manual and automated steps of a stenciling protocol can be selected based on the functionality of the tattooing apparatus. In some embodiments, the natural features of the skin may be used as a reference fiducial instead of a stencil.

After application of the stencil 302, the subject and tattooing apparatus operator may check the stencil 303. The subject may review the stencil application and either approve or disapprove of the design placement. The operator may review the stencil for quality of application. In some embodiments, for example, a stencil deposition should be such that a transfer of fiducial marks is adequate to perform a machine vision algorithm and the pattern formed by the fiducial marks should not be substantially deformed when the skin is relaxed. If the stencil appears misplaced or the application is not accepted by the client, the stencil application step may be repeated until accepted. In one embodiment, the tattooing apparatus 100 may review the stencil for placement and/or application, automatically using, for example, one or more machine learning models trained to review stencil results for quality (e.g., could use past accepted and rejected stencil applications as training data).

Following approval of the stencil application, lubricant is applied in step 304. A variety of suitable lubricants with different viscosities and hydrophobic properties may be suitable for use. For example, a lubricant with a viscosity between 10 cps and 500 cps with hydrophobic properties to increase the contact angle between ink droplets and skin may be used. The lubricant can be chosen such that the type and viscosity of the lubricant may allow it to protect the epidermis top surface from being stained by ink and/or increase ease of removal of the ink and/or lubricant by suction via suction system (e.g., suction systems 150, 450). In some embodiments, the lubricant may be applied automatically by the machine 100 when and where it is suitable by an intermediary of a fluidic system.

Tattoo machine preparation 305 can occur after the lubricant is applied in step 304. Some steps of the machine preparation 305 may be performed before the arrival of the client and/or after selection of the tattoo to be applied. The tattoo machine preparation step 305 may comprise of a variety of activities and may differ between tattooing processes 300. Referring now to FIGS. 1B and 3A, in one embodiment, the operator may begin by mounting an appropriate tattoo frame 103 (FIG. 1B), which corresponds to the area of the body to be tattooed, such that the tattoo frame 103 is in contact with the skin to isolate the area where the tattoo is to be applied. In one embodiment, the tattoo frame 103 may be configured such that an operator may mount one or more sterile electrodes 117 (two illustrated in FIG. 1B) to the tattoo frame 103. The electrodes 117 may comprise of the same or different electrodes capable of making at least one type of measurement. For example, the one or more electrodes 117 may be a plurality of electrodes for measuring galvanic response. In one particular embodiment, the one or more electrodes 117 may already have been mounted to the tattoo frame 103 prior to preparation. The number, type, and positioning of electrodes 117 may vary depending on the desired measurements and configuration. In one embodiment, for example, one electrode 117 may be mounted at a location more proximate to the contactor 120 than another electrode 117. In other embodiments, electrodes 117 may be placed or located on other parts of the tattooing apparatus 100 and/or on the subject's body. Following mounting the tattoo frame 103, the operator may then proceed to isolate the tattooing area from the rest of the body and tattooing apparatus 100 by mounting, for example, a sterile membrane and/or bag system.

Referring again to FIG. 2, the operator may then mount a sterilized needle cartridge 141 and an ink cartridge (not shown) to the tattooing apparatus 100. In one particular embodiment, the needle cartridge and/or ink cartridge can be coupled to the needle structure 140. Example needle cartridges are discussed in connection with FIGS. 10A and 10B.

With continued reference to FIGS. 1A-3A, after mounting the needle cartridge 141 (FIG. 2) and ink cartridge, the operator may then mount additional components of the machine vision device 130 (FIG. 2) to the machine. In one embodiment, the additional components of the machine vision device 130 may be a sterile imaging device 131 and vision viewport. The vision viewport may be a sterilizable viewport suitable for camera vision. Other embodiments may comprise of more or less different components. In one particular embodiment, the machine vision device 130 may already contain all necessary parts and preparation may comprise only of sterilizing the parts.

Additionally, the operator may mount a suction system 150 (FIG. 2) to the tattooing apparatus 100. The suction system 150 may comprise of one or more conduits, lines, pumps, valves, nozzles, containers, filters, and/or other components. In one embodiment, the suction system 150 may be, for example, a sterile, single usage suction line comprising of a nozzle, tubing, a microperforated air filter, and a liquid trap. In other embodiments, the suction system 150 may be reusable and/or comprise of more or less parts. In one particular embodiment, the suction system 150 may already be mounted to the machine and preparation may comprise only of sterilizing the suction system 150.

Following preparation 305 of FIG. 3A, the tattooing apparatus 100 may calibrate itself, or may be calibrated by the operator, in tattoo machine calibration step 306. Tattoo machine calibration 306 may comprise of running all or some of the actuation systems and sensors to evaluate nominal functioning. Referring now to FIGS. 2 and 3A, the tattooing apparatus 100 may perform zero reference calibration by measuring its range. In one embodiment, range can be measured through using a plurality of end range sensors, encoder sensors, etc. to calibrate the position of the needle 142 in space. Running all sensors may also comprise of running components of the machine vision device 130 such as the imaging device 131. In one embodiment, calibration may comprise of using an algorithm to run a diagnostic of the sensors and imaging device 131. Additionally, a conductivity test may be performed to confirm connection of one or more electrodes to the machine and/or to the skin. The calibration step 306 may also comprise of using a reference pattern in the tattoo frame 103 to confirm camera vision and illumination. In various embodiments, the calibration step 306 may comprise of more or less than the preceding steps as well as other steps suitable for appropriate calibration of the machine for the tattooing process. In some embodiments, the calibration step 306 can be omitted. In some implementations, parts of the calibration process can be performed at other times, such as when the tattooing apparatus 100 is powered on, prior to the stencil application, prior to the tattoo machine preparation step 305, or other suitable time.

Following calibration step 306 of FIG. 3A, the operator may then proceed to positioning step 307, which may comprise of positioning the tattooing apparatus 100 appropriately relative to the area to be tattooed and confirming a proper positioning. Referring now to FIGS. 1A-3A, positioning the tattooing apparatus may comprise of selecting the appropriate size of tattoo frame 103, orienting the subject and area to be tattooed relative to the rest surface 102 and tattoo frame 103, and aligning a machine tattoo zone with the area to be tattooed by rotating and/or repositioning the tattooing apparatus 100 and/or subject to match a location of the tattoo. An operator, or the machine itself, may then confirm appropriate positioning by using the machine vision device 130, e.g., to determine that identified skin features and/or stenciling are positioned to allow the tattooing apparatus 100 to apply the selected design with the previously determined position and orientation characteristics. In one embodiment, the machine vision device 130 may use a machine vision algorithm to identify each dot position in a stencil and compare it to a vector-based stencil design. The position of the stencil with respect to the tattoo frame 103 may be validated as well as whether there is a correct transfer of dots for calculating skin stretch and/or deformation. If the stencil deposition is such that the transfer of fiducial marks is inadequate to perform the machine vision algorithm and/or if the tattoo frame 103 is not properly positioned, an operator error is generated suggesting either reapplication of the stencil or realignment of the tattoo frame 103. In one embodiment, for example, an error may be generated if a sufficient number of dots corresponding to an aspect of the design (e.g., design contour) do not match. The machine vision device 130 may include one or more controllers storing the machine vision algorithms. Alternatively, separate controllers (e.g., controllers 108, 109) can perform the machine vision algorithms.

Figure 3B:
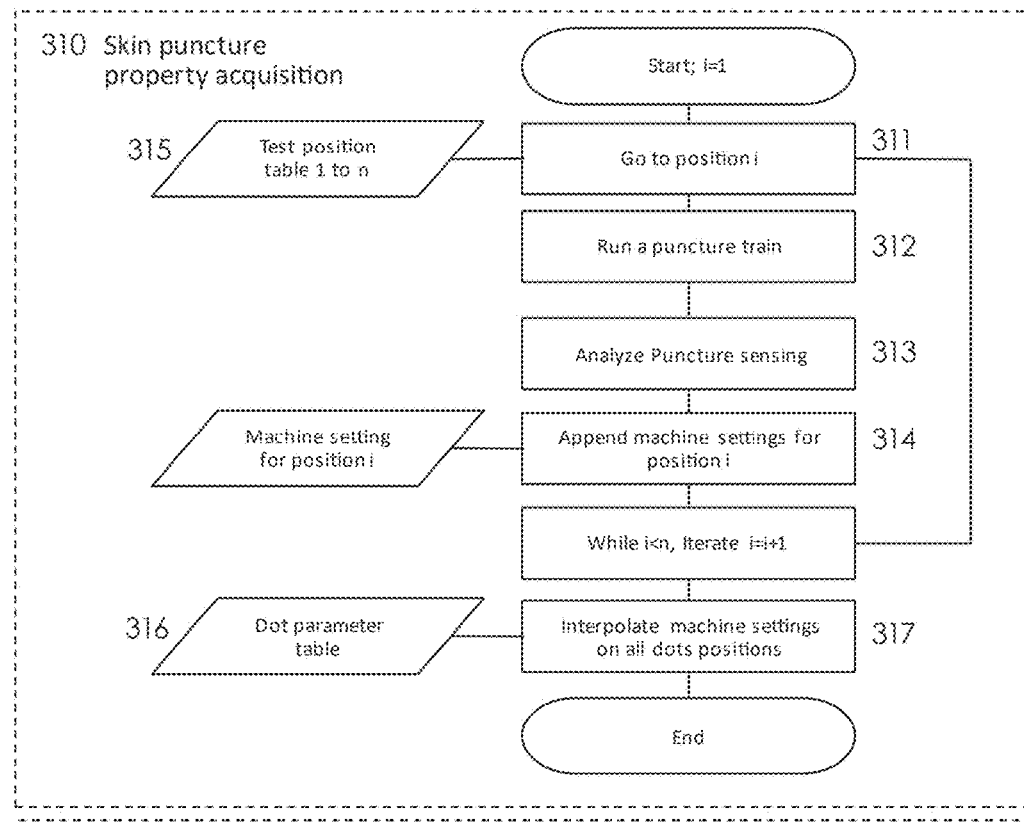
FIG. 3B is a block diagram of a skin puncture property acquisition step of the tattooing process in accordance with the embodiment of FIG. 3A.

After confirming that the machine is properly positioned, skin puncture property acquisition step 310 may then be performed by the machine itself, or the operator. FIG. 3B illustrates an expanded block diagram of an embodiment of the skin puncture property acquisition step 310. For example, the skin puncture property acquisition step 310 may comprise of performing a series of punctures distributed around the area to be tattooed with no ink. In some embodiments, multiple punctures may be performed for each position. The machine may be set to a safe depth setting such that the epidermis and dermis are punctured in the process. For each of the positions, information about the puncture operation is recorded with one or more sensors, which may be redundant for reliability. In one embodiment, the one or more sensors may include, but are not limited to, a load cell sensor, an accelerometer, an encoder, a set of galvanic electrodes, and a vibration sensor. The load cell sensor may be located on the needle plunger 145 of FIG. 2 and may be configured to measure a load applied to the plunger 145 during tattooing. The accelerometer may be on the plunger 145 and may be configured to measure an acceleration of the needle 142. The encoder may be located on the needle motor 111 and may be configured to measure an angular position of the needle structure 140. The set of galvanic electrodes may be configured to measure an impedance of the needle 142 to skin contact relative to an impedance of the skin alone. The vibration sensor may be configured to measure a vibration of the contactor 120. The locations, quantities, and types of sensors may vary depending on the particular embodiment and process.

Referring now to FIGS. 2 and 3A, the sensors can measure properties of the needle/skin system and precisely identify when skin puncture events occur during one rotation of the needle motor 111 (FIG. 2). Certain factors related to the needle/skin system may influence the complex behavior of the skin in terms of deformation and failure. For example, needle sharpness, number of needles, needle gauge, and speed may all be influencing factors. Additionally, certain skin characteristics such as elasticity, impedance, thickness, etc. may also be influencing factors. By measuring when the different layers of the skin fail (colloquially, when puncture occurs), the configuration of the machine can be varied by varying needle 142 (FIG. 2) extension out of the cartridge 141 and needle motor 111 speed such that a force applied to the skin is minimized and a maximum extension of the needle 142 can be insured. One rational is that an ultimate position of a tip of the needle 142 should be in the papillary zone of the dermis for optimal tattooing (e.g., to prevent or limit scattering, subdermal diffusion, etc.).

Referring again to FIG. 2, one or more of the exact elastic property of the skin, thickness of the skin, sharpness of the needle 142, and/or exact force transfer from the needle 142 to the skin may be unknown. Puncture tests can be performed on the skin to determine one or more machine settings. The puncture events can integrate some or all the parameters needed to pilot the needle 142 without having to measure skin characteristics, needle characteristics, and/or machine characteristics. In particular, the skin may be susceptible to deflection and compression, which are the primary determinates of the layer of tissue in which the needle reached. The deflection of the skin can be proportional to the distance traveled by the needle 142 between first skin contact and epidermis puncture. The measurement of skin contact, initial puncture, needle displacement and/or needle extension (e.g., maximum needle extension) can be used to pilot the height of the motor gantry 115 compared to the needle cartridge 141, which in turn can set the ultimate extension of the needle 142. For reliability, each position may be subjected to a train of punctures ranging from 1 to 50 punctures and the measured metrics may be averaged over multiple punctures. In some embodiments, the sensing strategy may be configured to detect a depth of the needle during a puncture event based at least in part on a relationship between a force applied to the skin and the depth of the tissue layer interface. Another embodiment of the current sensing strategy may be configured to detect the depth of the needle during a puncture event based at least in part on the contact conductivity (including changes in contact conductivity) of the needle against the skin, relative to the conductivity of the skin alone. The detected puncture event may be, for example, the failure initiation of the epidermis during the needle transition from surface of the epidermis to the epidermis to dermis layer interface. In some embodiments, determination of a proper height setting, needle extension, puncture event depth, and/or predicted depth of ink deposition may be based at least in part on the force applied to the skin. In other embodiments, determination of a proper height setting, needle extension, puncture event depth, and/ or predicted depth of ink deposition may be based at least in part on the contact conductivity, such as the variation of the contact conductivity of the needle against the skin, relative to the conductivity of the skin alone as exemplified and discussed in connection with FIGS. 12A and 12B. The puncture events can be identified by analyzing the conductivity data. For example, puncture events can be determined based on, for example, extrema of the conductivity curve obtained by the galvanic sensor, as well as the extrema of its first derivative with respect to time, as exemplified and discussed in connection with FIG. 12B.

For each location on the skin tested, the target needle 142 extension parameter (e.g., maximum displacement) for the execution of a dot of acceptable quality may be calculated using one or more algorithms based on collected data associated with initial or first contact, skin puncture, and maximum depth as exemplified and discussed in connection with FIGS. 12A and 12B. The data for each of the test positions can be stored. In one embodiment, for example, calculating the correct ultimate needle extension (e.g., maximum displacement of the needle or puncture depth) may be based at least in part on: a relative impedance of the skin/needle contact compared to the skin impedance as measured by the galvanic electrodes, a force magnitude, needle speed, needle acceleration, an angular position correlating to a needle 142 position at a certain time, or an algorithm that uses measured puncture events such as contact with skin, initial epidermis failure, additional layer failure, or ultimate needle 142 position to evaluate the maximum needle 142 position that results in a correctly applied tattoo dot. The collected data and metrics collected for each position tested can be stored, aggregated, analyzed, etc.

In one embodiment, an algorithm for predicting the ultimate needle depth in relaxed skin can be based on the sum of a weighted polynomial or any other set of relevant basis functions of the sensor measurements. Experimental calibration can be used to obtain the coefficients associated with each polynomial term. The depth prediction is then compared to the desired depth on relaxed skin to issue a change of height of the needle 142. An algorithm can be used to predict the depth of ink deposition based on the needle position at contact, the needle position at initial puncture, the needle position at max extension, the needle position when exiting the skin, and/or the angle of attack of the needle. Illustrative diagrams of example puncture events, for reference are discussed in connection with FIG. 12A. The extrema of the output of the galvanic sensor can be correlated to each example of the puncture events as discussed in connection with FIG. 12B.

Referring again to FIG. 3A, the skin puncture property acquisition 310 can include determining an initial deflection to puncture, which is the distance traveled by the needle from the time of first skin contact to the time of initial skin puncture. A distance traveled to puncture corresponding to the difference between a position of initial skin puncture and a position at skin contact can be derived. This distance is the initial deflection. Similarly, a distance traveled in the skin to max extension, which is the max extension, is the difference between a position at a predetermined or maximum extension and the position at contact. Because the skin deforms during puncture, the predetermined or maximum extension is not directly linked to the depth of ink deposition. Similarly, the initial deflection can relate only to the deflection until puncture, not the deflection at maximum depth, which is the total deflection. The total deflection may be assumed in the algorithm to have an affine relationship with the initial deflection. A more complex relationship between total and initial deflection may be devised based on weighted polynomials or any set of relevant basis functions. A prediction of the depth of ink may be obtained by deriving an affine relationship (or another appropriate mathematical fit) between the depth of ink and the difference of the max extension and the total deflection, accounting for the necessary trigonometric relations due to the needle angle with respect to an axis normal to the skin's surface. In some embodiments, the desired ink location for human skin may lay between 0.5 mm and 1.2 mm deep on relaxed skin. In some embodiments, the change in needle 142 height setting can be calculated to be the difference between the predicted depth and the desired ink location. From the calculations and measurements, a corresponding map of the tested positions on the skin containing the measured and/or calculated metrics such as, for example, a needle height, a needle extension, and/or a predicted depth of ink deposition may be generated and stored. The depth of the ink may be used as a non-visual metric to evaluate dot quality. A method for the determination of the puncture parameters based on training data explicitly introducing dot aesthetic quality is discussed in connection with FIG. 13.

In one embodiment, each position on the skin may be identified by the machine vision device 130 (FIG. 2) to confirm an absolute skin location. In normal operation of the machine, the skin is stretched resulting in a planar elastic deformation. This in turn means that the position of the machine needle 142 does not necessarily match with the position on the skin due to skin stretch. The machine vision device 130 may be used to acquire at least one image of the skin and a digital image correlation or other image analysis method may be used to calculate a skin displacement field. An embodiment of this method is presented in connection to FIG. 7. This displacement field may be used to calculate the true location of the needle 142 on the skin such that the set of sensor data used for defining a proper needle extension for each skin location is in a relaxed skin frame of reference. An algorithm that calculates skin deformation may be used to identify the position of the needle 142 from processing of at least one acquired image of the skin. Additionally, information about skin puncture in a skin positional frame of reference may be recorded in a database. The database may also, for example, record the prescribed needle extension at the sensed puncture position in an undeformed positional frame of reference of the skin.

Once all the prescribed positions designated for testing of the skin have been punctured, the punctures analyzed, and the prescribed needle extension for these positions saved, an interpolation algorithm may be used to interpolate the needle extension for all the dot locations that are part of the tattoo design. This allows evaluation of the proper height setting of the machine. The interpolation algorithm may be, for example, an algorithm that interpolates the prescribed needle extension from the test puncture points to the dot positions corresponding to positions not tested. The interpolation can include determining a depth plane for all punctures that is a fit to the saved positions and applies a smoothing function between them.

FIG. 3B illustrates an embodiment of the skin puncture property acquisition suitable for the step 310 that is shown in FIG. 3A. The skin puncture property acquisition step 310 can begin, in step 311, at position i. A puncture train is then run at position i, which may consist of at least one puncture 312. Data measured from the punctures by at least one sensor may then be analyzed for each position i 313. Certain puncture metrics may be calculated and a machine setting for position i may be determined based on the measured data and appended/recorded for position i as in step 314. For example, the machine setting may be based at least in part on any of the calculations as described. In one embodiment, the machine setting may be at least a proper height setting, needle extension, and may include parameters based upon puncture events, tissue layer interface depth, or predicted depth of ink deposition. Steps 311-314 may be repeated for all testing positions 1 to n according to test position table 315. The appended and recorded machine settings may then be used to update dot parameters of a dot parameter table 316, which may be representative of the tattoo design. The updated dot parameter table 316 may comprise of one or more dot positions, wherein at least some of the dot positions may correspond to the tested positions of test position table 315. In one embodiment, there may be more dot positions than tested positions and machine settings may be interpolated for the dot positions that do not have a corresponding test position 317. For example, machine settings can be interpolated for dot positions that do not correspond to tested positions of the test positions table 315 based on the appended and recorded machine settings for tested positions. In another embodiment, there may be the same number of dot positions as tested positions, and the tested positions may correspond to all dot positions in the updated dot parameter table 316.

Figure 3C:
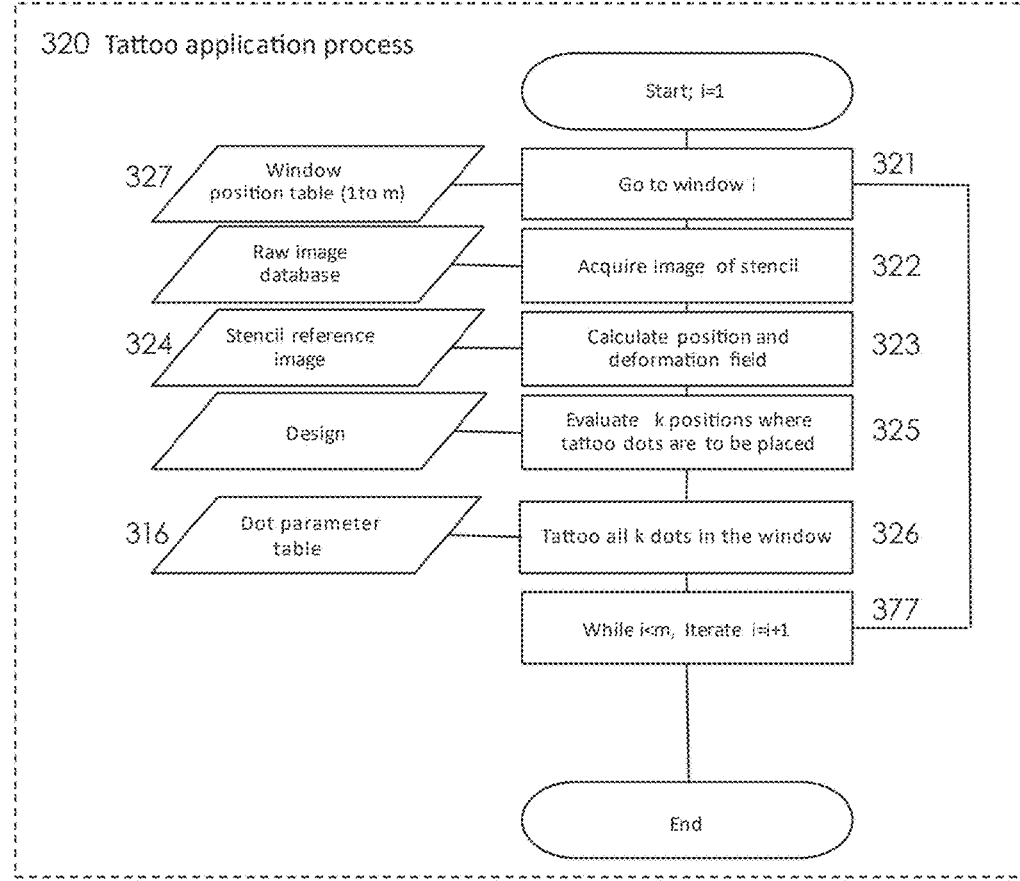
FIG. 3C is a block diagram of a tattoo application process step (tattooing process step) of the tattooing process in accordance with the embodiment of FIG. 3A.

Referring now to FIGS. 3A and 3C, the tattoo application process step 320 follows completion of skin puncture property acquisition step 310. FIG. 3C shows an expanded block diagram of an embodiment of the tattoo application process step 320. In one embodiment, tattoo application process step 320 may be based at least in part on the updated dot parameter table 316 (FIG. 3B) with corresponding appended and recorded machine settings. In one example, a map of prescribed needle depths may be defined based at least in part on the updated dot parameter table 316. Once the map of prescribed depths is defined, the tattoo machine repositions itself at the beginning of the tattoo field. Referring now to FIG. 2, the imaging device 131 (FIG. 2) may be used to scan a tattoo window i. In some embodiments, tattoo window i may correspond to a window of the contactor 120. The suction system 150 may be turned on. A machine vision deformation algorithm and a position algorithm may be used to evaluate the deformation of the skin as well as the position of the contactor 120, respectively. Algorithms for detecting the skin deformation and contactor position are discussed in connection with FIGS. 6A, 6B, and 7.

The deformation of the skin may be used to identify the positions of the tattoo dot prescribed in the reference undeformed vector-based graphics (one or more vector graphics) in the frame of reference of the contactor 120. The gantry movement of the tattoo shuttle 104 (FIG. 1B) is prescribed for realizing the tattooing of all dots that are within a central subset of the tattoo window i from one side to the opposite side in the Y direction. Ink may be added to the needle cartridge 141 and/or ink cartridge by an ink recharging process. This ink recharging process may be repeated mid tattooing of the window i if the level of ink in the needle cartridge 141 and/or ink cartridge is insufficient to tattoo all the dots present in the tattoo window i.

With reference to FIGS. 1B, 2, and 3B, the needle motor 111 is started to reach expected tattoo speed and to wet the needle 142 tip with ink. The zero-stepper actuator 112 is set for the needle extension of a first tattoo dot in the window i. The X gantry 105 and Y gantry 106 are actuated to position the needle 142 tip over the first dot location. The arm solenoid actuator 113 is energized to drop the motor gantry 115 down such that the needle piston 143 is compressed by the needle plunger 145 and that needle oscillation occurs at the Z reference set by the zero-stepper actuator 112. A reason for the arm solenoid actuator 113 is to rapidly engage the needle 142 with the skin without the needle motor 111 starting inertia. The needle 142 oscillates between a high position and a low position defined by the maximum needle extension controlled by the zero-stepper actuator 112. A number of punctures for a single dot may be set by a design file and may vary the dot size and color density. For example, the number of punctures for a single dot may be between 1 puncture and 50 punctures. An encoder sensor system and a galvanic sensor system may count the number of punctures and trigger the arm solenoid actuator 113 to raise the arm 110 when the prescribed number of punctures for that dot is reached (or calculated to be reached by taking into account transient effects related to actuation time).

The machine vision device 130 (FIG. 2) can be used to confirm correct dot application at that time. Once the arm 110 is confirmed to be raised by the sensor and algorithm, the needle 142 is not in contact with the skin and the gantry actuation is engaged to position the machine to the appropriate X and Y location and the calculated Z reference of the next dot to be tattooed. This tattoo process is repeated for all positions to be tattooed identified by the machine vision algorithm within the tattoo window i. The suction system 150 may be on throughout the process and may collect superficial drops of ink to improve the visibility for the machine vision device 130, or may be turned on when suction is necessary to remove fluids.

Once a selected number (e.g., all the dots in the tattoo window i) are tattooed, a drainage system, which may comprise part of the suction system 150, may be triggered to remove the chance of ink dropping from the cartridge because such ink drops compromise the imaging of the skin by machine vision device 130. The needle motor 111 may then be turned off. The contactor 120 may be actuated forward in the X direction by a fraction of the window width, such that each new window of tattooing i+1 may overlap with at least a portion of a preceding window i. The forward direction is decided based on the natural growth direction of the tissue, which is generally from a base to extremities of the limbs, or for trunk tattoos, in the direction of gravity. The tattooing of the contactor 120 window in the new position i+1 repeats the same steps from the preceding tattoo window i and is reiterated until the end of the tattoo field is reached m. Once this is the case, the tattooing apparatus 100 may be put in a safe position and all actuators may be turned off.

FIG. 3C illustrates an embodiment of the tattoo application process suitable for step 320 shown in FIG. 3A. Referring now to FIG. 3C, the tattoo application process step 320 may begin at window position i as in step 321. The machine vision device 130 may then acquire at least one image of the stencil and store it in a raw image database as in step 322. A position algorithm may be used to calculate a position of the contactor 120 (see FIG. 2) and window i. Similarly, a deformation algorithm may be used to calculate a deformation of the skin at window i to identify the positions of the tattoo dot prescribed in the reference undeformed vectoral graphics in the frame of reference of the contactor 120. Both the position algorithm and the deformation algorithm may take into account at least a stencil reference image 324 when calculating the position and skin deformation in step 323. Algorithms for calculating the position and skin deformation are discussed in connection with FIGS. 6A, 6B, and 7. Based at least in part on a tattoo design and the calculated position and skin deformation of step 323, the tattoo application process step 320 may continue by evaluating one or more positions k where tattoo dots are to be placed 325. The tattooing apparatus 100 may then tattoo all one or more positions k in the window i as in step 326 based at least in part on the updated dot parameter table 316. At step 327, if i'm, the process returns to step 312. Steps 321-326 may be repeated for all window positions 1 to m within window position table 327.

Referring again to FIG. 3A, after tattoo application process step 320 is completed, the tattooing apparatus may be removed as in step 308. The operator may remove the tattoo frame (e.g., frame 103 of FIG. 2) from the tattoo zone such that the subject may be freed from the tattooing apparatus 100 (FIG. 1). Any disposable components may then be removed and disposed of. As used herein, the term "disposable" when applied to a system or component (or combination of components), such as a needle, a tool, or stencil, is a broad term and generally means, without limitation, that the system or component in question is used a finite number of times and is then discarded. Some disposable components are used only once and are then discarded. In other embodiments, the components and instruments are non-disposable and can be used any number of times. In some kits, all of the components can be disposable to prevent cross-contamination. In some other kits, components (e.g., all or some of the components) can be reusable. Following machine removal step 308 of FIG. 3A, the tattoo area may be cleaned and dressed with a protection layer in dressing tattoo step 309. Additionally, a variety of aftercare treatments may be provided. Finally, the surface of the tattooing apparatus 100 of FIGS. 1A and 1B may be cleaned at step 290 with a cleaning solution so as to be suitable for a next use. At step 291, the process 300 is completed.

Figure 4:
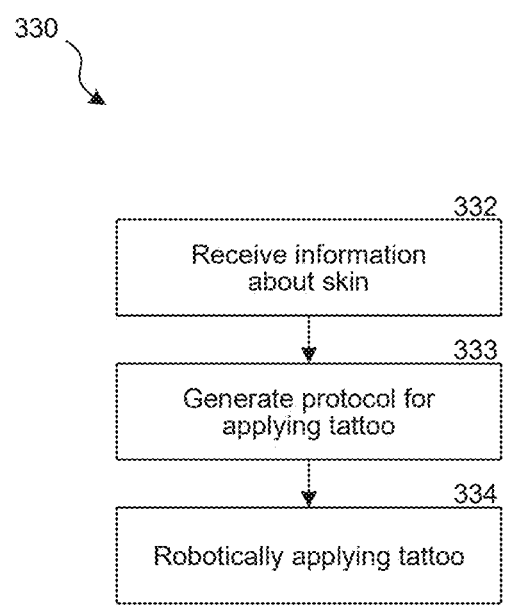
FIG. 4 is a block diagram of a tattooing process in accordance with an embodiment of the disclosure.

FIG. 4 is a block diagram of a tattooing process 330 in accordance with an embodiment of the disclosure. In step 332, a tattoo system can obtain information from the target site analyzer, such as a machine vision device, sensor, or the like. The information can include, without limitation, one or more images of a portion of the skin, and/or at least one characteristic of the portion of a subject's skin, skin puncture properties (step 310 of FIG. 3A), or the like. In step 333, a protocol for applying a tattoo can be generated based on the received information and a tattoo design. The protocol can include identifying changes associated with the skin capable of impacting a visual appearance of the tattoo to be applied. The protocol can include a plan or map of dots or individual punctures for applying the tattoo, together with application parameters for each. The tattoo system can compensate for the one or more changes (e.g., skin stretch, skin displacement, skin layer(s) thickness changes, etc.) associated with the skin to robotically apply at least a portion of the tattoo. For example, the spacing of the dots can be adjusted to match skin stretch at corresponding regions. If the system detects skin deflection increase, the system can increase the (e.g., puncture depth, maximum needle depth, depth ink is applied, etc.), needle displacement, or other applicator parameters for that region. A transformation can be applied to compensate for skin stretch, skin displacement, skin layers thickness changes, etc. For example, the spacing, pattern, and locations of puncture sites can be adjusted based on changes of the stenciling. A machine learning model can be trained to identify transformations to produce a tattoo on post-application that matches (e.g., geometrically congruent, visually identical to the naked eye, etc.) the tattoo design. For example, the applied tattoo can be placed with a deviation from the original design (e.g., average threshold deviation between dots and target dot of design less than 50 um, 75 um, to 100 um) which may not affect the visual outcome of the tattoo. In some embodiments, a virtual tattoo design can be generated to match the variation of measurable characteristics of the skin. For example, if the skin is stretched, a stretched virtual tattoo design, stretched stencil, etc. can be configured to compensate for the stretching of the skin. New puncture points and tattooing parameters can be generated based on the virtual tattoo design. During the tattoo session, numerous virtual tattoo designs can be generated to determine how to apply a tattoo on skin such that, when the skin is in a natural state, the applied tattoo will match the original tattoo design. One or more machine learning model can be trained to generate virtual tattoo designs and/or stencils. For instance, a transformation of the tattoo characteristics such as dot parameter, dot placement, dot density and such can be generated such that it would compensate for certain measured characteristics of the skin, such as skin color, variation in coloration, features such as moles and birthmarks and tissue thickness, bone backing and so on. These skin characteristics can be measured by machine vision and other sensors deployed by the automated tattoo machine. A machine learning strategy can be obtained by first generating a validated training set. One method may include a professional tattoo artist evaluating the type of transformation he/she would perform to obtain a more congruent tattoo for a certain area of the skin. Another method includes applying random transformations to the tattoo and use humans to evaluate the esthetic quality of virtually projected tattoo on the body area using augmented reality. Another method is to use a genetical algorithm or other optimized search to generate guesses for tattoo transformation, for evaluation for aesthetic quality by humans on virtually projected tattoos. A scoring method may be used to automatically evaluate congruence of the tattoo design after transformation. This training set may then be used by a machine learning algorithm to determine an optimal tattoo design transformation and for a large set of conditions where some skin characteristics are measurable. Another characteristic of the skin is the shape of the body area, which is curved and may need a special projection of the flat design (for example, using area-preserving mapping, distance-preserving mapping, conformal mapping, or other projection methods), such that the result looks harmonious on curved body surfaces, such as on shoulders, elbows, wrist, etc.

In step 334, the tattoo system can robotically apply at least the portion of the tattoo according to the protocol. The protocol can be used to reduce one or more differences between a selected tattoo design and the tattoo applied to the skin. The stenciling and techniques discussed in connection with FIGS. 5A-6B and 11A and 11D may be used to determine dot puncture locations. In some computer-implemented methods, the system can apply one or more reference features to the skin and analyze at least one of the reference features captured in one or more of the images to evaluate one or more characteristics of the skin to determine one of more changes in the skin. The tattoo system can compensate for the one or more changes in the skin to determine puncture sites for applying the pigment.

Figure 5A:
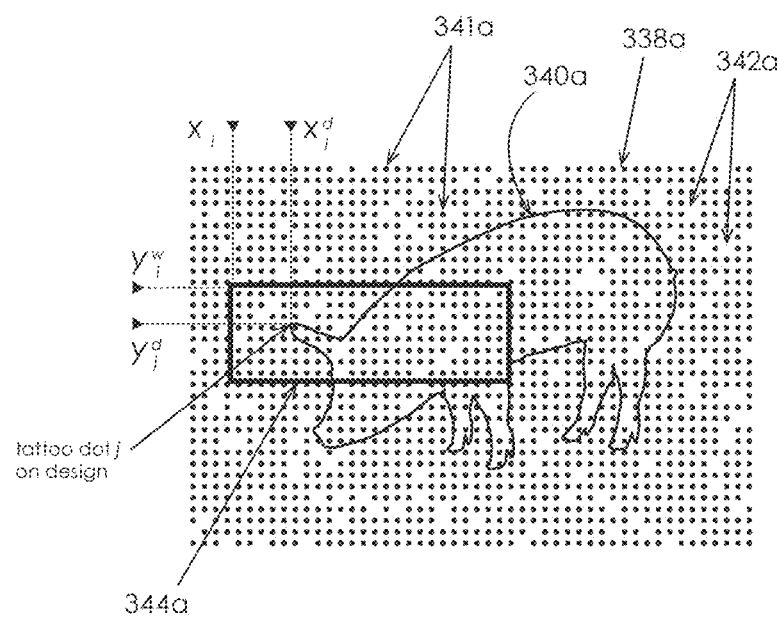
FIGS. 5A and 5B are illustrative diagrams of a stencil generation process in accordance with an embodiment of the disclosure.

Methods for Applying and Using Stencils, Image Analyses, and Machine Vision Technology FIG. 5A illustrates constituents of a stencil 338a and how it may be utilized by a machine vision algorithm, such as machine vision algorithm discussed in connection with step 323 of FIG. 3C. FIG. 5A shows one embodiment of a digital stencil reference that can be stored in memory (e.g., computing unit memory). The stencil reference can include at least (i) a tattoo design 340a, (ii) a reference stencil with fiducial markers 341a, and (iii) a pattern 342a encoded by fiducial markers which may be used to guide the machine vision process. The pattern 342a may be encoded by spatial variations of (a) size, (b) shape, (c) color and/or (d) presence/absence of fiducial markers. In one embodiment, the pattern 342a is encoded by (d) presence/absence of fiducial markers.

Figure 5B:
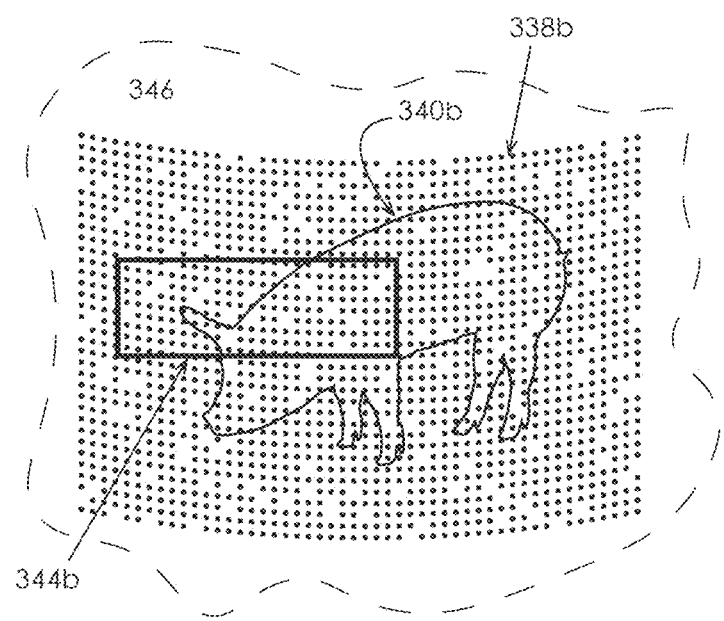

FIG. 5B depicts an embodiment of the stencil 338b transferred and viewed on the skin 346. In some procedures, the stencils 338a, 338b can be substantially identical in sizes and/or shapes. The tattoo design 340b on the applied stencil 338b may be utilized for previewing the tattoo placement, and may be (i) a complete representation of the tattoo design, (ii) a reduced form of the tattoo design, such as an outline or contours representing the tattoo design, or (iii) may not be placed on the applied stencil, at all. The transferred stencil 338b may stretch and rotate with the skin 346. During tattooing operation, a contactor (e.g., contactor 120 of FIGS. 1B and 2) can move across the skin as in step 321 of FIG. 3C. One possible position of an interrogation or contactor window 344b (e.g., detector portion of the interrogation or contactor window) is shown in FIG. 5B. The contactor window 344b can be moved to different locations to analyze and apply dots at different locations along the target site.

Figure 6A:
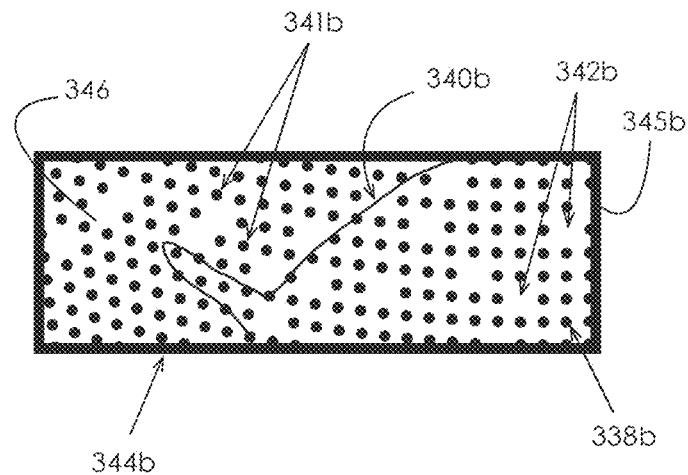
FIG. 6A illustrates an image captured by an image capture device in accordance with an embodiment of the disclosure.
Figure 6B:
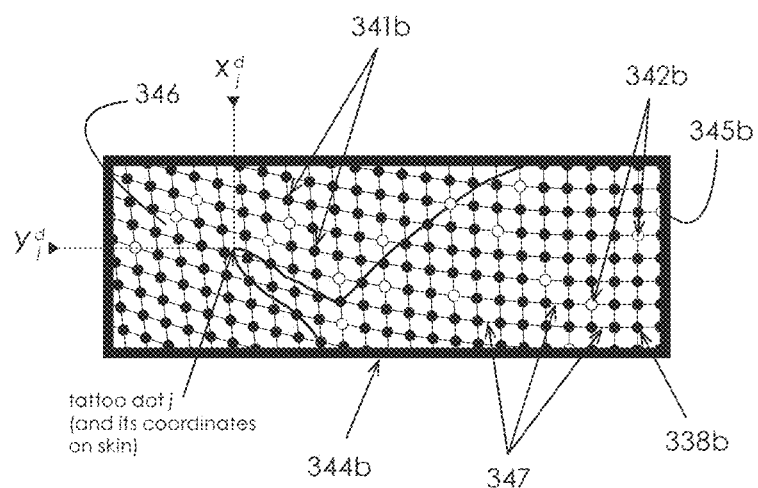
FIG. 6B illustrates an image analysis using one or more machine vision algorithms in accordance with an embodiment of the disclosure.

FIG. 6A shows one embodiment of an image captured by the machine vision device through the contactor window 344b of FIG. 5B. FIG. 6B illustrates features of FIG. 6A detectable using the machine vision algorithm. Referring now to FIG. 6A, the contactor window 344b exposes a portion of the skin 346, the applied stencil 338b, including the fiducial markers 341b and the encoded pattern 342b and the tattoo design on the applied stencil 340b. The viewable area 345b may also contain other features, such as, previously applied tattooed ink, residual ink, blood, moles, hair, hair roots, skin creases, light glare, etc. These are not shown in the figure for clarity, but may be addressed by the machine vision algorithm, as discussed in connection with FIG. 7.

Referring now to FIG. 6B, the detectable features can include, without limitation, fiducial markers 341b, the spatial variation of markers which constitute a pattern 342b, deformation field of the skin 347, and other features of the stencil 338b. The design and use of the stencil (338a in FIG. 5A, and 338b in FIGS. 5B and 6A) enables the machine vision algorithm (FIG. 7) to identify the position of the contactor window 344b on the skin 346, map the coordinates of the tattoo dots of the design 340a to their corresponding coordinates on the skin 346 where ink shall be deposited, evaluate the skin changes (e.g., stretching during the tattooing process), and analyze the target tattoo site. A machine vision device (e.g., machine vision device 130 of FIG. 2, machine vision device 1600 of FIG. 21, etc.) can utilize a machine vision algorithm to compare the detected reference features and/or tattoo dot locations with a vectoral stencil drawing. In other embodiments the machine vision algorithm may be performed by a controller such as a controller (e.g., controller 109 of FIG. 1B or controller 1400 of FIG. 20).

Figure 7:
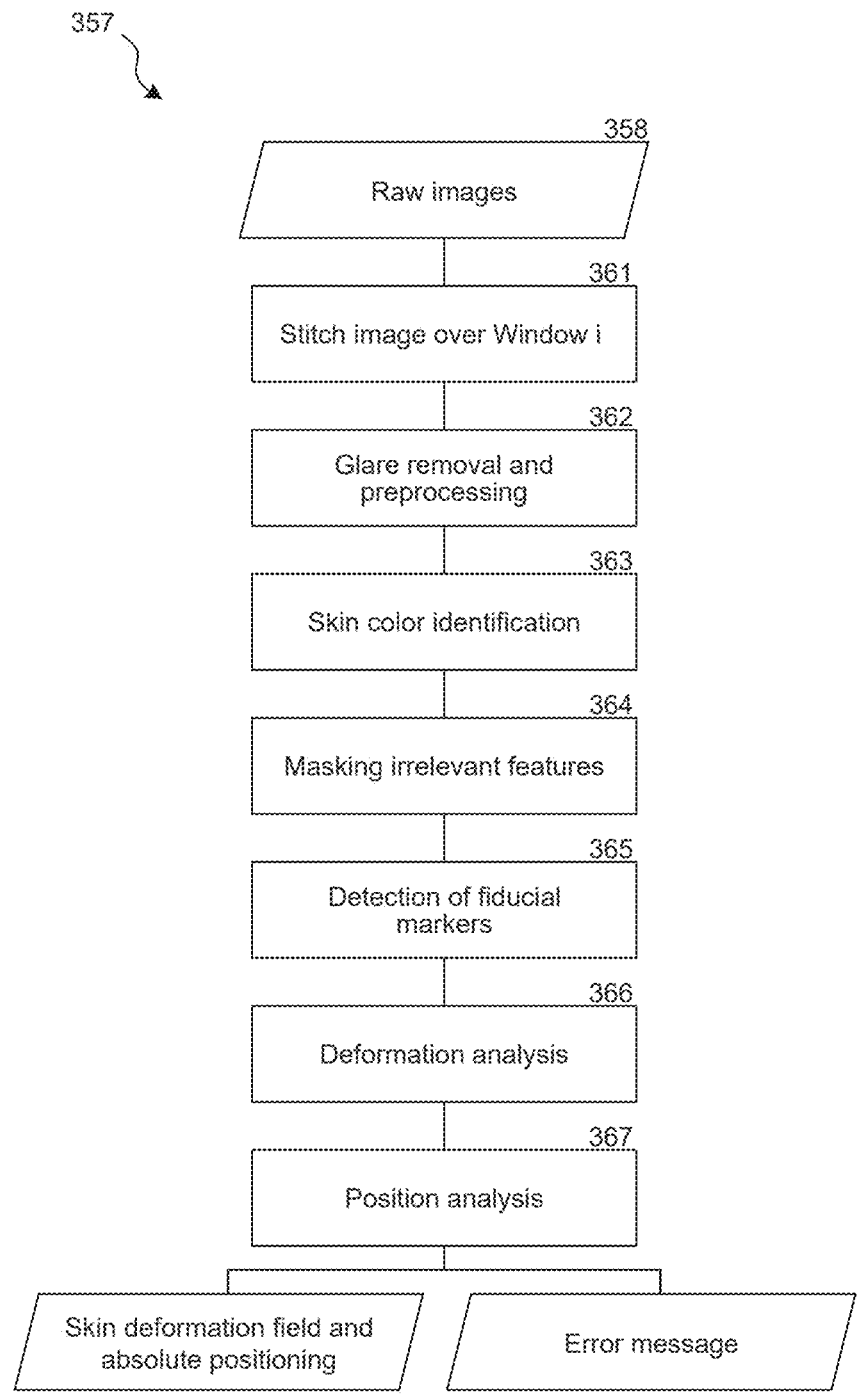
FIG. 7 is a block diagram of machine vision process in accordance with an embodiment of the disclosure.

FIG. 7 is a flow chart of a method 357 for calculating position and/or deformation field in accordance with an embodiment of the disclosure. For example, the method 357 can be used in step 323 of FIG. 3C and techniques discussed in connection with FIGS. 4-6B. In step 358, the system can obtain raw images from an image capture device, machine vision device, or other device configured to capture images. The resolution of the images can be selected based on the resolution of the stencil or other criteria.

In step 361, for a given position of the contactor, images acquired by the image capture device or machine vision device may be processed (e.g., combined, stitched together, etc.) to form an image of a portion or the entire area exposed through the contactor window (e.g., window 344b of FIG. 6A).

In step 362, the image may be preprocessed to remove, for example, light glare, reflection, shadows, and/or any variation of illumination on the skin. In one embodiment this step may be performed by color normalization.

In step 363, the preprocessed image may be analyzed to identify the colors of (i) the skin and (ii) the stencil fiducial marks as they appear on the skin. In one embodiment, color identification in step 363 may be achieved by principal component analysis (PCA) in the color space of the preprocessed image. In step 364, any features that are not relevant to the deformation and position detection steps (for example, previously applied tattoo ink, residual ink on the skin, blood, moles, hair, hair roots) may be identified on the image and masked to improve the accuracy of these algorithms downstream (steps 365-367). In one embodiment, the identification may be based on comparing the color of the image pixels to the colors of the mentioned features. In another embodiment, these features may be identified using an AI-based feature detection algorithm.

In step 365, stencil fiducial markers are detected 341b (FIG. 6B) and their size, shape and/or location on the image are determined. The contrast and accuracy of this detection may be improved based on, for example, the colors of (i) the skin and (ii) the stencil fiducial marks as they appear on the skin as identified earlier in step 363. In one embodiment, the location of the fiducial markers may be identified by filtering the image with a convolution matrix (kernel), followed by finding the peaks in the filtered image. The located fiducial markers on the image may then be further analyzed to identify their size and shape, for example, using other kernels to measure feature size and shape, or by performing pixel-level procedural analysis. In another embodiment an AI-based feature detection method may be used to identify and locate the fiducial markers on the image, based at least on their color, contrast, and/or shape. For example, a convolutional neural network (CNN) may be used for AI-based identification. The training dataset of the CNN may consist of a large number of synthetically-generated images, each showing a patch of skin with an applied stencil, as would be viewed by the machine vision device, in various states of deformation, light illumination, and skin conditions (color, creases, folds, presence of moles, hair roots etc.), wherein location, size and shape of the fiducial markers on the image are readily known by the image-generating algorithm. The CNN may then be trained by comparing its output to the known location, size and/or shape of the fiducial markers. In either method, confidence indices may be calculated for each marker detected on the image, to quantify the confidence in the detected location, size and shape.

In step 366, a deformation algorithm identifies the deformation of the skin 347 (FIG. 6B) within the contactor window 344b (FIG. 6B) by comparing the fiducial markers 341b detected on the deformed image (FIG. 6B) to the fiducial markers 341a on a reference (undeformed) stencil image 338a (FIG. 5A). In one embodiment, the deformation of the skin may be represented by a vector field (or by multiple vector fields for different regions) parameterized by a certain number of coefficients. An alignment score can be calculated for a given deformation field produced by a given set of coefficients, which may be based on the numbers of successfully-aligned and failed-to-align markers between the reference image (FIG. 5A) and deformed images (FIGS. 5B-6B), and/or the overall degree of overlap of markers between the reference and the deformed image. In this embodiment, the algorithm can identify the correct deformation field by finding the coefficients which produce the highest alignment score. The values of the deformation field coefficients may be restricted to a physically reasonable range to facilitate the search. If the lattice consists of an ordered arrangement (grid) of fiducial markers, the search may be informed by a periodicity analysis of the deformed image, for example, using Fourier analysis. In another embodiment of the deformation algorithm, a deformation field may be sequentially or locally constructed based on finding pairs of neighboring markers on the deformed image and analyzing their relative positioning with respect to each other, to quantify the local deformation and rotation of their neighborhood. This sequential analysis may begin from the fiducial marker with the highest confidence index. Different regions of the image may be analyzed separately and stitched or bridged together by making use of parameterized deformation vector fields (as in the previous method) to represent the deformation of each region. The result may further be processed by using a minimization method fitted to a physically acceptable deformation/displacement field. As a result, the output of step 366 is a deformation field, which describes the displacement of each marker on the deformed image with respect to the reference image (e.g., image in window 344a of FIG. 5A), and may be used, along with the detected contactor position (step 367), to map the coordinates of tattoo dots on the reference image to their target coordinates on the skin measured with respect to the contactor window.

In step 367, the collection of identified fiducial marks are individually analyzed to detect the portion of the encoded pattern exposed through the window 344b (FIGS. 6A and 6B). The detected pattern 342b (FIG. 6B) is compared and matched to a similar pattern in the complete reference stencil 338a (FIG. 5A), wherein the best match may indicate the most likely position 344a (FIG. 5A) of the contactor window with respect to the tattoo design 340a (FIG. 5A). A confidence index of the identified position may be determined, in one embodiment, by comparing the quality of the best match to the second-best match on the reference stencil or by other methods related to uncertainty quantification. If the confidence index is found under a critical threshold, the machine may attempt to first improve image acquisition by repeating the cleaning operation of the tattoo process. If the confidence index is still found lacking, the machine may be stopped by generating an operator error. The stopping procedure is detailed below. The above features and techniques can be incorporated or be used with features and techniques discussed in connection with FIGS. 11A-11D.

The machine vision technology discussed herein and in connection with FIGS. 6 and 7 may be used to achieve high-precision tattooing using, for example, robotic tattoo arms. Machine vision systems may be used to detecting surface topology of the body part where the tattoo is to be performed, in order to guide a tattooing robotic arm (with rotational and translational degrees of freedom) on the tattoo zone. A digital 3D representation of the surface of the body part (or the local vicinity of the tattoo area) may be constructed, such that relative location and orientation of the skin surface may be calculated with respect to the location and orientation of the tattooing head on the robotic arm. This 3D representation may be constructed by comparing images from multiple cameras (e.g., passive stereo vision), by projecting fiducial light or laser on the surface with a known pattern and detecting the correspondence of the pattern on the camera image to extract the depth information (active stereo vision), or by a combination of multiple cameras and pattern-projection in a hybrid approach. The machine vision device (or other optical analysis and machine vision systems disclosed herein) can include such multiple cameras, as discussed in connection with FIG. 21.

A 3D surface representation may also be constructed using point-wise distance measurement and mapping systems, such as LiDAR. The 3D point cloud collected from such systems is then used to construct a continuous model of the skin surface. The digital 3D representation of the skin surface may help actuating the automated machine to position the machine tattoo head in the vicinity of the tattoo zone and approach it with the proper angle (both the angle of the head and angle of approach), that is, close to normal or with an appropriate angle to the normal to the skin surface in the vicinity of the dot to be tattooed. This may be of interest when the body part is not held in a plane or displays a complex geometry in which the tattoo area may not be generally flat or cannot be flattened. A contactor may not be used for the flattening of the skin if such 3D model of the body part is generated that clearly identifies the normal to the skin in the vicinity of all the positions to be tattooed. However, our preferred embodiment may include a contactor in order to increase the stability of the skin where the tattoo is to be performed and to increase the positioning resolution. A ranging mechanism, which may be contact-less or involves contact, such as laser, ultrasound or feeler rangefinders may further be used to identify the skin to needle tip distance with high accuracy (less than 50 um, 75 um, 100 um). The measured tattoo-head-to-skin distance may be used in combination with the puncture setting from the dot parameter table (i.e., needle extension measured beyond surface of the skin), to calculate the total extension of the needle that will deposit ink at the correct depth in the skin. The machine vision device disclosed herein (or other optical analysis and machine vision systems disclosed herein) can include LiDAR sensors, multiple cameras, light emitter (e.g., lasers), scanners, projectors, etc.

A mapping method, such as the stencil-based machine vision technology explained in FIGS. 5A-6B and 11A-11D, can be used (i) to map dots on the reference tattoo design to points on the skin surface and (ii) to account for any deformation of the skin if the skin is not tattooed in its relaxed configuration, and (iii) to achieve a high tattooing resolution and relative spatial accuracy in the order of ~50 um. High-accuracy mapping may be also be achieved based on other embodiments of the machine vision methodology, for example, rather than a stencil, based on the detection of (i) skin natural fiducials (such as moles, creases, folds, hair roots, etc.) and other naturally present dermal features or other sub-dermal features such as blood vessel networks which may be visible in some parts of the electromagnetic (EM) spectrum, or (ii) other synthetic fiducials transferred to the skin or projecting a pattern of light or laser on the skin to serve as fiducials. In the same manner as in FIGS. 5A-6B and 11A-11D, these fiducials may be used by the machine vision algorithm to identify the target locations on the skin and account for skin deformation. The reference state of the skin fiducials which is used in the deformation algorithm may be collected by an initial scan of the body part in a relaxed state, performed before the tattooing operation begins. The machine vision technology can be used to determine relationships between changes to the skin and used to select one or more puncture sites based on the determined relationships to reduce dot placement deviation when the skin is in a natural state.

The 3D model of the skin surface (the global geometry of the body part) may also be used for this mapping in certain cases, however, it may not provide high positional accuracy, especially on nearly-flat or smooth surfaces unless used in combination with skin fiducials as described above. One embodiment of a hybrid localization and mapping of the tattoo area may be performed using other depth finding or 3D topology/surface reconstruction methods such as lidar, laser, ultrasound ranging or any other technique that may grossly identify the location of the body part as well as generate a three-dimensional, dynamically updating model of the skin surface. For instance, a single camera may be used to map the body part in three dimensions by adding a projected grid on the body part using a projection apparatus. The movement of the dynamically updating model of the skin and body part may be used to provide an additional layer of safety by identifying when the tattoo area is shifted away from the needle tip. The needle may then be retracted and the machine may reposition itself to realign the tattoo mechanism with the tattoo area to resume tattooing. The skin may also be flattened locally, such in the use of a contactor, and the local vicinity of the tattoo area only evaluated on a flattened area. Accordingly, 3D modeling of the skin surface can be used to compensate for skin changes.

The stencil-based machine vision technology described in FIGS. 5, 6, 7 may be used within an augmented reality (AR) framework, which allows the customer to view, dynamically-modify and confirm the placement of the tattoo design on their body. In some embodiments, the outline of the tattoo design (340*a* in FIG. 5A) is not included in the transferred stencil, and instead AR will be used to virtually overlay the tattoo design on the body part where the stencil is applied. In one embodiment of this AR framework, a high-resolution camera is used to view the body part and its video stream is processed by a computer (or other processing device) where the digital tattoo file is loaded. The computer or controller performs the machine vision algorithm (e.g., algorithm described in FIG. 7), and upon detection of the stencil in the image(s), it is able to map the dots in the tattoo design onto the streaming camera image(s), while accounting for any deformation or curvature of the body part. A high-resolution, realistic render (simulation) of the tattoo design, which may represent the different colors in the tattoo design, account for the appearance of diffusion and fading of ink over time, etc. is generated and overlaid on the camera image using this mapping. The processed stream of image(s) can be displayed on a large screen or display for viewing by the client, where the images may be mirrored (flipped horizontally) to mimic the feel of a mirror. The client may be provided with a controller (for example, a touch-screen interface, mouse, or other inputs discussed in connection with FIG. 20) which feeds into the machine vision (MV) software to dynamically-manipulate the placement of the tattoo design with respect to its original location on the reference stencil. The modifications made by the client are processed by the MV algorithm during the render, and reflected on the screen in real-time. This manipulation may allow for rotation and translation, and in some cases scaling of the tattoo design, with the requirement that the entire design remains within the bounding box of the stencil fiducials (341*a* in FIG. 5A). After the client decides on a placement of the tattoo design, they may confirm their choice on the interface, which may be time-stamped, digitally saved and may constitute a digital signature. Parameters of transformation that represents the updated position (translational and rotational displacement and scaling with respect to the original position) are appended to the digital tattoo file, or transferred into the automatic tattoo machine by other means. During the tattooing operation, the transformation parameters are used to update the coordinates of all tattoo dots in the tattoo file, resulting in the desired placement of the tattoo on the skin. The above methodology of previewing, dynamically-modifying and confirming the placement of a tattoo has the following advantages over static stencil-based previewing methods: (i) the client is able to modify the placement of the tattoo design to their preference, (ii) the AR-based method potentially saves time by avoiding repeated stencil applications, (iii) it minimizes risk of future disputes and maximizes client satisfaction related to the overall aesthetic look of the tattoo on the body part, as it provides realistic simulation of the final tattoo design on the client's skin, (iv) it provides a multi-color preview of the tattoo design which is not possible with conventional stencils used in tattooing, and (v) because there is no obstructing tattoo outline (340*a* in FIG. 5A) on the stencil, the information content of the encoding-pattern (342*a* in FIG. 5A) is maximized, which increases the accuracy, precision and operating confidence of the MV algorithm, and reduces the risk of error.

Another embodiment of the AR framework may use AR googles worn by the client. The googles may be utilize a built-in camera, whose video stream is processed using MV algorithms, as described herein, and the design is rendered on the body part based on the dynamically-chosen parameters of placement. In this embodiment, the processed images with the rendered design can be fed into the googles for an AR experience, which displays the tattoo on the client's body. In some embodiments, simulated images of the tattoo design viewed by the client. The simulated images of the tattoo design can be overlaid on the identified target site in images of a site. Simulated images of the target site showing the tattoo design on the subject's body part be viewed by the subject via a display, AR googles, display mechanism, computer, mobile device, or another viewing device. This can provide pre-visualization of the design with or without application of any stencil. If a stencil is applied, the simulated images can be keyed and positioned with the applied stencil. The system can receive user input via a user interface and generate operations to modify a tattoo design based on the user input, and the system can modify the appearance of the tattoo design based on the simulated images of the target site. The modification of the tattoo design can include translating, resizing, rotating, stretching, cropping, adjusting the color, etc. The pre-visualization can be performed prior to visiting a studio or retail location and/or at the studio or retail location.

Another embodiment of the AR framework may use projection of light to simulate the tattoo design directly on the client's skin, rather than displaying the render on a screen. In this embodiment, the camera is used to collect images of the body part and the MV algorithm maps the design with the appropriate deformation to comply with the body part, as explained before. A render of the design is fed into a light-projecting device, which is placed very close to the camera, and facing the same direction. The focal length of the projector could be automatically adjusted by the MV algorithm, by comparing the detected size of the stencil on the camera image to the reference stencil, and calculating an approximate distance to the body part based on this comparison. Any differences in the axes of view of the camera and the projector, may be accounted for when constructing the rendered image, to project the design with the right direction, orientation and scaling on the client's body. In some embodiments, multiple AR frameworks can be used. For example, the machine vision system can analyze a body part or target site and determine which air framework may provide the optimal client experience. The AR output can be compared to reference AR output to confirm visual accuracy. AR components can communicate with controllers disclosed herein via one or more wireless connections (e.g., via a Bluetooth connection, local Wi-Fi connection, local area network, etc.), wire connections, or the like. In some embodiments, simulated images of the tattoo design can be generated. The simulated images of the tattoo design can be overlaid on the identified target site in images of a site. Simulated images of the target site showing the tattoo design on the subject's body part be viewed by the subject via a display, AR googles, display mechanism, computer, mobile device, or another viewing device. This can provide pre-visualization of the design with or without application of any stencil. If a stencil is applied, the simulated images can be keyed and positioned with the applied stencil. The system can receive user input via a user interface and generating operations to modify a tattoo design based on the user input and can modifying the appearance of the tattoo design on the simulated images of the target site. The modification of the tattoo design can include translating, resizing, rotating, stretching, cropping, adjusting the color, etc.

Tattooing Apparatus with Frame and Contactor

Figure 8:
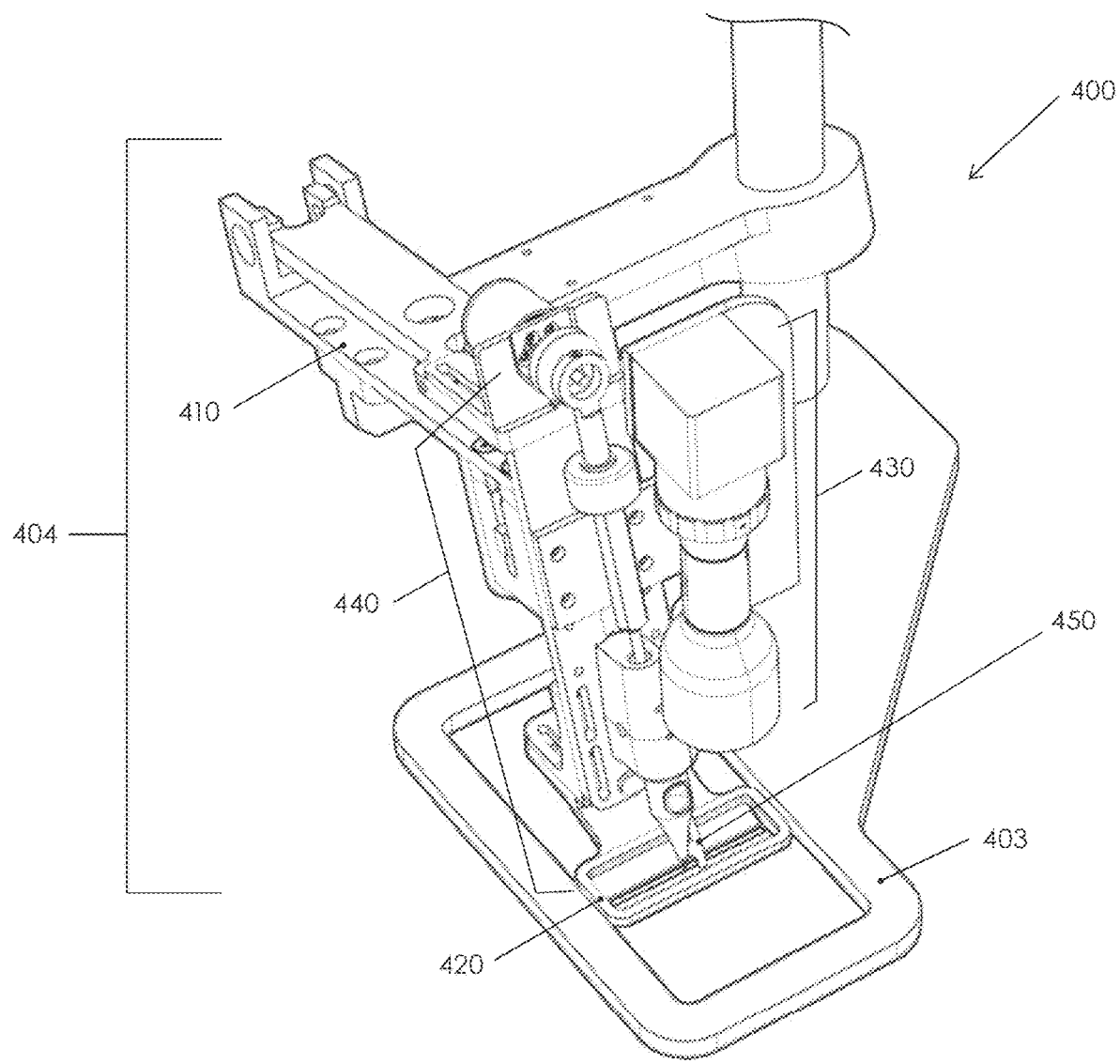
FIG. 8 is a schematic isometric view of a tattooing system in accordance with an embodiment of the disclosure.

FIG. 8 is an isometric view of another embodiment of a tattooing apparatus 400. The description regarding tattoo apparatus 100 can generally apply to tattooing apparatus 400 as well. For example, in one embodiment, tattooing apparatus 400 may comprise of a tattoo frame 403, a tattoo shuttle 404, an arm 410, a contactor 420, a machine vision device 430, a needle structure 440, and a suction system 450. Additionally, tattooing apparatus 400 may comprise more or less other components including but not limited to one or more motors, one or more actuators, one or more controllers, one or more gantries, a rest surface, a cantilevered tattoo machine, a needle cartridge, a needle, a plunger, a spring, a piston, a cam, an imaging device, a lens, etc. In some embodiments, the tattooing apparatus 400 can include one or more controllers, motors (e.g., drive motors, stepper motors, etc.), gantry devices, linear slides, rails, sensors (e.g., position sensors, accelerometers, etc.), or the like. In some embodiments, tattooing apparatus 400 can work with one or more separate controllers to form a tattooing system. Tattooing apparatus 400 can be configured based on desired characteristics for a particular tattooing process and may utilize any and all methods and/or components consistent with the present disclosure.

Marketplaces, Tattoo Selection, and Application

Figure 9:
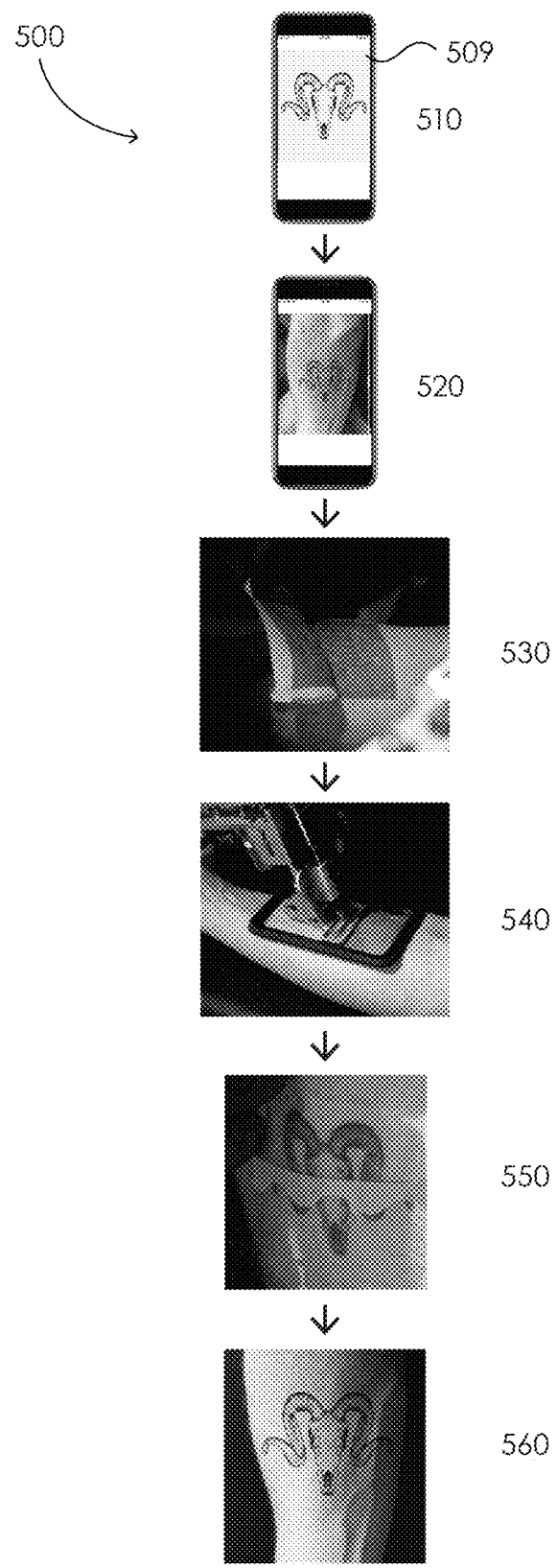
FIG. 9 is a block diagram of an embodiment of a tattoo selection and application process in accordance with an embodiment of the disclosure.

FIG. 9 is a block diagram of an embodiment of a simplified tattoo selection and application process 500. A subject may browse and/or select a design 510 from an online tattoo marketplace. In one embodiment, the subject may browse and/or select a design 510 from the online tattoo marketplace using a device 509 (or controller 108 of FIG. 1B), which may be, for example, a personal handheld device, smartphone, or a computer. The browsing and selection 510 may be done via a mobile app and/or website that allows access to the online tattoo marketplace, through which subjects may perform actions including, but not limited to, browsing, selecting, saving, rating designs, uploading, creating a profile, booking appointments, participating in auctions, or buying. In one embodiment, the online tattoo marketplace may be a global online tattoo marketplace where artists or users may upload, license, and/or sell their designs irrespective of their physical location. Artists may be paid a royalty based on selection and/or licensing of their designs by subjects through the app and/or website. Browsing, selection, and payment process may vary by location, as well as, by individual artist.

After browsing and selection 510, the subject may preview the selected design via augmented reality. In one embodiment, the subject may preview the selected design 520 via the device 509 using augmented reality to visualize how the design may look on a desired area to be tattooed. Augmented reality is a form of reality that has been adjusted in some manner before presentation to a user, which may include, e.g., virtual reality (VR), passthrough augmented reality (AR), mixed reality (MR), hybrid reality, or some combination and/or derivatives thereof. Augmented reality content may include completely generated content or generated content combined with captured content (e.g., real-world photographs). The augmented reality system that provides the augmented reality content may be implemented on various platforms, including a head-mounted display (HMD) connected to a host computer system, a standalone HMD, a mobile device or computing system, a projection system, or any other hardware platform capable of providing artificial reality content to one or more viewers. For example, a tablet or mobile phone with a camera on the back can capture images of the real world and then display the images on the screen on the opposite side of the device from the camera. The device can process and adjust or "augment" the images as they pass through the system, such as by adding tattoo designs. In some implementations, a similar process can be performed using a virtual reality or mixed reality headset, which allows light from the real world to pass through a waveguide that simultaneously emits light from a projector in the mixed reality headset, allowing the mixed reality headset to present virtual objects intermixed with the real objects the user can see. Previewing 520 may be available, for example, prior to and/or after selection of the design. Following previewing step 520, a subject may apply the design to the desired area using any of the systems or methods described. In one embodiment, a subject may undergo the tattooing process 300 using tattoo apparatus 100 or tattooing apparatus 400. In other embodiments, other embodiments of the systems and methods consistent with this disclosure may be contemplated to apply the tattoo. Application may involve utilizing a stencil 530, which may be any stencil compatible with the systems and methods described herein. Stencil application is discussed in connection FIGS. 5A-6B and stencil rejection and approval are discussed in connection with FIGS. 11A and 11B.

With continued reference to FIG. 9, the precision tattooing may be performed 540 using any system or method disclosed or consistent with this disclosure. In one embodiment, the tattooing may utilize machine vision. Following tattooing step 540, an aftercare treatment may be applied 550. In one embodiment, aftercare treatment 550 may promote, for example, healing, coloring, and/or fixation. Following the aftercare treatment 550, the tattoo may be revealed in step 560. The tattoo can be, for example, a micro tattoo, blackwork tattoo, color tattoo, realism tattoo, fine-line tattoo, or the like.

In some embodiments, a tattoo system receives a user's selection of a tattoo design and sends authorization data for the user's selection. The automatic tattooing apparatus can use the authorization data to determine whether to robotically apply a tattoo. The authorization data is sent to the user's device 509, the automatic tattooing apparatus, or both. The authorization data can include a token or credit for applying the selected tattoo design. The mobile application can manage an online tattoo marketplace that allows browsing of tattoo designs and selecting of the tattoo design. The application process 500 can include other features, steps, and processes disclosed herein.

Needle Cartridges

Figures 10A, 10B:
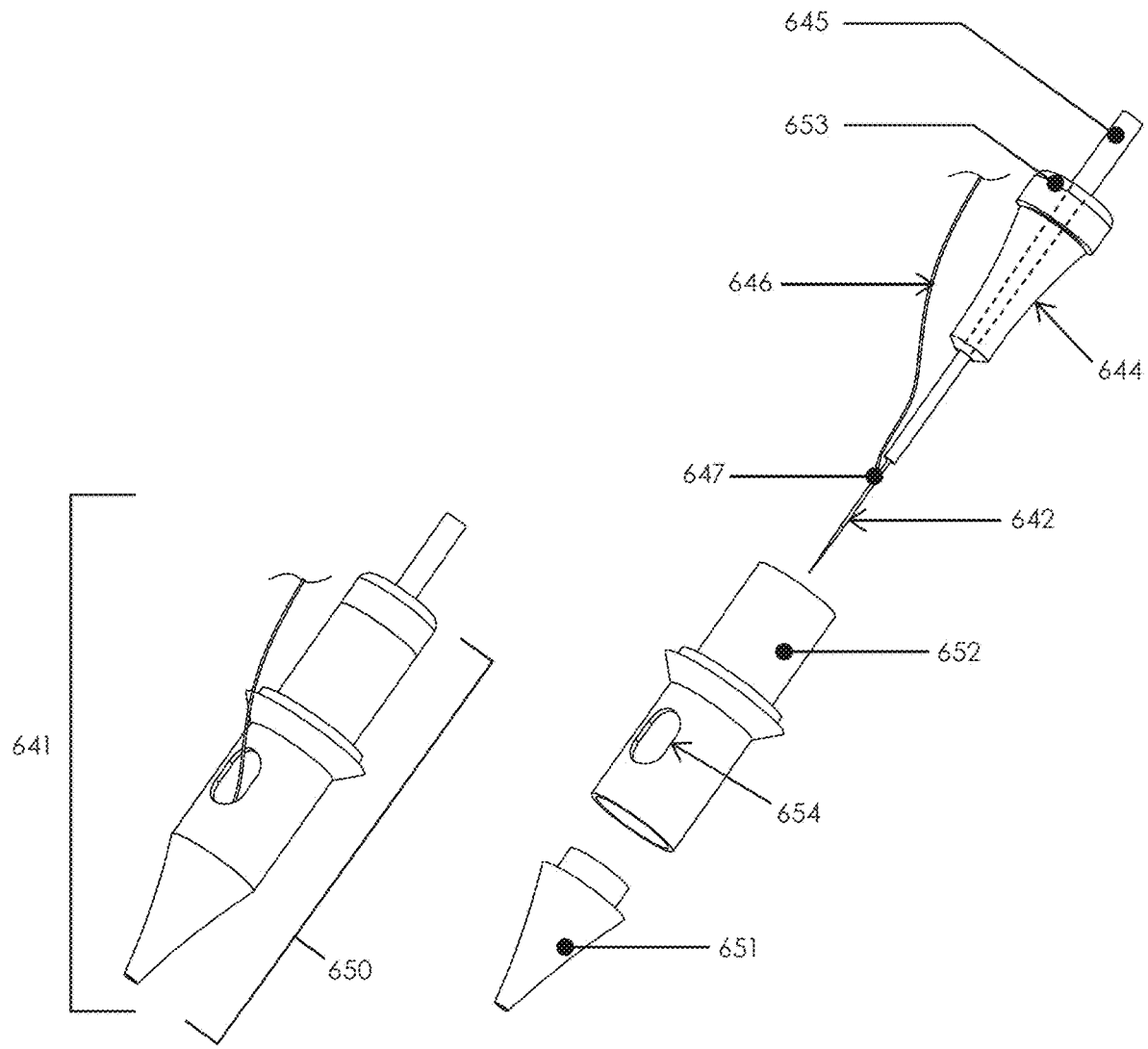
FIG. 10A is an isometric view of an embodiment of a needle cartridge in accordance with an embodiment of the disclosure.
FIG. 10B is an exploded view of the needle cartridge of FIG. 10A in accordance with an embodiment of the disclosure.

Different types of components can be incorporated into tattooing systems. FIG. 10A is an isometric view of an embodiment of a needle cartridge 641 suitable for system 76 of FIG. 1A, system 90 of FIG. 1B and system 400 of FIG. 8. FIG. 10B is an exploded view of the needle cartridge 641 of FIG. 10A in accordance with an embodiment of the disclosure. Referring to FIGS. 10A and 10B, the needle cartridge 641 may be removably coupled to the tattooing apparatus (e.g., apparatus 100 of FIG. 1B) such that switching between needle cartridges 641 may occur easily. The needle cartridge 641 may be a disposable component holding a tattoo needle and composed of the needle spring 644, plunger 645, and one or more needles 642. In other embodiments, however, the needle cartridge 641 may be suitable for refill, reuse, or limited use, and may be composed of more or less than the parts mentioned. The needle cartridge 641 may contain at least one sensor 646 such as, for example, an electrical wire for galvanic sensing. In one embodiment, the needle cartridge 641 can comprise of a wire coupled to a non-puncturing end 647 of the needle 642 and is configured to act as a galvanic electrode that can begin measuring or exciting the skin as soon as the needle 642 contacts the skin of the subject. The sensor 646 does not need to be a wire, however, and can be any type of sensor suitable for the desired configuration.

The needle cartridge 641 may also comprise of a housing 650, which may contain, for example, a cartridge tip 651, cartridge body 652, and cartridge cap 653. The housing 650 may vary in components, size, shape, design, color, and material depending on the desired configuration of the needle cartridge 641 to be used for tattooing. In some embodiments, the sensor 646 may extend through an ink inspection hole 654 in the cartridge body 652 for coupling to the tattooing apparatus 100. The ink inspection hole 654 may, for example, facilitate inspection of proper ink quality and distribution. In other embodiments, the sensor 646 does not extend through the ink inspection hole 654 and/or from other components of the housing 650 and may be located or coupled elsewhere. The ink inspection hole 654 may be sealed or opened to ambient air and may be connected to a fluidics system for the delivery of ink or other fluids to the cartridge 641.

The needle cartridge 641 can vary in the number, size, shape, type, sharpness, and arrangement of needles 642. In one embodiment, for example, needle cartridge 641 may utilize 3RL type needles in a slightly staggered arrangement. In other embodiments, the size, grouping, number of needles in the grouping, and arrangement may vary depending on the desired configuration and design. For example, any size greater than or less than 3 (e.g., size 2, 5, 7, 10, 12, etc.) needles can be used. In another example, any grouping type, needle gauge or taper may be used (e.g., RL, RLXT, RLXP, RS*T, F, M1, M2, M1C, etc.) along with any number of needles in the grouping. The needle type, shape, number, size, grouping, number in grouping, arrangement, etc. can be selected based on the use with the systems and methods of the present disclosure. The needle cartridge 641 may be any of a variety of types of cartridges, including but not limited to, custom cartridges, third party cartridges, generally available cartridges, or any other cartridge capable of operation with the systems and methods of the disclosure.

The ink cartridge (not shown) may be installed as a removable component to the tattooing apparatus and/or needle cartridge 641 such that switching between ink cartridges may occur easily. The ink cartridge can be configured to allocate ink via capillary action, tubing, and/or pumps at prescribed intervals from an anti-cross-contamination ink supply. In one embodiment, the ink cartridge may be a single use, disposable sterile ink cartridge with sufficient ink for a tattoo. The ink cartridges may contain different amounts and/or colors (e.g., black, red, blue, green, skin tone brown, etc.) and/or types of ink. The operator may choose one or more suitable ink cartridges depending on the tattoo. In some tattooing processes, one or more of the same or different ink cartridges may be used. In some embodiments, the ink cartridge may be suitable for refill or reuse. In one embodiment, the tattooing apparatus 100 and/or needle cartridge 641 may be configured to couple with multiple ink cartridges simultaneously. The ink cartridge type, shape, number, size, color, arrangement, etc. may vary so long as the ink cartridge is capable of use with the systems and methods of the present disclosure. The ink cartridge may be any of a variety of types of cartridges, including but not limited to, custom cartridges, third party cartridges, generally available cartridges, or any other cartridge capable of operation with the systems and methods of the disclosure. In some embodiments, the ink cartridge may be a component of the needle cartridge 641 or may be a separate component that may be coupled to the needle cartridge 641 and/or tattooing apparatus 100. The arrangement and configuration of the ink cartridge may vary depending on the desired configuration of the needle cartridge 641 and/or tattooing apparatus. The ink cartridge may be anything capable of holding and distributing ink such as, for example, an ink reservoir, ink pack, or the like.

Stenciling, Skin Analysis, and Related Technologies

FIGS. 11A and 11B are illustrative diagrams of an example rejection and example approval of stencil positioning, respectively, in accordance with another embodiment of the disclosure. In one embodiment, machine vision device (e.g., machine vision device 130 of FIG. 2) may assess stencil 710 positioning via an interrogation window 720. In one embodiment, interrogation window 720 may span a portion of the area to be tattooed. For example, in one embodiment, the interrogation window 720 can correspond to dimensions of the window of the contactor, such as contactor 120 of FIG. 2. With continued reference to FIG. 7A, interrogation window 720 may coincide with a field of vision of the machine vision device and may be configured to span the entirety of the tattoo field. In one embodiment, the interrogation window 720 may transition between multiple positions 722 of a scan zone 721 to assess positioning of the stencil 710. For example, the interrogation window 720 may be configured to detect a presence and/or absence of one or more reference features 730 and/or one or more tattoo dot locations 740. Approval of the positioning of the stencil 710 may then be based at least in part on the detected presence and/or absence of reference features 730 and/or tattoo dot locations 740. In one embodiment, the machine vision device 130 can utilize a machine vision algorithm to compare the detected reference features 730 and/or tattoo dot locations 740 with a vector-based stencil drawing. In other embodiments the machine vision algorithm may be performed by a controller such as controller 109.

FIG. 11A is an illustration of an example rejection of stencil positioning in accordance with one embodiment. For example, stencil 710 can be rejected as a result an absence of reference features 730 of the stencil 710 anticipated at particular locations within the interrogation window 720. Alternatively, stencil 710 can be rejected as a result an absence of a sufficient number of references features 730 near the targeted tattoo dot locations 740 anticipated at particular locations within the interrogation window 720. An absence of particular reference features 730 within the interrogation window 720 may be determined based at least on a comparison with reference data, such as a reference drawing, a vector-based stencil drawing, or the like. Rejection may occur when there is insufficient context within the interrogation window 720, suggesting reapplication of the stencil 710 may be required.

FIG. 11B is an illustration of an example approval of stencil positioning in accordance with one embodiment. The applied stencil 710 positioning may be approved based at least in part on a presence of reference features 730 within the interrogation window 720. In one embodiment, a presence of particular reference features 730 within the interrogation window 720 may be determined based at least on a comparison with a vector-based stencil drawing. In one embodiment, reference features 731 may be added to and/or removed from the stencil 710 to promote approval of the stencil 710 positioning. In another embodiment, stencil 710 repositioning and/or reapplication may be enough to promote approval of the stencil 710 positioning. Approval may occur when there is sufficient context within the interrogation window 720, suggesting stencil 710 may be properly positioned and tattooing may proceed. Once approved, ink can be deposited at the tattoo dot locations 740 using reference feature-based positioning in which the reference features 730 can be used as landmarks.

FIGS. 11C and 11D are simplified illustrative diagrams of an example rejected stencil and an example approved stencil, respectively, in accordance with one embodiment. FIG. 11C depicts in a simplified manner, an absence of reference features within a contour of the design (e.g., a virtually applied design) sufficient for approval. FIG. 11D depicts in a simplified manner, approval despite a limited absence of some reference features suitable for generating targeted tattoo dot locations. For example, approval may still occur if the absence of reference features and/or tattoo dot locations is sufficiently limited and/or in a non-critical region such that the tattooing process may proceed.

Figure 12A:
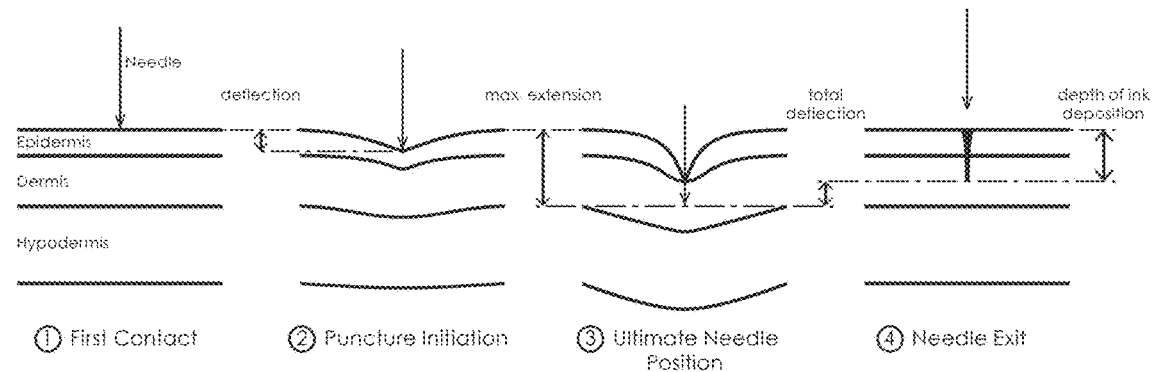
FIG. 12A is an illustrative diagram of an example puncture event in accordance with an embodiment of the disclosure.

FIG. 12A is an illustrative diagram of an example of puncture events in accordance with an embodiment of the disclosure. The needle contacts the exposed skin surface and begins to puncture the epidermis. The maximum extension corresponds to the needle being located at the ink deposit position. After depositing ink, the needle is pulled out of the skin. The depth of ink deposition can be determined based on the position at contact, the position at initial puncture, the position at maximum extension, and/or the angle of attack of the needle, as discussed in connection with step 310 of FIGS. 3A and 3B.

Figure 12B:
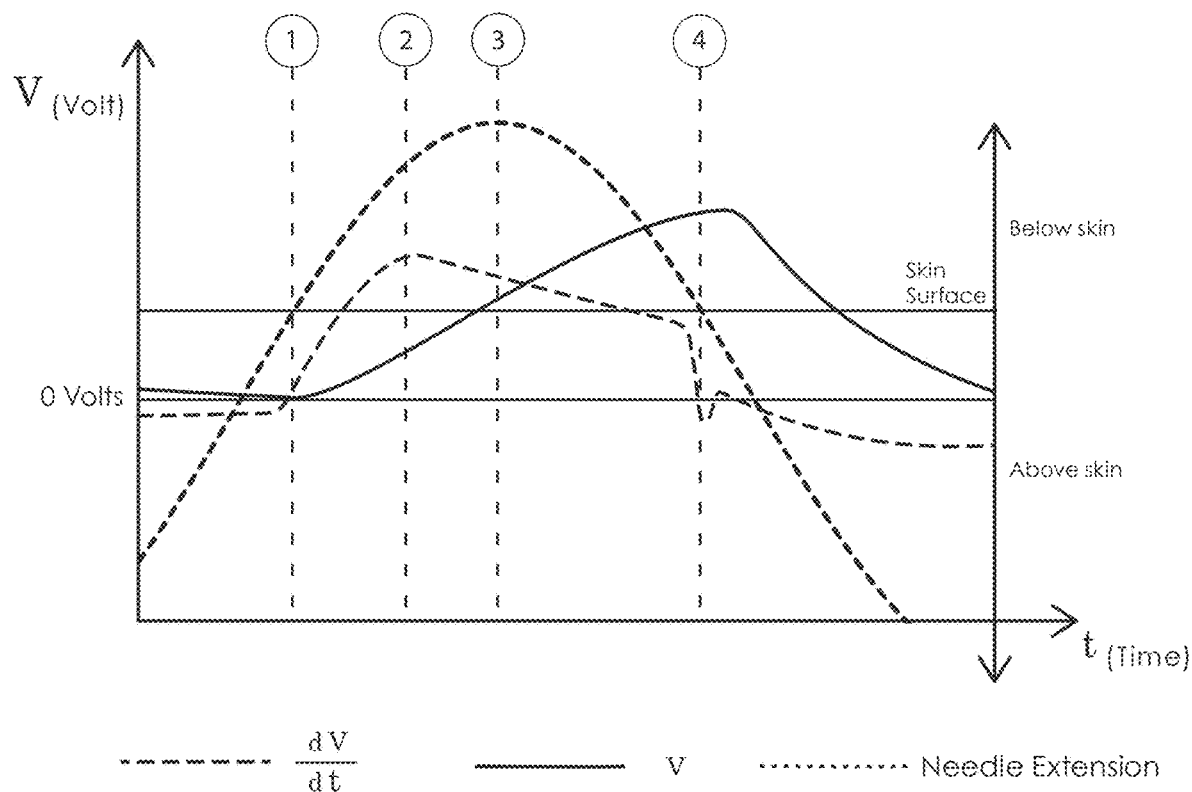
FIG. 12B illustrates a conductivity curve as detected by a galvanic sensor and data curves in accordance with an embodiment of the disclosure.

FIG. 12B is an illustrative conductivity signal of one embodiment utilizing a galvanic sensor and its first derivative with respect to time for a single puncture. Additionally, the needle extension may be obtained using the measurement from an angular encoder (e.g., an angular encoder on the needle motor 111 of FIG. 2) or other sensor. In general, the puncture events 1-4 are detectable by determining the extrema of these three illustrated curves. Puncture event 1 corresponds to initial contact. Puncture event 2 corresponds to puncture initiation. Puncture event 3 corresponds to ultimate or maximum depth needle position. Post puncture area 4 corresponds to post puncture needle exit. Example puncture events are described in detail below.

The puncture events in accordance with an embodiment are identified using an algorithm identifying the local extrema in the conductivity signal during puncture and the local extrema in the first temporal derivative of the conductivity signal during puncture. The initial contact is identified when conductivity becomes non-zero and the first temporal derivative of the conductivity signal becomes non-zero. This is because the needle closes the electrical circuit formed by the skin and the electrodes when the needle is in contact with the skin. The position at initial puncture is identified by a trend artifact in the first temporal derivative of the conductivity signal following initial puncture. This change in trend is observed in the first temporal derivative of the conductivity signal because of the shift from surface conductance to subdermal conductance.

When puncture of the epidermis finally occurs, the needle becomes in contact with the inner tissue which is more conductive than the outer layer of the epidermis, while the surface of the skin may be conductive, which results in an increase of bulk conductivity and a decrease of surface conductivity.

The position at maximum extension is identified by the analysis of the position of the needle using the needle motor 111 of FIG. 2 angular encoder with a known alignment when the needle is at its deepest setting. The signal from this encoder can be superimposed with the signal from the galvanic response to synchronize the temporal and positional signals. The position of the needle may be calculated using the equation for an eccentric cam. The post puncture event is identified when the conductivity signal and the first temporal derivative of the conductivity signal suddenly reduce. This is because the needle is losing contact with the tissue.

The conductivity signal output can be analyzed to determine additional information, including the tissue characteristics (e.g., mechanical properties of the tissue, electrical properties of the tissue, or thickness of tissue layers), performance of the tattoo system, or the like. The number and pattern of locations at a targeted area that are analyzed can be selected based on the characteristics of the tattoo to be applied at the target area. For example, the number of locations can be increased or decreased based on how the tissue characteristics vary across the target area.

The techniques discussed in connection with FIGS. 12A and 12 B can be used to determine first contact, puncture initiation, needle position, needle exit, and other puncture events based on data from other sensors disclosed herein. The puncture force used to drive a needle through each layer of skin can be monitored to identify such events. This is because each layer has different mechanical characteristics that can be identified using analytics and AI based algorithms disclosed herein. Puncture force versus displacement curves can be generated to identify the events of interest. Optical sensors, pressure sensors, logical sensors, or combinations thereof can be used with the puncture force data to identify the events. In other embodiments, sensors can noninvasively analyze sites along the skin to detect skin characteristics. The sensors can be ultrasound sensors, optical sensors (e.g., near infrared sensors, infrared sensors, etc.), acoustic sensors, or the like. In some embodiments, both noninvasive and invasive techniques are used to analyze the skin. Results from both techniques can be compared and used to generate predictive skin thicknesses at various locations along the site.

Figure 13:
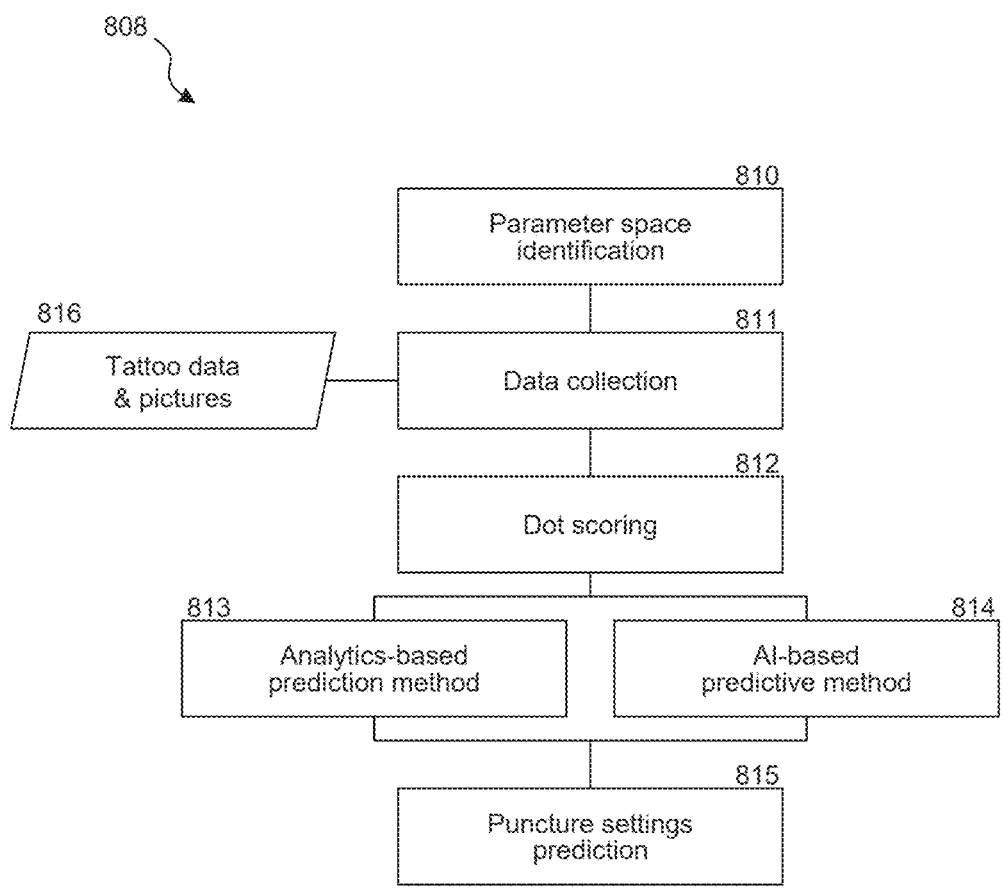
FIG. 13 is a block diagram of steps of a puncture setting prediction procedure in accordance with an embodiment of the disclosure.

FIG. 13 is a flow chart of a method 808 for acquisition and usage of a training set for the development, experimental calibration, and/or operation of a method for sensor-based control of needle extension during tattoo ink deposition. In step 810, parameter space is identified by, for example, identifying internal and external variables or properties which may influence the visual outcome of a tattoo dot. The internal variables can include: (i) needle extension, (ii)

number of punctures per location, (iii) type and geometry of the needle, and/or (iv) type of the ink. Among these, (i) and (ii), are the puncture settings, which may be controlled by an algorithm based on sensor data during tattooing operation. The external variables or properties can include: geometric properties of the skin, such as thickness of its various layers and physical properties of the skin, such as mass density, water content, presence and properties of the supporting (backing) tissue, such as bone or muscle, age, race and gender of the person, (viii) body mass index, and/or and body hydration. The variables for the parameter space can be selected based on the functionality of the tattooing system, tattoo to be applied, or the like.

In step 811, data 816 can be collected by, for example, performing one or more experiments on a set of participants to identify the internal and external variables that influence the puncture sensing and ink deposition processes, and to find the relations or correlations between these variables. The participants and internal puncture settings can be chosen to increase or maximize the range of internal and external variables. The experiments can involve administration of wet (inked) punctures on the skin as well as dry punctures in the vicinity of the wet punctures. The experiments are performed and the collected data can be organized in a dataset as: the puncture settings (i,ii), needle and ink type (iii, iv), meta information about the participants related to external variables (v-ix); sensor data from the dry puncture experiments (x), and high-definition pictures of the resulting inked dots (xi), and their numerical scores (xii) which can be calculated in Step 812. The images (e.g., pictures) of tattoo dots (xi) may be appended with additional images taken at subsequent stages of the skin's healing process. In Step 812, inked dots can be assigned numerical scores (xii) based on their aesthetic quality, which can then be used to train and validate the puncture control method. Aesthetic quality can be inputted by a user or determined using an automated scoring protocol. For example, scores may be manually (by human) or automatically (by image analysis) assigned, based on the following visual aspects: (i) diameter of the dot in comparison to the expected diameter, (ii) circularity of the dot, (iii) sharpness of the edges, or the degree of diffusion, and/or (iv) presence of blowout, or another undesirable outcome. Next, a model can be trained from the collected data to predict the dot outcome as a function of one or more puncture parameters and other internal/external variables. The model can be configured to determine or selecting needle extensions, number of punctures, needle tip configuration, and/or number of needles so as to affect tattoo dot size, aesthetic quality, color saturation, color gradient, and/or color tone.

Two alternative models are described in steps 813 and 814. In Step 813, a mechanistic model of the needle and the skin may be developed while accounting for the uncertainties in the data and input/output quantities. The input of the model may be based on data collected from one or more sensors, such as galvanic sensor data which correlates with the contact of the needle and the layers of the skin, load-cell data which correlates with the force on the needle or motor encoder data which correlates with the angular position or angular velocity of the needle. The times of individual puncture events, such as (i) first contact with skin (event 1 in FIGS. 12A-B), (ii) puncture events of individual skin layers (event 2 in FIGS. 12A-B), and (iii) needle exit from the skin (event 4 in FIGS. 12A-B), are detected from the galvanic sensor data as shown in FIG. 12B. The motor encoder data in combination with the detected times of puncture events (i) and (iii) may be used to calibrate a model of the oscillatory needle extension as a function of time. This model can be constructed by calculating the conversion of the eccentric rotation of the cam to the linear extension of the needle. This model may be used to predict the time of maximum needle extension (iv) (event 3 in FIGS. 12A-B), and the extension of the needle at the time of each puncture event (i-iii) into position of the needle tip. The distance traveled by the needle between individual events (i-iv) constitute intermediary output variables of the model, which may provide valuable information pertaining to the tattoo ink delivery. For example, distance traveled between first contact (i) and first puncture (ii) is (a) the initial deflection. The distance traveled between the times of puncture of individual layers (ii) may be correlated to the (b) thickness of these layers. The distance traveled between first contact (i) and maximum needle extension (iv) is (c) the max extension. The distance between max extension (iv) and needle exit from skin (iii) is (d) the posterior max extension. A combination of the intermediary output variables (a,b,c,d) may be statistically related to the penetration depth of the needle, the depth of ink deposition, or the tattoo dot quality (xii) in the experimental dataset. The statistical relation between the intermediary output variables (a,b,c,d) and the tattoo dot quality (xii) may be identified using a partial least-squares regression (PLS) method, or other regression methods such as standard or constrained least square approaches, regularized minimizations, principal component analysis or other. The goodness of fit, correlation coefficients, or other statistical measures of the model precision with respect to the predicted output, may be calculated from the dataset to provide a confidence index to the predictions during tattooing operation.

As an alternative to step 813, a machine-learning method, such as a neural network, could be trained in step 814 from the collected dataset, in order to predict the correct puncture settings to achieve a high-quality dot as a function of the sensor data and any available meta-information related to external variables (v-ix). In this approach, the dot score is used as the objective set and the sensors signals are the input and the puncture settings are the searched variables. The puncture events may or may not be defined as intermediary input and collected dataset may be enhanced until a statically representative dataset is obtained.

In step 815, the model developed in step 813 or 814, is used to predict the correct puncture settings which would create a high-quality tattoo dot, for each location where dry punctures are applied. The predicted puncture settings are appended to a parameter table 316 of FIGS. 3B and 3C.

In some embodiments, predictions are generated using the analytics prediction methods of step 813 and AI-based predictive methods of step 814. The method 808 can include using output from both steps 813, 814 to determine predictions, e.g., by using confidence factors determined for one or both processes to weight a combination of the results or to select which output to use at any given time. For example, the output of the machine-learning method can include a value in a range for a puncture setting, where a difference between the value produced at the nearest of the range can be the confidence factor, and the results of the machine-learning method are only used when that confidence factor is above a threshold, otherwise the analytics-based method is used. Alternatively, the method 808 can select one of the outputs from step 813 or step 814 as the prediction. The selection can be based on analysis of the collected data and historical prediction accuracy for similar data. The model from steps 813 and/or 814 are used to predict the correct puncture settings.

A robotic tattooing system can include a portable automated handheld tattoo device. The handheld tattoo device can be conveniently carried by a user and applied to a subject. This allows tattoos to be applied at a wide range of settings, including at tattoo studios, spas, home settings, or the like. During a tattooing session, the handheld tattoo device can be manually repositioned (e.g., manually carried and placed) at desired locations.

Handheld Tattoo Device and Related Technology

Figure 14:
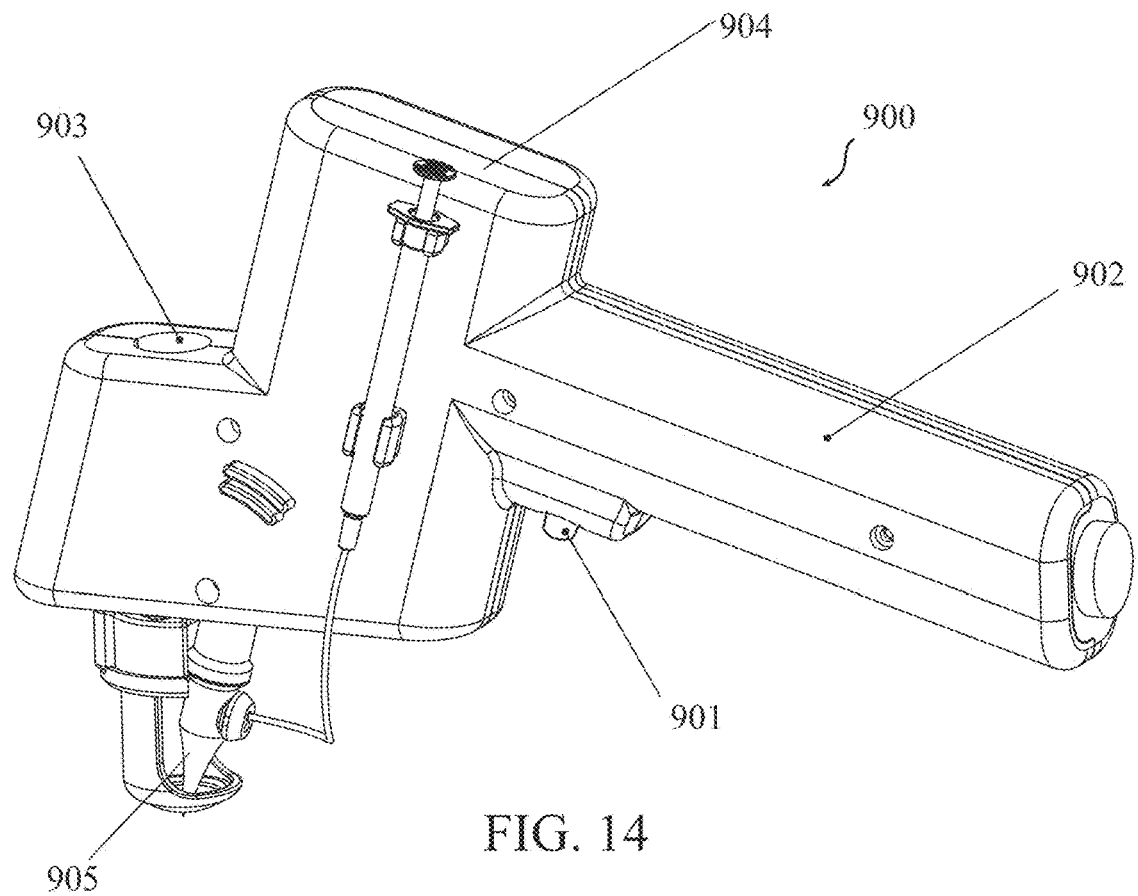
FIG. 14 is an isometric view of a handheld tattoo device in accordance with an embodiment of the disclosure.

FIG. 14 is an isometric view of a handheld tattoo device or unit 900 ("handheld tattoo device 900") in accordance with an embodiment of the technology. The handheld tattoo device 900 can include a grip or handle 902, a main body 904, and a needle assembly 905. A control element 901 can be used to control operation and can include a trigger, a push button, a switch, a finger interface, and/or an actuatable element. The control element 901 can be used to, for example, control operation of the needle assembly/actuator, start/stop a tattoo protocol, or the like. A sensor 903 can include one or more indicators, levels, accelerometers, gyroscopes, etc. In some embodiments, the sensor 903 is an indicator (e.g., one or more bubble levels) used to set or correct (1) relative positioning of the tattoo device 900 with respect to the skin surface, (2) the orientation (e.g., horizontal orientation or vertical orientation) of the tattoo device 900, or (3) the angular position of the tattoo device 900 relative to a reference plane.

Figure 15:
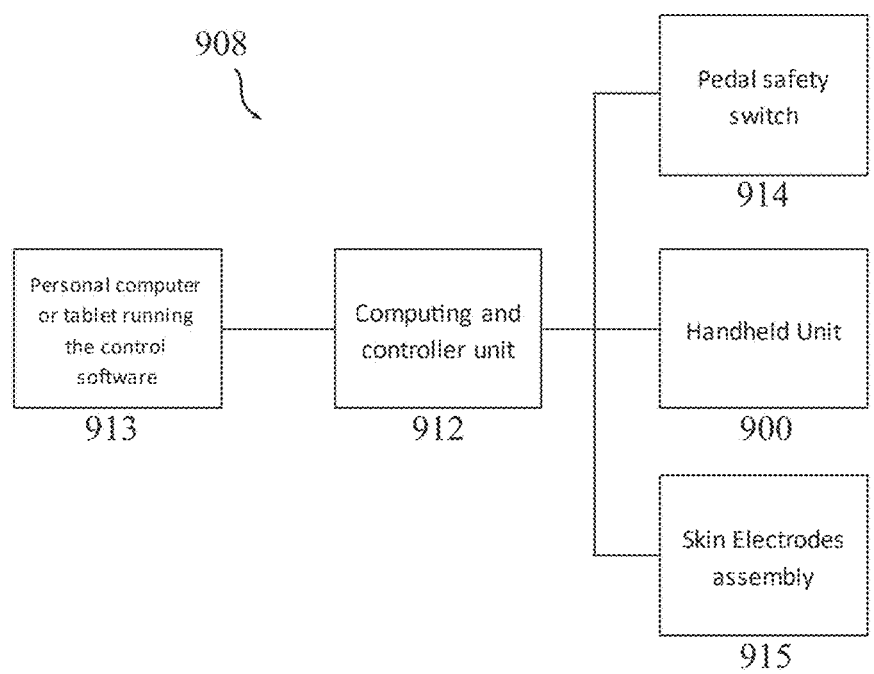
FIG. 15 illustrates a handheld automatic tattoo apparatus in accordance with an embodiment of the disclosure.

FIG. 15 illustrates a handheld tattooing system 908 in accordance with an embodiment of the technology. The handheld system 908 can include the handheld tattoo device 900, a computer and/or controller unit 913 (e.g., a PC/tablet running the control software), controller unit 912, a safety device 914 (e.g., pedal safety switch), and an electrode assembly 915 (e.g., skin electrodes). The components can be integrated into or coupled to the handheld tattoo device 900. For example, the components can be detachably coupled to the handheld tattoo device 900. The handheld tattoo device 900 can include one or more rechargeable power sources. In some embodiments, the handheld tattoo device can be powered via an external power source. The handheld tattooing system 908 can be incorporated into systems with features and functionality discussed in connection with FIGS. 1 and 21.

Figure 16:
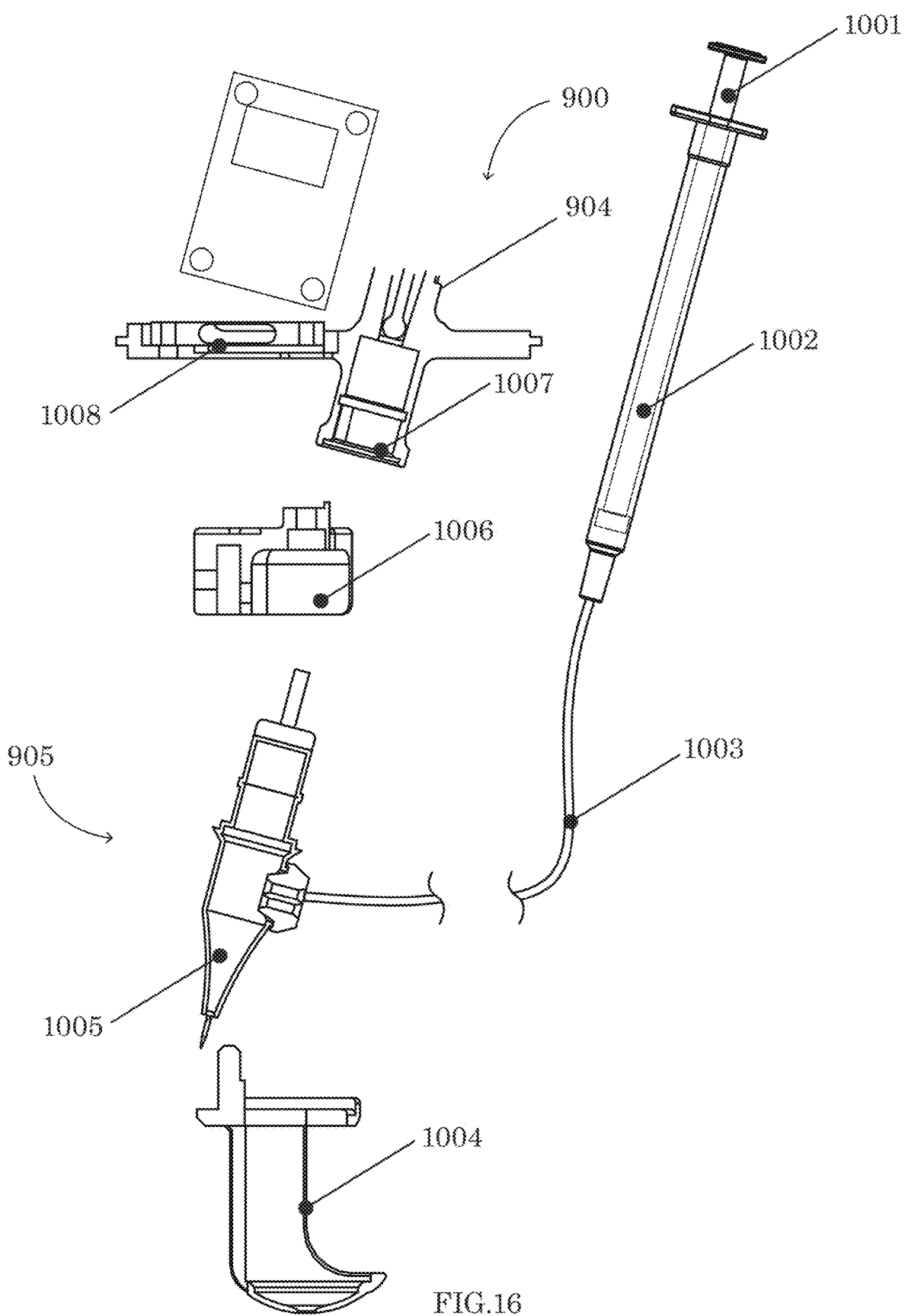
FIG. 16 is an exploded side view of a handheld device in accordance with an embodiment of the disclosure.

FIG. 16 is an exploded view of components of the handheld device 900 in accordance with an embodiment of the technology. The handheld device 900 can include a contactor 1004 (or contactor 1106 in FIG. 18C) with one or more windows or openings to facilitate visualization of the skin. The contactor 1004 can be configured to keep a region of the skin surface general flat. In some embodiments, the contactor 1004 has a generally circular shape, partially spherical shape, or cylindrical shape since only one dot or a limited number of dots may be applied at a time. In multi-needle assembly embodiments, the configuration and number of contactors and number of openings can be selected based on whether ink is applied simultaneously or sequentially by different needles assemblies.

Figure 18A:
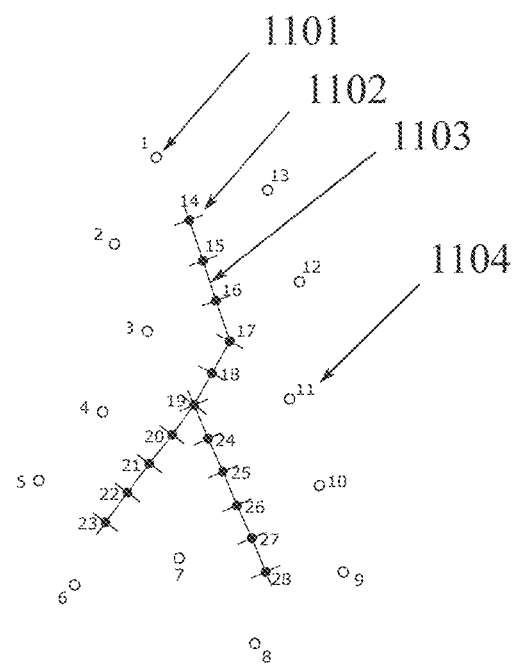
FIGS. 18A-18C illustrate a stenciling process for manual tattooing in accordance with an embodiment of the disclosure.
Figure 18B:
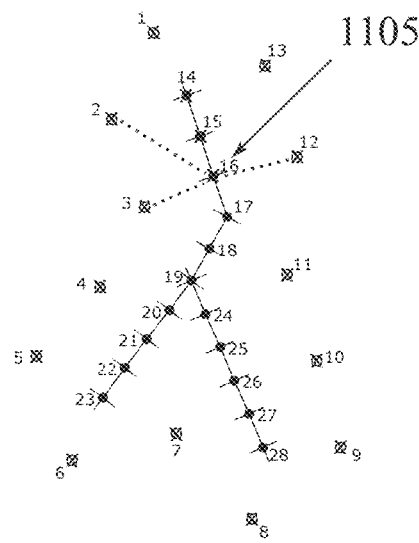
Figure 18C:
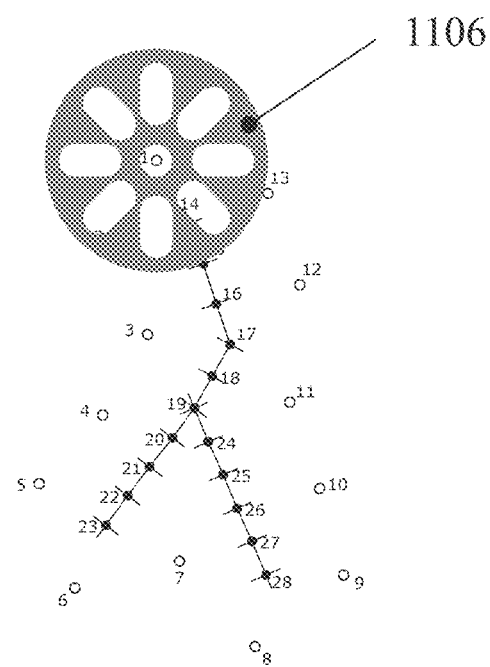

The device 900 can also include an integrated lighting system that outputs light to facilitate operator vision of the tattoo window and openings of the contactor. In FIG. 18C, the integrated lighting can be integrated in the contactor holder 1006. In some embodiments, the lighting system is installed as a removable component of the device 900 to allow repositioning of the lighting system. All or some of the components of the handheld device 900 can be encased or include a protective housing to protect the mechanism from being exposed to the patient and/or operator. A removable electrical assembly can include one or more wire harnesses used to couple the tattoo device to components, such as the control and sensing electronic box. In some embodiments, the device 900 has an integrated control and sensing electronic box, an internal power source, or the like. A pedal (e.g., a safety device 914 in FIG. 15) can be used to trigger off the actuator in case of malfunction.

Referring to FIG. 16, a load cell 1008 can be coupled to the contactor holder 1006 and to the body of the handheld tattoo device 900 in order to sense the applied pressure from the skin to the contactor 1004. The tattoo device 900 can also include one or more actuator mechanisms similar to or the same as the actuator mechanism described in connection with arm 110 and FIG. 2.

The needle assembly 905 can be inserted into an opening 1007 of the main body 904. One embodiment of the disposable needle cartridge is an integrated ink and needle disposable (or not disposable) cartridge. Such a system includes an ink reservoir 1002 holding ink that be injected in the needle well 1005 by pressing a piston 1001. A line or tube 1003 can be used to deliver the ink from the ink reservoir 1002 to the needle well 1005. Referring now to FIGS. 10A, 10B, 14, and 16, the needle cartridge of FIG. 16 and the needle cartridge 641 of FIGS. 10A and 10B can include one or more electrodes, electrode wires, sensors, or the like. For example, the cartridge 641 of FIGS. 10A and 10B can contain the electrode wire 646 that provides the needle electrode connection 647 to the rest of the system or device. With continued reference to FIGS. 10A and 10B, the needle cartridge 641 also contains a plastic piston 645 connected to the needle 642 to provide Z movement and an elastic skirt 644 that provides a seal to ink and air from the ink well as well as a spring like action on the plastic piston. When assembled, air and ink can only be released through the needle opening. The ink cartridge of FIG. 16 can include similar components and operate in a similar manner.

The ink and needle cartridges can integrate with the needle and the ink necessary to provide desired tattooing action. When inkless measurement with the needle is performed (e.g., dry puncture), the ink reservoir piston is not pressed and no ink is present in the ink well. The needle is therefore operated without ink on its surface, resulting in a puncture with no ink. When performing a tattoo with ink, the ink reservoir piston is pressed in initially until ink fills up the ink well. The ink in the ink well does not drain excessively from the needle aperture when the needle actuation is not performed due to the surface tension of the ink. In operation, the needle actuation moves ink from the ink well by coating the needle surface with ink, which allows ink to be transferred to the skin and in the skin. As the tattoo progresses, the piston of the ink reservoir is further pressed to compensate for the consumed ink as part of the tattooing process such that the ink well is always sufficiently full for tattooing. This can be realized by either sensing the ink well content or by adding a prescribed amount of ink for every, or some number of actuations of the needle. The piston of the ink reservoir can be, in one embodiment, pressed by an automated actuator, or, in another embodiment, by the operator in case of a manually operated machine.

The ink and needle cartridge system may, in some embodiments, not contain a piston to transfer ink from the reservoir to the ink well, but any other suitable mean of transferring ink from one to the other, such as a pump, capillary action, pressure differential, or piezoelectric action. The ink and needle cartridge may include multiple sub elements, each of which may or may not be disposable. The ink and needle cartridge may contain sensors and electronic components to detect ink level and to authenticate originality, quality or first usage of the ink and needle cartridge, to avoid reuse of components (e.g., ink cartridges/assemblies), quality of product and one status of product.

The handheld manually operated tattooing process can include one or more steps discussed in connection with FIG. 3A and there can be some optional differences in steps 302, 303, 304, 305, 306, 307, 310, 320, 308. The handheld manual operation can include one or more features discussed in connection with step 310 (FIG. 3B), step 320 (FIG. 3C), and processes discussed in connection with FIG. 17. Referring now to FIG. 3A, in a manually-operated embodiment of step 301, a portion of skin that will receive the tattoo is prepped by, for example, shaving (if required or desired), cleaning the skin surface, etc. In step 302, a stencil can be applied to the portion of skin. The stencil in step 302 can be similar or identical to the steps described in connection with FIGS. 18A-18C or other stenciling processes disclosed herein. The stencil can provide information about operation of the tattooing device. The stencil can include one or more markings indicating tattooing procedure information, specifying the order of operations for a manual operator to execute, post tattooing session information, or combinations thereof. In some embodiments, the stencil can provide a temporary indication of the final design that can be reviewed and accepted by the client. Artwork can be used to generate a stencil. An algorithm may be used to generate the stencil from the artwork. The artwork can be comprised of dots, lines, areas interpreted as dots, or the like. The algorithm can be selected based on the characteristics of the artwork, such as resolution of the artwork, colors of the artwork, or the like.

After applying the stencil 302 of FIG. 3A, the subject and/or operator may check the stencil 303. The subject may review the stencil application and either approve or reject the design placement. The operator may review the stencil for quality of application. In some embodiments, for example, a stencil deposition should be such that a transfer of fiducial marks is adequate to apply a tattoo using the handheld tattoo device without missing dots. If the stencil appears misplaced or the application is not accepted by client, the stencil application step may be repeated until accepted.

Following approval of the stencil application, lubricant can be applied in step 304. A variety of suitable lubricants with different viscosities and hydrophobic properties may be suitable for use. For example, a lubricant with a viscosity between, for example, 10 cps and 500 cps with hydrophobic properties to increase the contact angle between ink droplets and skin may be used. The lubricant can be chosen such that the type and viscosity of the lubricant may allow it to protect the epidermis top surface from being stained by ink and/or increase ease of removal of the ink.

Step 305 may be performed after step 304. In step 305, the handheld tattoo device can be prepared to position the disposable ink delivery system, contactor, needle cartridge and/or protective bagging on the handheld tattooing device. These accessories can be disposable for hygiene purposes. Electrodes (e.g., liquid electrodes) can be positioned on the skin by the operator within the vicinity of the tattooed skin area. The electrodes can be positioned side by side or in another pattern, with the test electrode positioned closer to the tattoo area than the reference electrode.

Following step 305, the tattoo device may perform a calibration routine. In step 306, the tattoo device can identify its internal zero reference and calibrate itself. The calibration routine can include actuating one or more actuators (e.g., actuator system) to assess correct operation in this step. In one embodiment, calibration may comprise of using an algorithm to run a diagnostic of the sensors. Additionally or alternatively, a conductivity test may be performed to confirm connection of one or more electrodes to the tattoo device and/or to the skin.

In the handheld operation, step 307 of FIG. 3A can be omitted, since positioning of the handheld tattoo device can be performed by the operator in steps 310 and 320 for each and every dot, or a subset of dots. In some embodiments, a tattoo process can include both step 307 of FIG. 3A and steps 310 and 320.

At step 310, a skin puncture property acquisition can be performed. For the manual embodiment of FIG. 3B, the operator can identify one or more markers associated with a dry puncture.

Figure 17:
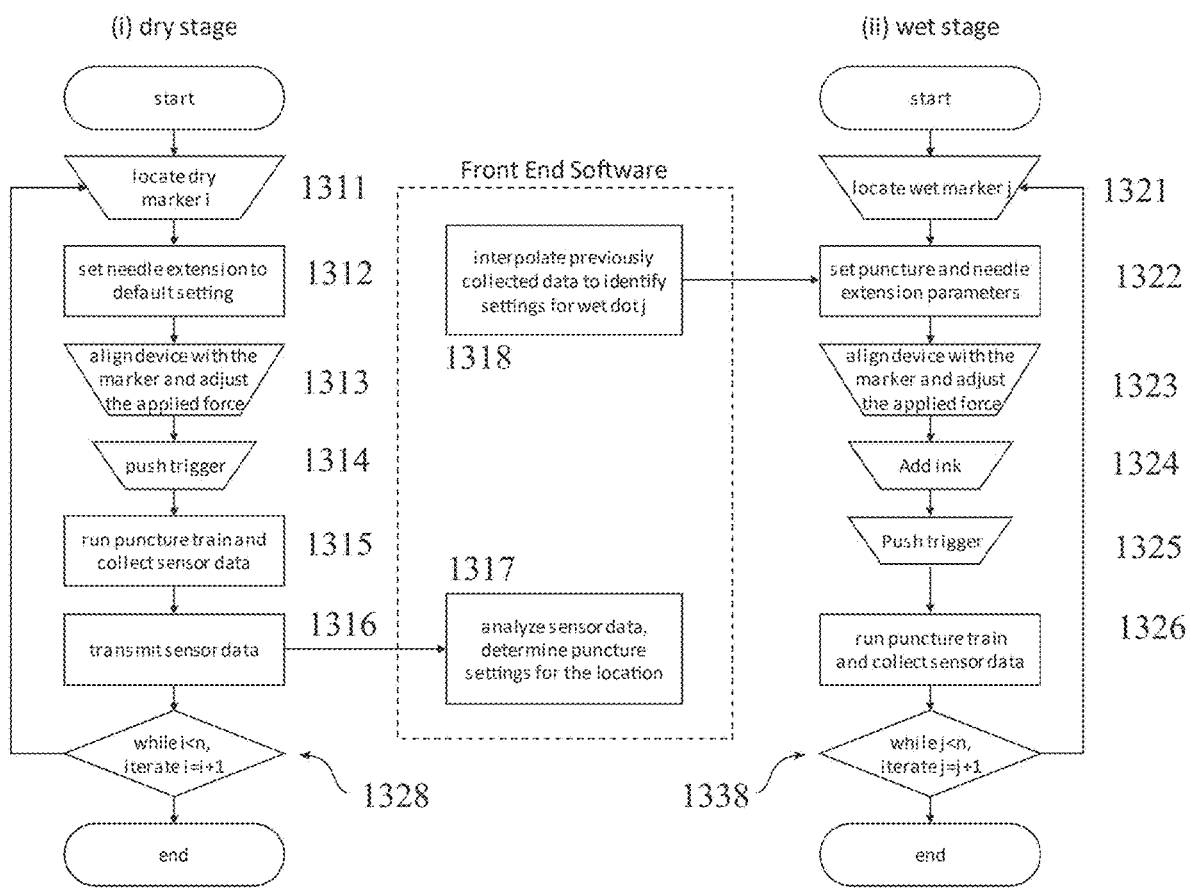
FIG. 17 is a block diagram of an embodiment of the procedure for applying a tattoo using a handheld automatic tattoo apparatus in accordance with an embodiment of the disclosure.

FIG. 17 is a block diagram of a dry stage with dry puncture and wet stage with wet puncture in a tattoo application process step in accordance with an embodiment of the disclosure. The robotic systems can perform the steps discussed in connection with FIG. 17 and discussed in connection with the embodiments of FIGS. 14-16. A dry puncture is a puncture that is formed without applying ink. For example, a needle can be inserted into the skin to form the puncture, and the needle can be removed from the skin. The locations designated to receive dry punctures are denoted by an unfilled feature 1101 in the example stencil illustration in FIGS. 18A to 18C. The unfilled feature configuration (e.g., shape, dimensions, diameter, etc.) can be an indicator for needle configuration. In one embodiment, small diameter circles indicate the use of a needle with 3 or less tips in a tight circular configuration, and large diameter circles indicate the use of a needle with 4 or more tips in a tight circular configuration. The position can either be identified by a numeral character (e.g., number 1104 as shown in FIG. 18A) applied as part of the stencil and/or through a digital representation of the tattoo displayed on the computer or tablet that runs the control software's graphical user interface. Other techniques can be used to apply the numeral character.

A control module can send a command to the computing unit of the tattoo system to configure (e.g., applying one or more settings) the tattoo device for the skin puncture acquisition in step 1312. After a setting is applied in step 1312, the operator can position the contactor window by centering the contactor with the marker in step 1313. FIG. 18C illustrates positioning of the contactor window 1106 with the stencil illustration. For example, contactor can be aligned with the dry marker numbered "1". In step 1313, the operator can also ensure that the tattoo device is properly oriented with respect to the skin surface with or without using a level element, such as the level element 903 in FIG. 14. If the skin surface is oriented horizontally, the level element can be an air bubble level element used to ensure that the contactor/skin surface are substantially parallel.

The operator can increase or decrease the pressure applied by the contactor to the skin by applying manual force. In some procedures, belts, straps, adhesive elements (e.g., double-sided adhesive tape) are used to couple the tattoo device to the subject. The tattoo device can apply a sufficient level of force to the skin to ensure sufficient contact between the contactor and the skin. The amount of force employed can be measured by one or more sensors (e.g., contact sensors, pressure sensors, load cell, etc.). The amount of force can be digitally reported by the graphical and/or sound interface of the control module. The amount of force or pressure allowed can be between two force/pressure values, a lower bound optimal force/pressure and a higher, upper bound optimal force/pressure. In some embodiments, the optimal forces are between 0 g and 10,000 g.

The control module can block the actuation of the handheld tattoo device if the force/pressure applied is not in the between the lower and upper optimal force/pressure. When the operator is ready to perform a puncture, the operator can press the trigger element, as discussed in step 1314 of FIG. 17. If the contact force/pressure is in the optimal range, the diagnostic system can report nominal operation and the handheld tattoo device can confirm applying the parameter settings from step 1312. The handheld tattoo device can proceed immediately to step 1315. In step 1315, the handheld tattoo device can perform a set of punctures (e.g., a puncture train). The depth, size, positioning, and/or pattern of the punctures can be specified in step 1312. In step 1312, the actuator(s) of the handheld tattoo device can be powered to puncture the skin. A galvanic sensor and/or other sensors in the handheld tattoo device can start measuring and recording signals related to the application of the set of punctures, the data can be buffered in the control unit and, after the puncture train (e.g., set of punctures) is partially or entirely completed, and the data can be formatted and transferred to the control module. The data can be analyzed and/or interpreted in step 1316. In some embodiments, the data is analyzed in step 1317. In step 1328, if i<n, the process returns to step 1311. The steps 1311 to 1316 are then repeated until a set or all the puncturing has been completed.

Signal detection and/or interpretation can be used to analyze data and leads to the detection of the puncture events as described in connection with FIGS. 3A, 12A, and 12B, and the device setting for performing a desired dot (e.g., a circular dot, round dot, a dot with a desired size, color, color saturation, darkness, geometric characteristics, shape, etc.) at that location marker is computed by an algorithm described herein. The device settings can be stored. The operator can then repeat the operation from steps 1311 to 1317 for each dry marker until a predetermined number or all dry punctures have been performed.

Once performed, an optimal setting obtained in step 1317 for all the dry markers of a specific dot size can be interpolated in step 1318 for all the positions associated with wet dots of the same or similar configuration (e.g., size, shape, diameter, etc.). This is exemplified for dot number 16 (dot 1105 in FIG. 18B), for which the settings can be interpolated as a combination of the information collected from one or more of dry punctures 2, 3, and 12. In one embodiment, this interpolation can be performed on different wet dot diameters than the dot diameters of the dry punctures by applying a setting conversion from one type of needle to another type of needle used to obtain different dot diameters. Wet dots are tattoo dots where a detectable amount of ink has been applied to the subject. This can conclude the step 310 (FIG. 3A) associated with the manual embodiment of the tattoo process.

In step 320 (FIG. 3A) associated with the manual embodiment of the tattoo process, the tattooing process can be performed. In the case of the manual embodiment of the tattoo process, wet dots can be applied. The operator can proceed to identify the marker associated with a wet puncture in step 1321 of FIG. 17. These dots can be marked by a filled circle in the stencil illustration in FIGS. 18A-18C. The diameter of the filled circle can indicate the diameter of the needle used. In one embodiment, small diameter circles are applied using a needle with 3 or less tips in a tight circular configuration and large diameter are applied using a needle with 4 or more tips in a tight circular configuration. The position can either be identified through a number applied as part of the stencil and/or through a digital representation of the tattoo displayed on the computer or tablet that runs the control software's graphical user interface. Settings of the tattoo device are applied in step 1322 (FIG. 17) by reading the interpolated parameters obtained in step 1318 (FIG. 17) and sending a command from the control software to the computing unit of the tattoo handheld unit. Once the settings are applied in step 1322 (FIG. 17), the operator can position the contactor window or opening by centering the contactor with the marker in step 1323. In this step 1323, the operator also ensures that the needle (or needle assembly) is properly oriented perpendicular to the skin surface (e.g., a longitudinal axis or line of action of the needle assembly can be generally perpendicular to the surface of the skin) with or without using a level indicator. The operator can increase or decrease the pressure applied by contactor to the skin by applying manual force. One of the operator's objectives can be to apply an optimal level of force to the skin to ensure sufficient contact between the contactor and the skin. The amount of force employed is measured by the load cell (e.g., load cell 1008 of FIG. 16) and the value of the load can be digitally reported by the graphical interface of the control software. The optimal force allowed is between two force values, a lower bound optimal force and a higher, upper bound optimal force. These forces can be between 0 g and 10,000 g. The control software can prevent actuation of the handheld unit if the force applied is not within a target range (e.g., between the lower and upper optimal forces).

When the operator is ready to perform a puncture, the operator triggers the ink delivery system to inject ink in the needle well in step 1324 of FIG. 17. For the initial wet dot, the needle well will be filled with ink for the first time. For additional wet dots, a sufficient amount of ink can be present in the needle well and adding more ink may be performed if necessary. When ready, the operator can press the trigger button in step 1325. If the contact force is in the optimal zone, the diagnostic system can report operation information and the handheld unit can be configured based on the parameter settings from step 1322. The handheld unit then proceeds immediately to step 1326. In step 1326, the handheld unit performs a set of punctures at the depth and number settings specified in step 1322. In this step, the handheld actuator can be powered, which results in the needle (or needle assembly) puncturing the skin. Data associated with the puncture event can be collected. This collected data is analyzed and used to confirm appropriate application of the tattoo settings. The stored interpolation settings for subsequent dots may be adjusted if new settings are desired or needed to produce desired dots. In step 1338, if i<n, the process returns to step 1321. The steps 1321 to 1326 are then repeated until all the wet dots have been applied. This concludes step 320 (FIG. 3A) for the manual tattooing process embodiment.

In the manual embodiment of the tattoo process, step 308 of FIG. 3A can be omitted as the handheld unit is not attached to the customer. The tattoo area may be cleaned and dressed with a protection layer in dressing tattoo step 309 (FIG. 3A). Additionally, a variety of aftercare treatments may be provided. Finally, the surface of the tattooing device may be cleaned with a cleaning solution so as to be suitable for subsequent use. Any disposable components may then be removed and disposed of. In some embodiments, the handheld robotic units can be attached to the customer.

As used herein, the term "disposable" when applied to a system or component (or combination of components), such as a needle, a tool, or stencil, is a broad term and generally means, without limitation, that the system or component in question is used a finite number of times and is then discarded. Some disposable components are used only once and are then discarded. In other embodiments, the components and instruments are reusable and can be used any number of times. In some systems, all of the components can be disposable to prevent cross-contamination. In some other systems, components (e.g., all or some of the components) can be reusable.

Embodiments of the stencil deposition can be designed for manual application of the tattoo. One embodiment is displayed in FIGS. 18A-18C. The stencil can facilitate tattoo application by the manual operator and to provide a proxy reference of the final design to the client. In such embodiments, the stencil can contain alignment markings 1101, 1102 and 1103 (FIG. 18A) for proper operator alignment. Numbers and text 1104 to help the operator proceed in the correct order of dots. Filled circles 1102 denote the locations designated for "wet" punctures. Unfilled circles 1101 denote the locations for "dry" punctures to be administered. Dry punctures are administered without ink, not part of the final tattoo, but used for gathering information about the skin puncture properties prior to performing wet dots. One embodiment of the stencil uses various diameters for the filled and unfilled circles to indicate the correct needle type and arrangement for the tattoo dot size by varying the dot diameter. Any other markings may be present to facilitate the operator application of the tattoo and customer validation of design and placements. Stenciling procedures can include steps discussed in connection with FIGS. 5A-6B, 11A-11D, and 18A-18C.

Digital Files, Computing Systems, and Controllers

Figure 19:
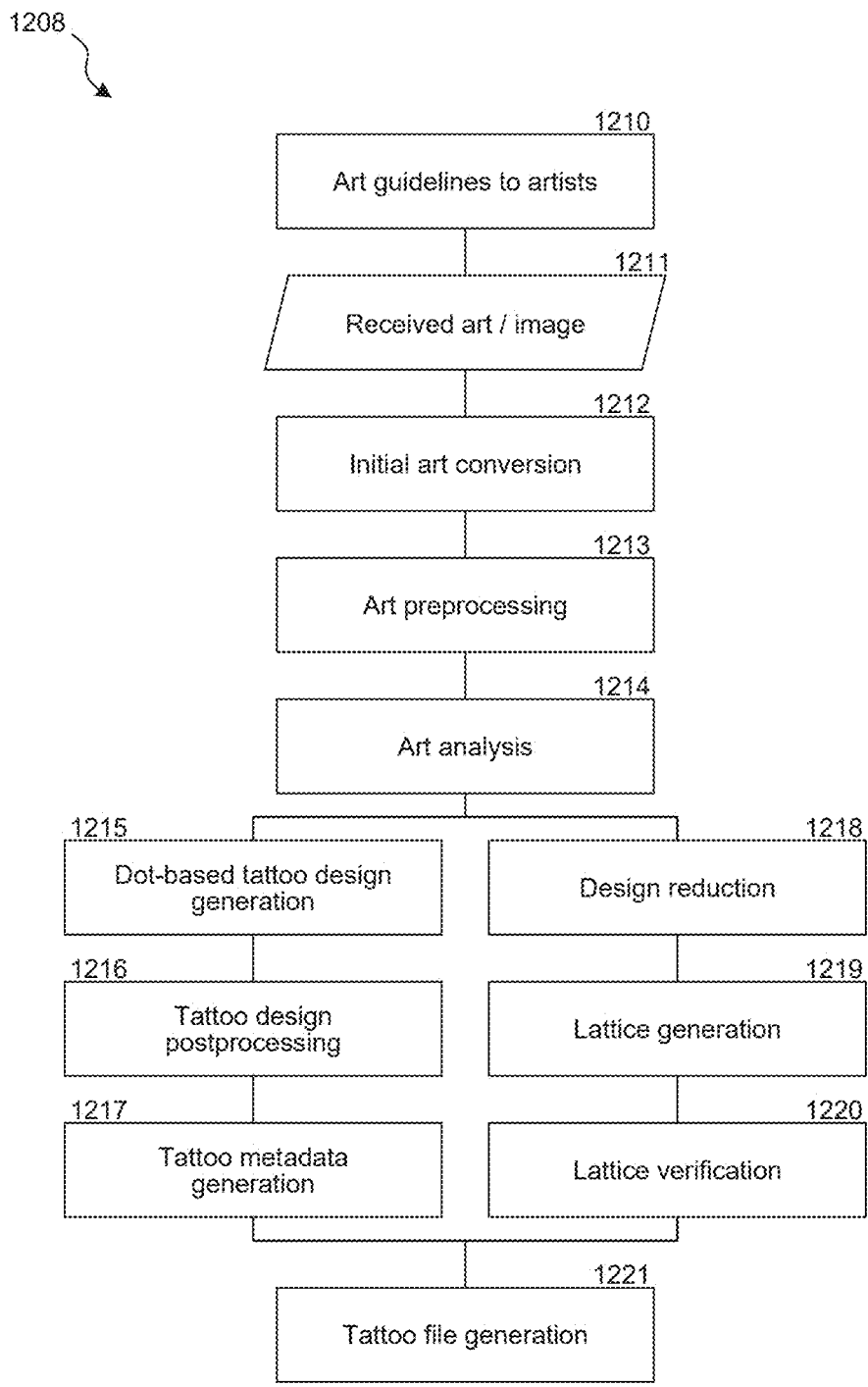
FIG. 19 is a block diagram of an embodiment of a digital tattoo file generation process optimized for automatic tattooing in accordance with an embodiment of the disclosure.

FIG. 19 is a flow chart of a method 1208 for generating tattoo digital files (or digital tattoos) that are optimized for automated tattooing and can be displayed as visual art or machine-read for the execution of the tattoo by the automated tattoo machine. These files are created by interpreting graphical artworks or images.

In step 1210, a set of optional guidelines and directions may be provided to the artist to facilitate the conversion of the artwork into a digital tattoo. In some implementations, this step may be omitted.

In step 1211, art is received either physically or by other means in digital media formats which may be vector-based, raster-based, or a combination of both. In some embodiments, the artwork is received via a wireless or wired connection. For example, the artwork can be received via a local area network or wide area network.

In step 1212, the artwork can be converted into a digital image with a standardized format. If artwork is received physically, it can be scanned at a desired resolution (e.g., a high resolution using a scanner, or other imaging device) suitable for being converted into a raster-based digital image. If artwork is received in digital media format, any vector-based components of the artwork may be rasterized at a certain high resolution. The technique for converting the artwork to a digital image can be selected based on the desired processing time, resolution, and/or conversion accuracy.

In step 1213, the digital image can be preprocessed. For example, the digital image can be preprocessed to adjust its brightness, contrast, light curves, dynamic range, color distribution, and/or enhance desired geometric features, such as edges. Separate preprocessing procedures may be applied to different parts of the image, and manual touch-ups could be performed to achieve desired aesthetic.

In step 1215, a dot-based tattoo design can be generated by, for example, using one or more conversion algorithms to convert the digital image into a collection of tattoo dots. This conversion may be performed in multiple stages, aimed to convert different aspects of the image, such as dots, lines and shades. The number of dots used to represent the tattoo design can be selected based on the resolution and capabilities of the tattoo apparatus.

In steps 1214 and 1215, different visual components of the artwork can be detected and analyzed, such as individual dots, lines, shaded areas and edges of shaded areas. The analysis may be performed in multiple stages, and parts of the image may be masked off at each stage to avoid duplicate detection of features. Isolated dots on the image whose size are similar to the tattoo dot or needle size may be identified as individual tattoo dots and assigned a representative color or shade. Lines and edges of shaded or solid areas may be detected as lines with a representative color, shade and thickness, each of which may be varied. Line tracing techniques may be used to identify continuous lines or edges, and to construct a series of tattoo dots with varying spacing and dot size to represent the line with varying contrast, thickness or shade. The rest of the image, such as areas of varying color or shade, or continuous areas of a solid color may be covered with a collection of tattoo dots using space-filling methods, where the spatial density and/or size of dots is varied to represent the variations of color or shade on the image. Space-filling may be performed based on an underlying ordered grid, probabilistic dot placement, halftoning or dithering techniques. Computational stippling methods, such as one utilizing weighted Voronoi cells, may be used to spatially rearrange the locations of tattoo dots based on the gradients of color or shade on the image. This operation may improve the visual representation of image gradients by the spatial distribution of tattoo dots. The resulting collection of tattoo dots constitutes a candidate tattoo design, and it is rendered on a screen in step 1216 for visual inspection by a human operator.

In step 1216, the tattoo design can be postprocessed. The candidate tattoo design may be compared with the original artwork on the screen to facilitate the inspection. The tattoo design may also be digitally overlaid on pictures of body parts with different skin colors, to assess its aesthetic outcome. At this step, the operator may add, remove, and/or relocate dots manually to improve the aesthetic outcome of the tattoo design. Based on the outcome, the operator may also choose to modify the image preprocessing settings of step 1213, and repeat steps 1213-1216 to improve the design. As a result, the output of step 1216 can be the final tattoo design, which visually represents the original artwork received in step 1211.

In step 1217, metadata may be assigned to the tattoo dots to modify their puncture settings, such as the needle extension and number of punctures or ink delivery flowrate in the needle reservoir, around their nominal values, in order to achieve a particular aesthetic aspect. For example, to better represent a light-shaded area of the artwork, the number of punctures or needle extension may be decreased for the collection of tattoo dots in that area. Or, these settings could be increased for very dark or color-saturated areas, to increase the deposited ink per puncture and consequently reduce the time needed to tattoo such areas.

In step 1218, a simplified design outline is generated from the art, which may be placed on the stencil to allow the customer to review the design's positioning on the skin before starting the tattooing operation. A subset of the features detected in step 1214, such as the most distinct lines and edges, may be used to create the design outline. Positioning of the design may also be reviewed using augmented reality, wherein the final tattoo design (step 1216) is overlaid on a camera image or live video, based on the positioning and deformation of the applied stencil on the image detected by machine vision. If augmented reality is used, including the design outline on the stencil may not be necessary.

One or more of the steps 1218-1220 can be performed in parallel with steps 1215-1217. For example, the lattice generation 1219 can be performed concurrently with the step 1216. Each step can incorporate data from other steps. For example, the tattoo metadata generation at step 1217 can be based on the design reduction at step 1218. The order and timing of the steps can be selected based on the tattoo file to be generated.

In step 1219, a spatial arrangement of fiducial markers (lattice) is generated and placed on the stencil. The lattice of fiducial markers is employed by machine vision to track the deformation of the skin and detect its spatial coordinates (see FIGS. 5A-6B). This lattice is constituted of fiducial markers of a certain diameter (e.g., 50-500 um) and spacing (e.g., 100-1000 um). This lattice may be spatially arranged as a square grid, as shown in FIG. 5A, although other arrangements are possible, such as a hexagonal grid, or unordered spatial distributions. Information-encoding variations (pattern) of these fiducial markers such as location, size, omission, shape or color, (see FIG. 5A for a spatial variation encoding example) may be used to create a pattern which allows identification of the local spatial coordinates by the machine vision. The pattern may be probabilistically (randomly) or deterministically (rule-based) generated.

In step 1220 of FIG. 19, the local-uniqueness and robustness of the pattern is checked. The requirement of local-uniqueness means: different parts of the pattern, as exposed through the contactor window, can be distinct for every potential position of the contactor. The robustness of the pattern means that the local-uniqueness persists when parts of the pattern are concealed or when random noise is introduced to the pattern (these conditions may occur during tattooing operation or when the stencil is first applied to the skin). Deterministic or probabilistic modifications may be made to the pattern, manually or automatically, to improve the likelihood of either requirement being satisfied. Steps 1219-1220 can be repeated until a locally-unique and robust pattern is generated. In some embodiments, step 1219 and 1220 can be performed in advance and the same lattice may be reused for various stencils for tattoos of the same size.

In Step 1221, the digital tattoo data or file can be generated, which contains at least (i) the coordinates of the dots in the tattoo design (step 1216), and (ii) the coordinates of the fiducial markers (step 1219,1220), (iii) a digital image of the stencil which (a) at least contains the fiducial markers and (b) may also contain the design outline from step 1218. The tattoo file may also contain: (iii) a digital image of the original artwork (step 1212), (iv) artwork ownership and licensing information, (v) the settings used in image pre-processing (step 1213), (vi) the metadata for tattoo dots (step 1217), (vii) simplified outline of the art (step 1218) in vector form, (viii) a pre-computed data table to facilitate finding the tattoo dots in a particular region. Each component in the digital tattoo file may be stored using the appropriate data structures for that component, such as, a data table for the dot coordinates, a vector-based graphics format for the stencil, a raster-based graphics format for the artwork image, etc. As described in FIG. 3C the information in the tattoo file, such as the components (i, ii, vi, vii), and the machine vision analysis (FIG. 5A-6B) are used in combination to create the machine instructions for each tattoo dot, controlling (i) spatial positioning of the needle on skin, (ii) needle extension, (iii) number of punctures, (iv) amount of ink injected on the needle.

The accuracy, repeatability, capability, and/or resolution of the robotic application of the tattoo, as compared to traditional manual tattooing, may be characterized, for example by one or more of the following. In one embodiment, the tattoo position (e.g., overall tattoo position, section of tattoo, etc.) relative to the absolute position on the skin may be, e.g., about ±0.5 mm, ±1 mm, ±2 mm, ±3 mm, or ±4 mm in a skin plane as compared to a stencil positioning. In other embodiments, the overall tattoo position relative to the absolute position on the skin may be ≤±5 mm, including but not limited to, e.g., ±2 mm, ±3 mm, ±4 mm, and all non-integer values, e.g., ±0.6 mm, ±0.7 mm, ±1.2 mm, ±1.3 mm, etc. The relative tattoo position can be selected based on the size, intricacy, resolution, or other features of the stencil, tattoo, or the like.

The optical detection (e.g., machine vision accuracy) may be ~4 um per pixel. In other embodiments, the optical detection or machine vision accuracy may be ≥~4 um per pixel, or ≤~4 um per pixel. In one embodiment, the extracted position error of a fiducial marker may be ≤±50 um in the skin plane, including but not limited to for example, ±40 um, ±35 um, ±30 um, ±20 um, and all other non-integer values, e.g., ±25.7 um, ±25.6 um, ±25.5 um, etc. The detection capabilities of the optical detection can be selected based on the characteristics of the tattoo and may be better than detection via the naked eye.

The accuracy of the needle in the z plane may be ≤±100 um from the prescribed needle elongation setting due to skin deformation, including but not limited to for example, ±90 um, ±85 um, ±80 um, ±70 um, and all other non-integer values e.g., ±65.7 um, ±65.6 um, ±65.5 um, etc. In one embodiment, the position accuracy of each tattoo dot compared to its neighbors may be ≤±50 um, including but not limited to for example, ±40 um, ±35 um, ±30 um, ±20 um, and all other non-integer values for example, ±25.7 um, ±25.6 um, ±25.5 um, etc.

The expected resolution of tattooing in dots per inch (dpi) may be 72 to 2540 dpi, but is variable based on design dot density. For example, the expected resolution of tattooing may be, but is not limited to being, between 72 to 2540 dpi, or larger than 72 to 2540 dpi, e.g., between 50-3000 dpi, etc. In one embodiment, the expected dot size may be, but is not limited to, between 100 um to 5000 um based on the needle size. In one embodiment, the expected tattooing speed may be ≤0.15 s per dot, for example including but not limited to 0.1 s per dot, 0.8 s per dot, 0.5 s per dot, etc. In one embodiment, the expected time of completion of a 3.5×2 in, 15000 dots tattoo, including dry dots may be for example ≤40 min.

Figure 20:
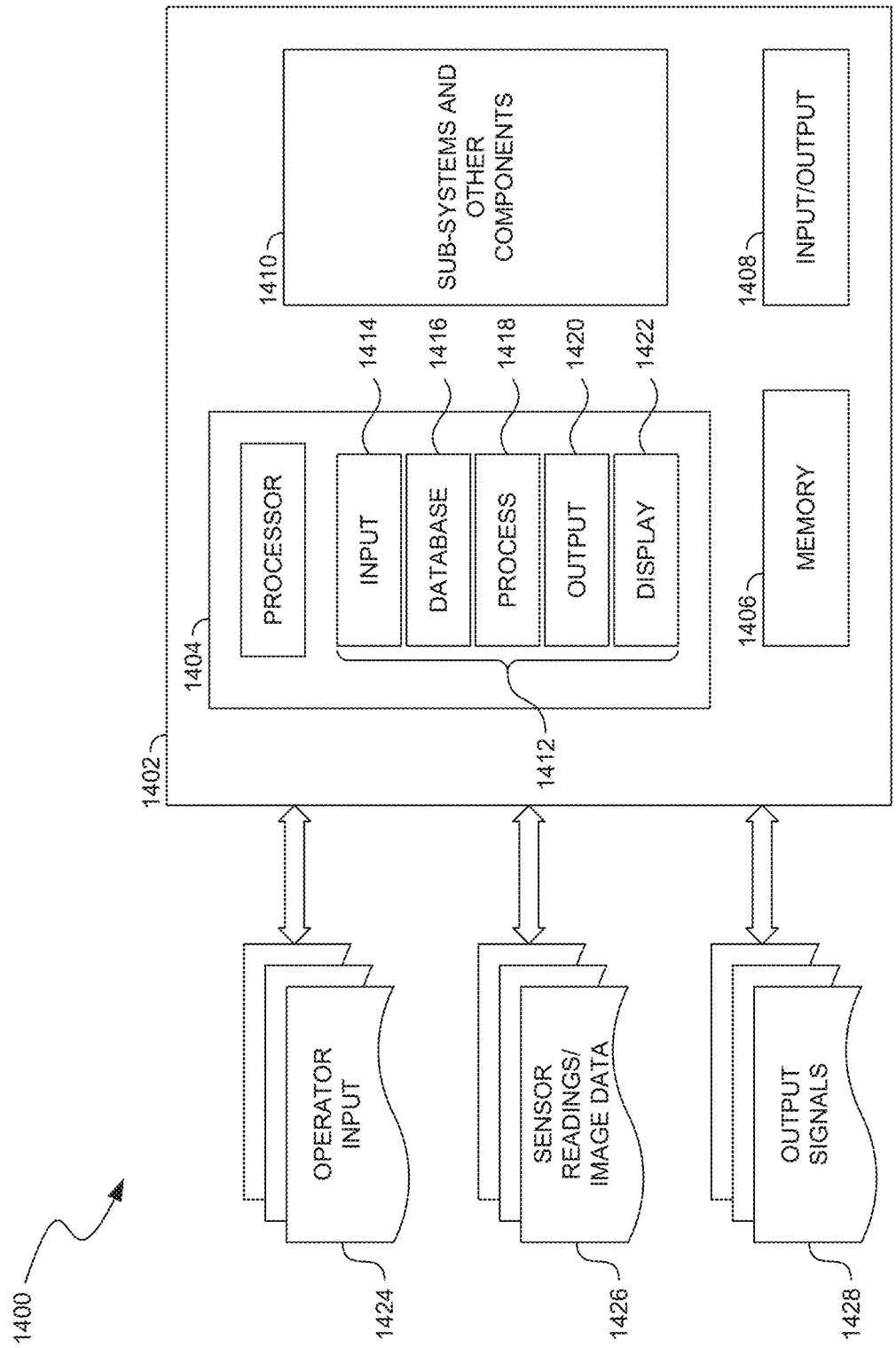
FIG. 20 is a schematic block diagram illustrating subcomponents of a controller in accordance with an embodiment of the disclosure.

FIG. 20 is a schematic block diagram illustrating subcomponents of a controller 1400 in accordance with an embodiment of the disclosure. The controller can be part of a control unit (e.g., controllers 108 or 109 of FIG. 1B) and/or can be incorporated into other tattoo device or components disclosed herein. The controller 1400 can include a computing device 1402 having one or more of each of processors 1404, memory 1406, input/output devices 1408, and/or subsystems and other components 1410. The computing device 1402 can perform any of a wide variety of computing processing, storage, sensing, imaging, and/or other functions. Components of the computing device 1402 may be housed in a single unit or distributed over multiple, interconnected units (e.g., though a communications network).

The components of the computing device 1402 can accordingly include local and/or remote memory storage devices and any of a wide variety of computer-readable media.

As illustrated in FIG. 20, the processor 1404 can include a plurality of functional modules 1412, such as software modules, for execution by the processor 1404. The various implementations of source code (i.e., in a conventional programming language) can be stored on a computer-readable storage medium or can be embodied on a transmission medium in a carrier wave. The modules 1412 of the processor can include an input module 1414, a database module 1416, a process module 1418, an output module 1420, and, optionally, a display module 1422.

In operation, the input module 1414 accepts an operator input 1424 via the one or more input devices, and communicates the accepted information or selections to other components for further processing. The operator input 1424 can include, for example, stencil information, tattoo design information, subject preferences (e.g., preferences for tattoo, length of session, tattoo resolution, tattoo style, etc.), or the like. The information can be displayed via the display 1422. The display 1422 can be a touchscreen or other output device capable of displaying and/or receiving input.

The database module 1416 organizes records, including internal and external variables, settings (e.g., machine settings, puncture settings, etc.), puncture parameters, scores (e.g., dot scores), subject data sets, experimental data, tattoo graphic data, stenciling data, artwork, tattoo designs, and operating records and other operator activities, and facilitates storing and retrieving of these records to and from a data storage device (e.g., memory 1406, an external database, etc.). Any type of database organization can be utilized, including a flat file system, hierarchical database, relational database, distributed database, etc.

In the illustrated example, the process module 1418 can generate control variables based on sensor readings, image data, and/or color saturation of the tattoo from sensors, machine vision systems, and/or other data sources. The sensors can include, without limitations, impedance sensors, accelerometers, gyroscopes, contact sensors, pressure sensors, sensors configured to output signals associated with needle depth or position, galvanic sensors, or other suitable sensors. The sensor readings and/or image data 1426 can include, without limitation, one or more images, scan, scan data, optical data, etc.

The output module 1420 can communicate operator input to external computing devices and control variables. The output module 1420 can include one or more communication elements, transmitters, receivers, antennas, ports (e.g., USB ports, LAN port(s), optical port(s), etc.), interfaces, etc. Example interfaces include USB port interfaces, a wired Local Area Network interface (e.g., Ethernet local area network (LAN) interface), a wireless network interface via a WiFi LAN access in accordance with, for example, I.E.E.E. 802.11b/g/n wireless or wireless network communications standard. The display module 1422 can be configured to convert and transmit processing parameters, sensor readings 1426, output signals 1428, via one or more connected display devices, such as a display screen, touchscreen, etc. the output signals 1428 can be sent to one or more components to control or command the components.

In various embodiments, the processor 1404 can be a standard central processing unit or a secure processor. Secure processors can be special-purpose processors (e.g., reduced instruction set processor) that can withstand sophisticated attacks that attempt to extract data or programming logic. The secure processors may not have debugging pins that enable an external debugger to monitor the secure processor's execution or registers. In other embodiments, the system may employ a secure field programmable gate array, a smartcard, or other secure devices.

The memory 1406 can be standard memory, secure memory, or a combination of both memory types. By employing a secure processor and/or secure memory, the system can ensure that data and instructions are both highly secure and sensitive operations such as decryption are shielded from observation. In various embodiments, the memory 1406 can be flash memory, secure serial EEPROM, secure field programmable gate array, or secure application-specific integrated circuit. The memory 1406 can store instructions performing any of the methods disclosed herein, including, without limitation processing images, obtain information about our work and or tattoo designs, acquiring information, analyzing target sites, dot scoring, data collection, determining puncture settings, digital stencil reference data, or the like. The memory 1406 can include non-transitory computer-readable medium, memory component, etc. carrying instructions, which when executed, causes actions. The actions can include steps disclosed herein.

The steps of the methods disclosed herein can employ one or more AI techniques. AI techniques can be used to develop computing systems capable of simulating aspects of human intelligence, e.g., learning, reasoning, planning, problem solving, decision making, etc. AI techniques can include, but are not limited to, case-based reasoning, rule-based systems, artificial neural networks, decision trees, support vector machines, regression analysis, Bayesian networks (e.g., naïve Bayes classifiers), genetic algorithms, cellular automata, fuzzy logic systems, multi-agent systems, swarm intelligence, data mining, machine learning (e.g., supervised learning, unsupervised learning, reinforcement learning), and hybrid systems.

In some embodiments, image processing, detection (feature detection, fiduciary marker detection, reference feature detection), skin puncture property acquisition and analysis, skin color identification, position analysis, dot scoring, art conversion, artwork preprocessing, artwork analysis, tattoo design generation, lattice generation, lattice verification, and other steps disclosed herein can use one or more trained machine learning models. Various types of machine learning models, algorithms, and techniques are suitable for use with the present technology. In some embodiments, the machine learning model is initially trained on a training data set, which is a set of examples used to fit the parameters (e.g., weights of connections between "neurons" in artificial neural networks) of the model. For example, the training data set can include any of the reference data stored in database 1416 (FIG. 20), such as a plurality of reference puncture data sets or a selected subset thereof.

In some embodiments, the machine learning model (e.g., a neural network or a naïve Bayes classifier) may be trained on the training data set using a supervised learning method (e.g., gradient descent or stochastic gradient descent). The training dataset can include pairs of generated "input vectors" with the associated corresponding "answer vector" (commonly denoted as the target). The current model is run with the training data set and produces a result, which is then compared with the target, for each input vector in the training data set. Based on the result of the comparison and the specific learning algorithm being used, the parameters of the model are adjusted. The model fitting can include both variable selection and parameter estimation. The fitted model can be used to predict the responses for the observations in a second data set called the validation data set.

The validation data set can provide an unbiased evaluation of a model fit on the training data set while tuning the model parameters. Validation data sets can be used for regularization by early stopping, e.g., by stopping training when the error on the validation data set increases, as this may be a sign of overfitting to the training data set. In some embodiments, the error of the validation data set error can fluctuate during training, such that ad-hoc rules may be used to decide when overfitting has truly begun. Finally, a test data set can be used to provide an unbiased evaluation of a final model fit on the training data set.

To generate a tattoo plan or protocol, a data set can be input into the trained machine learning model(s). Additional data, such as the selected subset of reference patient data sets and/or similar patient data sets, and/or treatment data from the selected subset, can also be input into the trained machine learning model(s). The trained machine learning model(s) can then calculate whether various candidate treatment procedures and/or medical device designs are likely to produce a favorable outcome for the patient. Based on these calculations, the trained machine learning model(s) can select at least one treatment plan for the patient. In embodiments where multiple trained machine learning models are used, the models can be run sequentially or concurrently to compare outcomes and can be periodically updated using training data sets. The module 1420 can use one or more of the machine learning models based the model's predicted accuracy score.

The controller 1400 can include any processor, Programmable Logic Controller, Distributed Control System, secure processor, and the like. A secure processor can be implemented as an integrated circuit with access-controlled physical interfaces; tamper resistant containment; means of detecting and responding to physical tampering; secure storage; and shielded execution of computer-executable instructions. Some secure processors also provide cryptographic accelerator circuitry.

The input/output device 1408 can include, without limitation, a touchscreen, a keyboard, a mouse, a stylus, a push button, a switch, a potentiometer, a scanner, an audio component such as a microphone, or any other device suitable for accepting user input and can also include one or more video monitors, a medium reader, an audio device such as a speaker, any combination thereof, and any other device or devices suitable for providing user feedback. For example, if an applicator moves an undesirable amount during a tattoo session, the input/output device 1408 can alert the subject and/or operator via an audible alarm. The input/output device 1408 can be a touch screen that functions as both an input device and an output device.

The controller 1400 can detect events, such as adverse events. The adverse events can include interruptions during the tattoo execution, such as (1) temporarily pausing and resuming the tattooing process, 2) stopping and later reinitiating the tattooing process, and 3) stopping the tattooing process due to an emergency or critical event and later reinitiating the tattooing process. The operator can be notified via the input/output devices 1408 of a detected event. Sensor readings 1426 can be analyzed to automatically detect events based on sensor output. The tattooing system 90 of FIG. 1B, shuttle 104 of FIG. 2, tattooing apparatus 400 of FIG. 8, tattoo device 900 of FIG. 14, and tattooing system 908 of FIG. 15 can detect events and may perform recovery processes based on the detected event, as discussed below.

Example Tattooing Environment and Systems

Figure 21:
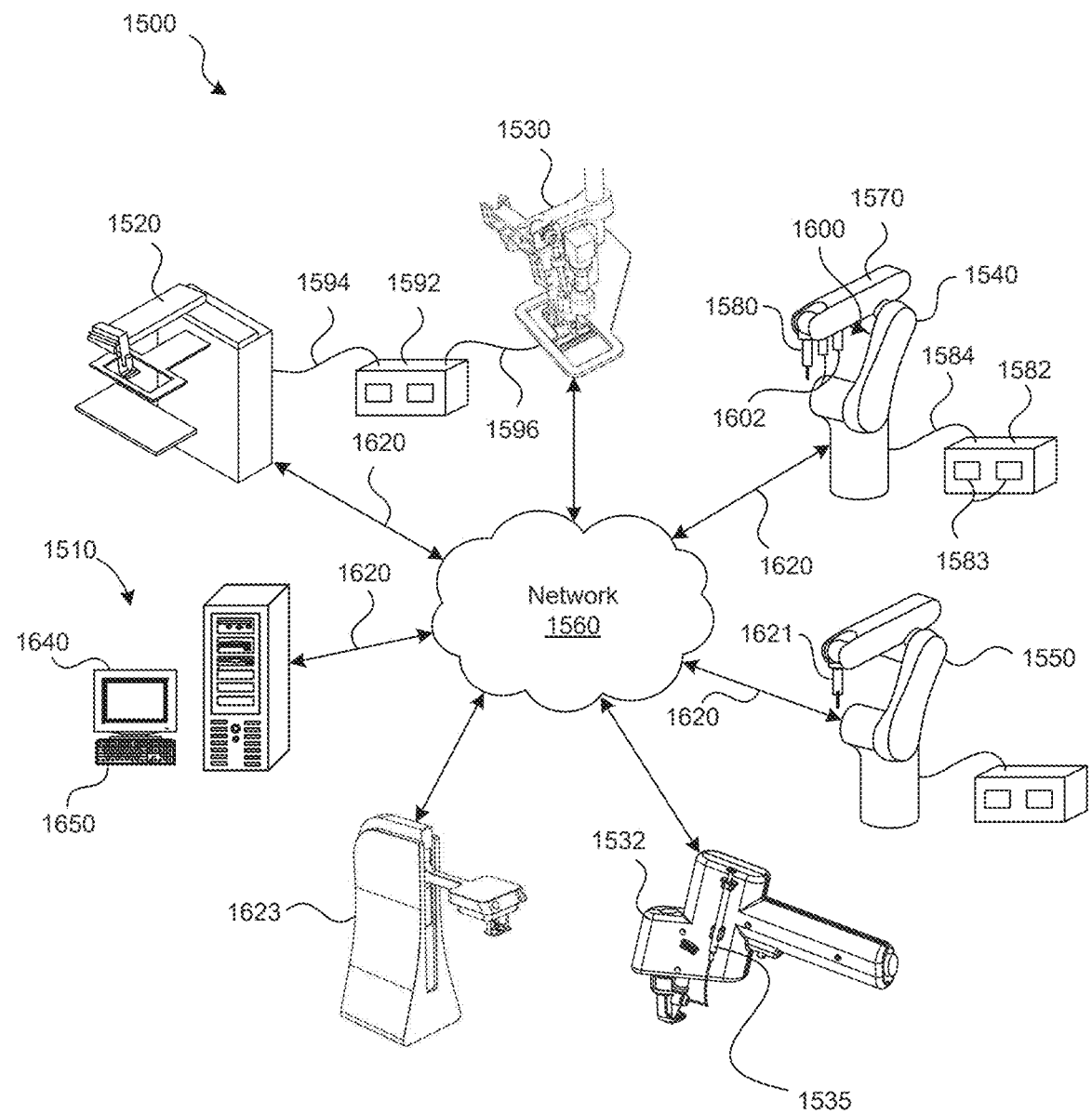
FIG. 21 is a network diagram of a tattooing environment and system in accordance with an embodiment of the disclosure.

FIG. 21 is a network diagram of a tattooing environment and system 1500 ("system 1500") in accordance with an embodiment of the disclosure. The description of the tattoo system 60 of FIG. 1A applies equally to the system 1500 unless indicated otherwise. The system 1500 includes a tattoo assistance system 1510 that can control tattoo apparatuses with different configurations and functionality to allow operator(s) to apply different types of tattoos to multiple clients. A network 1560 can provide communication between the various components of the system 1500 via one or more wireless connections, wired connections, optical connections, or the like. In one embodiment, some or all of the tattoo apparatuses are configured to be controlled by the tattoo assistance system 1510 and can be located at a single tattoo studio or separate tattoo studios.

FIG. 21 illustrates the system 1500 including a tattooing apparatus 1520 with features and functionality described in connection with FIGS. 1A, 1B, and 2, a tattoo apparatus 1530 with features and functionality described in connection with FIG. 8, a handheld tattoo apparatus 1532 with features and functionality described in connection with FIG. 14-16, and tattoo apparatuses 1540, 1550. The number, configuration, and functionality of the tattoo apparatuses and components can be selected based on the number of subjects to be tattooed at the same time, characteristics of the tattoos to be applied, desired length of tattoo session, preferences of the operator or subject, or the like. In some embodiments, different needle heads and/or needles can be utilized by the tattoo apparatuses 1520, 1530, 1532, 1540, 1550, 1623. Different types of end effectors, needle assemblies, tattoo needles, fluidic systems, controllers, or the like can be selected based on desired tattoo capabilities.

An ink delivery system can be used to provide ink to a single tattoo apparatus or to multiple tattoo apparatuses. Referring again to FIG. 21, the tattoo apparatus 1540 includes a robotic tattoo apparatus or multi-axis robotic arm 1570 (e.g., 3-axis robotic arm, 4-axis robotic arm, 5-axis robotic arm, 6-axis robotic arm, etc.), an end effector in the form of a needle head assembly 1580, and an ink delivery system 1582. The ink delivery system 1582 includes containers 1583 (e.g., ink bottles, ink cartridges, etc.), a fluidic system 1584 (including hoses, valves, pumps, etc.), and other fluidic components for fluidically coupling the ink delivery system 1582 and the needle head assembly 1580. The tattoo apparatus 1540 can include a machine vision device or system 1600 ("machine vision system 1600") with multiple image capture devices 1602 (e.g., spaced apart digital cameras) for imaging-based automatic inspection and analysis. In other embodiments, the devices 1602 are LIDAR sensors. The needle head assembly 1580 can also include one or more sensors for providing data to the tattoo assistance system 1510 via communication channel 1620.

The tattoo apparatus 1550 can include an end effector in the form of a needle head assembly 1621 with an integrated machine vision system, sensor(s) (e.g., contact sensors, optical sensors, mechanical sensors, chemical sensors, light detectors, galvanic sensors, pressure sensors, etc.), or other features disclosed herein. The integrated machine vision system can be protected by the housing of the needle head assembly 1621. The tattoo assistance system 1510 can concurrently support and provide functionality to different machine vision systems for each tattooing apparatus. This allows the tattoo studio to utilize various types of machine vision systems and apparatuses. The vision and/or sensor data can be used to control one or more tattoo steps.

An ink delivery system 1592 can be in fluid communication with the tattoo apparatuses 1520, 1530 and can include one or more pumps, lines, fittings, and other features (e.g., fluidic systems 1594, 1596) for independently delivering ink to the tattoo apparatuses 1520, 1530. In some embodiments, a single ink delivery system can deliver ink to all of robotic tattooing machines.

The handheld tattoo apparatus 1532 having ink delivery system 1535 including a fluid container or a cartridge (illustrated as a syringe compatible with a housing of the tattoo apparatus 1532), fluid line, and other fluidic components. Ink cartridges are discussed in connection with FIGS. 14 and 16. The handheld tattoo apparatus 1532 can be used to manually apply tattoos, touchup tattoos or dots applied robotically, and/or apply a portion of the tattoo while another portion of the tattoo is applied robotically. In some implementations, a single tattoo design can be applied by sequentially applying portions that tattoo using robotic tattoo apparatus (e.g., robotic tattoo apparatus 1520, 1530, 1570, or 1550) while the portions of the tattoo are applied concurrently or sequentially by the handheld apparatus 1532. The handheld tattoo apparatus 1532 (or tattoo apparatuses of FIG. 21) can include one or more output modules to communicate with and provide data to the tattooing environment and system 1510. The tattooing environment and system 1510 can adaptively control the tattoo apparatus applying the tattoo based on the received data from another tattoo apparatus. This allows for coordination between tattoo apparatus to produce a desired tattoo. In non-tattoo implementations, the robotic tattoo apparatus 1520, 1530, 1570, 1623, or 1550 and handheld apparatus 1532 can be used to perform aesthetic treatments.

The tattooing apparatus 1532 can include ink container 1535 such as those disclosed herein. For example, the ink container 1535 may include an ink delivery system described in connection with FIG. 16.

With continued reference to FIG. 21, the tattoo assistance system 1510 can include one or more controllers, displays 1640, input devices 1650, etc. and can include features or functionality disclosed herein. In some embodiments, the tattooing environment and system 1500 has multiple tattoo assistance systems 1510 each incorporated into the tattooing apparatuses. The tattoo assistance system 1510 and controllers disclosed herein can be programmed to identify events, including low ink supplies, machine vision alerts, temporary pauses, stop events, emergency or critical events, adverse events, or the like. The tattoo assistance system 1510 and controllers disclosed herein and can be programmed to monitor and provide information such as ink levels, tattoo apparatus data (e.g., status, maintenance history, operational history, settings, etc.), client data (e.g., preferences, profiles, payment, order histories, etc.), tattoo design data, or the like.

In operation, the tattoo assistance system 1510 can generate a tattoo protocol to apply a tattoo and can communicate with the tattoo apparatus to be used. The tattoo assistance system 1510 can store one or more control maps, command programs, instruction sets, and other data for controlling the tattoo apparatus to be used. For example, the control map for the tattoo apparatus 1540 can include angles for controlling each of the joints of the robotic arm. In 6-axis robotic arm embodiments, the control map can include angles for each of the 6 joints to position the needle device 1580. Additionally or alternatively, the control map can include target pose data for positioning an end effector a desired location. For example, the control map can include translation data, rotation data, or other data with reference to one or more reference frames. Based on a target location of the end effector to apply a dot, the tattoo assistance system 1510 can determine the translation and rotation data and commands for moving the end effector to the target location.

The tattoo assistance system 1510 can implement one or more programs for enforcement regarding authorization, authentication, and/or configuration of the tattoo apparatuses. In some embodiments, the technology disclosed herein can be incorporated into a commercially available robotic system. The tattoo assistance system 1510 can communicate with the robotic system and obtain control data for controlling the robotic system. The control data can include, without limitation, number of degrees of freedom, geometric parameters of components of the robotic apparatus, force settings, range of motion data, pose data, tolerance data, or the like. The tattoo assistance system 1510 can generate one or more machine settings (e.g., settings for selected poses), control maps, command programs, instruction sets, kinematic model data, and other data (e.g., position matrices, Jacobian matrices, transformation matrixes, joint vectors, rotational vectors, translational vectors, etc.) based on the received control data.

In non-tattoo setting, the robotic tattoo apparatus 1520, 1530, 1570, or 1550 and handheld apparatus 1532 can a apply botulinum toxin, anti-wrinkle agents, denervating agents, anti-acne agents, collagen, medicants, or the like. The system can optically analyze a site and identify wrinkles (using a trained computer vision system similar to that described above). Targeted wrinkles located along the subject face (e.g., along the forehead, surrounding the eyes, etc.) or any other location. The apparatus can determine one or more puncture sites based on characteristics (e.g., size, depth, location, etc.) of the wrinkles. The apparatus can inject one or more anti-wrinkle agents at puncture sites to reduce or limit the appearance of the targeted wrinkles. The system can perform both medical and aesthetic procedures. In another implementations, each robotic tattoo apparatus 1520, 1530, 1570, or 1550 and handheld apparatus 1532 can apply ink, dyes, or other substances to articles, such as purses, belts, and other articles of manufacture disclosed herein.

Tattooing Processes and Events

A temporary pause may be initiated during the tattoo process either by the operator, the client or the machine itself. In case of a client or operator interruption, a command or tactile switch may be available. In the case of a machine triggered interruption, a warning message may be displayed (e.g., via the input/output 1408 or display 1422 of FIG. 20) to inform the operator that a pause was triggered as well as an error or warning message. In normal operation triggering, the aforementioned temporary pause may cause the tattoo machine to pause the tattooing process. Setting granularity can include, but is not limited to, pausing between dots or between the executions of all the dots within a tattoo window. When the tattoo process is ready to resume the tattoo operator or client may resume the tattooing process without a requirement for recalibration or reinitiating of the tattoo machine. The operator may instead decide to trigger a stop if the tattoo process cannot be resumed or at the request of the client.

A stop of the tattoo process may be triggered by the operator, using either a switch or a command line. The tattoo progress information is dumped from the core to a restart file to assist with the eventual resuming of the tattooing process, and the actuators are put in a safe position which would allow the client to disengage from the machine safely. In the case, alignment may be disrupted and a recalibration of the tattoo machine may be required. To resume tattooing after a stop, the client can reengage with the machine and the tattoo area can be centered in the tattoo frame. Recalibration is achieved by initially performing a scan (e.g., a partial or comprehensive scan) of the tattoo area before moving in the vicinity of the last completed dot area and recommencing the tattooing process. If the tattoo stencil is not sufficiently preserved for the performance of machine vision, a new stencil may be applied and machine vision can assess the location of the next tattoo dot by scanning the completed portion of the tattoo. Because it may be difficult for an operator to exactly align a stencil with a partially completed tattoo, the new applied stencil lattice is free floating. This means that the position of the reference tattoo design is not initially fixed within the lattice. The machine vision can be used to scan the tattoo area completely, in particular the already completed area of the tattoo. This allows using a digital image correlation or other image analysis method to identify the exact position of the partially completed tattoo in the newly applied lattice. The position of the reference design within the digital reference lattice is then calculated from this digital image correlation and the tattoo process can be resumed where the partial tattoo was initially stopped. The same or similar strategy may be used when the expected tattoo is larger than the tattoo frame, in which case the stop function is triggered to position the client's skin such that the non-tattooed part of the tattoo is now centered in the tattoo frame while still some of the completed partial tattoo is also visible to provide sufficient machine vision information for position referencing. This stop and shift strategy is repeated until the tattoo is fully completed.

In the event of an emergency or critical event (as determined by the client and/or the tattoo operator), a command or tactile emergency switch may be available for that purpose. In normal operation, triggering the emergency switch will cut power to the actuators (directly and indirectly) and dumps the tattoo progress information from the core to a restart file to assist with the eventual resuming of the tattooing process. The passive safety of the actuator may allow the client to remove themselves from the tattoo machine when the actuator is unpowered. The resume function of the tattoo in case of an emergency stop is similar to the one for a stop.

The restart data and/or files for the emergency stop and standard stop may be transferred to the cloud or to a detachable storage media and may be used in another machine altogether. This may allow completion on another machine, for example, in case of critical failure of the machine or if the client wishes to complete their tattoo at another location/store/shop. The restart data and/or file may contain the original tattoo file, the ID of the machine that performed the work, diagnostics of the machine at the time of tattoo, ID of tattooed or tested dot in the design and ID of remaining dots, the dot parameter table for the tattoo, the raw data files collected by the sensors and machine vision systems and all other data generated in the original session. Other information in the restart file may include identifying the tattoo session and client information as well as other information input by the operator.

The tattoo systems may also encompass recovery methods in the case of machine malfunction. Based on the gravity of the machine malfunction, a warning or a pause or a stop or an emergency stop may be initiated by the operator, automatically by the machine or by the client.

External malfunction may include loss of reliable power, such as during a power outage. One embodiment of the invention includes an uninterruptible power supply (UPS) which allows providing power in case of outage, at least long enough to complete the ongoing tattoo. In case the tattoo is not finished within the predicted battery life of the UPS, the operator or machine itself may trigger the stop function of the equipment.

The automated tattoo machine includes automated and manual diagnostic function that evaluates if the device is operating nominally to provide, for example, diagnostic function for critical systems. This is not construed as exhaustive and it shall be assumed that each subsystem has its own operational diagnostic function to verify nominal operation.

One potential source of malfunction is a disposable malfunction in particular a needle malfunction, an electrode malfunction or an ink delivery malfunction.

Needle malfunction may be identified by a change of the galvanic response of the needle when in contact with the skin, a change in the perceived dot quality by the machine vision system, by the operator or the client observation or response or by ink delivery to the skin failure as observed by the machine vision. In case of a needle malfunction, the machine may trigger an error message and pause the machine and/or the operator may trigger a pause. The operator may decide to trigger a stop if a replacement of the needle is warranted. The client is allowed to disengage from the machine while the operator diagnose and address the needle malfunction by issuing a needle replacement. The tattoo process may resume as specified by the stopping process. If the needle cartridge was replaced, dry dots may need to be resumed from the start in order to account from the variability of needle sharpness and length which may affect puncture settings. Note that if dry dots are done a second time, their position with respect to the tattoo may be shifted slightly in order to avoid puncturing the skin at the location of previous punctures as this may shift the measurements.

Electrode malfunctions are identified by the addition of a test electrode or internal circuitry which purpose is to verify resistance of each electrode connection. In case of electrode failure, the process of the tattoo may be paused to replace the electrodes. The or internal circuitry electrode may also be replaced. Electrode contact resistance may be tested at the beginning and throughout the tattoo process to verify operation. A stop may or may not be triggered by the operator depending on whether or not dry punctures need to be reevaluated.

Ink delivery malfunction may be detected when the ink delivery is too close to the capacity of the reservoir, if no ink is observed to exit the needle tip or if the dot on the skin seems to be executed with an inappropriate amount of ink. A pause or stop may be triggered to refill the reservoir, exchange the ink delivery line or replace the needle cartridge. In case of no disruption to the tattoo process, a pause may be sufficient. In case the needle cartridge is replaced, the process specific to needle replacement may be executed.

Detected actuation failure may trigger a pause (for transient failure such as motor overheating), stop, or an emergency stop (for a power or mechanical failure) in order to protect the client. The operator may decide to resume the process at a later time and trigger a maintenance flag for the machine.

In general consideration, any diagnostic error from the machine may trigger a pause, a stop or an emergency stop, which may be addressed by the operator during the tattoo session or by a subsequent maintenance. Corrective action (positive or negative) may be taken in response to any errors, malfunctions, failures, or other adverse events such as, but not limited to, those described throughout this application.

The robotic systems can use a dot database. The number of punctures for a specific ink dot can be referred to in the dot database. This is the number of times the needle will touch and puncture the skin at the same location for the purpose of transferring ink. This number of punctures affects the final size and color intensity of the ink dot. The tattoo device can pilot the number of punctures performed at a certain position to achieve various tattoo dot diameter and for varying the color intensity to achieve various area coverage in the design and for color tone and color gradient with the same ink. The number of punctures can be varied from 1 to 100 punctures at the same location which the system algorithm attributes to different tone, gradient and dot size. Puncture number at a location to vary gradient, tone and dot size. The robotic system can include an ink quality monitor configured to monitor the ink quality based on, for example, ink viscosity, optical characteristics of ink (e.g., color intensity, tone, etc.), or the like.

Multispectral Analysis of Skin

Figure 22:
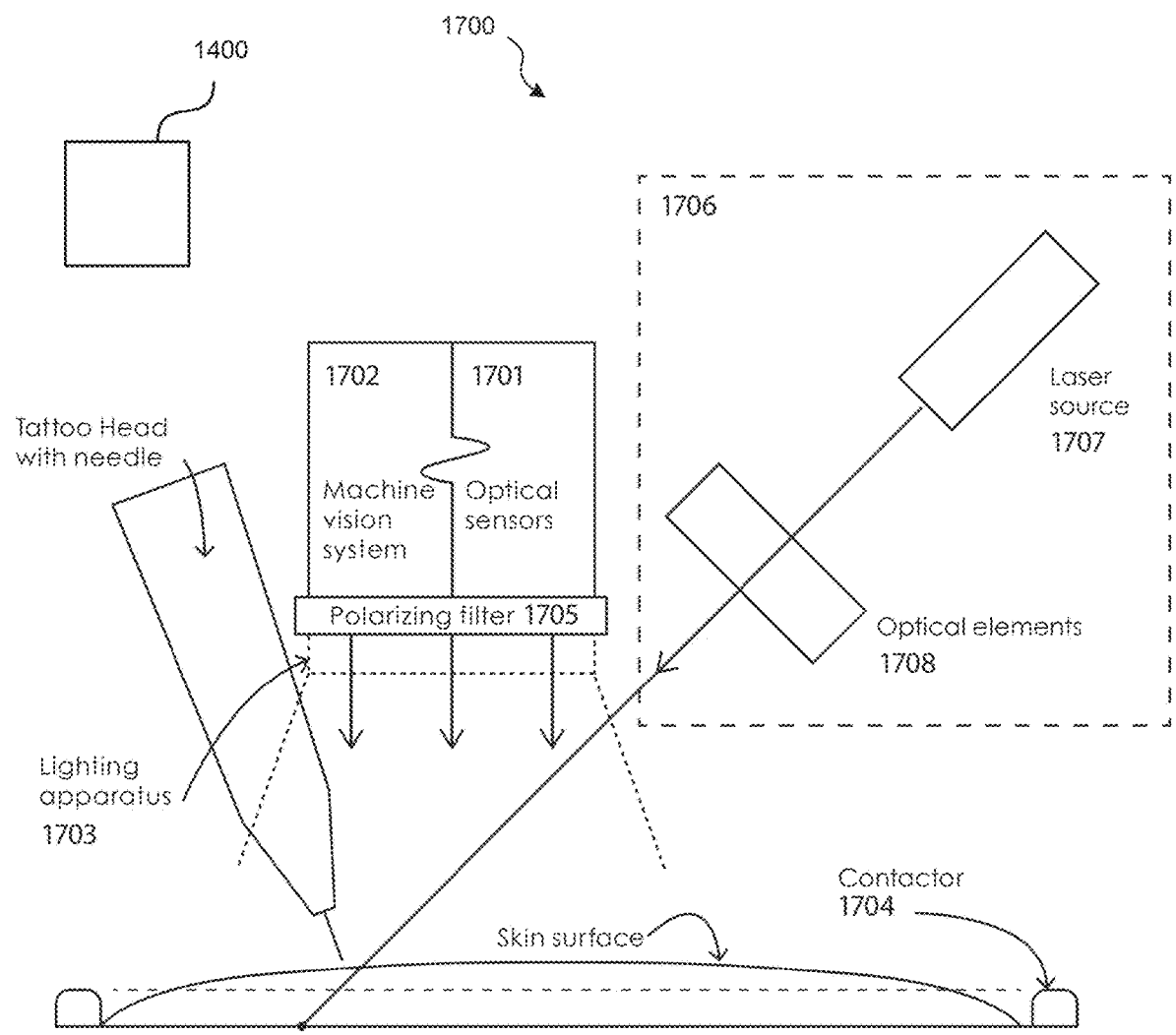
FIG. 22 shows a system with optical sensors and a machine vision system in accordance with an embodiment of the disclosure.

Some embodiments disclosed herein may include one or more optical sensors for the observation of the skin in various spectral bands, such as UV, visible, and/or infrared bands. FIG. 22 shows a system 1700 including optical sensors 1701 and a machine vision system 1702. The machine vision system 1702 can be coupled to a positioner, such as a Y gantry (gantry 106 of FIG. 2) or the tattoo shuttle assembly (tattoo shuttle assembly 104 of FIG. 2) of the tattooing system. Additionally, lighting apparatus 1703 may be attached to the positioner to output light detectable by the optical sensors 1701. For example, the lighting apparatus 1703 may output light toward an observed portion of the skin in the proper observation or detection bands. For instance, UV diodes may be used to provide light in the UV band, IR diodes in the IR band, or alternatively blackbody equivalent sources may be used to provide light in many bands at once, such as incandescent light sources.

The optical sensors 1701 can be imaging or non-imaging sensors. For example, the optical sensor may include an imaging thermal camera such as a microbolometer array, and an optical assembly for focusing on an area of the skin exposed by the contactor 1704 in FIG. 22.

Imaging optical sensors may observe the skin using pixels that are sensitive to particular bands of the light spectrum. For example, RGB cameras have three types of sensitive pixels that detect alternatively red, green and blue. An imaging multispectral camera may have additional sensitive pixels that are sensitive to different bands of the electromagnetic spectrum, for instance in ultraviolet and/or infrared. Imaging sensors provide an image of the skin in the observed bands of the spectrum.

Non-imaging optical sensors may include microspectrophotometers using refraction gratings, or Fabry-Perot interferometers or other spectrometer technology. These sensors may use dispersion of light to decompose light into many narrow bands of light that are then projected on an array of sensitive pixels, thereby identifying the spectrum of the incident light over many wavelength bands. Alternatively, interferometry may be used to subselect a narrow band of light around a central wavelength to be projected on a sensitive pixel.

Such non-imaging optical sensors may use an optical assembly to focus on a small area of the skin. These sensors measure the spectrum of light across many wavelengths for the portion of the skin on which they are focused, and do not result in an image but a spectrum. However, a multispectral image may be obtained with this method by actuating the shuttle on the precision x 107 and Y 106 gantries (FIG. 2) and taking a spectral reading of different portions of the skin exposed by the contactor window. The spectrum reading for a series of coordinates X and Y forms a 2D points cloud over the entire exposed portion of the skin in the window of the contactor. This point cloud may be randomly selected or organized, for example, as a grid. Each of these readings may therefore act as one pixel on an image, for example, in the case of a rectilinear grid. Alternatively, an interpolation may be used to obtain a continuous multispectral image of the skin formed from the points cloud spectra. An image formed with this method may be more resolved in the spectral space compared to an image directly obtained by an imaging optical sensor, but requires actuation and multiple actuations of the precision x and Y gantry to obtain a complete image, which can be slower.

Alternatively, a hybrid method for imaging a portion of the skin in a multispectral manner can be used, which relies both on imaging optical sensors and non-imaging optical sensors. For instance, a rapid imaging may be obtained by an imaging sensor first. Second, the image may be analyzed for detecting visible features in the bands which are observable with the imaging sensor. The analysis may identify features of interest, for instance when a visible change in texture or property of the skin is observable in the image. The detail for such an analysis may be described in part in the description of FIG. 27. Third, the resolved spectra of the features of interest may be obtained by observing the area of the feature of interest on the skin with the non-imaging optical sensors. Fourth, the total resolved spectra of the image may be obtained by forming a composite of the limited non-imaging sensor observations and the image obtained by the imaging optical sensor. For example, different areas of the skin may be classified based on their features, as presented in the description of FIG. 27 and each different area spectral property may be averaged from statistically representative observations of the non-imaging sensor. Variation from the spectral property of an area may be used to further refine the classification or reclassify the various areas of the exposed portions of the skin.

The hybrid approach can reduce the duration of a highly resolved imaging spectra of the skin when compared when using non-imaging optical sensor alone. Conversely, the proposed hybrid approach enhances the spectral resolution of an imaging spectra of the skin when compared when using imaging optical sensors alone.

With continued reference to FIG. 22, the lighting apparatus 1703 for imaging may include various emitters or light sources for outputting detectable or observable energy (e.g., detectable or observable by the sensor or detectors). In light-emitting embodiments, the position and diffusion of light can facilitate high quality imaging or observation of reflective spectrum. The reflected light may be scattered or specular. Specular light is due to direct reflection of the light on glossy surfaces, such as due to the natural oils covering the skin or from other fluids on the surface of the skin (e.g., lubricant, liquid ink barriers, etc.). Specular light is reflected based on its incidence angle and the local surface normal of the skin. Scattered light is reflected based on the small imperfections of the skin in many directions and may happen at various depths in the skin based on transmission, absorption and scattering property of the skin and the presence of natural or artificial compounds. Specular light may be many times brighter than scattered light which leads to saturated observations by the optical sensor that do not have a dynamic range that is broad enough. As a result, it may be interesting to disperse the light emitted by the lighting apparatus 1703 to reduce the specular light. This may be realized by reflective or transmission diffuser apparatus. An example of reflective diffuser is a diffuser dome. An example of transmission diffuser is a frosted glass panel. Diffuse light source such as by using total internal reflection in a frosted pan of optical material may be used as well. The diffuser embodiment should be selected specially to diffuse all the spectrum bands of interest. The measurement of the spectrum of the lighting apparatus may be measured in order to offset variation of power across the observation spectrum in order to regularize and normalize the spectral observations performed by the optical sensor embodiment. Non diffused lighting apparatus may be used for some multispectral observation embodiment of the skin. For instance, the observation of the skin texture may require an increase in contrast of the various features of skin such as the sulcus cutis, crista cutis, epidermal papillae, etc. One potential lighting apparatus embodiment that can enhance the contrast is to provide razing or angled light which will enhance shading of deeper feature and specular reflection on ridges. An alternative embodiment uses total internal reflection in a transparent medium directly in contact with the area of the skin being observed.

All or some of the embodiments of the lighting apparatus presented herein may be used together, concurrently, alternatively or sequentially for the purpose of obtaining multispectral and multimodal observations of the portion of the skin being studied. The number, configuration, and functionality of the lighting apparatuses can be selected based on the imaging or detection to be performed.

Another embodiment of the technology may use light polarization. Light polarization may be used to separate specular from scattered light by either using a polarizing filter 1705 on the source, the optical sensor or both. The polarization direction may be shifted during image acquisition in order to observe light of different polarization. This may be done by mechanically rotating linear polarization filter. The analysis of the polarized image may be used to distinguish light reflected by the exterior surface of the skin from light scattered from the skin at various depths. The analysis of polarized light adds a new modality to the analysis of multispectral light and may be tied to optically detectable characteristics of the skin.

The optical sensor embodiment, together with the lighting apparatus 1703 described herein result in a multispectral image or point cloud of the skin. The usage of these multispectral and multimodal observations is described in detail in relation to FIG. 27. One purpose of this type of observations can be to provide additional characterization of the portion of the skin to be tattooed or acted upon such that the tattooing or action process may be tailored, aborted or optimized. The optical characterization may be used to infer on other characteristics of the portion of the skin, which in turn may lead to a modification of the tattooing or action process.

The spectrum of an observed portion of the skin can indeed be caused by a plethora of factors that may influence or warrant the process to be performed. The skin reflective spectrum depends upon the spectrum of the incident light, the scattering within the skin and the absorption of various compounds within the skin. The skin scattering is a function of the skin layers and their thickness. Scattering is enhanced by collagen fibers. The absorption profile is dominated by the profile of melanin, water and collagen. Additional natural compound influences the UV, visible and IR reflective spectrum by further absorbing light. The major natural compounds are melanin, blood, hemoglobin, bilirubin and beta-carotene. Additional compound due to drug, nutrition and disease may influence the light absorption of the skin. Non-natural compound may also influence the reflective spectrum of the skin. Topical compound may be present on the skin that modify the skin's spectrum, such as cosmetics (artificial tanning, sunscreen, makeup, henna, etc.), topical drugs or the lubricant used in relation to at least some embodiments of the technology. Other artificial compounds may be present, in particular injected cosmetic compounds and tattoo ink. Each of these compounds, natural and artificial may have different reflective and absorption properties that may modify the spectrum of the skin. These differences may be picked up by the analysis of the spectrum of the skin in an absolute manner, for instance by identifying a darker skin tone by the absorption spectrum of melanin. Absolute baseline spectrum may be used to change a puncture setting. For example, contrast may be reduced on lighter skin tones to provide a better color balance.

In other instance, the spectrum of the skin may differ across various positions of the skin due to natural or artificial features. A differential spectrum may then be obtained to identify the reason of the variation. For example, the differential spectrum of a mole compared to a clear portion of skin may result in the obtention of a differential spectrum that is indicative of melanin. By clear portion of the skin, we mean a portion of the skin clear of identifiable features, indicative of the average skin background. An important feature of the differential spectrum is the identification of artificial features such as tattoos. In particular, this can be used to identify the particular pigments used in a tattoo. This can be of importance for complementing an existing tattoo for example, by providing a color matching feature. This can also be used for changing or covering the color of a portion of a tattoo by properly identify proper additive or subtractive color combinations. Finally, this can be used in removal applications when the absorption of light of a specific tattoo pigment is matched with an appropriate laser to maximize the absorbance of energy from the tattoo ink while minimizing damage to the tissue.

Figure 23:
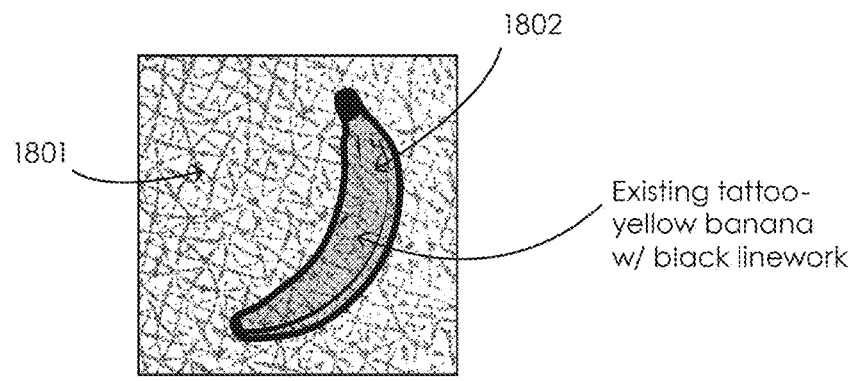
FIG. 23A illustrates an example of differential spectral processing in accordance with an embodiment of the disclosure.
FIG. 23B shows averaged reflectance spectra of a clear portion of skin and a tattooed portion of skin.
Figure 23:
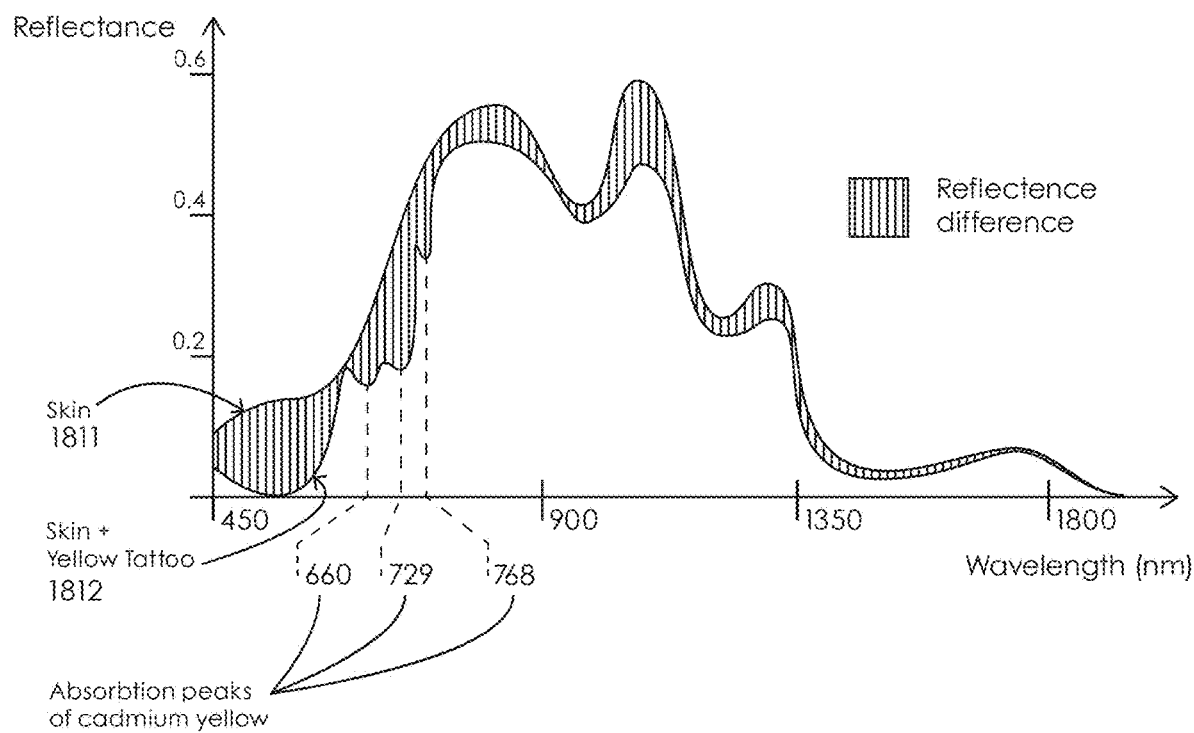
Figure 27:
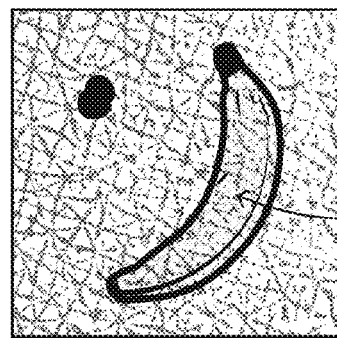
FIGS. 27A-27E show multi-spectral images and height maps of skin collected and analyzed in accordance with an embodiment of the disclosure.
Figure 27:
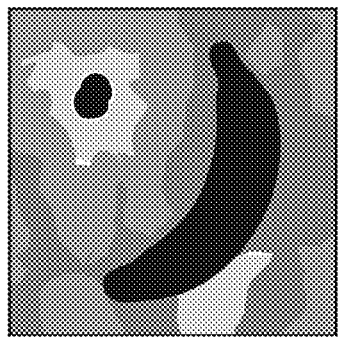
Figure 27:
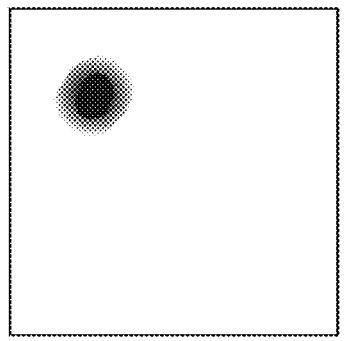
Figure 27:
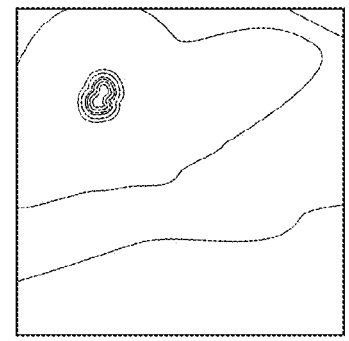
Figure 27:
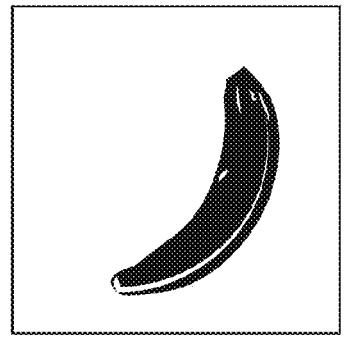

FIGS. 23A and 23B illustrate an example of differential spectral analysis. A portion of the skin 1801 in FIG. 23A is observed using a non-imaging sensor embodiment.

The portion of the skin includes a clear portion of skin and another portion of the skin on which a tattoo of a banana 1802 is visible.

FIG. 23B shows the averaged reflectance spectrum of the clear portion of the skin in the curve 1811. The curve shows the reflectance spectrum of the skin in between 450 nm and 1800 nm. The absorbance in the 450 to 900 nm zone is dominated by hemoglobin and melanin absorbance while the 900 to 1800 nm zone is dominated by melanin and water absorbance.

FIG. 23B also shows the averaged reflectance spectrum of the yellow part of the banana tattoo in the curve 1812. The difference between both spectra is exemplified by the hatched area. In particular, absorption peak can be seen at 660, 729 and 768 nm that are uniquely associated with the cadmium yellow pigment. In order to obtain a quality absorption spectrum, the spectrum difference may need to be performed in the absorbance space obtained by the negative of the logarithm of the ratio of the tattoo reflectance spectrum over the reflectance spectrum of the clear skin. The various peaks of this absorbance differential spectrum may be compared to the differential spectrum of a database of compounds naturally found in skin, cosmetic compounds, lubricant and other compound used in relation to the tattoo apparatus, and pigment used in tattooing in order to identify the likely source of an absorption peak.

Differential spectral analysis may be used to enhance strategies of color matching in the case of tattooing. The art proposes to use color matching to identify the apparent color of a skin feature and use this to select a particular pigment to tattoo. This is however an insufficient methodology to produce accurately matching results. Indeed, color matching by simply analyzing the spectral composition of light from a particular portion of the skin is not sufficient to fully identify the true color of the pigment or other colorful feature of the skin. First, the spectrum of the light source needs to be known to compensate for variation of the spectrum of light. A green tattoo under green light does not look the same under a blue light, for example. Then, and more importantly, the spectrum of the pigment seen through the skin differs from the direct reflective spectrum of the pigment due to the scattering and absorbance of the skin and its components. For example, one may notice that veins seen through the skin have an apparent blue color while the color of veins is actually dark red: the scattering of light in the skin affects longer wavelengths (such as red) less than shorter wavelength (such as blue). This clearly shows that matching the apparent color of a feature in the skin may not lead to a matched color when applying tattooing because of the effect of the skin on the perceived color. Differential spectroscopy allows for partially removing the effect of the skin on the actual color by understanding the scattering taking place in the skin. This is however insufficient for complete color matching, as the scattering in the skin also depends on the depth at which the feature is positioned: a deeper feature will suffer more skin effect than a shallower one. Therefore, the technology can be used to further model and simulate the effect of the skin on the color of the resulting tattoo: A model of the skin is constructed either ad hoc or from the measurement of the spectrum of a clear portion of the skin. This model, together with the known depth of ink deposition during tattooing is used to simulate the effect of the skin of that particular client on the resulting observable color of the tattoo after deposition. The color matching is conducted by comparing the simulated result to the actual perceived color until an accurate equivalent is found. This not only allow for accurate color matching but also for tailored matching based on the skin characteristics of the particular client. The color matching is further enhanced by the differential spectrum analysis that can be used to identify the actual compound that resulted in the apparent color. Identifying compound is critical for exact color matching and for aging as different compounds and pigments characteristics (composition and geometry) may lead to different aging and pigment-to-skin interaction. The use of the same compound for color matching further enhances the accuracy of the color matching and its persistence during the skin aging process.

Laser Embodiment and Precise Measurement of Skin

The portion of the skin that is observed through the window of the contactor 1704 may not be completely flat. For example, skin features such as sulcus cutis, crista cutis, epidermal papillae, etc. which form the grooves and crests of the skin's surface texture may have height variation in the order of 100 um. Other skin features, such as scars and moles, may have height variation on the order of a few millimeters. In addition to skin features, the process of maintaining in place the skin through the use of a contactor 1704 creates a variation of the skin height within the contactor window, referred as a bulge. The bulge may have variation in height between 50 um to 3 mm. Moreover, the bulge height and geometry may depend on the skin or skin backing characteristics. For instance, skin backed by bone will display a compression bulge while skin backed by adipose tissue will display a tension bulge. The primary effect of height difference on tattooing resides in the position of the needle first contact which may necessitate a change of needle elongation in order to compensate for the height of the skin at the point of contact with respect to the tattoo shuttle. Moreover, a change in height may be indicative of a change in properties of the skin, such as scarring tissue in a keloid scar or the mechanical difference due to a compression versus a tension bulge. This may impact, as a secondary effect, the appropriate puncture setting to be used for a perfect tattoo dot.

In order to mitigate the effect of height differences, the height of the skin may be measured. A measurement apparatus may be added to the shuttle for measuring the skin height. Referring again to FIG. 22, the system includes a laser-based measurement apparatus 1706. Height of skin may be measured, for instance by laser time of flight or a physical feeler probe. The laser-based measurement apparatus 1706 and machine vision system 1702 can be used concurrently or sequentially to measure skin height, analyze skin, monitor tattooing, position needles, etc.

FIG. 22 shows a laser system 1706 positioned at an angle with respect to the normal of the skin N. The laser system 1706 includes a laser source 1707 and optical elements 1708. The laser source 1707 can include one or more laser. The optical train or optical elements 1708 ("optical elements 1708") focus the laser light such that the focal region is in the vicinity of the skin surface. The optical elements 1708 can include one or more lenses, focusing elements, reflectors, mirrors, diffusers, filters, or the like.

The laser may be focused as a single point, for example, by using one or more lenses, such an aspherical collimating lens followed by a focusing doublet or can be focused as a line, for example using a cylindrical collimating lens followed by a focusing doublet. A focusing element can provide a very narrow line or point projection over the skin. This is advantageous in order to have a resolved measurement of the height, as a larger spot of light on the skin will result in a less resolved observation. Typically, the spot or line may have a thickness between 1 um and 1000 um. The line or spot is then observed by the machine vision apparatus 1702. The position of the spot or the position and shape of the line can be used to infer the height of the skin.

The measurement of all the portion of the skin is obtained by scanning the skin surface. With a line projection the measurement apparatus 1706 may be attached to the Y gantry 106 (FIG. 2) and fixed compared to the machine vision system 1702. A scan is obtained by moving the Y gantry across, and subsequent images are collected by the machine vision system to create a scan of the portion of the skin. With a spot or dot projection, the measurement apparatus may be attached to the precision x gantry 107 (FIG. 2) and fixed when compared to the tattoo shuttle. The Y and precision x gantries are then actuated to various coordinates of the exposed portion of the skin to create pictures of the spot at various coordinates. The position of the dot is used to infer the height of the skin the machine coordinate reference system.

In some embodiments, the system 1700 can scan the skin to detect skin features. The controller 1400 can execute a program to control the machine vision system 1702 and can then analyze at least one of the detected skin features. The controller 1400 can assign each analyzed skin feature to a feature category based on the analysis. The controller 1400 can use one or more machine-learning models to perform these steps and can determine at least one puncture setting for applying tattoo dots to the subject based on the detected skin features and respective feature category. For example, the controller 1400 can control operation of the tattoo head based on the skin surface. The controller 1400 can receive output from the measurement apparatus 1706 and can perform the one or more of the methods discussed below.

In other embodiments, the measurement apparatus 1706 can include LEDs, LEDs and laser, or other light sources. The optical elements 1708 can include lenses, filters, sensors, and other components for controlling the light emitted toward the skin. Other skin position or measurement apparatuses can also be used. For example, a matrix of laser dots or other patterns may be projected on the skin.

Skin Height Maps Based on Laser Measurements

Variations in skin height may be caused by, for example surface features (e.g., moles, tumors, skin tags, skin folds, skin wrinkles, skin texture, scarring, etc.), local bone or cartilage structure under the skin, local deformation of the skin surface due to the physical contact of the contactor or another other component of the tattoo machine, or a combination of these factors. The laser-based measurement system 1706 may be used to characterize the deviations in skin height with respect to a reference plane with high accuracy (e.g., within 1-100 μm). Skin height characterization may be performed every time the skin surface profile within the operating window changes, for example, when (i) contactor comes in contact with the skin (e.g., by means of a robotic arm), (ii) contactor is repositioned on the skin (e.g. by sliding on skin using a gantry system), (iii) downward force of contact is changed, (iv) a movement of skin with respect to the contactor is detected (e.g., due to twitching, sudden motion of client, or other cause of unexpected relative motion), etc. Due to these factors, the height of the skin surface may vary by approximately 50 μm-3 mm under the tattooing head from point to point, or from time to time.

In the context of tattooing, the skin height information may be used to offset needle extension settings, in order to account for spatial or temporal changes in skin height which may result from the factors listed above, and control the depth of ink deposition with high accuracy. For example, for each tattoo dot, an optimal needle extension setting may be calculated based on skin puncture data collected by a galvanic-sensing system, as described in relation to, for example, FIGS. 12A and 12B. The needle extension setting determined by this manner may account for the needle length, skin layer thickness, desired visual characteristics of the dot, and/or the height of the skin surface at the time of skin puncture data collection. The difference between (a) the skin height measured at the time of collecting the skin puncture data, and (b) the height measured immediately before executing a tattoo dot, could be used to calculate a needle extension offset (c=a−b) which accounts for the changes in skin height. The calculated offset (c) is added to the needle extension setting, and the updated setting is executed by the machine.

In another use case, for a fixed position of the contactor window, the skin height characterization system may be used to construct a topological map of skin surface within the contactor window. This map may be constructed using various embodiments of the system, for example, embodiments based on projecting (i) a set of dots, (ii) a set of lines, or (iii) a grid, etc. FIGS. 24A-24C show the line projection method (ii). Generalization of the method for dots (i) and grids (iii) is straightforward. The laser source 1707 (FIG. 22) emits light that is optically focused, bent, truncated, or otherwise altered by the optical elements 1708 (FIG. 22) to produce a nearly planar beam of light (a beam of light whose cross section has a very high aspect ratio). First, consider that the contactor is on a completely planar surface, that is, a surface with no variations in height. The projection of the described beam appears as a straight line across the surface, which is shown in FIG. 24B from the perspective of a machine vision system 1702 (FIG. 22) viewing the contactor window. The line appears as a straight line on the image because there is no variation in height of the surface, as shown in FIG. 24A. Such a surface may be used for calibration of the method, and the plane it lies on is called the reference plane in the subsequent FIGS. 25-A,B,C and FIGS. 26-A,B,C. Due to the angle of incidence of the beam, any positive deviation in height of a surface will result in deviation of the line on the image towards right from its reference position. For example, consider a non-planar or deformable surface, for example skin, placed under the contactor, as shown in FIGS. 25-A,B,C. The skin may bulge out of the contactor window (i.e., towards the camera), such that the skin surface is more elevated near the center of the window, and close to reference plane towards the edges of the contactor window. As a result, the projection of a planar beam of light follows a generally curved path on the image (e.g., projected line #1 in FIG. 25B), such that its deviation from its reference position (e.g., reference line #1 in FIG. 25B) is proportional to the height of the skin at any point along the projected line (see FIG. 25A). It should be emphasized that the points on the skin whose height is measured by this method are the points that are illuminated by the projected light. Geometric relations for calculating the skin height as a function of deviation distance of the line may be derived as a function of angle of incidence θ, and other relevant design parameters. For example, for the setting shown in FIGS. 25-A, B, C, the height $h_A$ of an illuminated point A on the projected line on the skin, may be calculated as:

$$h_A = \delta_A / \tan \theta$$

where $\delta_A$ is the deviation of the illuminated point on the projected line from the reference line, as measured on the camera image. Height of the illuminated point is measured with respect to the reference plane. This equation assumes camera axis of view is perpendicular to the reference plane, and may be extended to a more generalized form to account for any variation in the relative position of the components of the tattooing system (e.g., system shown in FIG. 22). The deviation $\delta_A$ has units of physical distance (e.g., millimeters), calculated by dividing the measured pixel distance on the image, to the resolution of the image at the plane of the skin (e.g., pixels per millimeters). In FIGS. 26-A, B, C, the height measurement method is demonstrated for a system which employs a linear laser beam, which results in the projection of a point on the skin. In this setting, the deviation $\delta_B$ of the projected point from the reference point may be measured to calculate the height of the skin $h_B$ at the illuminated point B, using a similar mathematical expression. Note that compensation may be applied in the case the distance between the camera and the reference plane, the incidence angle and position of the laser, etc, vary during the actuation of the machine.

To construct a topological map of skin height across the contactor window, a sequential scanning approach may be followed. The laser beam may be translated or rotated by certain increments using gantries 106 or optical elements 1708 (FIG. 22) to project a series of lines at different locations on skin, for example, as shown by #1,2,3,4 in FIG. 25A, resulting in the projections #1,2,3,4 respectively in FIG. 25B. For each projected line (i) a camera image is captured, (ii) the line is detected on the image, and (iii) skin height along the line is calculated based on the line's deviation from its reference position, as explained above. The height information collected from different parts of the contactor window could be used to feed an interpolation method to construct a continuous topological map of the skin, which may be probed at arbitrary points within the contactor window to estimate the skin height at those points. In another embodiment, multiple lines may be simultaneously projected on the skin, for example, in the form of a grid or parallel lines, by the use of multiple laser sources or a modified optical system. In another embodiment, a laser beam may be used to project one or more laser dots on the skin, simultaneously or sequentially. The deviation of the positions of dots on the camera image from their reference positions may be used to calculate the height of the skin at the illuminated points. The mapping of height at the illuminated points of the skin may further be extended to all positions to be tattooed by interpolation or extrapolation and the dot parameter table for these dots may be updated to reflect the variation of height. After scanning, to execute multiple tattoo dots within the contactor window, needle extension settings may be updated based on the relative differences in skin height within the contactor window, without having to collect galvanic-sensor data from all of the targeted locations.

Measurement of an absolute distance to the skin surface from the tattooing head, is not necessary, and it is sufficient to identify variations in skin height in a relative manner to obtain useful information. For example, measurements of the variations in skin height at multiple locations within the contactor window may be used to reconstruct a topological map of the skin surface. This topological map could then be used in combination with the multi-spectral analysis described earlier, for identification, characterization or segmentation of moles, tumors, lesions or other features of interest on the skin. In another use case, a measured change in the skin height at a fixed coordinate within the contactor window between different time instances (for example, before and after repositioning the contactor) could be used to modify the extension of a tattoo needle to ensure ink is delivered at a constant depth under the skin.

Skin Feature Identification and Compensation Based on Multi-Modal Scanning of Skin At least some of the systems disclosed herein can be used to simultaneously collect multiple channels of information from the skin, as discussed in relation to FIGS. 22 through 26, such as: (i) RGB imaging, (ii) spectral imaging, (iii) infrared, (IR) imaging, (iv) ultraviolet, (UV) imaging, (v) skin height maps, and/or (vi) polarization. Selected information could be extracted from a combined analysis of these multiple channels of information, for diagnostic, operational or decision-making purposes in tattooing or dermatologic applications. A few examples are given in the subsequent paragraphs.

High-resolution images from RGB camera are used to detect natural and artificial fiducials (skin texture, stencil-dots, etc.) for high-precision positioning and deformation analysis, as discussed in relation to FIGS. 32-A, B,C of the current disclosure. For example, FIG. 27A shows an RGB image of the skin which is processed to detect skin texture, a mole, and an existing tattoo. Methods to identify positioning and deformation based on skin texture will be discussed later in relation to FIGS. 32-A, B, C. A combination of RGB images and multi-spectral imaging may be used to identify prior tattoos on the skin.

Combination of IR and RGB imaging could be used to identify tumors and detect their boundaries. Increased vascularization around skin tumors exhibits itself as locally elevated thermal IR emission due to elevated temperature over the tumor. Proliferation of cells in a skin tumor may also cause a bump, roughness, or other irregularities on the surface of the skin, which may be detected using the skin height scanning system. Spatial maps of IR emission (FIG. 27C) and surface height (FIG. 27D) may be used as differentiators, in combination with visual diagnostic criteria, in order to distinguish malign skin tumors from benign tumors or moles with better specificity and sensitivity. An AI methodology could be developed for automatic diagnosis of early stage skin tumors based on these spatial maps. For example, a dataset for training a convolutional neural network (CNN) could be prepared by combining (i) spatial maps of IR emissions, (ii) surface height and (iii) visual images on the input fields, and expert diagnostic outcome (cancer/not cancer) on the output field. A blood spot (petechiae) may also emit high IR due to high density of capillaries, however may be distinguished from a tumor due to its red appearance on the RGB image.

Infrared imaging may also be used to detect skin rash, or other inflammation of the skin surface, as local temperature of the skin will be elevated. A combination of RGB imaging and IR imaging may be used to identify skin rash, based on visual its pattern in both channels.

A spatial map of absorption-emission characteristics at a specific-wavelength may reveal the presence and spatial boundaries of a certain pigment or substance of interest. FIG. 27E shows a processed image, obtained by scanning the skin at wavelength(s) which distinguish the yellow pigment used in the banana tattoo from the non-tattooed parts of the skin, for example, at the wavelengths of 660 nm, 729 nm, 768 nm predominantly absorbed by cadmium yellow as shown in FIG. 23B. Other natural or artificial pigments or substances on the skin could be detected by scanning absorption-emission characteristics at specific wavelengths known to produce high contrast for the substance of interest against the background skin.

UV images of the skin may be used create highly accurate maps of melanin density on skin, since UV light is selectively and efficiently absorbed by melanin. As demonstrated by the sketch in FIG. 27B, UV images reveal spots or patterns on the skin which are formed by natural variations of melanin on the skin. These patterns may be used in combination with the patterns visible in the RGB images (e.g., skin texture), in order to improve the accuracy and error tolerance of positioning and deformation analysis methods discussed in relation to FIGS. 32-A,B,C. In addition, UV images may be used to detect variations in skin's collagen density. Puncture settings may be modified spatially to account for these variations to achieve desired visual outcome throughout the skin. For example, a region of the skin with higher collagen density may require more number of punctures to deposit the same amount of ink.

Compensating for Skin Features During Tattooing Operation

Figure 28:
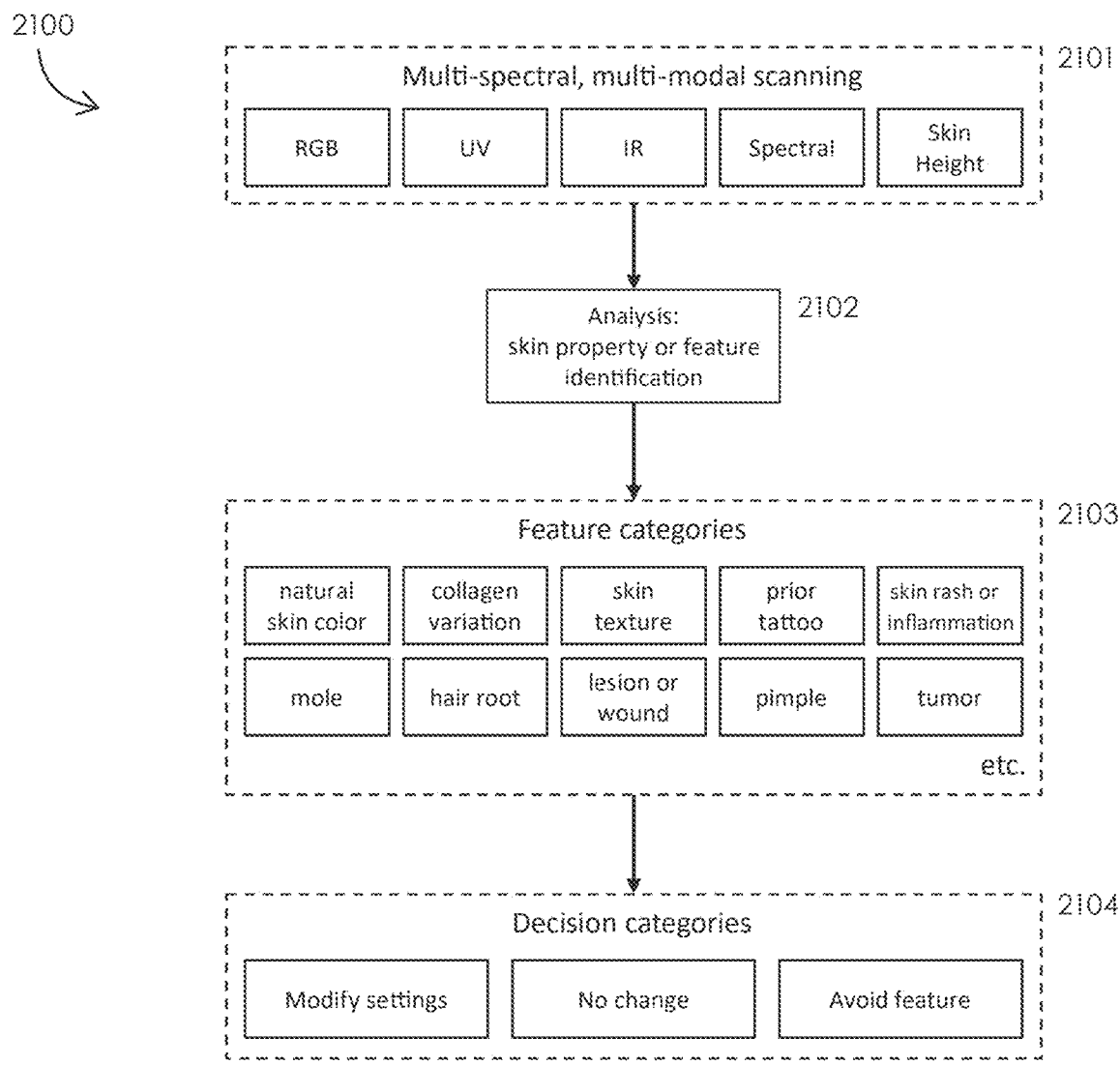
FIG. 28 shows a process for feature identification, feature classification, and decision-making in accordance with an embodiment of the disclosure.

FIG. 28 shows the process 2100 of feature identification, classification, and decision-making for a tattooing operation. At step 2101, a scanner system can perform one or more scans to generate spatial maps, images, and scan data suitable for analysis of the subject's tissue. The scanner system can scan using one or more of RGB scanning, UV scanning, IR scanning, spectral scanning, skin height scanning, etc. For example, multi-spectral, multimodal scanning can be used to generate scan data suitable for performing one or more skin analysis disclosed herein. In some embodiments, machine vision systems disclosed herein can be used to perform the scanning 2101. For example, a machine vision system (e.g., machine vision systems 430, 1702) can be configured to perform a three-dimensional analysis of the skin surface and multi-spectral, multi-model scanning 1201. In some embodiments, the scanner system can include the machine vision system 1702, optical sensors 1702, and/or laser-based measurement apparatus 1706 discussed in connection with FIG. 22. The configuration and functionality of the scanner system can be selected based on the feature detection and categorization to be performed and scanning discussed in connection with FIGS. 27A-E, FIGS. 32A, and FIG. 32B.

At step 2102, scan data (e.g., spatial maps, skin contour maps, images, topology maps, etc.) acquired from the scanning system are analyzed to identify certain properties of skin and features of interest on the skin 2103, for example, natural skin color, temporary skin color variation, collagen characteristics (e.g., high/low collagen areas), prior tattoos on skin, skin texture (e.g., skin folds, creases, or wrinkles), mole, blood spot, tumor, hair root, scar, scabs, lesion, pimple, skin rash or other transient inflammation of skin, etc. Step 2102 can include, without limitation, image segmentation (e.g., trained ML segmentation, model-based segmentation, multi-scale segmentation, fast marching segmentation, etc.), classifying objects, filtering, edge detection, etc.

At step 2103, each detected feature is assigned to a feature category or an operational bucket and may accordingly modify the execution of the tattoo. The feature categories can include, without limitation, skin color (e.g., a natural skin color, an abnormal skin color, etc.), collagen variation, skin texture, prior tattoo, temporary skin conditions (e.g., skin rashes, skin inflammation, etc.), mole, hair root, lesion, wound, pimple, tumor, or category inputted by a user. Abnormal normal skin color can include, without limitation, hyperpigmentation, hypopigmentation, port-wine stains, or the like. For example, if a subject has a visible anomaly, such as a scar, a user can program the system to identify and categorize the scar. This allows for the user to customize the scanning and feature categorization process. The system can display the identified features and categorization for further user input. This allows a user to visually inspect the tattoo site and modify the tattooing plan. In some embodiments, a machine learning model is initially trained on training data sets including skin features in each category. The machine learning model can be trained using the techniques disclosed herein.

In step 2104, one or more puncture settings of tattoo dots (e.g., needle extension, needle speed, volume of applied, and number of punctures) may be modified or operational decisions may be made based on the presence of certain features. For example:

Modify settings: Puncture settings may be modified to account for features or spatial variations in skin properties, to achieve a desired visual outcome consistently. For example, a tattoo puncture setting map can be generated based on the tattoo to be applied. The tattoo puncture setting map can include, without limitation, one or more approved stencils, dot-based tattoo designs, puncture settings (e.g., puncture settings for a location, region, entire tattoo, etc.), ink settings, digital tattoo files or protocols, or the like. In some implementations, an overall lighter skin may require less ink than an overall darker skin to achieve the same visual contrast or shade in a tattoo design, thus puncture settings may be modified to account for the overall skin color of the client. For example, the puncture settings can be modified to compensate for localized regions of hyperpigmentation, hypopigmentation, or abnormal skin coloring within the tattoo site. In addition, puncture settings may be modified based on spatial variations in natural skin color or collagen density. A local change in skin height or color due to a mole may also result in modifying the puncture settings over the mole, if the mole can be visually integrated into the tattoo design. Prior tattoos on the skin may also be accounted for by modifying puncture settings to deposit more or less ink over lines, shades, dots, of the pre-existing tattoo. The system can generate a predicted image of the tattoo based on the modified puncturing setting for review and approval (e.g., review by the client/subject, operator, etc.). The puncture settings can be modified to meet or exceed an image quality score, which can vary depending on the type of tattoo to be applied. A notification can be generated if the system determines that the image score cannot be meet, and the tattoo site can then be modified until a suitable image score is achieved. For example, an area with scar tissue may not provide a desired image quality score for a micro-tattoo. In another example, skin with excessive wrinkles may not provide a desired image quality score for a thin-lined geometric tattoo. Additional puncture settings or modified tattoo design can be generated to meet the desired image quality score.

No change: Puncture settings may not be modified for features that are transient such as skin rash, since these features would disappear over time. Accordingly, the system can maintain a tattoo puncture setting map or portion thereof associated with the detected feature.

Avoid feature: Placement of the tattoo may be modified or tattoo operation stopped in order to avoid tattooing over certain features. Features which may pose a health risk if punctured, cannot be successfully tattooed over, or otherwise hamper tattoo execution fall into this category, for example: pimples, eczema, lesions, tumors, large moles, or scar tissue with significant surface irregularities, etc. In certain cases, tattoo dots over such features may simply be omitted, if approved by the client. If roots of shaved hair are longer than a certain threshold, the operation may be stopped and the user may be prompted to re-shave the skin.

In some embodiments, a controller (e.g., controller 109 of FIG. 1B or controller 1400 of FIG. 20) can analyze detected skin features and assign each skin feature to a feature category based on the analysis. The controller can then perform then determine whether to modify a tattoo puncture setting map for applying at least one tattoo dots proximate the detected skin feature, maintain a portion of the tattoo puncture setting map associated with the detected skin feature, and/or avoid applying any tattoo dots proximate the detected skin feature. The tattoo puncture setting map can be modified to avoid or compensate for the detected skin feature. The controller can then robotically apply the tattoo according the modified or unmodified tattoo puncture setting map.

Simulating Tattoo Appearance Based on the Scanning of Skin

Images and other data collected from the multi-spectral scanning/imaging of the skin may be used to construct a realistic simulation of the appearance of the tattoo on the skin. The simulated images may be used to preview the tattoo by the client, or may be used as a basis for further aesthetic modifications on the tattoo, such as overall brightness, contrast, color temperature, and/or color saturation of the tattoo. The first step of the visual simulation can include aligning and stitching the images collected from different portions of the skin, in order to create a continuous image of the skin over a tattoo area (e.g., portion of tattoo area or the entire tattoo area). Skin coordinates calculated based on the positioning and deformation analysis methods (e.g., methods described in relation to FIG. 7 or 32B) may be used for transforming and aligning the images of contiguous portions of the skin while satisfying continuity across the overlapping portions of the images. Alternatively, methods based on, for example, feature matching between pairs of images may be used to align the images of contiguous portions the skin. In visual simulation of the tattoo dots, the appearance of each tattoo dot may be characterized by its shape, size, aspect ratio, color, and/or spatial distribution of ink density. An optical model of the skin is used to predict the colors of tattoo dots. The optical model accounting for absorption and/or scattering of light in different layers of the tattooed skin. The visual render of each dot can be computationally generated using this model, based on the known variables that control its appearance, for example, puncture settings for the dot (e.g., needle extension and/or number of punctures), ink properties (e.g., color, pigment content, and/or saturation), skin properties (e.g., color, optical properties, etc.), and/or skin features at the location of the dot, and any modifications of puncture settings to compensate for skin features as discussed earlier. Experimental datasets which relate puncture settings to visual characteristics of tattoo dots, such as one described in relation to FIG. 13, may be used in generating the rendering. Mathematical models for diffusion and clearance of the ink under the skin may be used to simulate the appearance of the tattoo dots at a desired time after execution. The color balance of the images may be adjusted to simulate the appearance of the tattoo under different ambient light.

Generation of Digital Tattoo Files for Robotic Application of Multi-Color Tattoos The appearance of colored ink as tattooed to skin depends on the pigment content of the ink and optical characteristics of the skin, as light is modified by absorption and scattering while it travels inside the skin. For example, different frequencies of light are absorbed in varying degrees by the natural pigments in the epidermis (such as melanin) and hemoglobin in the dermis, in addition to the pigments of the tattoo ink trapped in the dermis. Light is also scattered by filamentous proteins (such as collagen) in the epidermis. Smaller wavelengths of light are scattered more, resulting in blue and green light having traveled less deeply into the skin than red light before they exit from the surface. Due to these interactions, an optical model of the skin can be used to predict the color of the ink as tattooed on the skin. Optical parameters or values of the skin relevant to the model (e.g., absorption coefficients, scattering coefficients, transmission coefficient etc.) may be measured or inferred from data collected by one or more imaging modalities (e.g., optical analysis, RGB, UV or IR imaging, spectral imaging, etc.), for example, during a skin scanning process described in connection with FIGS. 27A-E. For example, a target site can be optically analyzed to determine characteristics of the skin for generating optical values for the skin. The optical values can be used to select puncture settings, modify or develop tattoo puncture setting maps, etc. In some embodiments, the tattoo puncture setting map includes optical parameters or values for each dot, puncture site, etc.

Figure 30:
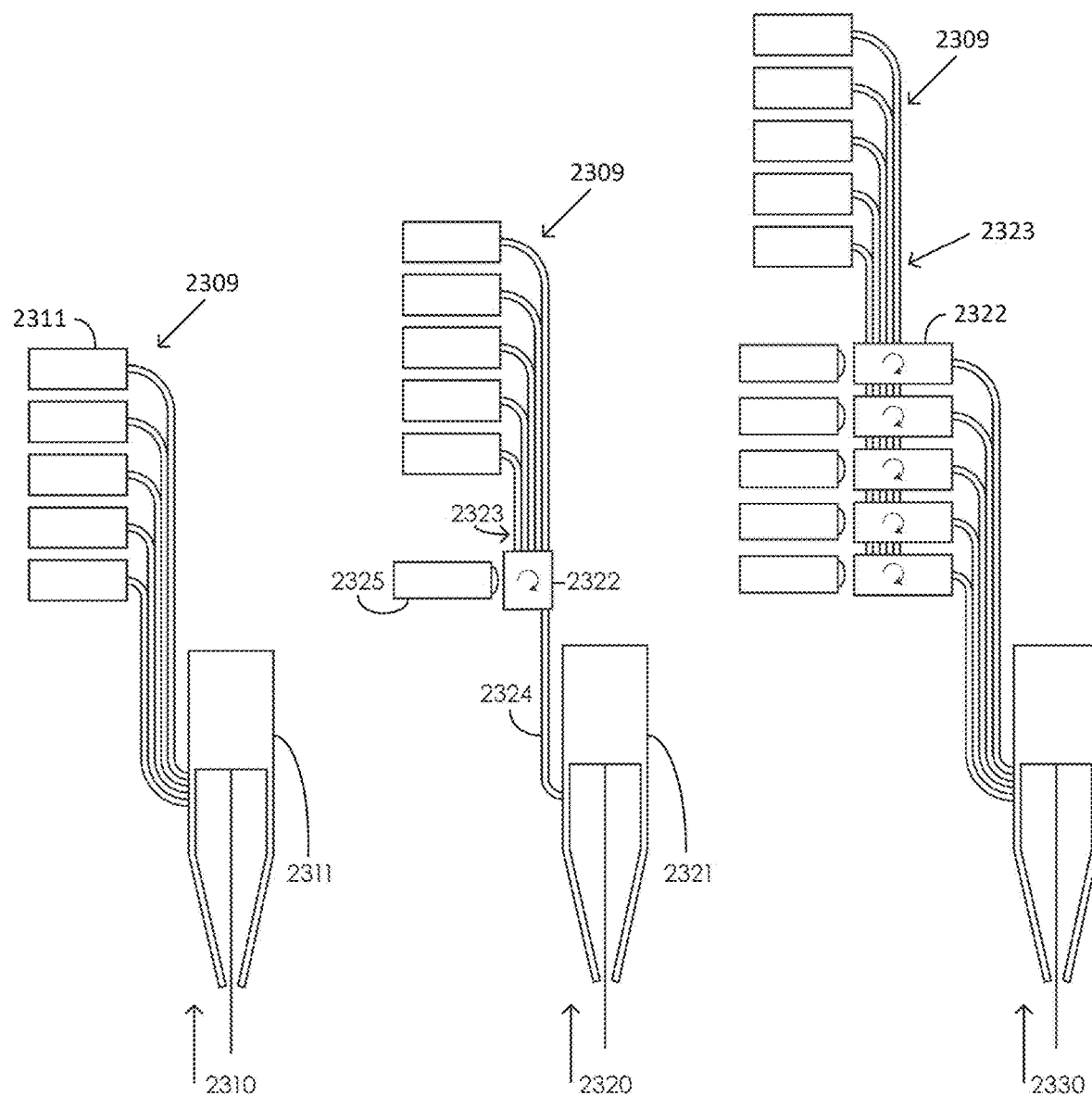
FIG. 30 shows ink delivery systems in accordance with embodiments of the disclosure.

At least some systems can enable the creation of multi-colored tattoos using ink and/or diluting agents supplied from multiple containers, which are discussed in relation to FIGS. 30, 31A, and 31B. To create multi-colored tattoos, different color ink may be (i) mixed before being injected on the skin, (ii) mixed on the skin by overlapping injections, (iii) used without mixing and each color applied to non-overlapping parts of the tattoo, and/or (iv) applied in a tightly-packed, non-overlapping spatial arrangement of dots to create a variety of colors when viewed from a distance, such, as in half-toning or dithering methods. In some embodiments, ink can be mixed before delivery to the needle(s) for applying portion of tattoo and ink can be mixed using overlapping injections. The mixing process can be selected based on, for example, ink characteristics, skin characteristics, target tattoo appearance, etc.

In determining the set of primary colors of ink used for mixing, a subtractive color model may be used, such as the CMY (Cyan, Magenta, Yellow) models and/or Hexachrome color models. Black ink (K) and white ink (W) may also be mixed to obtain lighter or darker colors. A diluting agent, such as water, may be mixed with any of the colors with a controlled ratio to produce variations in color saturation or lightness. For example, different shades of grey wash ink may be created, by mixing black ink with the diluting agent during tattooing operation.

White ink may be applied at a deeper skin layer to create a reflective backing surface prior to applying a tattoo design. This deposited layer of white ink may be used to block light from entering and escaping the epidermis, and thus allowing a more predictable control of the tattoo color. White ink may also be used to create highlights on a tattoo design.

In the multi-color tattooing method (i), a controller may be used to mix different colored inks or diluting agents with desired ratios, which will be discussed in relation to FIG. 30. The mixed ink is then injected to the skin via the tattoo needle to form a tattoo dot. The optical model discussed earlier may be used to calculate the mixing ratio of inks to yield the desired color of tattoo dot.

In method (ii), tattoo dots with different colors are applied at the same location on the skin, to achieve a tattoo dot of desired color. In this method of color mixing on the skin, the relative intensity of each primary color component in the tattoo dot may be controlled by varying the number of punctures when applying each primary color. In any method which involves color mixing (e.g., methods i, ii), optical properties of the selected set of primary inks are considered in the optical model for predicting the color of the resulting tattoo dots.

In another embodiment using a non-mixing method (iii), the machine is loaded with a set of colors (referred to as a "palette" of colors), each color corresponding to a non-overlapping part of the tattoo design. For example, a tattoo depicting ocean waves may be created using blue for the water, white for the foam, and dark blue and black for the outlines of waves. This method also involves decomposing or segmenting the design into a discrete set of colors during the tattoo file generation.

In another embodiment (iv), groups of non-overlapping or semi-overlapping tattoo dots may be applied using the primary colors of a color model, such that when viewed from a sufficient distance, the group of dots is seen as the desired color. For example, size of the tattoo dots or ink saturation of tattoo dots with each primary color may be varied in space to vary the perceived color, as in the halftone technique in reprography. Analysis of visual artwork and their conversion into digital tattoo files or protocols optimized for creating colored tattoos is described below.

Figure 29:
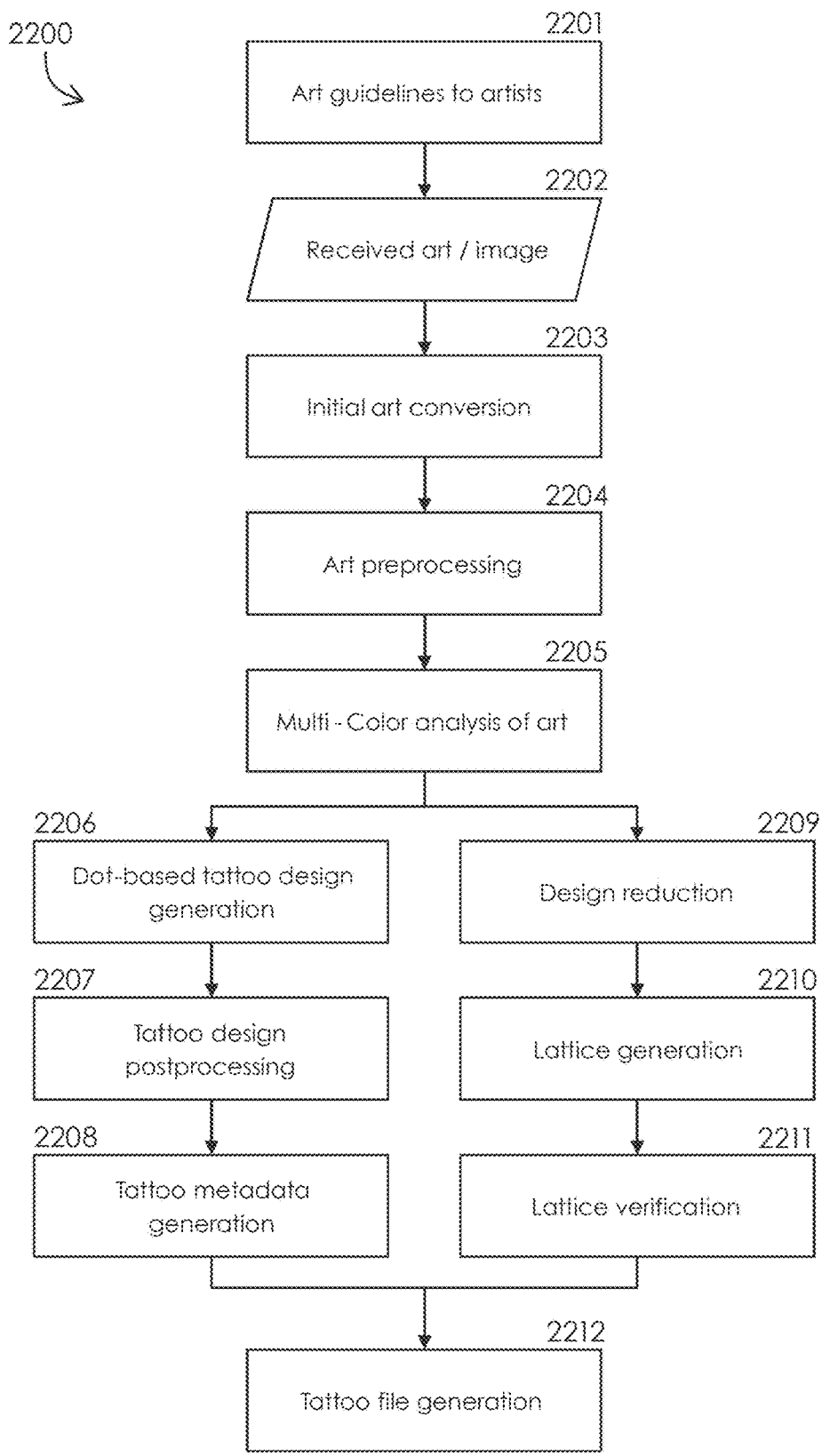
FIG. 29 shows a process for generating a digital tattoo file for application of multi-color tattoos in accordance with an embodiment of the disclosure.

Example methods for generating digital tattoo files for robotically applying tattoos are described in connection with FIG. 19. FIG. 29 is a flowchart of a method 2200 for generating digital tattoo files (or digital tattoos) for enhanced automated multi-color tattooing and can be machine-read for the execution of the multi-color tattoo by the automated tattoo machine. These files can be created by interpreting graphical artworks or images. The steps 2201-2204 and 2210-2211 of this process can be similar to the process of tattoo file generation described in relation to FIG. 19. Steps 2205-2208 are modified specifically for multi-color tattooing. These steps are described below.

In step 2205, different visual components of the artwork can be detected and analyzed, such as individual dots, lines, shaded or solid areas of different colors, and/or boundaries of these areas or features. The analysis may be performed in multiple stages and parts of the image may be masked off at each stage to avoid duplicate detection of features. Isolated dots on the image whose size are similar to the tattoo dot or needle size may be identified as individual tattoo dots and assigned a representative color or shade. Individual lines, boundaries of areas (e.g., shaded or solid areas of a certain color), or discrete features may be detected using, without limitation, one or more detection and tracing techniques. These visual features may be represented as line segments with spatially varying color, shade, and/or thickness. To represent the spatial variation of color, shade, and/or dimensions (e.g., uniform or varying thickness) along a line, a series of tattoo dots can be digitally constructed and placed along the line with varying spacing, color and dot size. The remainder of the image, such as areas of varying color or shade, or continuous areas of a solid color may be represented with a collection of tattoo dots using, for example, space-filling methods. Each tattoo dot (or group of tattoo dots) can be assigned a color which represents the color on the original image at the location of the dot. The step 2206 can output a collection of tattoo dots of varying colors, which visually represents the original artwork.

In embodiments of the tattoo machine which uses color mixing (e.g., methods i, ii), since the optical characteristics of the client's skin may not be known at the time of tattoo file generation, the targeted color can be assigned to the tattoo dots in the digital tattoo file. The appropriate mixing ratio of the primary colors (whether mixed before injecting on skin as in method (i) or mixed by overlapping punctures on the skin as in method (ii)), may be calculated during the tattoo operation, based on, for example, the measured skin characteristics and/or the optical model. The intra-session ink-mixing in real-time can be used to improve targeted color. The applied ink can be imaged and compared to a target color. The comparison can be used to control the color mixing (e.g., ratio of ink volumes, selection of inks, mixing method, etc.)

In one embodiment of the tattoo machine which uses the palette method (iii) for multi-color tattooing, the original image is segmented to a discrete set of non-overlapping zones with distinct colors. For example, given a desired number of colors, K-means clustering method may be used to assign each color in the original image, to an optimally chosen set of closest colors. Alternatively, given an available set of pre-defined colors of ink (the palette), the color of each tattoo dot in step 2206 may be changed by the nearest available color from the palette, based on a defined measure of distance in the color space.

In another embodiment of the tattoo machine which uses method (iv), each tattoo dot in step 2206 is replaced by a group of non-overlapping adjacent dots, each created with one of the primary colors of the preferred color model (e.g., CMY+KW), such that when viewed from a sufficient distance, the group of dots is seen as the desired color. As in method (ii), the amount of ink tattooed with each primary color may be adjusted by varying the number of punctures performed with each color. In calculation of the number of punctures for applying each primary color, the optical model is used to predict the appearance of the group of tattoo dots, based on the optical characteristics of the skin. However, as primary colors are spatially non-overlapping on the skin, the mixing of colors in this case occurs on the viewer's retina, at the stage of perception. A modified version of the optical model may be used in this case to predict the perceived color.

In another embodiment, a plurality of methods (i-iv) may be used with different portion of the tattoo area or a portion thereof. One or more steps of methods (i-iv) can be performed during tattooing to, for example, generate new dot data, optical models, etc.

Single Needle Cartridge Multi-Color Tattooing

At least some embodiments of the technology include changing the ink mixing supplied to the needle cartridge in order to perform tattooing in another color or shade of ink. Referring to FIG. 30, a system 2309 can include ink containers or cartridges 2311 may be fluidically coupled to a needle cartridge 2321 through ink lines 2323 fluidically coupled to a hub 2322, as presented in the embodiment 2320. The hub may include at least two liquid carrying tubes as input 2323 and a single tube as output 2324 that is fluidically coupled to needle cartridge 2321. Alternatively, all or some of the lines may be fluidically connected directly to the needle cartridge 2311 of embodiment 2310. The hub can be eliminated. A robotic tattooing apparatus with the system 2309 can include any number of ink containers installed prior to starting the sessions in order to complete a portion or entire tattoo. In some embodiments, the robotic tattooing apparatus can generate an ink protocol for a tattoo. The ink cartridge protocol can include, without limitation, ink container information, schedule for installation of in ink container, control settings, or the like.

This fluid system 2309 can be used to replace one fluid by another in the cartridge. For instance, one of the tubes can carry a first liquid to the needle cartridge; for example, for tattooing in a yellow ink. During this step, none of the other input tube provides liquid. Then, another tube can carry a second liquid to flush the needle cartridge and substantially replace the first liquid with the liquid from another tube. For example, the yellow ink can be replaced by black ink. The process of replacement includes the flushing of the residual first liquid by flowing the second fluid in excess. This excess of liquid, mixture of the second liquid and residual first liquid, can be flushed out the tip of the needle cartridge. This flushing step can be performed in a dedicated position of the tattooing mechanism, in order not to flush over the skin, or can be performed in any position on the exposed portion of the skin, relying rather on the suction mechanism to remove the excess liquid. Additionally, the needle oscillation may be performed against a cleaning apparatus (for example, a cleaning pad) in order to mechanically remove the residual ink trapped in or over the needle.

Alternatively, a third tube can be used to flush by using a flushing, cleaning, or diluting third liquid in between the application of two different liquids. For example, the first yellow liquid in the cartridge can be flushed out using a water and alcohol mixture third liquid before the second black liquid is introduced. Advantages in using a flushing, diluting, or cleaning liquid between liquid changes are to, (i) remove more residual first liquid using the cleaning action of a cleaning liquid, (ii) perform the flushing with a substantially less pricy substance, (iii) avoid staining the exposed portion of the skin by using a flushing liquid, and/or (iv) facilitating or promoting the suspension of non-soluble pigments.

In some embodiments, a hub can be used mixing of liquid at various rate of proportion. In this embodiment, multiple tubes may provide liquids to the cartridge at the same time and at various rates. The hub and output tube can provide a well-mixed mixture of liquid. This can be achieved by improving mixing (e.g., shear mixing and/or mechanical mixing) using a mechanical apparatus that may be actively or passively powered. Mixture of liquid in different proportions may be supplied to the needle cartridge. This mixing embodiment may or may not use flushing.

In some mixing embodiments, various ink colors within the cartridge can be mixed in order to produce another color. For example, yellow and blue ink may be mixed together to obtain a green ink mixture. Additionally, an ink color shade may be changed by dilution. In some embodiments, an ink is diluted using a diluting liquid. For example, a black ink may be diluted with a water-based dilution liquid to obtain a lighter shade of black, for example, a grey. Additionally, liquid with different properties may be mixed together to provide the benefit of each liquid. For example, ink may be mixed with a topical anesthetic substance to reduce the pain of the tattooing operation. Another property adjuvant may be added to a liquid to change its mechanical or chemical characteristics. For instance, viscosity and/or osmolarity can be influenced by the addition of adjuvant such as salts and soluble fibers in the ink to optimize the ink property to the portion of the skin being tattooed. For instance, the osmolarity may be varied based on the skin osmolarity in order to avoid the dispersion/resurgence of the ink due to osmotic pressure and other irritation process such as hemolysis.

With respect to FIG. 30, the hub 2322 in embodiment 2320 can be used for mixing substances. Optionally, an optical analyzer 2325 may be used to analyze and verify the resulting optical properties of the mixture (e.g., RGB color, absorption spectrum, etc.) in order to provide a particular color, color shade, and/or other characteristic. Liquid mixture can be visualized through an appropriate optically clear or frosted surface of the hub under adequate lighting conditions. If the color is off from the target color, the analysis by the optical analyzer can be used to, for example, (i) adjust (e.g., increase, decrease, etc.) the mixing duration before proceeding in order to remove previous ink residue, (ii) mechanically alter (e.g., mix, agitate, etc.) the mixture, (iii) adjust the mixing ratio (including adding additional substances) to reach the target color, and/or (iv) heat/cool the mixture. The measured optical properties of the mixture may be used within the optical model to predict the resulting color of ink as injected in the skin, and the mixing process may be controlled based on this model to achieve the desired resulting color.

At least some applications of the technology are in the application of multi-color tattoos. The ink color in the needle cartridge may be changed during the tattoo process in order to apply various colors to the skin. Using one or a mixture of halftoning, dithering and design decomposition, a target color or colors (e.g., ink color data) may be associated to each dot locations and added as an information in the dot parameter table. The process related to passing from one color to another in the needle cartridge is detailed in the description of the hub replacement of a liquid by another. This color change will result in the punctures resulting in different colored dots. The process of shifting color may be applied at different steps of the tattoo process. First, color may be shifted between the performance of a tattoo dot and the performance of another tattoo dot, if it is desired. For example, the process may involve performing three consecutive dots where the first and second dot have the same shade of black and the third dot is yellow. The machine may not change color between the performance of the first and second dot but may shift color to yellow for the third dot.

Second, color shift may be evaluated for groups of dots during the tattooing of a window of exposed skin. For example, during the determination of all the positions to be tattooed within the window of the contactor, the dots may be grouped based upon the color ink to be used and or mixed. Rather than alternating the ink used between each and every dot, the dot execution order is shifted in order to tattoo dots based on their color. Additionally, one may optionally perform dots of lighter color first in the order of shade to minimize the impact of cross-mixing of the ink used. For example, one window may contain three sets of dot colors and or shades: black, dark yellow and light yellow. Dots are classified based on their color and ordered such that only 3 changes of color need to be performed: for example, initially filling the needle with black, then dark yellow, then light yellow. For each color change, all the dots in that specific color within the window are performed until no dots remain. Optionally, the color order is performed from lightest to darkest, for this example, this means light yellow, dark yellow and black.

Third, and similar to second, the entire tattoo can be analyzed rather than the portion of the tattoo visible in a specific window. The tattoo process (e.g., process detailed in FIG. 17) is then repeated multiple time for subsets of dots, each time with a different ink color. Optionally, this process is performed from light colors to dark colors.

Regardless of the order in which the colors are applied note that multiple passes of color may be performed on the same dot position. For example, a dot may be first tattooed with 2 blue punctures and then tattooed with 3 yellow punctures. Additionally, the depth of each color pass may be different, for example, a deep white colored set of punctures on a dot with shallow yellow punctures on top. This may be used in combination with color mixing presented herein to provide different combination of colors and other effects such as highlight and relief within the tattoo.

In some instances, it may be advantageous to generate spot color within many hubs in real time as shown in embodiment 2330 in FIG. 30. Rather than continuously mix spot colors that may be used in the design, it may be advantageous to use multiple hubs each containing a different mixture of color matching specific spot colors of the design with any minute changes necessary from the multispectral and multimodal analysis of the skin. In this embodiment, valves (not shown) are used to alternatively connect the ink cartridges to a plurality of hubs. Mixing can occur within each hub and each hub can alternatively provide ink to the needle cartridge by a supplementary pumping system (not shown). This may allow to precisely mix certain inks within the hubs prior to flow in the needle cartridge and have more than one mixture at the ready without requiring a complete flush.

The mixing system presented herein allows to change the composition of the tattooed compound in real time. This change in composition may depends on the prescribed compositions in the tattoo design and/or the characteristics of the portion of the skin, particularly resulting from the multimodal and multispectral analysis of the portion of the skin and/or the puncture settings used for each tattoo dot.

As an alternative to the hub design for changing liquids, systems with more than one needle cartridge assembly may be used, where each needle cartridge assembly is used for different fluids and possess its own ink delivery system. Additionally, different needle types may be used for each needle cartridge assembly. For example, a shader needle can be used for large areas and liner needle can be used for smaller dots. Examples of such embodiments are shown in FIGS. 31A and 31B. This has the advantage of avoiding residual liquids in the cartridge after changing liquids but necessitate more than one needle cartridge mechanism.

Multiple modalities are possible for system with more than one needle cartridge. First, an array of complete needle mechanisms can be used, for example, as shown in FIG. 31A. In such an arrangement, the mechanism for actuating the oscillation of the needle as well as for varying the number of punctures and needle elongation may be replicated for each needle cartridge instance. The array may be organized radially, such that all the needle punctures occur in the vicinity of the same location, linearly such that all the mechanism are in a line or in 2D array such as the mechanism are distributed in both X and Y directions. Second, a single needle mechanism may be used with a replaceable needle cartridge. A tool change mechanism with a turret may be used to replace the needle cartridge and affix it to the same needle mechanism, for example, as shown in FIG. 31B. This approach has the advantage of being less constrained spatially and more needle cartridges may be used than with an array embodiment, but it may require a more complicated mechanism. One embodiment of the replaceable cartridge mechanism is a rotary tool switch as used for shifting magnification in microscopes where the rotation of the tool by a known angle engages a new cartridge.

Embodiments using more than one needle cartridge may use a separate set of dry punctures to be applied for each needle cartridge to account for variation in the needle length and sharpness when performing puncture event identification. Systems and methods for compensating for variations in the needle length using dry punctures in automatic tattooing are discussed in connection with FIG. 17.

Using more than one needle cartridge per tattooing head as discussed in relation to FIGS. 31A and 31B can accelerate execution of the tattoo since more than one needle may be operated at the same time. The process of shifting from one needle to the next can reduce or minimize the time necessary for shifting ink compared to the hub design. The number of color and shade may, however, be limited to the number of needle cartridges used.

Finally, at least some embodiments of the technology may use both multiple needle cartridges and a hub design for varying the fluid composition in each needle cartridge. This may have advantages over using either multiple needle cartridge or the hub design alone, by improving the execution speed and by allowing a large gamut of color and shades.

For example, a radial array of 5, 6, 7, or 8 needle cartridges may be used. Each needle possesses a hub with one color and a dilution liquid. The colors used in these cartridges may be Cyan, Magenta, Yellow, Black, White, etc. By using the hubs of each needle, each needle can achieve a dilution of their color and therefore various shades of this color. The radial array allows for very close puncture grouping to be performed with each of the colors thereby achieving color mixing of various shades on the skin.

Skin Texture Characterization

High resolution color images (e.g., RGB images of the skin (FIG. 27A)) can also be used to extract important characteristics of the skin by analyzing its texture. The texture of skin may be formed by various features on the surface, such as the sulcus cutis, crista cutis, epidermal papillae, etc. Components of the skin texture, such as folds, creases or wrinkles on the image may be detected using edge detection and line-tracing algorithms, and represented as interconnected line segments of with variable thicknesses. The statistical distributions of length, thickness, and/or orientation of these lines may be used to characterize different aspects of skin. For example, the spatial density and thickness of the lines may be used to estimate the accumulated UV damage. The distribution of line orientations may be used to characterize the skin's growth direction or anisotropy. The amount of stretching (or strain) over a region of skin may be estimated by comparing the spacing or orientation distribution of the line segments collected at different instances of time (e.g., before and after robotically probing the skin).

Skin texture may also be represented as a collection of edges and/or nodes to facilitate its searching within a large collection of skin images. Feature detection methods, such as corner, edge and/or ridge detection methods may be used to detect the edges and nodes formed by the skin texture, i.e., the points of intersection between skin folds, creases or wrinkles, or the edges along these features. The collection of points or edges may represent the skin texture, and digitally saved as a feature vector representing that portion of the skin. The feature vectors may be then used for digitally searching and finding correspondences between different collected images of the same portion of the skin. Image search or pattern matching methods, such as the scale-invariant feature transform (SIFT) methods or its variants, may be used to search and locate a portion of skin within a set of previously collected skin images or scanned skin textures, in a way that is robust to rotations, stretching and imaging noise. This methodology may be used to calculate the position of a robotic tattoo head on the skin using a machine vision system (e.g., machine vision system 1702 in FIG. 22), and thus eliminate the need for application and tracking of temporary fiducial markers on the skin. This method is described below.

Position and Deformation Analysis Based on Skin Texture

Natural features on the skin, such as skin texture (created by skin folds, creases or wrinkles), moles, hair roots, etc. could be used as fiducials for positioning of a robotic arm and its effector on skin with high-precision. This "positioning" is based on identifying the skin coordinates of a point on the skin, regardless of the deformation of the skin. These "skin coordinates" are with respect to a reference coordinate system which moves with the skin. FIGS. 5A, 5B, 6A, 6B, 7 described a positioning method which involves, (i) at the preparation stage placing artificially created fiducial markers on the skin, for example, using a stencil, then at the operation stage, (ii) detecting the artificial patterns on the skin by machine vision methods, and/or (iii) searching for the detected pattern within a digital reference pattern to identify the positioning and local deformation on the skin. The applicability of this method can rely on permanence of the stencil, which may not allow the operation to be interrupted and resumed at a later time, if the stencil is worn off. The following disclosure makes use of natural features on the skin (with or without stenciling) to significantly extend the time window of operation.

Figure 32A:
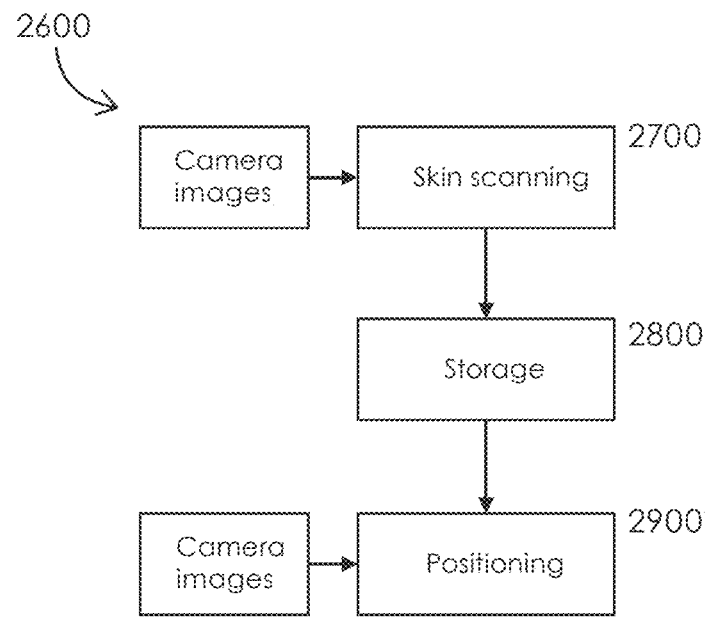
FIG. 32A shows a multi-stage process for positioning of a robotic head or effector based on natural skin features.

FIG. 32A describes a three-stage process 2600 for positioning of a robotic head or effector based on natural skin features. At skin scanning step 2700, a series of images of the skin are captured using a camera attached to a robotic arm or gantry-based actuation system. Image analysis and data processing may be performed at this step as explained in relation to FIG. 32B. At step 2800, images and any processed data is saved in a storage for later access during operation. At step 2900, positioning is performed using machine vision camera and the stored data from step 2800, as explained in relation to FIG. 32C.

Figure 32B:
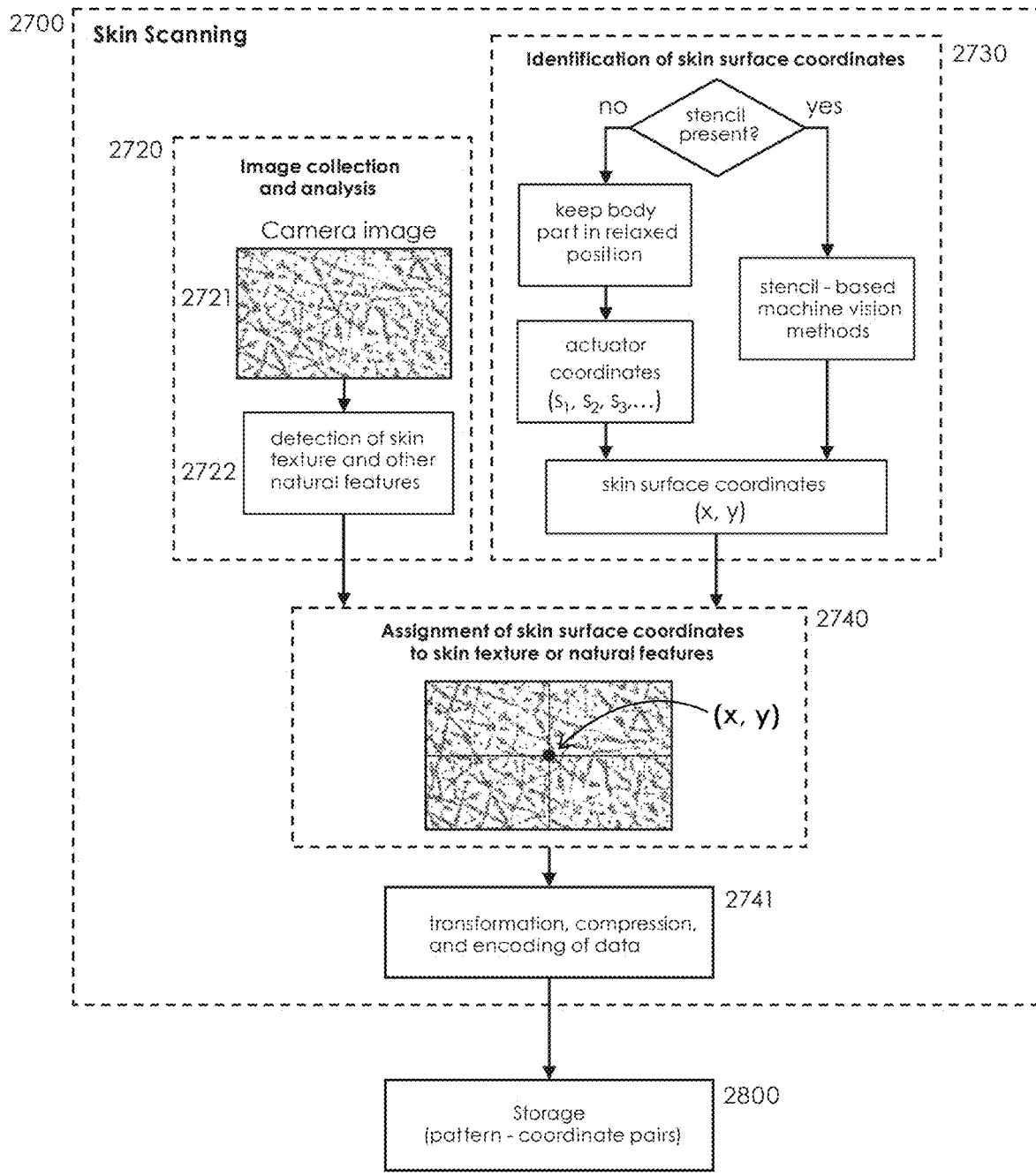
FIG. 32B shows a skin scanning stage for positioning of a robotic head or effector on skin based on natural features on the skin.

FIG. 32B shows an example of the skin scanning stage 2700 for positioning of a robotic head or effector on the skin based on natural features on the skin. In step 2720, a camera attached to the effector of a robotic arm or a gantry system is sequentially positioned on different parts of the skin to collect a series of images 2721 of the skin with high resolution. For example, imaging resolution of at least 100 pixels per millimeter of skin can be used to resolve the texture of the skin and to provide a precision better than ~10, 9, 8, or 7 µm in local positioning.

In step 2722, computer vision methods may be used to detect natural features on the skin and identify their position, shape, size, compositions, tissue characteristics, and other characteristics. These natural features may be skin texture (created by skin folds, creases, wrinkles, sulcus cutis, crista cutis, epidermal papillae, etc.), moles, hair roots, etc. Among these, skin texture forms a natural pattern which has a high spatial information density and shows high visual contrast on camera images, therefore it is the preferred natural feature to serve as fiducial markers for the positioning method described here.

In step 2730, skin coordinates corresponding to the collected image are identified, to be assigned to the features identified in step 2722. This step may be performed using various methods. For example, following the stencil-based positioning and deformation method described in FIGS. 5A, 5B, 6A, 6B, 7, a stencil which contains a certain pattern of fiducial markers may be applied on the skin prior to the operation, then machine vision methods described herein may be used to identify a mapping of skin coordinates (x,y) on the image. For a stencil-free process, the following alternative procedure may be followed. The targeted body part is held fixed in a relaxed state, while scanning 2700 is in progress. For each collected camera image 2721, geometric relations may be used to calculate skin coordinates (x,y) on the image, based on the position and orientation of the camera in 3D space, and optionally distance to the skin measured by additional sensors and methods. Position of the camera in 3D space may be calculated based on coordinates of the actuators used to position the camera and dimensions of components of the robotic arm or gantry system. In addition to actuator coordinates, an analysis of connectivity based on the overlapping skin texture of neighboring areas may be used to inform the calculation of skin coordinates. Alternatively, skin coordinates may be calculated and mapped onto the images by performing a connectivity analysis of overlapping skin texture images.

In step 2740, the natural features detected in step 2722 are assigned skin coordinates based on the output of step 2730. Spatial patterns formed by natural skin features, may be transformed into a representation that is convenient for a spatial search algorithm. For example, the skin texture may be represented as a set of lines, set of corner points, or a graph structure. The digital representations of skin features may be compressed to reduce memory requirements. The output of step 2741 is a digital representation of spatial patterns and features on the skin, and their associated skin coordinates. These pattern-coordinate pairs are saved in a storage unit 2800. This data may be digitally encrypted before storage to protect the client's biometric information.

Figure 32C:
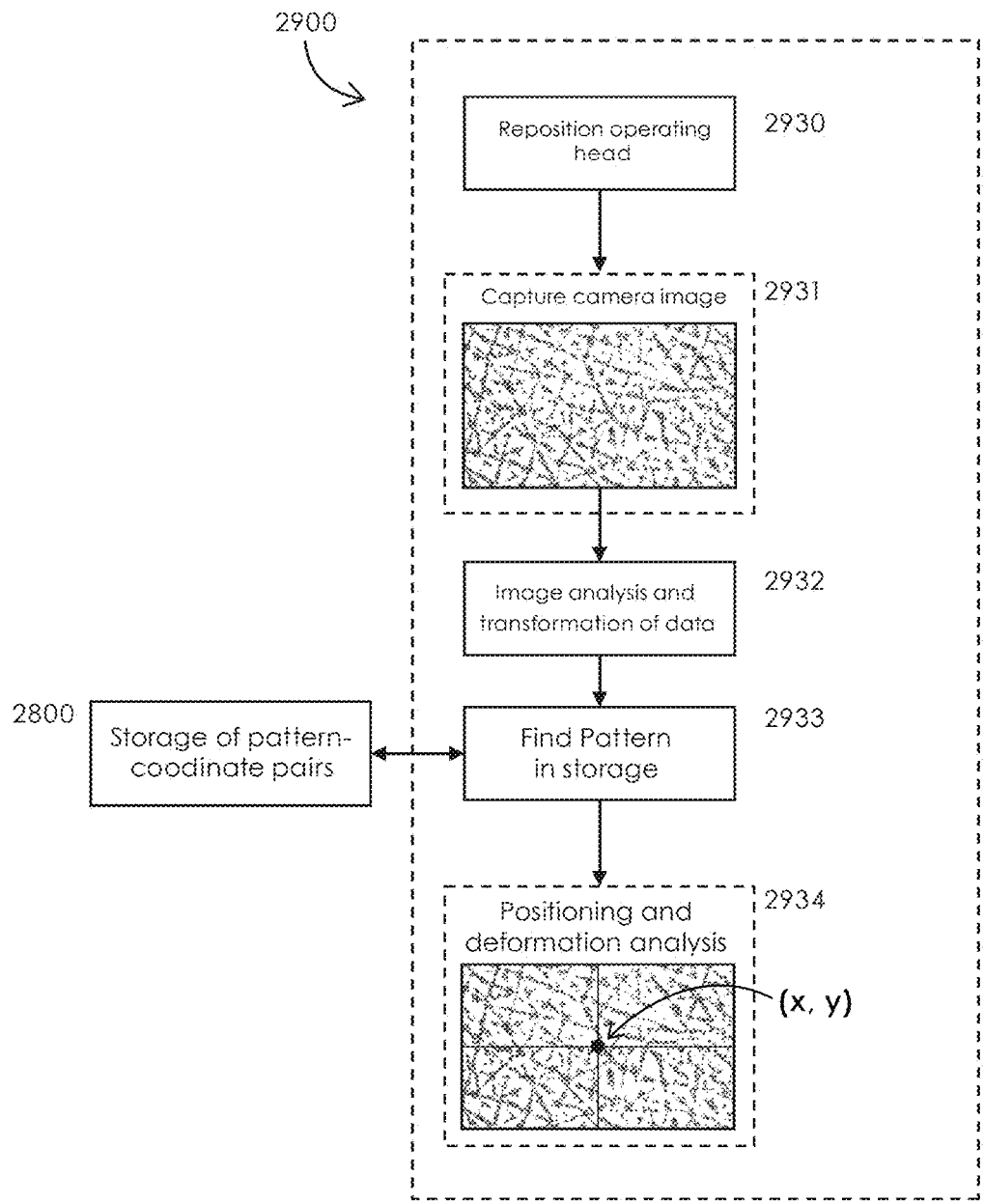
FIG. 32C shows positioning stage for positioning of an operator head on the skin based on natural features on the skin.

FIG. 32C shows an example of the positioning stage 2900 for positioning of an operator head on the skin based on natural features on the skin. In step 2930, a robotic arm or gantry-system positions the operating head on the skin. As described in relation to FIG. 22 the operating head may be equipped with a contactor system 1704 to stabilize the skin surface with respect to the operating head. In step 2931 camera on the operating head captures a photo of the skin. In step 2932, computer vision methods may be used to detect natural features on the skin and identify their characteristics, such as position, shape, and size. Spatial patterns formed by these features, may be transformed into a representation that is convenient for a spatial search algorithm. In step 2933, the detected and transformed patterns are searched for in the storage of pattern-coordinate pairs 2800 which was previously generated at the stage of skin scanning 2700. At step 2934, the skin coordinates assigned to the features of the best-matching pattern are used to identify the skin coordinates of the corresponding features on the camera image. Skin may be locally deformed due to the contact of the contactor or another component of the operating head. By comparing the positions of the features on the camera image 2931 to those in the best-matching pattern in the storage (which represents the relaxed, non-deformed state of the skin), the local deformation field on the skin may be calculated.

Integrated Edge Suction System for Contactor

Figure 33:
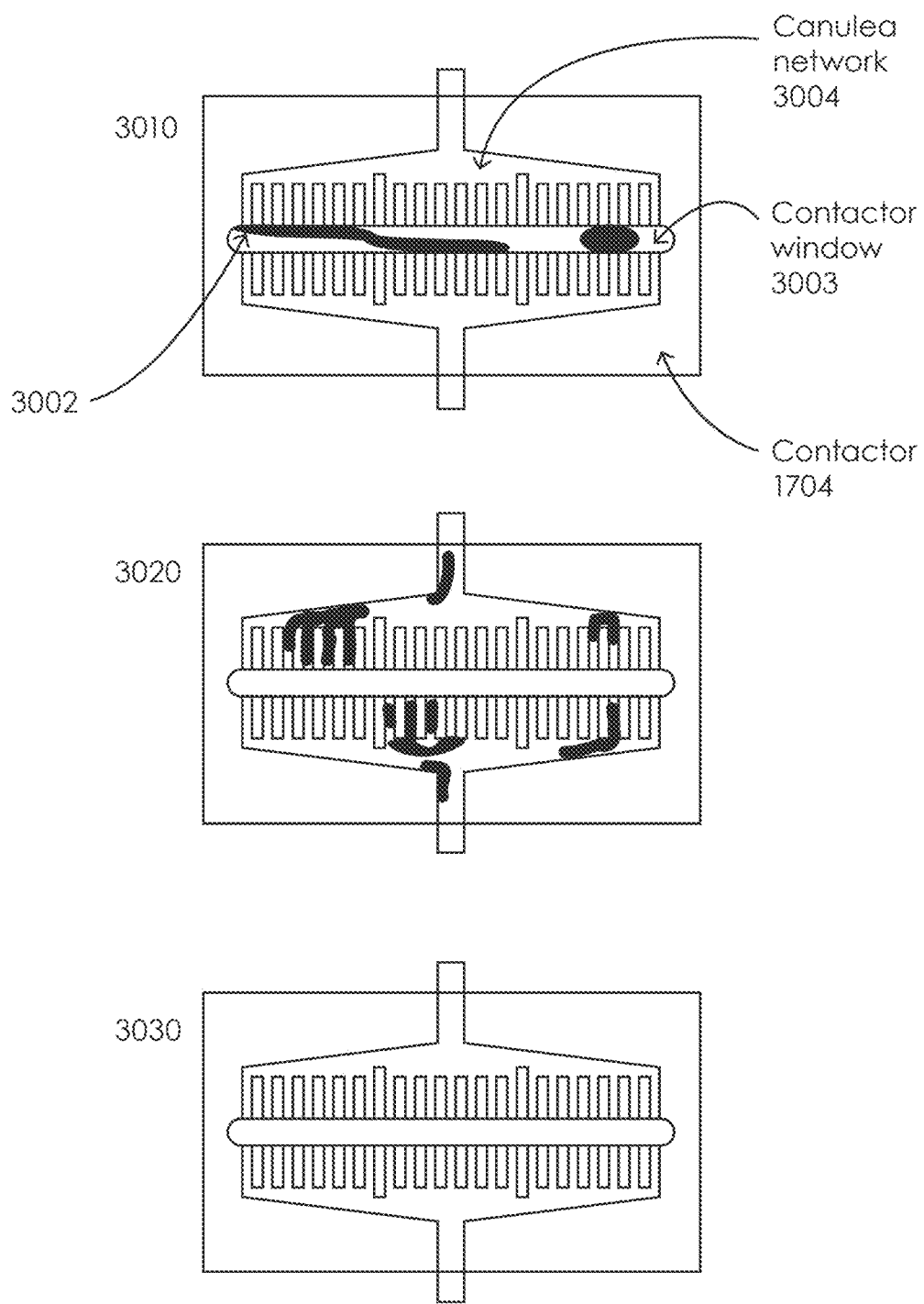
FIG. 33 shows methods of edge suction for contactors in accordance with embodiments of the disclosure.

At least some embodiments of the technology relate to the usage of edge suction for the contactor, as shown in FIG. 33. Edge suction may be an advantageous complement to a suction nozzle in the vicinity of the needle. The liquid adhesion on the edge of the contactor 1704 may allow excess liquid 3002 to remain in the window 3003, even after the passage of a cleaning step using a suction nozzle. Integrating a capillary or other canulae network 3004 to the edge of the contactor 1704 and applying suction may enhance the efficacy of excess fluid removal. FIG. 33 illustrates the operation of such a network within a contactor. In 3010, excess fluid, composed of ink, lubricant, blood, or other is present in the window of the contactor. When applying a vacuum to the capillary network, the excess fluid may be pumped within the network as shown in 3020 and subsequently removed from the window of the contactor as shown in 3030.

Contact Force Variation to Vary Friction During Movement of Contactor

The contactor embodiment can be held in contact with the skin using a prescribed force or predetermined force profile (include a force range) to maintain contact with the skin for a desired period of time (e.g., at all times). The applied force can be high enough to keep the edge of the window in contact with the skin and restrain small movement of the client while being sufficiently low enough to allow for blood perfusion of the portion of the skin subjected to the force. In some instances, the force applied to the skin may lead to an increase in the friction between the skin and the contactor. This friction may be high enough to impact the movement of the contactor during the sliding phase of the contactor over the X axis. Indeed, the friction resulting from the applied force may result in the skin being pulled during the movement over the X, rather than the contactor sliding on the skin. In some embodiments, a varying force can be applied to the skin by the contactor in order to have high force ensuring good contact of the window during tattooing, when the contactor and the skin are static relative to each other and low force insuring good slide during the movement of the contactor over the skin. The force for sliding may be tailored for a specific skin characteristic by measuring the slip condition with the optical sensor. Similarly, the complete contact across the lip of the contactor window during tattooing may be measured using the optical sensors and the height measurement laser system. Alternatively, the force for both slide and contact may be prescribed by the operator or by an ad hoc method. These measurements are then used to tailor the force to be applied. This may be performed by varying the pressure of the pneumatic system used in the pad on which the portion of the body rests, and to put the portion of the body in contact with the contactor, resulting in a variation of the force applied by the contactor to the skin. Alternatively, or concurrently, a mechanism could vary the force of the contactor applied to the skin, using a force-controlled actuation of the tattoo head to move toward the portion of the skin or away from the portion of the skin, inducing varying amount of force. Such a force may be measured in a feedback loop to insure the force-controlled actuation of the mechanism.

A mechanism associated with the contactor embodiment is therefore used to vary the force applied to a portion of the skin. Optical or laser sensor may be used to tailor the force to be applied for slide or good contact during tattooing. The force for slide may be less than the force applied for maintaining the skin during tattooing.

Bagging and Disposables

The tattoo apparatuses and systems presented in this disclosure can be used for the application of a tattoo on a client or subject. The process of tattooing pierces the skin of the client, exposing the client to contamination from the tattoo system, the rest of the tattoo environment and the operators or other individuals, and reversely, exposing the tattoo system, tattoo environment and individuals to contamination from the client. This cross contamination is mitigated or avoided in different parts of the disclosure by limiting interactions between the client and the rest of the environment and by aseptic practices. Some of these practices relate to the use of disposables for parts exposed to the client's tattoo area directly and indirectly.

In particular, objects in direct contact with the tattoo area or any fluids can be single use or sterilizable. This includes, for example, the needle cartridge, the contactor, liquid system for providing fluids to the needle cartridge, suction line, and skin electrodes. These objects can be sterilized prior to use in order not to expose the client to any contaminants and discarded or saved for sterilization after use.

Figure 34:
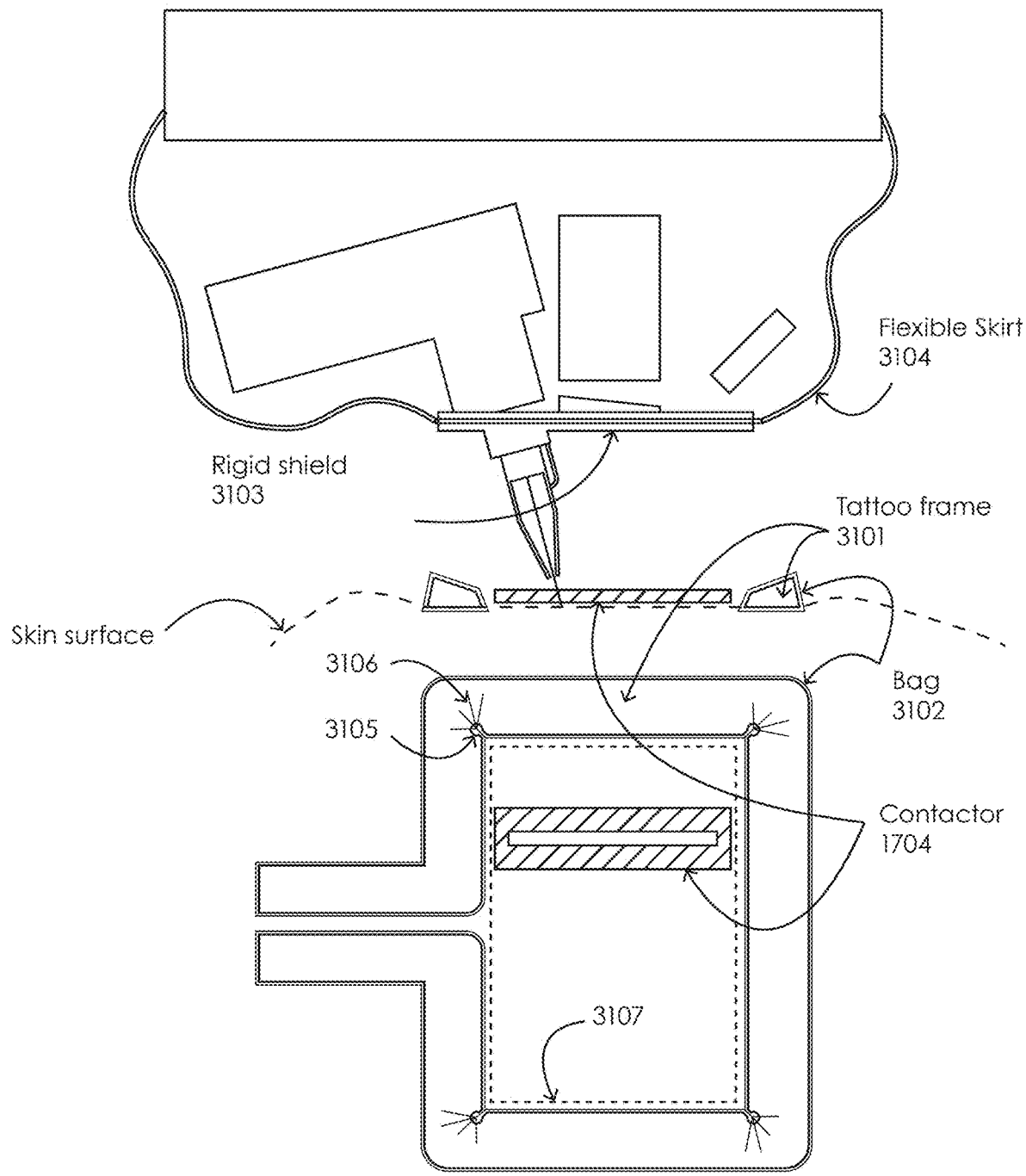
FIG. 34 shows some of the bagging, disposable or sterilizable components of the system for the prevention of cross-contamination in accordance with embodiments of the disclosure.

Some other part of the system can be in indirect contact with the tattoo area or any fluids. In particular, interface surface with objects in direct contact, surfaces that may be in contact with aerosolized or splash liquids and to a lesser extent, any surfaces that the clients or the operators are in contact with, or interact with. Temporary barriers are used for that purpose which may or may not be sterilized prior to use. In particular, the tattoo chair is covered with a single use surface. FIG. 34 illustrates a tattoo frame 3101 (side view and top view) that is bagged with a tubular bag 3102 to avoid direct contact as in FIG. 34. The needle mechanism, gantries, machine vision, lighting system, and other optical and laser sensor are separated from the tattoo area, the contactor and the needle cartridge by a rigid shield 3103 and a flexible skirt 3104 as in FIG. 34. The rigid shield 3103 may be a single use or sterilizable component. The rigid shield 3103 can include a rigid frame with one or more view ports and apertures sealed by flexible membranes. In some embodiments, it includes a membrane sealed aperture that serves as a sterile interface between the needle cartridge and the needle mechanism. The view ports can include optical components for the observation and/or lighting of the tattoo area. The shield 3103 can accommodate the interface of the needle cartridge with the rest of the mechanism in an aseptic manner and to facilitate observation and illumination in a way that is not possible through a flexible membrane. The edge of the shield can include an attachment feature (e.g., a groove, a notch, etc.) for the attachment of a flexible skirt 3104. The flexible skirt 3104 ensures the continuation of the protection from cross contamination past the edge of the shield 3103 and protect the rest of the gantry mechanism from the tattoo zone to the safe zone. The other edge of the skirt may be connected to appropriate attachment on the machine. The other property of the skirt 3104 is that it can accommodate the actuation of the gantries and other mechanism without restriction due to its flexibility. The skirt may contain another aperture for accommodating a fork responsible to hold the contactor in contact with the skin. The fork may be bagged separately to provide an aseptic interface between the contactor and the rest of the machine.

At least some embodiments of the technology relate to a vacuum bagging method for parts where precise tolerancing and reduction of folds in the flexible barriers is of interest. For instance, the tattoo frame and contactor fork may need precision and fold reduction in the flexible barrier. FIG. 34 shows an embodiment of the bagged frame 3101. The frame geometry is optimized to receive a flexible barrier in the form of a tubular bag. Vacuum bagging may involve the removal of air within the flexible barrier to form a tight, profile conforming barrier. Note that for the avoidance of folds, it may be necessary to accommodate relief in the geometry to constrain folds to locations that do not impact tolerancing. For example, the frame 3101 can include relief circular cuts in the corners 3105 such that the folds 3106 can be constrained outside the tattoo frame area 3107.

Other disposable barriers may be used before, during, and after the tattoo process. This involves primarily PPE (Personal Protective Equipment) for the protection of both the clients and the operators, on the surface of any interfaces that requires contact such as screens, seats, etc. and the area of the client's body surrounding the tattoo area, for instance, by using adhesive windowed drapes.

Disposable and bagging procedure are optimized to remove operator error. For instance, all the components of the tattoo system that are either sterilizable or disposable, including consumables such as ink lubricant, antiseptic, gauze, and dressing and such may be provided in the form of individual sterile packages or kits such as a tray containing all the components necessary for one tattoo procedure. A checklist may be devised to keep track of the right order of assembly into the machine and for removal which minimize disposable and bagging errors. The tattoo system may have mechanism to check the quality of disposable component and their proper assembly or function. The assembly may be performed before client interaction to minimize disruption of the process, and similarly, removal can be performed after interaction with the client. Potentially exposed surfaces may be wiped down with antiseptic solution after tattooing to provide a final protection. Airflow in the tattoo location may also be optimized to maximize replacement and filtration in order to remove any potential aerosolized contaminants from the air. UV, ozone or H2O2 may be used to decontaminate the room after use and antibacterial paints may be used on surfaces to limit bacterial growth.

Touchless Tattooing Process for Minimizing Risk of Cross Contamination

Human-operated tattooing for effectively eliminating or minimizing cross contamination may involve proper usage of gloves, sterilization of hands, surfaces, tattooing tools, and handling and disposal of disposable parts. The automatic tattoo machine, its operation and client experience can also minimize or eliminate the risk of cross contamination, as explained in the subsequent paragraphs.

First, the operator prepares the tattoo machine and the tattooing environment. The tattoo machine uses detachable parts or components, which may be disposable (single use), or sterilizable (multi-use) parts, as discussed earlier. The disposable parts may be ordered and packaged in a single sterile container as a kit. The sterilizable parts are sterilized prior to each tattooing session and stored in appropriate packaging. After installing the detachable parts, the tattoo machine is bagged with a disposable bag 3102 and a vacuum system may be used, as explained in relation to FIG. 33.

Next, the tattoo design associated with the client's booking is retrieved from the tattoo marketplace and displayed on a screen for the initial confirmation. The process of identifying the customer and their booking, and retrieval of the design may be performed automatically by a software, by scanning a barcode or QR code, which may be delivered to the client at the time of booking confirmation. After the client confirms the design on the display, they may enter the tattooing environment. The placement of the tattoo on the desired body part is previewed. If available, the placement initially selected at booking is also retrieved from the booking data. To determine whether the body part is compatible with any geometric restrictions of the tattoo machine, physical measurements, reference templates (e.g., tattoo frame or contactor), or a contact-free method (e.g., LiDAR-based, or light projection-based) may be used to measure the geometry of the body part (e.g., its size and curvature). The tattoo design may be resized (e.g., made smaller) based on these measurements. Augmented reality-based methods described herein may be used to preview, modify and confirm the placement of the tattoo on the desired body part. Alternatively, the design may be printed on a transparent surface (e.g., Vellum paper) and placed on the desired body part to preview the tattoo design, and to choose the desired tattoo size and positioning. The client may approve the design, it's positioning, and e-sign any consent forms, disclaimers, or legal statements, electronically via a display device, e.g., a touch-screen. The confirmation may be registered by, for example, scanning client's personal barcode/QR code, acquiring biometric data of the client, or clicking a button on the touch-screen. To avoid cross-contamination, any physical interaction with user interfaces (such as touch-screens) may be performed using a disposable stylus, or contact surfaces may be covered with transparent, touch-sensitive, disposable covers.

If the tattoo design needs to be re-sized to better fit the desired body part, the process of artwork to tattoo design conversion (FIG. 29) may be repeated to produce a tattoo design with the desired size. After obtaining the revised digital tattoo file, it may be saved in the client's profile, and the preview and electronic approval process described above is repeated. If the intended location is not suitable for the tattoo (e.g., skin has scarring, irregularities, etc.) a new design may be selected and/or a new location identified to apply the tattoo. The client may also electronically reject the tattoo application.

After previewing, if the client does not wish to proceed with the initially selected design, an AI algorithm may be used to propose alternative tattoo designs the client may prefer. This AI-based prediction of alternatives may be based on similarity to the initially selected design, and/or based on the client's customer information (age, gender, interests, etc.), previous tattoo purchases, tattoo market place browsing history, favorite designs, saved design, followed artists, etc.

While performing any revisions described above, the price of the tattoo may be automatically recalculated and displayed on a screen for the customer to review. The price may be calculated based on, for example, the tattoo size, number of dots, time of operation, ink consumed, body part, tattoo scarcity, tattoo popularity, etc. Details of calculating the price of a tattoo will be below in relation to the tattoo selection process. After the client's approval, a new digital token is generated to reflect any changes in the tattoo, and the old token is voided.

After electronic approval of the tattoo design and its placement, the client's skin is prepared for tattooing. The operator shaves the area of the intended tattoo on the skin and any areas where electrodes 117 (FIG. 1B) may be adhered. The skin is disinfected using procedures common in tattooing such as wiping with alcohol. The client assumes a natural pose, and while the skin is in a relaxed (non-deformed) state, a stencil may be applied (e.g., step 530 in FIG. 9) to guide machine vision methods. Alternatively, natural fiducial features of the skin may be scanned in a relaxed, non-deformed state, at that point. As discussed earlier in relation to FIGS. 5-A, B, the stencil may contain, in addition to fiducial markers for guiding machine vision, an outline of the tattoo design indicating the overall shape and position of the tattoo for the client to review. The client electronically approves or rejects the stencil application and the final tattoo positioning, via a mobile app, a tablet device, or other interface in the tattooing environment. The electrodes are placed on the subject prior to starting the tattooing operation.

The digital token generated earlier by the client's approval is loaded into the tattoo machine, by scanning a barcode/QR code, or using another interface such as touch-screen. The tattoo machine validates the digital token which may provide access to the digital tattoo file and authorize the execution of the tattoo. Validation of the token may also be used to cryptologically count or track the number of times the design is applied as a tattoo, and thus provide an encrypted and trusted royalty tracking method for artists.

Prior to starting the tattooing operation, the operator loads the tattoo machine with the appropriate tattoo inks required by the tattoo design. Tattoo inks may be available in pre-packaged ink cartridges or containers, which may include electronic components used in identifying their content. The digital tattoo file may contain a list of required inks, where inks are represented by color names, part numbers, IDs, etc. The tattoo machine may automatically verify that ink cartridges required by the design are appropriately loaded, by reading cartridge identifier chips or by optical analysis of each ink.

The payment may be processed automatically when the tattooing operation starts or when the tattoo process is completed. The payment may also be processed pending any unforeseen issue or objection by the client.

After completion of the tattoo, the machine notifies the operator. Automatically or upon confirmation by the operator the tattoo machine may retract the tattooing head and/or any components supporting the body part such as the frame 3101 or the contactor 1704.

Industry-standard or customized procedures may be used to clean and dress the tattooed area, which may exhibit minor bleeding, skin trauma, etc. due to the operation of the tattoo needle. Prior to dressing the tattoo with appropriate covers, photos of the tattoo area are taken which may later be used for advertisement, traceability, and/or evidence for liability purposes. The operator removes and disposes the single-use components of tattoo machine including any bagging, and prepares sterilizable parts for sterilization.

During healing of the tattooed skin, which may take several weeks, the client may capture and upload photos of the tattooed skin using the mobile application. The mobile application may display periodical notifications on the mobile device to remind the client. The uploaded photos are used to track the healing progress. Artificial intelligence or computer vision methods may be used to automatically identify problems in the healing process, provide care advice, etc. A human expert may also review the healing process based on the collected photos, or at periodic in-store visits. Tele-care may be provided on demand by a trained tattoo operator.

Selecting Tattoos Based on Existing Art

A marketplace that may be accessed by, artists, design license holders, and the clients wiling to, for example, receive a tattoo or offer a tattoo as a gift.

The selection of design may be performed on a dynamically updating portal, access by personal computer, mobile platform such as a smartphone, virtual reality, or augmented reality apparatus.

The client may be required to login prior to browsing or rather prior to buying the art. The login may contain the user personal information such as their email address, name, identification document, payment implement, or other personal information. The history of browsing through the art may be saved as well, such as a liked or bookmarked art or artist. The history of previous session, containing applied design and information about the previous tattoo session. The current active bookings may be available for browse in the client login menu. Part of the information on browsing or about previous session may not be shared with the client and may contain metadata. For instance, the time spent on looking at a tattoo design from the database may be added in the browsing history and saved without showing in the user's accessible browsing history. This information is stored for the purpose of creating a user interaction model in order to maximize client satisfaction and tattoo session booking.

The client may browse the collection of databases of tattoos using a search engine. The order and rank of the displayed tattoo design depends on multiple factor: (i) the search engine keyword or filter input by the client; (ii) the personal information of the client; (iii) the history of browsing of the client; (iv) the existing tattoos received by the client; (v) the previous search parameter input by the client; (vi) the preference of the friends or networks of the client; (vii) the client user iteration model, and/or (viii) the curation provided by a content curator.

The content presented to the client is optimized using AI and machine learning in function of these inputs in order to maximize client satisfaction and tattoo session booking. The user engagement with the platform is used as a reinforcement variable to provide training data to the AI/ML algorithms. The AI/ML algorithm may in turn influence the composition of the displayed tattoo design as well as the displayed price for a certain tattoo in order to promote tattoo booking. The behavior of the AI/ML algorithm may be influenced by macro trend in the client's behaviors and by curation efforts. The AI/ML algorithm may classify clients or art based on the client taste using classification methods in order to provide targeted content that may not be directly related to browsed content.

Alert and notifications may be used to display promotional content to the client as well as new art created by a favorite artist, favorite tattoo design change of attributes, tangential to favorite art or browsed content, specifically selected by a curator, or specifically selected by AI/ML.

The tattoo database may therefore be periodically or constantly evolving and its accessible or visible part by the client may be changing based on client taste, macro trends, and/or curation effort in other to maximize client retention.

Specific tattoo design may have attribute that can be browsed by the client. In particular, a design may have a description of its content or artist, may have a certain scarcity or limited time availability, may be tattooed in various limited sizes or placement and may have metrics related to its execution, price, or popularity.

The tattoo design description may provide insight into the creative process that resulted in the design. The artist description may provide a glimpse of the artist stylistic genre, career and ambition. This is crafted to enhance the appeal and meaning of the tattoo design.

Scarcity and limited availability of a tattoo design can reflect the artist or company willingness to limit the availability of a certain design. This is done in order to enhance the rarity of a design an make it more exclusive. A tattoo design may not be scarce, tattooed an unlimited amount of time, of have limits such as 10,000, 1,000, 100, 10, 1, and so on. When a tattoo reaches its scarcity limit, the tattoo may not be available for booking anymore but may still be displayed in the database. The exact number in a limited series may be displayed and provided with a certificate (e.g., digital certificate, physical certificate, etc.) to the client. Scarcity may influence the cost of a tattoo. Limited time availability designs may not have a hard limit but may be seasonal, meaning that the tattoo can only be booked between certain dates. This is performed to enhance booking numbers in some periods.

Tattoo design size may be specified for best results, user defined appearance, etc. Since that tattoo needle has a non-zero size, it may be impractical to execute a tattoo at a particular size under which the resolution of the tattoo would be too low. There is also a maximum size for which the tattoo would either be larger than the machine tattoo size, would take too long to execute, or cannot be properly wrapped around a body part. It may therefore be practical to restrict the availability of size for certain design. This can be done by having a maximum and minimum size or by having precalculated size. The rendering of the tattoo design into a tattoo process commands may be performed in real time to provide a high-fidelity rendition of the final result to the client. For instance, and since the needle has a finite constant size, the rendition of a tattoo in dots coordinates that are executable by the tattoo machine may result in minute differences between the tattoo design and the executable design. The rendering engine allows for an accurate rendition of the executable design. Precalculated rendition may be of interest for certain size as this allows for manual correction of the final design by an artist prior to rendering. Rendering correction by an artist may be provided with delay to the client. The tattoo size may also be limited by the location on which the tattoo is to be applied. Indeed, large tattoos may not be performed on area of the body that do not have enough area.

Tattoo design may display information about their execution, for example, once the tattoo size and location are designated, the amount of time, number of dots and price may be presented.

The number of dots or punctures to be performed can calculated in near real-time, real-time, or precalculated based on the size of the tattoo. Larger tattoos will typically result in larger number of dots.

The tattoo execution file, derived from the size and the design, together with the tattoo location allows the platform to calculate the approximate duration of the tattoo session. The tattoo location will indicate the preparation time to prepare the client to receive the tattoo based on previous experience. The tattooing process depends on the tattoo execution file and the required number of dry punctures, wet punctures, needle cartridge or color change, and/or overall actuation to realize the tattoo.

The price of the tattoo may depend on a variety of factor associated with the design specifics, client specifics, period when the tattoo is booked, occupancy of the tattoo shop, and/or promotional or sales events. The base price of the tattoo may be defined based on, for example, one or more of the tattoo scarcity, its size, location, the specific deals with the owner of the design license, and/or the minimum pricing for any tattoo. The client's specifics can denote the willingness to pay of the client or client specific discount may be necessary to realize a transaction. The period when the tattoo is booked may lead to limited time offers or pricing. The occupancy of a tattoo shop may lead to price surges or discounts. Sales or promotional events may further discount the price of the tattoo. Additionally, the popularity of the artist may influence cost.

The popularity of a tattoo may be determined based on the number of times it was marked as favorite by other clients or the number of times the tattoo was executed.

As an alternative to selecting an existing tattoo, a customized tattoo may be generated before selection.

Selecting Customized Tattoos

The booking system may be used to generate and book customized tattoos, which may include designs introduced by the customer, or new designs created by an artist based on consulting with the customer.

Designs may be introduced or proposed by a customer for example, by uploading to the system via internet, brought to the store in digital storage device or in hardcopy form to be scanned, or generated by the customer using a design editor which may integrate desired text and images provided by the customer. Proposed designs may be subjected to automated checks before booking, such as spell-check, detection of hate speech, sign, symbols, detection of copyright infringement, as described in the subsequent paragraphs. Similar to the processing of existing tattoo designs discussed earlier, the customer may fill out a form or use a graphical interface to indicate the preferred location of the tattoo on the body or use an augmented reality system to preview and select a placement for the tattoo. The time to execute the tattoo and the price of the tattoo are updated and displayed on the user interface, based on the proposed tattoo design and options selected, such as the size and placement of the tattoo. Before tattooing, proposed designs may be also reviewed by a human to ensure the tattoo result will be aesthetically satisfactory, or to assess any execution risk e.g., in terms of copyright infringement, presence of hate speech, signs or symbols, or client's health and safety.

Tattoo Designs with Custom Text and Lettering

A custom lettering system allows customers to create tattoo designs that contain text of their choice. Through a user interface, the customers may edit the appearance of the text, by choosing its size, color, styling (e.g., bold, italic, shadows, borders, etc.), kerning, spacing, orientation, etc. Fonts may be chosen from a prepopulated list, which may include publicly available fonts, externally licensed fonts, or proprietary fonts. Text is searched in the hate symbol database and based on the search results appropriate actions are taken, as described in following paragraphs. A spell check tool may be used to suggest corrections to the user.

The text may be manipulated and stored in memory as vector-based graphics, or as raw text data combined with styling data. At the stage of finalizing the design, the stylized text is converted into a dot-based tattoo design and saved into a digital tattoo file, using the process described in FIG. 29.

Computer-Generated Tattoo Designs

Computational techniques may be used to automatically generate aesthetically pleasing tattoo designs within the custom design user interface. Probabilistic methods may be used, for example, Gaussian Stochastic Fields or linear function spaces (e.g., Fourier space, polynomial space) with random coefficients to create random surfaces with a variety of smoothness levels. Procedural generation techniques may be used to generate designs which contains, for example, trees, leaves, flowers, terrain, water surface, textures, and patterns etc. Geometric or abstract tattoos may be generated by creating multiple geometric shapes, such as rectangles, circles, triangles, dots, lines, polygons, meshes, graph structures, etc. with randomly-determined dimensions, shape parameters, and orientations, and then combining them to form a tattoo design. Recurrent Neural Networks (RNNs) may be trained on large datasets of visual artwork, and probabilistically generate new tattoo designs. The type of design generation process may be chosen by the user within the interface. User interface allows the client to adjust certain parameters of the random generation process, such as smoothness and variance of surfaces, average number, size, or density of geometric objects, the palette or theme of colors, etc. The user interface includes a button to automatically generate and preview new designs based on the parameters of the process. The user may re-generate multiple designs until a desired design is achieved. The user may save parameters of the random generation process and any designs generated by the process, in their profile for later access. Using the interface, the client is able to schedule a booking for a generated design. When finalized, the design is converted into a dot-based tattoo design and saved into a digital tattoo file, using the process described in FIG. 29. The data disclosed herein used by the tattoo machine and tattoo generation information can be contained in a tattoo puncture setting map associated or linked (e.g., based on ID code, client name, etc.) to the tattoo.

Detection of Hate Speech, Signs, and Symbols in Tattoo Designs

A database of multi-lingual and multi-cultural hate speech, signs and symbols may be used to identify any components of the proposed design, such as text or images, which may be associated with hate symbols. The database may also have levels of public recognition or context information associated with each item. Optical Character Recognition (OCR) techniques may be used to recognize text in proposed designs and search in the database. Image recognition or labeling techniques, e.g., based on deep neural network models, may be used to identify objects, gestures, and actions on the image of the proposed design and perform a search based on such contextual information. Image search techniques may be used to find instances of hate symbols in the proposed design. Identified matches are assigned a risk level (e.g., 0, 1, 2, 3), based on the degree of match with the hate sign or symbol, the location of the design on the body, the degree of public recognition of the matched sign, etc. Different actions are taken automatically based on the risk level. For example, level 0 indicates no concern and the client may proceed with booking. Level 1 indicates small potential risk, and client is allowed to proceed with booking after reading a disclaimer and agreeing to terms, etc. Level 2 may indicate moderate risk, and the system requests an explanation from the client and submits the case to a human reviewer. Level 3 refuses the proposed design and may explain the reason for refusal. The number of levels, criteria for levels, and settings can be selected based on the ability to detect and quantify risk.

Detection of Copyright Infringement in Tattoo Designs

To prevent infringement, the proposed designs are automatically compared to a database of copyrighted visual artwork and trademarks. The entire design or a portion of it may constitute copyrighted material, which may or may not result in infringement. Feature detection methods (such as scale-invariant feature transform (SIFT), maximally stable extremal regions (MSER), etc.) may be used to search for correspondences between the image of the proposed design and the database of copyrighted visual art. Alternatively, APIs of external database providers may be used to execute the search queries. If matches are found, risk levels may be assigned to the proposed design based on the degree of similarity and context. For example, a risk level of 1 may be assigned for a negligible level of overlap of design components, or overlap that is consistent with fair use or transformative use of artwork. This level may allow the client to proceed with booking after reading a disclaimer and agreeing to certain terms, etc. A risk level of 2 may submit the case to a human reviewer, who may decide whether infringement is possible or may seek to obtain a license for the artwork. The booking system may also automatically initiate a licensing process. A risk level of 3 may be assigned if licensing is not possible or is not feasible. In this case the proposed design may be refused for tattooing.

Booking a Session for the Selected Tattoo and Checking-In to Tattoo Studio

Once a tattoo is selected or generated, a client may select a tattoo for preview. Tattoo design may be tested using different methods: (i) the tattoo may be tested using augmented reality AR, (ii) a printable version of the tattoo may be printed by the client for size test, (iii) a non-permanent tattoo may be ordered for testing, (iv) a non-permanent tattoo file may be provided for tattooing with a non-permanent tattoo machine.

Augmented reality may be used for visualizing a tattoo digitally added to a static image or to a real time feed from the camera or webcam or a personal computer, tablet or phone. When available on the device, depth is estimated using the onboard Lidar or stereoscopy to identify depth. This allows to properly size the design on the area of the body where the tattoo design is to be digitally projected. In the absence of Lidar or stereoscopy, a fiducial of known size may be added to the image such as a transferable marking, gluing a printed fiducial on the area of interest, or using an object of everyday as a reference, for example a penny stuck on the skin as a reference. Computer vision methods may also be used to identify a body part (e.g., forearm, ankle, shoulder, etc.) and estimate its boundaries, 3D geometry and perspective, based on the image(s) captured by the device, in order to automatically adjust the size and perspective of the previewed tattoo design. In the absence of any reference marking or depth or size information, the design may be projected without respect of scale. The user may then manipulate the image to change the tattoo size, position, or orientation in the augmented reality space.

Printable version of the tattoo may provide a good representation of the size of the final tattoo and can be cut around its contour to physically test placement.

Non-permanent tattoos may be ordered for a fee or free of charge to be delivered at the client's location for tattoo test. The client can then transfer the non-permanent tattoo to a location of interest to test the tattoo in as close a condition of a permanent design as possible.

A non-permanent tattoo file may be downloaded for a fee or free of charge to be loaded in a non-permanent tattoo machine or printed over a transfer paper. Non-permanent tattoo machines directly print the design over the skin, such as the Prinker® printer. Special printer paper such as the Forever® printer paper may be used as a transfer paper for printing transferable tattoo design.

The client may then share the images of the augmented reality session or personal picture of the tattoo with their friend either over the disclosed platform or over social media. The client may post comment about a design and how it resulted on them in a review section associated with the design.

Once a tattoo design, its size and the tattoo location are selected, the client may proceed with booking and payment. If not prompted before, the client will be required to login or create an account to proceed. The client's age may be required in some state to receive a tattoo and the client will be offered the opportunity to scan or photograph their piece of identification for confirmation of age. This may not be required on the platform but rather at the location of tattoo application. After login, location access may be requested over mobile or specified by the client to identify a location or tattoo shop for tattoo application near to the client. The client may then select an appropriate time and location for the tattoo realization. Price may vary based on availability, with earlier session may be more expensive than later sessions. The client may be proposed preferential dates and time or may select a date and time in a calendar where the price of the tattoo may change based on availability. Once booking is made, payment may be processed. The payment may be held in escrow and the payment may only be processed if the tattoo is executed. A unique cryptographic token or other sort of barcode or QR code-based token is generated at that time, which contains encrypted data about the client, the booking, the tattoo, and so on. In particular, the information of the previous sessions of this particular client may be encrypted here, which may influence the operation of the machine. For example, allergic reactions or inflammation of the client with specific pigment or compound may be transferred here, which may change the pigment used by the machine. Adverse results or atypical machine settings associated with this client may be related here in order to change the dot parameter settings appropriately. For example, it may be noted that the previous sessions using typical needle elongation settings resulted in larger dot than predicted in that particular body part and a shallower puncture setting may be used instead.

A distributed cryptographic ledger may be used to keep track of transaction and automatically calculate the distribution of proceeds as profit, execution costs, licensing cost, and/or other COGS. The usage of a barcode/QR code based encrypted token allow for contactless and transaction-less interaction at the location where the tattoo is provided, thus reducing cross contamination. The barcode/QR code may be read directly by the automated tattoo machine in order to give tattoo specific instructions to the operator and to modify, if need be, the typical tattoo setting algorithm.

Bookings may be changed or canceled with or without fee with cutoff notices. For example, free cancelation may be performed with 48 h notice. Booking changes may have limits in the number of times a booking may be shifted in time. An email may be received to confirm bookings or other in app module. A reminder of the booking may be sent at some time in advance through the platform, through alerts, notifications, SMS, and/or through emails with a link to the QR-based token.

At arrival at the tattoo process location, the client may check in by displaying the barcode/QR code to a machine, together with a piece of ID if required by the state. The barcode/QR code may be provided in the form of a printed document or in the mobile application of the platform. The barcode/QR code may be read by an optical sensor. Additionally, the client may check in a conventional way with their ID by checking it in relation with the platform booking ledger.

Laser Removal Methodology and Related Technologies

One embodiment of the technology relates to the usage of the methods and hardware disclosed herein for the purpose of tattoo removal. The robotic tattoo machine can provide the template for the accurate positioning of an effector tool with respect to the skin using skin information and with respect to a reference pattern. For tattooing, the effector tool can be a needle assembly and the reference pattern can be the desired tattoo design. In the application of tattoo removal, the effector tool may be a needle assembly and/or a laser assembly, and the reference pattern may be the skin scan of a tattoo or part of a tattoo to be removed. The utility of a robotic tattoo removal machine is related to (I) its precision, (II) its minimization of trauma, (III) its capability to tailor the removal method to observed skin characteristics, all of which are limited in the current art by the limitations of manual operators.

In the current art, high speed laser pulse trains are used to shatter ink pigment under differential heating. First an appropriate laser wavelength is selected to maximize absorption by the pigment while minimizing absorption and scattering by the skin: this is done such that most of the laser energy is transferred to the ink pigments rather than to the skin. Longer wavelengths of laser light are generally less sensitive to scattering in skin, which leads to longer effective depth of laser removal of ink. Typical lasers and wavelengths selected for this are ruby lasers at 694 nm, alexandrite lasers at 755 nm, and Nd:YAG lasers at 1064 nm. Optical crystal can be used in conjunction with lasers to convert the laser light to shorter or longer wavelengths. For example, potassium titanyl phosphate-KTP can be used to halve the frequency of Nd:YAG lasers down to 532 nm. Black ink absorbs a wide range of light frequencies, so most laser systems can be used to remove black ink. Scattering of light by the skin can be further reduced by topical solutions to improve laser energy transfer.

Reducing the duration of laser pulses can greatly improve laser power transfer for ink removal. This is important for two reasons. First, the light scattering properties of human skin quickly increase when exposed to the trauma of laser energy. After exposure to a laser pulse, the skin may display a phenomenon called 'frosting' where the skin texture may change and its transparency greatly diminish. Second, the destructive energy of the laser is due to its pulse being shorter than the thermal relaxation characteristic time of the pigments. As a result, high-power short-duration pulse trains are the method for transferring energy to pigments for the purpose of tattoo removal. This is generally achieved by Q-switching the laser (and more recently with picosecond lasers) to obtain high-power short-duration pulses. The laser optics for this setup are generally tailored to minimize energy loss while focusing the laser on the skin at a fixed distance. The laser spot (cross-section) on the skin surface is generally tailored to be of consequent diameter (e.g., between 1 and 10 mm) to provide an appropriate 'brush' for the operator to remove the tattoo. Smaller spot sizes are more influenced by light scattering so generally a larger spot size is used to limit excess scarring. In general, tattoo removal can result in scarring, skin pigmentation, and/or textural change.

The mechanism of laser removal of the tattoo can be a two-step process. First, the pigments are partially destroyed by the laser energy; either by thermal, photochemical, or photoacoustic processes. The resulting smaller fragments are then dealt with by the immune system. The removal of a tattoo may require multiple consecutive sessions of laser exposure, and or multiple laser wavelengths, interceded with healing time to let the immune system flush the resulting pigment fragments. Multiple laser sessions for resistant tattoos may result in fibrosis and textural changes that reduce the effectiveness of subsequent laser sessions. It is therefore of interest to reduce the number of sessions to improve removal outcomes. Note that a laser session may modify the optical characteristic of the tattoo pigment, as some optical characteristics are due to geometrical and chemical characteristics of the pigments, which may be modified by the action of the laser.

Some embodiments of the application provide a novel approach to laser or other forms of optical energy-based tattoo removal that take advantage of robotic actuation and multispectral imaging. The resulting approach reduces energy loss to the tissue, provides a better match between laser setting and skin and tattoo pigment characteristics, accelerates removal through automation, and reduces the potential number of removal sessions. Additionally, the usage of combined removal techniques can be achieved through robotic removal such as co-optical laser removal (when more than one laser operates in conjunction) and multi-modality removal, when additional non-optical methods, such as focused ultrasound removal or creating microperforations on the skin, are used in conjunction with laser removal. Finally, removal of tattoos applied by other embodiments of the invention can be enhanced by the usage of information collected during tattoo application, such as skin characteristics and tattoo settings.

Additional apparatuses, components (e.g., light sources, lasers, filters, energy doses, etc.), compositions (e.g., substances, such as cell disruptors, for promoting or facilitating tattoo removal), controllers, software, methods of removal (e.g., pigment or ink removal), methods of operation, methods for manufacturing, and other features are disclosed in the following patents and applications: U.S. Pat. Nos. 9,254,174; 8,036,448; 7,179,253; US Pub. No. 20180110566; U.S. Pat. Nos. 9,474,707; and 9,247,995, all of which are incorporated by reference in their entireties. For example, the pigment or tattoo removal systems disclosed in incorporated by reference patents and application can be combined with or incorporated into the robotic tattooing systems and devices disclosed herein.

Multi-Spectral Imaging and Selective Tattoo Removal

Some embodiments of the invention relate to multi-spectral and multi-modal imaging of the skin, which can allow the identification of skin characteristics such as collagen, hemoglobin, melanin, and water contents, and characteristics of foreign matter embedded in the skin such as tattoo pigments. Skin type (e.g., lighter or darker skin), skin age, sun exposure, body location, and skin hydration strongly influence the transparency of skin to certain wavelengths of light. As a result, the effectiveness of a certain wavelength at penetrating the skin varies from person to person and across the body. For example, skin reflectance at 685 nm varies from 66.9 percent for inner-arm measurement on German ethnic group patients to 29.4 percent on people from the Mongo ethnic group (DRC) at the same location of the body according to Jablonski and Chaplin. Jablonski, N. G., and G. Chaplin (2000). "The evolution of human skin coloration" Journal of Human Evolution. 39 (1): 57-106. doi: 10.1006/jhev.2000.0403. PMID 10896812.

This observation can be generalized to other frequencies with similar variance, due to the variation in collagen, water, hemoglobin, and types and distribution of melanin. In most instances, the skin color and texture perceived by human senses are insufficient to quantify the effect of a given skin on the transmission of a particular wavelength of light. By quantifying skin reflectivity using multi-spectral sensors placed near the tattoo location, a user can identify the particular wavelengths of light that are most transparent for the particular skin characteristics of a given patient.

Similarly, differing tattoo ink pigments have different maximal laser wavelength absorbances. For example, while a cadmium yellow pigment may look similar to a metanil yellow pigment once in skin, associated absorbance peaks are markedly different (660 nm, 729 nm and 768 nm for cadmium yellow and 420 nm for metanil yellow with no peaks in the 600 nm to 800 nm region). By using differential multi-spectral sensing of the portion of the tattooed skin subject to tattoo removal, a user can identify the particular wavelength for which the tattoo pigment is most absorbent.

As a result, for each portion of the skin to be subjected to tattoo removal through a laser, an automated algorithm can identify, among a selection of possible laser wavelengths, which wavelength delivers the most amount of power to the tattoo pigment while delivering the least amount of power to the surrounding tissue. Note that within a tattoo multiple inks may be used, so the optimal laser for tattoo removal may be different from one portion of the skin to another.

Figure 35:
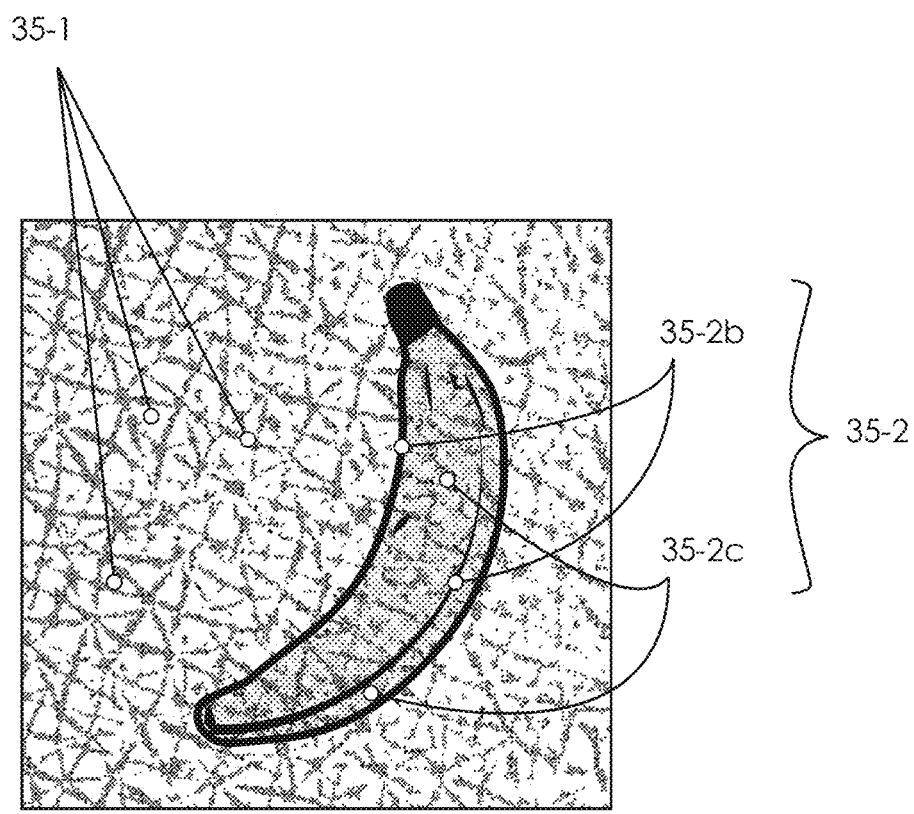
FIG. 35 is an illustrative diagram of a tattoo image, in accordance with an embodiment of the disclosure.

FIGS. 23B and 35 represent the robotic process for a tattoo to be removed. First, the skin background reflective characteristics are established in 1811 of FIG. 23B by using a multi-spectral sensor on portions of the skin surrounding the tattoo area (positions 35-1 in FIG. 35). This is done by actuating the robotic implement of FIG. 22 on the skin and taking optical observations of the denoted portions of the skin 35-1. These observations are processed by the robotic apparatus into an average transparency spectrum for the background portion of the skin surrounding the tattoo. Second, as in 1812 of FIG. 23B, the multi-spectral sensing is repeated on the portion of the skin containing ink. This is exemplified by the positions 35-2 in FIG. 35. Note that the tattoo in FIG. 35 (the banana) is using two different inks: the outline of the banana is using a black ink (35-2b), which is absorbing every frequency and the inner portion of the banana, using a cadmium yellow pigment (35-2c) which has absorptions peaks at 660 nm, 729 nm and 768 nm. The machine establishes a differential spectrum between the skin background reflectance and the portions of the skin that have tattoo ink. Based on this differential reflectance, the best laser is selected. Assuming that the choice is between four lasers (Nd:YAG at 532 nm, Ruby at 694 nm, Alexandrite at 755 nm and Nd:YAG at 1064 nm), Nd:YAG at 532 nm is selected for the cadmium yellow portion of the tattoo (35-2c) because of the ability to transfer maximum power to the ink and Nd:YAG at 1064 nm is selected for the black portions of the tattoo (35-2b) because the transparency of the skin is highest at this higher frequency.

Positional and Optical Optimization

Scattering can be critical when it comes to selecting a spot size. At equal fluence (i.e., energy per surface area of laser spot), it can be beneficial to use a larger spot size than a smaller one because the outer ring of the laser spot on the skin can receive too little energy to break up pigments but enough energy to affect the skin. Frosting of the skin occurs as a reaction to pigment breakup, which is a degradation of the optical properties of the skin. As a result of frosting of the skin due to an initial laser pulse, subsequent laser pulses in the same area are not as effective at removing more ink. This also means that there is a halo effect in the vicinity of the edge of the laser spot where enough energy is received to result in frosting but not enough energy is transferred to breakup pigments. This reduces the effectiveness of smaller laser spots at removing ink. In general, laser suppliers maximize the size of the laser spot that still has sufficient fluence to be effective.

One embodiment of the technology optimizes the geometry of the spot and the position of the spots to minimize loss of effectiveness due to scattering. The laser spot geometry can be optimized using optical elements: for example, a combination of a beam expander and a cylindrical focusing lens can shift the laser spot geometry from a circular spot to a high eccentricity ellipse of equivalent fluence which is suitable for tattoos composed mainly of lines. A variable focal system can produce an elliptic spot with a variable eccentricity to be used selectively.

The position of the laser spot can also be optimized to maximize tattoo coverage and/or minimize spot overlap. This can be achieved by first using machine vision to identify the location of the tattoo on the skin. An algorithm can then be used to optimize the positions of laser spots such that, (1) all the area of the tattoo receives enough energy for ink removal, (2) the minimum number of laser pulses is used, (3) the appropriate spot geometry is used to minimize frosting in adjacent area of the laser spot.

Another embodiment of the technology relates to the angle of attack of the laser beam with respect to the skin normal. Manual laser removal typically relies on normal, collimated laser pulses and there is no effort to optimize laser angle. In the case of robotic removal, angle of attack may be varied for different parts of the tattoo. This can enhance removal for certain types of features such as deep and thin linework. For example, in FIG. 36D, a cross-section of the skin is depicted where the cluster of pigments 36d-1 has a large range of depth deposition into the dermis. If a normal laser pulse is used, the top cluster of pigments may shield the bottom cluster of pigment. It may be of interest to approach such a tattoo from the side to maximize the volume of pigment exposed to laser energy sufficient for removal. The angle of attack may be varied by inclining the collimated laser light 36d-2 with angle of attack alpha or by using a focusing optical element to achieve a converging cone of laser light 36d-3. Note that in FIG. 36D, the cones of laser light are indicative of the area where sufficient fluence is provided as the light scatters in the skin. Later in the disclosure, it is demonstrated in FIG. 36C how a larger spot size, coupled with scattering in the skin, may result in a similar effect.

Another embodiment of the invention relates to using nearly synchronized laser pulses from multiple lasers, or to moving the laser spot fast enough over the skin, to increase the effective lased area before frosting occurs. The application of focused laser energy may lead to the scattering effect defined above and result in frosting of the skin, reducing the transparency of the skin. This loss of transparency may happen at close to the speed of sound in skin, due to acoustic shock, so if two laser pulses arrive on the skin at times close to synchronized (below the characteristic time of this phenomenon), the propagation of frosting from one of the pulses will not interfere with the effect of other pulse. If two laser pulses so arrive, close together in time and with a spatial overlap on the skin, they will effectively behave similarly to a single larger pulse. This can be generalized to more than two pulses of light if sufficiently synchronized.

Using Tattoo Session Information for Removal

One embodiment of the technology relates to using tattoo execution information to improve ink removal. In particular, some information related to pigment type, puncture positions, ink deposition amount and ink deposition depth in the dermal layers may be used to optimize laser selection, fluence, spot size, and spot positions. Tattooing is inherently three-dimensional as ink is deposited in a column through the dermis. The optically apparent presence of ink in the skin may not reflect the depth to which ink is deposited. This information is however captured during the tattooing process and immediately after the tattoo is completed; indeed, the position of the skin and the position of the needle and number of punctures for each portion of the skin to be tattooed (tattoo dots) are measured and specified during the tattooing process with the robotic tattoo machine presented herein. After the tattoo application, a scan is performed which allows confirmation of the end position of the needle compared to the skin surface, established by observing the position of the needle entry point on the epidermis (which disappears after the tattoo is healed) and the ultimate position of the pigment in the dermis. This is possible because of the consistent slanted angle of the needle axis compared to the skin normal in the robotic tattoo machine. The initial position specification, and this measurement and confirmation after the tattooing process is completed, pinpoints the ultimate location and depth of the pigment in the skin. Further, as explained in this disclosure, the position of the pigment is referenced to natural fiducials of the skin such as hair follicles and epidermis folds. Such fiducials are stable in time and can be used to localize the recorded information during the tattoo session at a later date; for instance, at the time of removal of the tattoo. Of course, the initial tattooing session information about ink position and depth is not sufficient to know the position and depth of pigment at a later date, since skin healing, environmental factors, mechanical and physical processes, and immune response will inevitably lead to pigment diffusion and some degree of removal from the tattoo area. It may however be possible to model that diffusion and removal process by knowing the state of the skin prior to tattoo removal (e.g., through optical observation) and by knowing the initial state obtained from the tattoo session recordings and inferring the approximate depth of pigment in the skin. This may be done by using a diffusive model with diffuse drain, initiating the model with median skin diffusion parameters, using the initial state as given by the tattoo session recording, and updating the model diffusive parameters a posteriori based on the current observation of the skin. The drain terms of the equation may approximate immune removal of the pigment through phagocytosis and epidermal shedding. The diffusive parameters may be constant for separate dermal layers, with interfacial terms at the epidermis-dermis junction and dermis-hypodermis junction. Forcing terms, representing pressure gradients between blood capillary and lymphatic system, may be added.

Such a model may be used to predict the position of the pigment in the ink column in the skin. A confirmation method may be obtained optically by observing a reflection spectrum for applied light. Indeed, longer wavelengths may penetrate deeper than shorter wavelengths due to scattering biases which result in more blue light being scattered than red light. If the absorption spectrum of the pigment is known, such as in the case when tattoo sessions and pigment types are recorded, the effect of light scattering can be evaluated. Scattering is proportional to the height of the column of skin, and this can be used to evaluate pigment depth by comparing the reflective spectrum of the known pigment with its reflective spectrum in the skin. Further, an optical model of the skin is necessary to establish the relationship between skin depth and scattering. By using this model, depth can be known by observing the intensity of scattering. This is easiest on black ink since most light is absorbed by the ink when the light reaches the ink and most of the wavelengths observed by reflective spectroscopy will be of scattered light. For example, in older tattoos, black inks will shift to a blue tone when aging due to scattering of the skin and diffusion of the pigments to deeper layers. The issue with optical measurements alone is that the localization of pigments in the skin becomes more and more unreliable with depth due to "halo effects" from scattering, and thus the use of optical data in conjunction with data from the tattoo session can enhance predictions of position and depth of pigments.

Figure 36A:
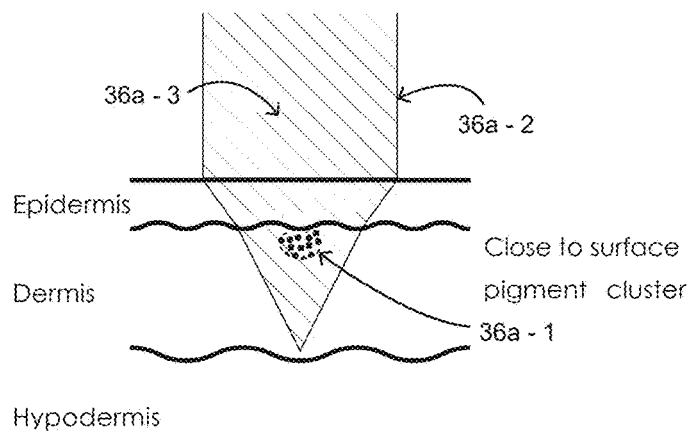
FIGS. 36A-36D are illustrative diagrams of the position, depth, and ink amount obtained from modeling and a tattoo session, in accordance with an embodiment of the disclosure.
Figure 36B:
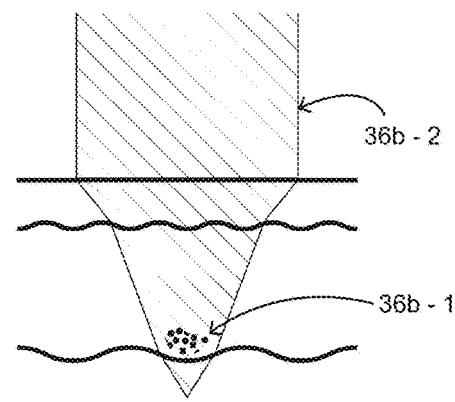
Figure 36C:
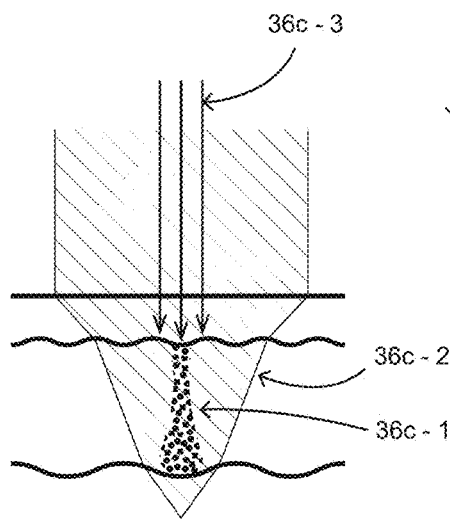
Figure 36D:
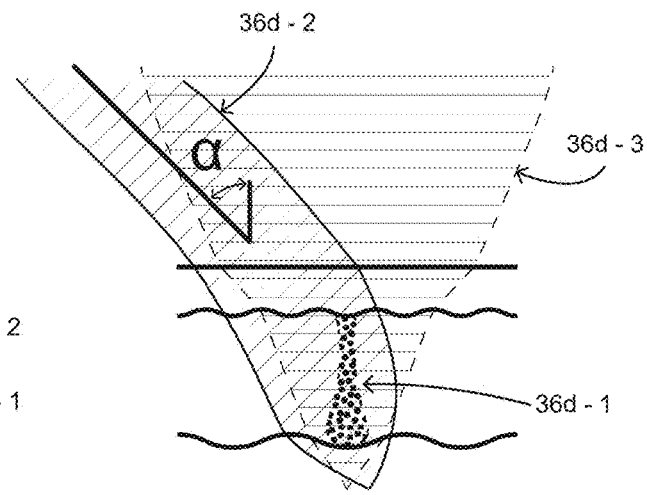

Once pigment depth is estimated, appropriate laser spot size (assuming constant fluence) may be adjusted to obtain best removal results. For a simple example, assume a single dot, containing a cluster of pigments in a skin column at various depths. Because of skin scattering, the size of the laser spot for removal is intimately linked to the height position of pigment removal: if the pigment cluster is deeper, the light from the laser will be more scattered to reach it, so a larger spot size is warranted. FIGS. 36A-36D present this effect. In FIG. 36A, the pigment 36a-1 is located in a shallow region of the dermis. The laser beam 36a-2 is selected to provide the appropriate power to remove the pigment. Note that the zone of laser effectiveness 36a-3 reduces as a cone in the skin as the laser light diffuses due to scattering by the skin. Some of the light at the edge of the laser beam is then insufficient for pigment removal. In FIG. 36B, the pigments 36b-1 are located deeper. While the pigment cluster 36b-1 is of similar size to pigment cluster 36a-1, the selected laser beam 36b-2 has a larger aperture than laser beam 36a-2 to account for scattering. Note that in these examples, the laser fluence (the amount of energy by area of the laser spot) is constant, so the laser beam in FIG. 36B is more powerful than in FIG. 36A. In the case of FIG. 36C, the pigment cluster 36c-1 spans a long column at different depths. The aperture of the beam is increased compared to FIG. 36B despite the fact that the depth of the pigment cluster 36c-1 doesn't exceed the depth of cluster 36b-1. This is because scattering can be used to enhance removal by lateral transfer of the power of the laser. Indeed, some of the light from the edge of the laser is scattered laterally as shown by the light path in 36c-2, where direct light 36c-3 is absorbed by the top of the top of the pigment cluster.

FIGS. 36A-36D show that information regarding the position, depth, and ink amount obtained from modeling and initial tattoo session can be used to enhance tattoo removal.

Integrated Operations

Figure 37:
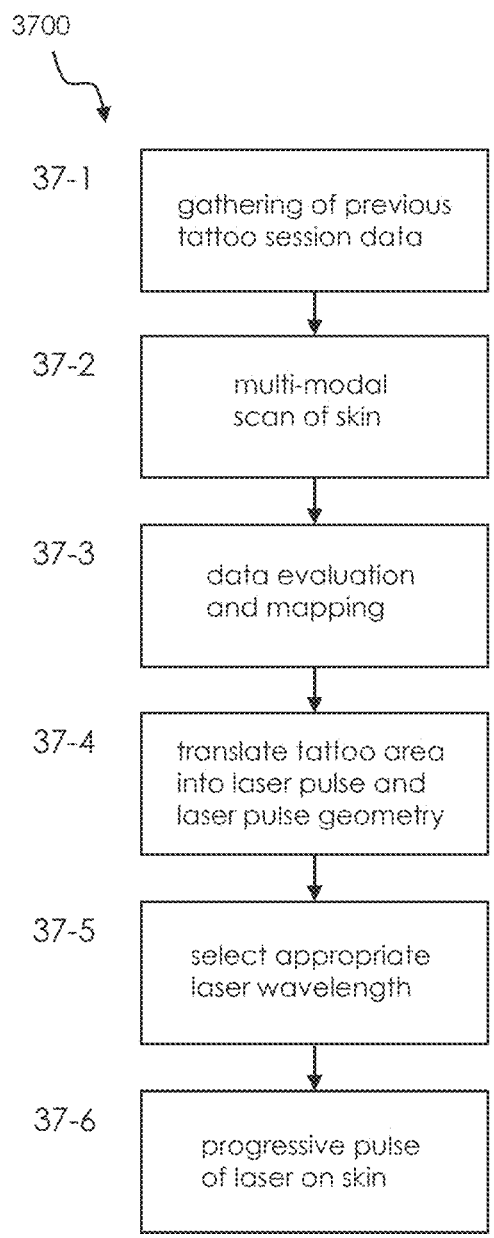
FIG. 37 shows a process for tattoo removal, in accordance with an embodiment of the disclosure.

Information about pigment absorbance, pigment position, and depth and effective geometry of laser light pulses can be used together to optimize tattoo removal. The process is detailed in FIG. 37 at step 37-1: gathering of previous tattoo session data; at step 37-2: multi-modal scan of skin; at step 37-3: data evaluation and mapping; at step 37-4: decompose the tattoo area into laser spot positioning and laser spot geometry; at step 37-5: select appropriate laser wavelength; and at step 37-6: progressive pulse of laser on skin.

Assume a tattoo removal patient is coming to the tattoo removal studio for removal care. First, if the tattoo has been performed by the robotic tattoo machine presented in this disclosure, data gathered during the tattooing session is retrieved in step 37-1. This step is optional since previous tattoo session data may not be available. Data of particular interest can include the position, amount, depth, and/or type of pigments of the ink deposited in skin at the time of the tattoo application, as well as its relation to position of natural skin fiducials that may be identified in subsequent steps of the removal process. The value of tattoo session data in the removal process may be augmented by including derived modeling data that simulate diffusion and removal of tattoo ink by time, the environment, or immune response.

In step 37-2 a multi-modal scan of the skin is performed. This allows for the identification of: (1) current position of the pigment in the skin with respect to the natural skin fiducials; (2) reflective spectrum of tattooed portions of the skin; (3) reflective spectrum of clear portions of the skin. This information permits positional registration of the optional tattoo session information to the current state of the skin by matching natural fiducials, and evaluation of current position and depth of pigments by modifying diffusion modeling and optical scattering data, and establishment of pigment type in step 37-3. Once the scan is completed, a digital model of the whole tattoo is established. In step 37-4, the removal areas are established by the patient and the machine. The patient specifies which areas of the tattoo (or its totality) are to be removed by the machine. One advantage of the robotic tattoo removal technique is the possibility to precisely evaluate where energy from the laser is sufficient for pigment removal. This means that some areas of the tattoo can be selected for removal while other areas can be preserved with minimal loss of pigments. Once patient identification of removed and preserved areas is complete, a rendering of patient choices may be displayed that shows the expected result from this session removal on the digital scan of the tattoo. This validation provides for agreement of the patient with the expected removal outcome. Note that more than one session may be necessary for complete removal and an approximate removal efficiency may be displayed, such as a change in opacity and blur of the removed selection that may be shown to the patient on a digital model. The computing unit of the tattoo machine may then discretize the tattoo removal area into overlapping laser light spots of various sizes and geometries to fully cover the removal areal while minimizing energy transfer to both ink-free areas of the skin and tattooed areas designated to be preserved. Further, the angle of attack and size of the spots may be selected on the basis of the estimated depth and extent of the pigment position in the skin. In step 37-5, this discretization may be further modified and or enhanced by selecting different laser wavelengths for different laser light spots based on the pigments and skin absorbance data, in order to maximize removal outcomes. For example, long wavelengths may be used on black pigments. Once this decomposition of the design is complete, the removal process may begin in step 37-6. As for the scan of the skin, the machine vision system may be used to position the end effector to the appropriate position for a laser pulse. The laser beam geometry may be modified prior to lasing and a pulse or train of pulses of laser light may be sent to the position established in step 37-4. The robotic tattoo removal machine may then be actuated to position the appropriate laser end effector to the next spot for the next laser pulse and so on and so forth, until all the spot positions designated in step 37-4 have been lased. As part of this process, cryogenic air may be applied to the skin to soothe the inflammation caused by the laser. Additional energetic processes may be applied by the machine concurrently with the laser process, such as sonication of the skin to aid pigment fragments dispersion, as this has been observed as an effective enhancement alongside laser removal treatment.

Robotic Laser Device Embodiment

One embodiment of the technology relates to integrating a laser system in relation to a robotic arm similar to the technology disclosed herein in relation to FIG. 1b and FIG. 2. In particular, a laser effector assembly can be used in conjunction with or in replacement of the tattoo head assembly 140 of FIG. 2. Similarly, this laser effector assembly can be used instead of or in conjunction with the tattoo head assembly in FIG. 2. The laser effector assembly is the effector tip of a laser system responsible for the transfer of laser energy to the skin and can contain optical elements to collimate and shape the laser beam. In the instance where laser effector assemblies are integrated to the robotic tattoo machine of FIGS. 1 and 2, the robotic tattoo machine may be called a robotic tattoo removal machine.

Figure 38:
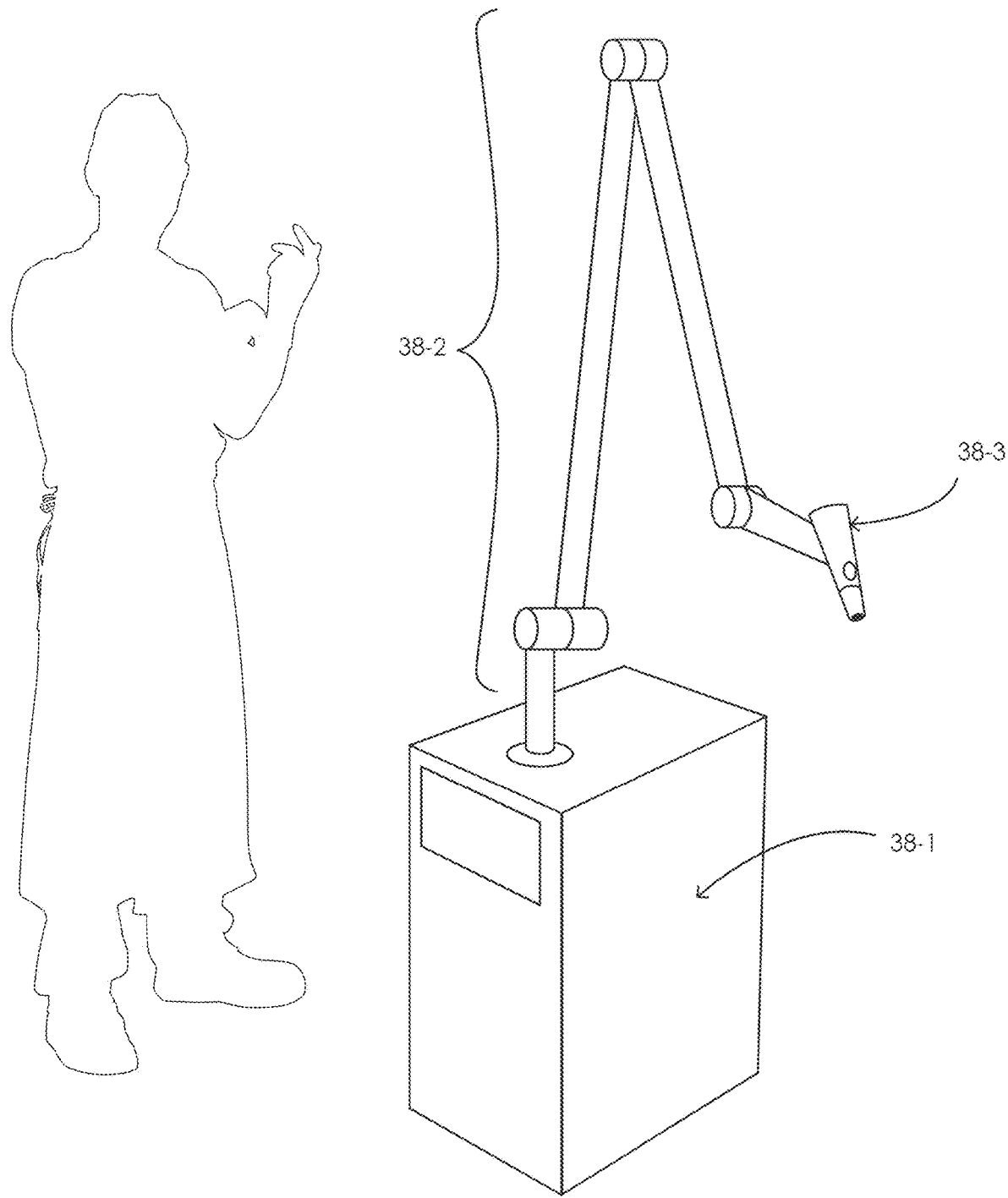
FIG. 38 is an illustrative diagram of a laser system and effector, in accordance with an embodiment of the disclosure.

The laser system and effector are detailed in FIG. 38. The laser system is composed of the laser pulse generator 38-1, the optical transfer arm 38-2 and the laser effector assembly 38-3. The laser pulse generator contains control, power and optical systems that may be used to produce laser pulses. The system contains a driving laser (or multiple driving lasers), a lasing medium, an optical cavity to generate laser pulses, a power and controller system to control, power and cool the system, and/or an optical element to focus, collimate and/or expand the laser pulses and communicate them to the laser transfer arm 38-2. The laser transfer arm is a series of pivot-articulated tubes through which the laser beam may be transported. The arm is composed of an optical element such as off-axis parabolae or other mirrors of various convexity to carry light through the pivot articulations of the arm and to the end effector 38-3. The arm pivot allows linear and angular movement of the end effector to permit a wide range of movement necessary for the performance of tattoo removal. The laser effector 38-3 is used to condition the laser beam to the appropriate spot geometry for effective removal. The laser effector may contain non-spherical optics (such as cylindrical lenses), variable focal groups, focusing groups and collimating groups to produce a variable eccentricity spot of laser light of variable apparent diameter and distances from the projection plane, for example.

The laser effector 38-3 may be used in lieu of the tattoo head 140 of FIG. 2, in order to project laser light on a portion of the skin. The shuttle of FIG. 1 may be used to move about the position of the laser effector end and the optical multi-modal camera assembly 130 of FIG. 2 in order to observe the skin, define a laser removal plan and proceed with laser pulses on the skin. One or more optional rotation actuators may connect the laser effector to the tattoo shuttle in order to vary the laser angle of incidence with respect to the skin normal. The laser effector may be connected to the tattoo shuttle through a laser effector adaptor structure.

Note that the entire laser system may be a separate unit from the robotic machine presented herein. For instance, the laser system may be a commercially used laser removal system, for which a laser effector structure and control adaptor is specially designed and made to connect such a laser system, initially intended for manual use of the laser effector unit, to the robotic tattoo removal machine. Moreover, more than one laser system may be in use in the robotic tattoo removal machine, as in the case where multiple laser wavelengths may be needed. In some embodiments, a modifying lasing medium may be optionally added to the laser path to modify its wavelength, such as an optical crystal used in conjunction of an Nd:YAG laser to halve its frequency. This may be used within the pulse generator 38-1 of FIG. 38. In some embodiments, these multiple laser systems may be commercially used laser removal systems for which the laser effectors may be connected to the shuttle of the robotic tattoo removal machine.

Ink Delivery

One embodiment of the technology relates to ink delivery. The operation of the ink delivery may be adding ink proportional to the number of punctures in order to replenish the cartridge reservoir denoted as 651 in FIG. 10*b* and as 1005 in FIG. 16. Some embodiments of this technology may result in overconsumption of ink in some steps of the needle operation. The following proposes an innovation in pressure management to limit ink consumption.

Indeed, in an operation where the back pressure of the cartridge reservoir is the ambient pressure (i.e., same as at the needle tip) the ink may flow freely out of the cartridge reservoir when the needle is not oscillating. This is because the surface tension of ink may be insufficient to keep any significant amount of ink in the cartridge reservoir against gravity for certain cartridge reservoir design. However, when the needle is oscillating, then ink may be kept inside of the reservoir cartridge due to the friction of the ink against the needle that dynamically keeps the ink from leaking. Only the ink adhering to the needle tip may exit the tattoo machine thus limiting excess ink loss. This means that in cases where the needle is oscillating, it is appropriate to have the back pressure in the cartridge reservoir as ambient pressure, for example, by exposing the back of the reservoir to ambient air. However, this is not the case when the needle is not operating since the ink can drain out.

When the needle cartridge is sealed, for example, when the needle is fed by a pumping mechanism, the ink may not leak out when the needle is not operated. This is because the back pressure would reduce if ink drips and surface tension are enough to keep the ink from leaking. This is a similar effect as is used by pipettes for holding liquids. However, when the needle is oscillating, the internal volume of the cartridge reservoir changes when the needle is operating, which forces ink out when the needle is extending and forces air in when the needle is retracting, quickly emptying the cartridge reservoir. This means that while a sealed pumping mechanism for the ink is able to preserve ink in the cartridge while the needle is not oscillating, ink is forced out during needle operation.

An embodiment to reduce ink loss in both idle and oscillating states of the needle is proposed herein by varying the back pressure of the cartridge reservoir. By using a valve actuator, the system is operated sealed (valve closed) when the needle is not operated and open to ambient pressure (valve opened) when the needle is in operation. Therefore, overconsumption of ink is avoided. A possible physical embodiment of this may be realized by adding a flexible tube to the cartridge system that is open to ambient air. A pinch valve may be used to alternatively pinch and release the flexible tube, providing the needed opening and closing actuation.

Another embodiment of the technology relies on flooding ink onto the portion of the skin to be tattooed, rather than dosing ink through the needle. While this may reduce the ability to observe the skin during tattooing, this has the advantage of being easily implemented and providing consistent results. In this embodiment, after skin scan is performed as in step 322-325 of FIG. 3C, ink may be intentionally leaked on the entire portion of the skin exposed by the contactor window. This is possible because the contactor window produces a seal on the skin to keep the ink from flowing outside the window. Tattooing operations of step 326 of FIG. 3C are modified by puncturing the skin through the flooded ink without relying on replenishing the cartridge reservoir for every dot. The ink may then be removed through suction as described throughout this disclosure.

Test Tattoo Embodiment

In one embodiment of the technology the tattoo session may be preceded by or may concurrently proceed with a test tattoo, for the purpose of tuning the tattoo dot parameters to better fit particular portions of the skin where the tattoo is to be performed on the basis of information acquired during the test tattoo. Indeed, while galvanic sensing may be used to predict the appearance of a tattoo on the basis of measured skin characteristics, some additional information, such as skin to ink interaction, may not be fully captured. Additional information acquired by directly measuring the visual characteristics of a tattoo in or in the vicinity of the tattoo area may bring validation of a certain skin characteristic model. In particular, this can be used to evaluate the visual characteristic of a dot performed at different positions in the dermis and with different puncture counts. The test tattoo may consist of a set of dots (for example, three groups of three dots), lines (e.g., a set of dots in a string with variable center-to-center distance) or areas (e.g., sets of overlapping dots in two dimensions) that can be used to evaluate the effect of dot dermal position (e.g., by varying the needle extension), number of punctures (e.g., by varying the number of punctures per dot), or dot overlapping (by varying the dot density in lines or areas). Once the test tattoo is performed, the area of the skin is cleared of surface ink stain and other excess fluid for visual inspection either by trained human eye or by a machine vision algorithm.

For each dot or group of dots with certain puncture settings, the following is evaluated: Ink amount, dot diameter, and/or other visual characteristics of the dots, such as defects like non-persistence (e.g., a dot that is too shallow) or blow-outs. Similarly for line and area, density consistency and line thickness may be evaluated. These visual characteristics may be quantified by a machine-vision algorithm and evaluated for each set of puncture settings as it is presented for visual analysis in this disclosure in FIG. 47 and its explanation. Fitting methods may then be used to evaluate the effect of different puncture settings on the expected visual characteristics. For example, the effect of average needle extension on dot diameter and ink amount may be inferred from the measured effect of low and high extension on dot diameter and ink amount. This allows a validated model to achieve a certain visual characteristic on the skin where the tattoo is to be performed by direct measurement in or around the tattoo area. In particular, this allows for calibrated use of grayscale by matching the fitted gradient of ink amount, dot size and dot density to the requirements of the tattoo design and modifying the dot parameters across the whole desired tattoo design to fit the measured grayscale range. A test tattoo can therefore enhance the fidelity of the executed tattoo with respect to the expected visual appearance of the design.

In one embodiment of the technology, a test tattoo may be performed prior to the execution of the tattoo session. The test tattoo may be applied using a similar procedure detailed for a standard tattoo session in the vicinity of the desired tattoo area, as in FIG. 3A with the following modification. Because of the size of the test tattoo, it may not be necessary to move the tattoo window across the tattoo zone and step 320 may be achieved without moving the window on the X axis. The other modification is that step 320 may be followed by a specific additional step dedicated to the visual observation and analysis of the test tattoo. In order to perform a visual observation of the test tattoo, ink and other excess fluid may be removed. This may be performed using the same process as in step 320 by the machine or may involve more steps to ensure clear imaging of the test tattoo: an optional solvent may be applied to the test tattoo to facilitate removal of excess fluid, and or a wand with an adsorbent material may be run across the test tattoo to enhance cleaning of the skin. Machine vision may then be used to image the test tattoo and quantify dot characteristics as described in this disclosure. The steps following 320 detailed in FIG. 3A may then be followed.

Alternatively, the additional cleaning and imaging can be performed not by the machine but by an operator. In this case, the test tattoo is performed using the normal routine detailed in FIG. 3A. After machine removal and cleaning, the operator may clean the client's skin in the vicinity of the test tattoo to facilitate visual observation. The operator may then use a manual imaging device, such as a handheld microscope, to image the test tattoo. The resulting images may be evaluated for dot characteristics as described prior in this disclosure.

After the test tattoo is performed and analyzed, the tattoo session for the desired tattoo may be started in the vicinity of the test tattoo. The dot parameter table may be updated by the results of the analysis of the test tattoo.

Alternatively, the test tattoo may be performed as part of the desired tattoo session. The test tattoo design may be appended to the desired tattoo design (such as on the vicinity of the desired tattoo) or the test tattoo may be hidden within the desired tattoo design, either by selecting dots in the desired tattoo design that can be used as test dots (for example, when the variability in dot parameters of such dots may not substantially impair the overall quality of the tattoo) or could be appended to the tattoo design in an area where the test tattoo would be covered by the desired tattoo design (for example, under dense tattoo area). Optionally, the test dots may be applied in close proximity to each other as to facilitate their application without moving the contactor window. In either case, the normal process of the tattoo session in FIG. 3A is modified to account for the presence of test dots in the design. In particular, step 320 is amended such that the test dots are performed first when performing wet dots. After the test dots are performed, the area of these test dots is cleaned well such that visual observation of the dot is possible. As detailed above, this may involve using suction and optional solvents to assist with fluid removal, and/or involve mechanical wiping using an adsorbent wand. Imaging using the machine vision system is then conducted to quantify the visual characteristics of the test dots. Based on these characteristics, the dot parameters for the entire tattoo are modified to enhance tattoo quality and fidelity with respect to the expected design.

Actuation Embodiment Over the X Axis

One embodiment of the technology includes the actuation of the machine to advance and position the contactor window during scanning, skin puncture property acquisition, and tattooing process (referred below as 'active phase'). Two methods are hereby proposed for the actuation of the mechanism in order to advance the contactor window on the X axis with good skin holding during tattooing and good registration during movement.

The first process is referred to here as the "stick-slip process," where the contactor is slid on the skin by varying the contact pressure between the contactor and the skin. During active phase of the tattooing process, such as scanning and skin puncturing, it is necessary for the skin to be held in place. This is achieved globally by the application of a frame on the body part where the tattoo is performed and locally by the contactor. During that phase, the contactor applies a force on the skin, for example, between 0.5 kgf and 10 kgf, 2 kgf and 10 kgf, 3 kgf and 7 kgf, which holds the skin in place. In some embodiments, the force is equal to or greater than, for example, 0.5 kgf, 1 kgf, 2 kg, 3 kgf, 4 kgf, 5 kgf, 6 kgf, 7 kgf, 8 kgf, 9 kgf, and 10 kgf. In order to control this force application, load cells may be used to measure the contactor-to-skin force and a Z-axis gantry may be added to the mechanism to lift or lower the tattoo shuttle, thereby varying the applied pressure between contactor and skin. Minute movements of the skin within the contactor window are averted because of skin friction against the contactor. For example, empirical experiments performed by users suggest that with a 10 centipoise (cps) lubricant on the skin, a 500 gf load over a contact surface of six square inches can hold the skin in place within the contactor window despite a 1 cm movement of the contactor on the X axis (i.e., the skin moves with the contactor due to friction while the client's body otherwise remains at rest). In the part of the process where the contactor is to be moved across the skin on the X axis, such as when progressing with the tattoo process on another portion of the skin, the contactor pressure against the skin may be released to avoid frictional stick against the skin. The contactor force is lowered to (e.g.) between 0 gf and 100 gf for this phase. A small positive pressure is of interest to keep the skin in contact with the contactor window and thereby allowing imaging during movement; in particular such that the skin is in focus for the imaging system. This is of interest to verify that the movement of the contactor corresponds to the desired movement of the fiducial marks, providing a feedback loop during movement of the contactor. In some examples, with a 10 cps lubricant and using the same contactor geometry as the stick example, a 50 gf load between the contactor and the skin is appropriate to avoid deforming or frictional sticking of the skin during a 1 mm movement on the X axis.

The second embodiment of the technology is referred to here as the "walking foot system". This method is an enhancement of the stick-slip process in which both the frame and the contactor are actuated on both Z and X axis. The basic concept is that the frame and contactor lift over the Z axis and move over the X axis alternatingly in order to always apply a consistent pressure on the client's skin during the active phase of the tattooing process. The advantage over a static-frame concept is that the frame may be reduced in size over the X axis. This in turn increases the potential for non-flat body parts to be tattooed as the walking foot system may walk across body parts of larger curvature.

Figure 39:
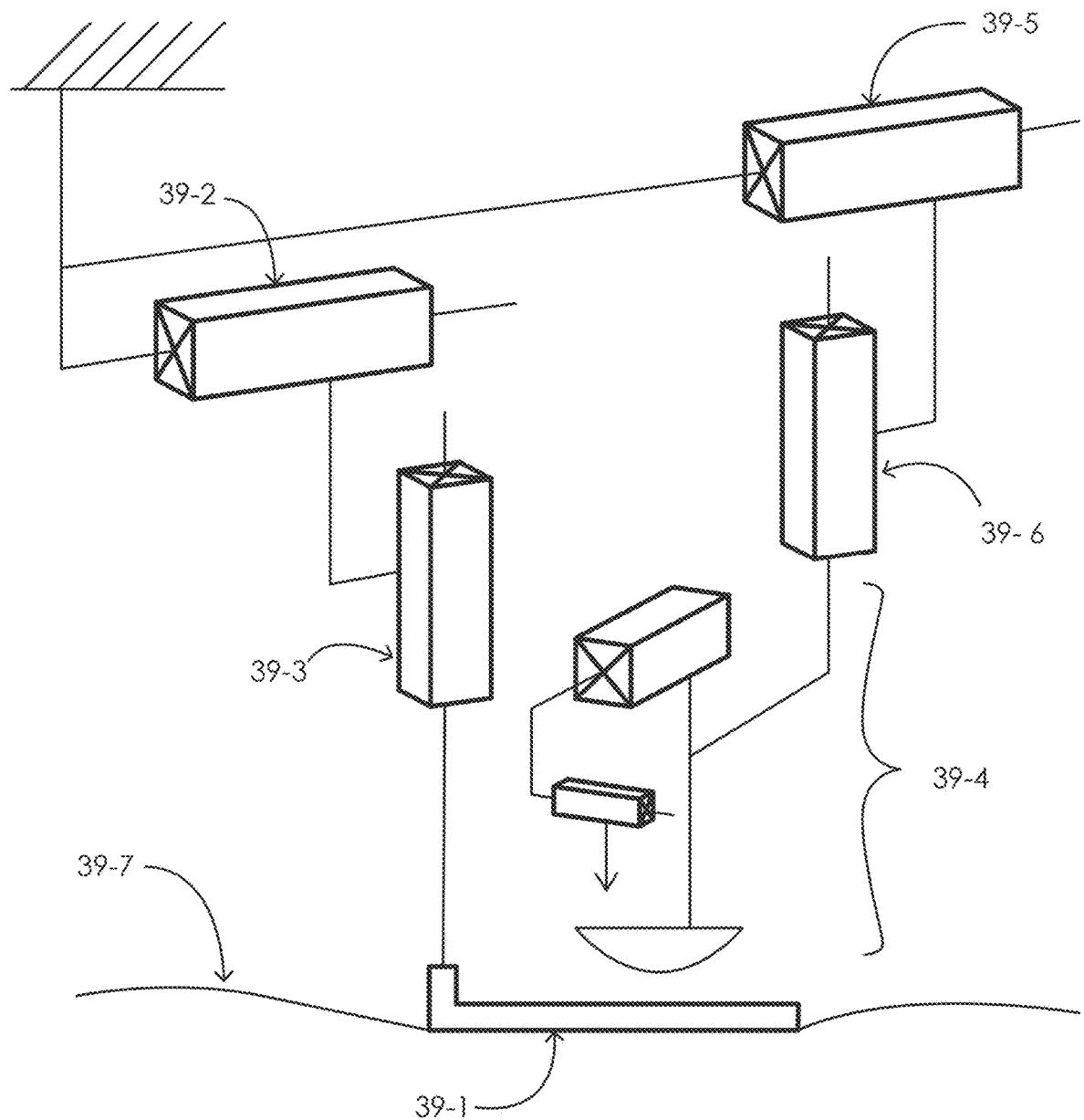
FIG. 39 is an illustrative diagram of a walking foot system for applying a tattoo, in accordance with an embodiment of the disclosure.

The physical embodiment of the walking foot is detailed in FIG. 39. The frame 39-1 is connected to the machine with its own X gantry 39-2 and Z gantry 39-3, while the tattoo shuttle 39-4 has a separated X gantry 39-5 and Z gantry 39-6. The two Z gantries 39-3 and 39-6 are used to alternately lift the frame and contactor, respectively.

Figure 40:
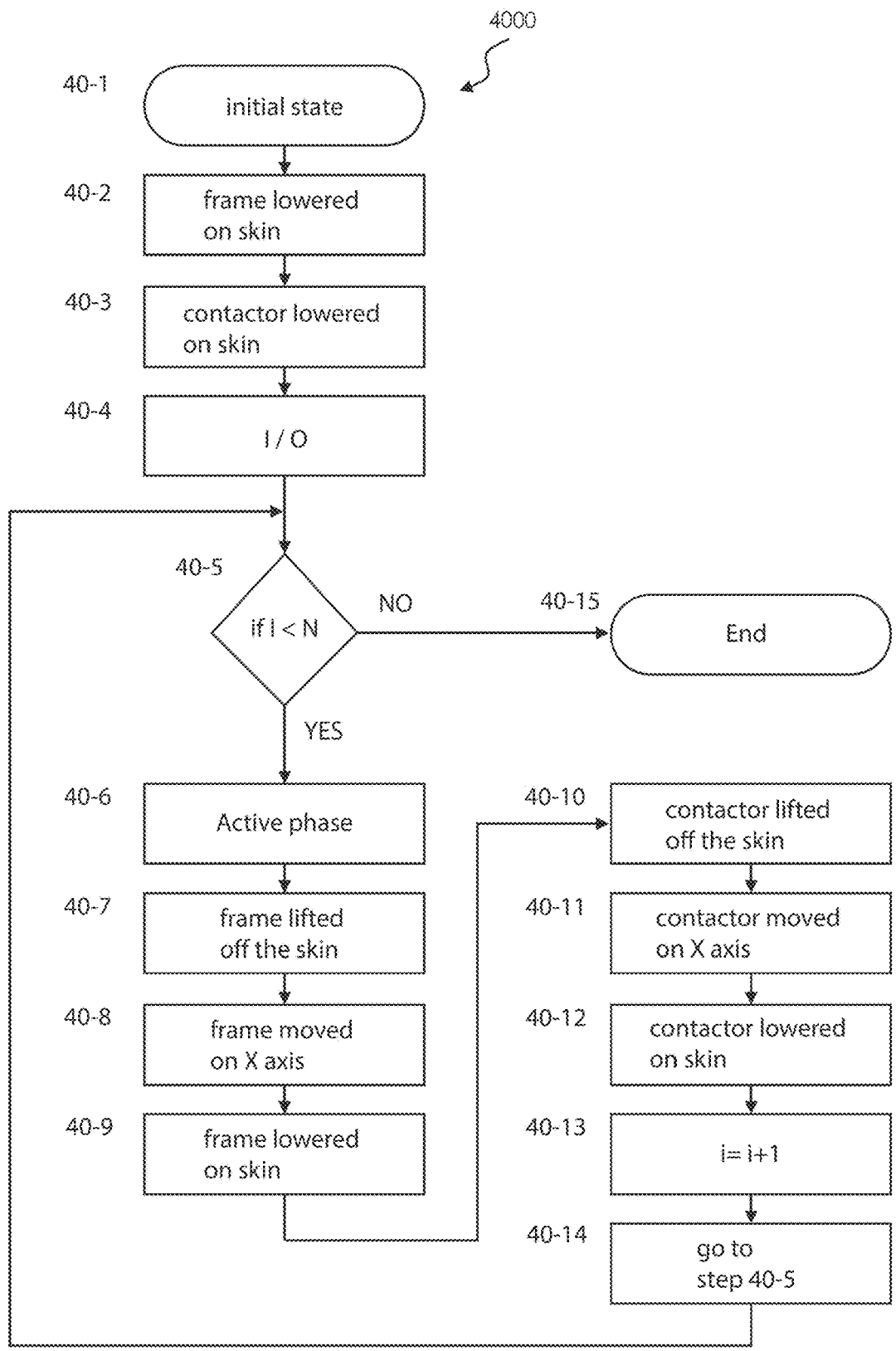
FIG. 40 shows a process of a walking foot system for applying a tattoo, in accordance with an embodiment of the disclosure.

The principle of operation is presented in flowchart of FIG. 40 by steps 40-1 initial state, 40-2 frame lowered on skin, 40-3 contactor lowered on skin, 40-4 I/O, 40-5 if I<N, 40-6 Active phase, 40-7 frame lifted off the skin, 40-8 frame moved on X axis, 40-9 frame lowered on skin, 40-10 contactor lifted off the skin, 40-11 contactor moved on X axis, 40-12 contactor lowered on skin, 40-13 i=i±1, 40-14 go to step 40-5, and 40-15 end.

This paragraph describes specific operational criteria that may be employed in at least one embodiment of the device. In the initial state 40-1, both contactor and frame are up and not in contact against the skin. In 40-2 the frame is lowered such that the frame enters in contact against the skin. Load between the frame and the skin is controlled by measuring load and actuating the Z axis dedicated to the frame. Load between skin and frame is held constant +−0.5 kgf at an optimal load set between 0.5 kgf and 10 kgf. In step 40-3 the contactor is lowered such that the contactor enters in contact against the skin. Load between the contactor and the skin is controlled by measuring load and actuating the Z axis dedicated to the contactor and shuttle assembly. Load between skin and contactor is held constant +−0.5 kgf at an optimal load set between 0.5 kgf and 10 kgf. In this position, both the contactor and the frame are in contact with the skin. This is the configuration where active tattooing, skin scanning or any other active phase of the tattooing process may be performed as in step 40-6. The active phase may be repeated N times as indicated by the conditional step 40-5, where N corresponds to the number of times a new portion of the skin exposed by the contactor window needs to be acted upon. After completion of the active phase in step 40-6, the frame is lifted off the skin in step 40-7 such that the load is null or under 100 gf. At this point, the skin is only held in place by the contactor, still in contact against the skin. The frame is then actuated on the X axis in the direction of interest to operate on a new portion of the skin in step 40-8 and lowered over the skin once more in step 40-9 to apply a load on the skin between 0.5 kgf and 10 kgf. At this point the skin is held in place by both the contactor and frame. The contactor is then lifted in step 40-10 such that the frame is the only element holding the skin in place. The contactor is then actuated on the X axis in the same direction as the frame and with a similar distance in step 40-11. Note that since the frame surrounds the contactor, the contactor movement over the X axis is constrained by the bounds of the frame. The contactor position in the X axis is confirmed and corrected by the camera such that the new portion of the skin exposed within the window corresponds to the portion of the skin to be acted upon, either for scanning, cleaning, galvanic sensing, tattooing, or any other operations associated with the active phase. Once in place on the X axis, the contactor is lowered against the skin in step 40-12 until the appropriate load is reached and held. The steps 40-6 to 40-13 are repeated until all the portion of the skin to be acted upon have been exposed through the contactor window. The operations are complete at step 40-15.

Bagging

Figure 41:
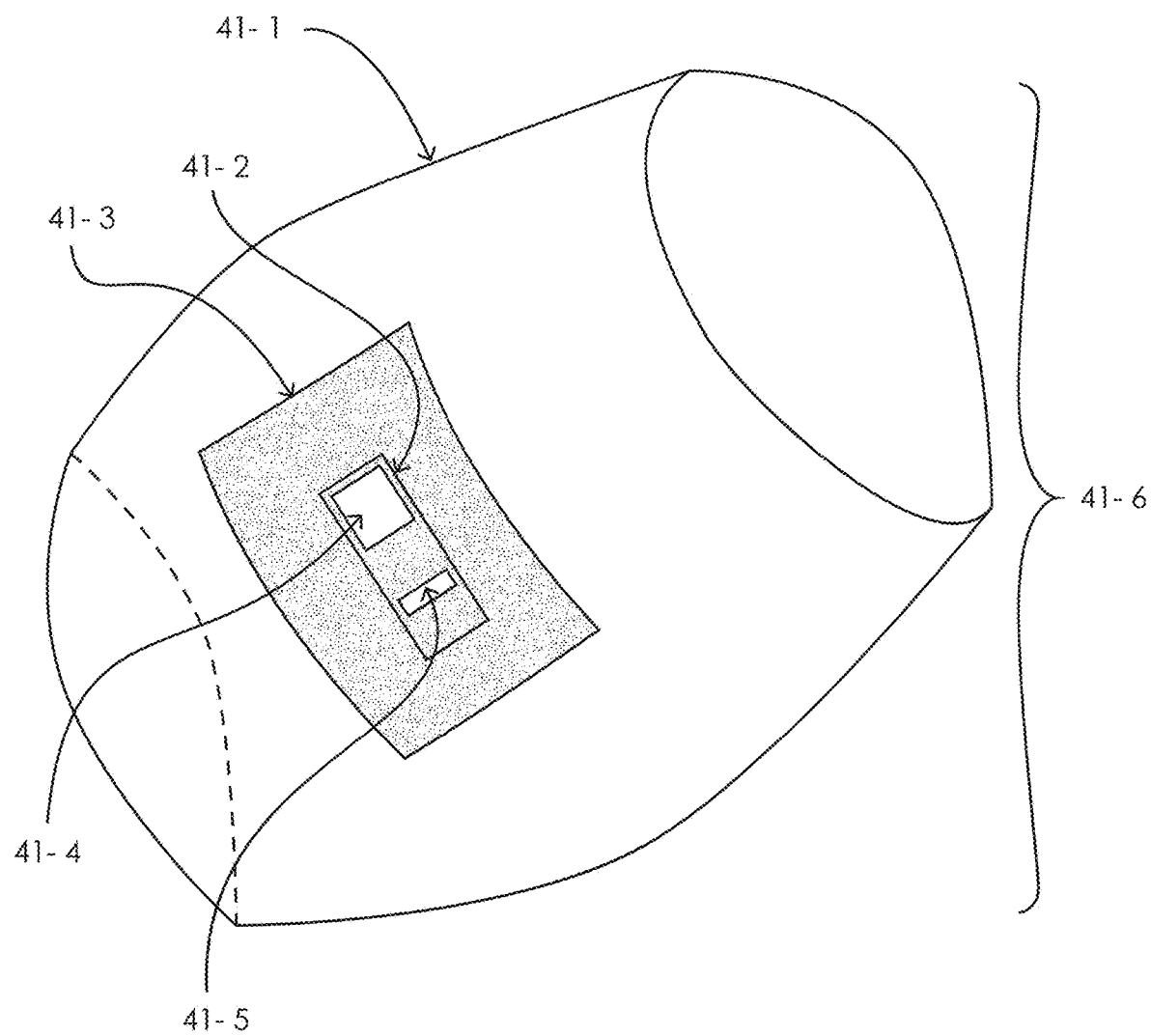
FIG. 41 is an illustrative diagram of bagging a tattoo device, in accordance with an embodiment of the disclosure.

One embodiment of the invention concerns bagging, loosely meaning the encasement of the device in areas that may come into human contact or exposed to contamination. In particular, bagging is used as an aseptic barrier to protect robotic elements used in medical applications from cross-contamination. Typically, bagging may be performed with off-the-shelf bagging systems, or with custom-built bags for complex machine geometry. One particular area of interest is bagging elements that have optical applications requiring that the bagging be optically transparent. This is typically not possible with flexible plastic barriers, as their transparency and clarity may be insufficient for applications such as imaging, spectroscopy or laser light transmission (as is the case in some embodiments of the technology). In one embodiment of the technology, a simple, affordable, single-use bagging system rely on an optically clear glass element affixed to flexible plastic off-the-shelf bagging. One example is to rely on standard 1 inch by 3 inch glass microscope slides to serve as single-use, low-cost optical elements. Microscope slides are produced in high-quality glass and crystals and may be used for multi-spectral observations. As in FIG. 41, the microscope slide 41-2 may be sandwiched between a no-residue transparent adhesive film 41-3 and off-the-shelf bag 41-1 that may fit on the robotic part of the system of interest; here the machine vision system. Then holes 41-4, 41-5 may be made on the bag and the adhesive film in the location of the microscope slide and in the area where optical observation 41-4 or laser emission 41-5 is expected. This bagging system 41-6 may then be affixed to the machine by using the microscope slide 41-2 as a locating element to ensure appropriate mounting. This bagging system 41-6 may be disposed of after operation. The particularity of this embodiment of the invention is that the system is easily constructed, inexpensive, disposable, and permits precision optical operations related to laser measurement and imaging.

Example of Tattoo Operation

Figure 42:
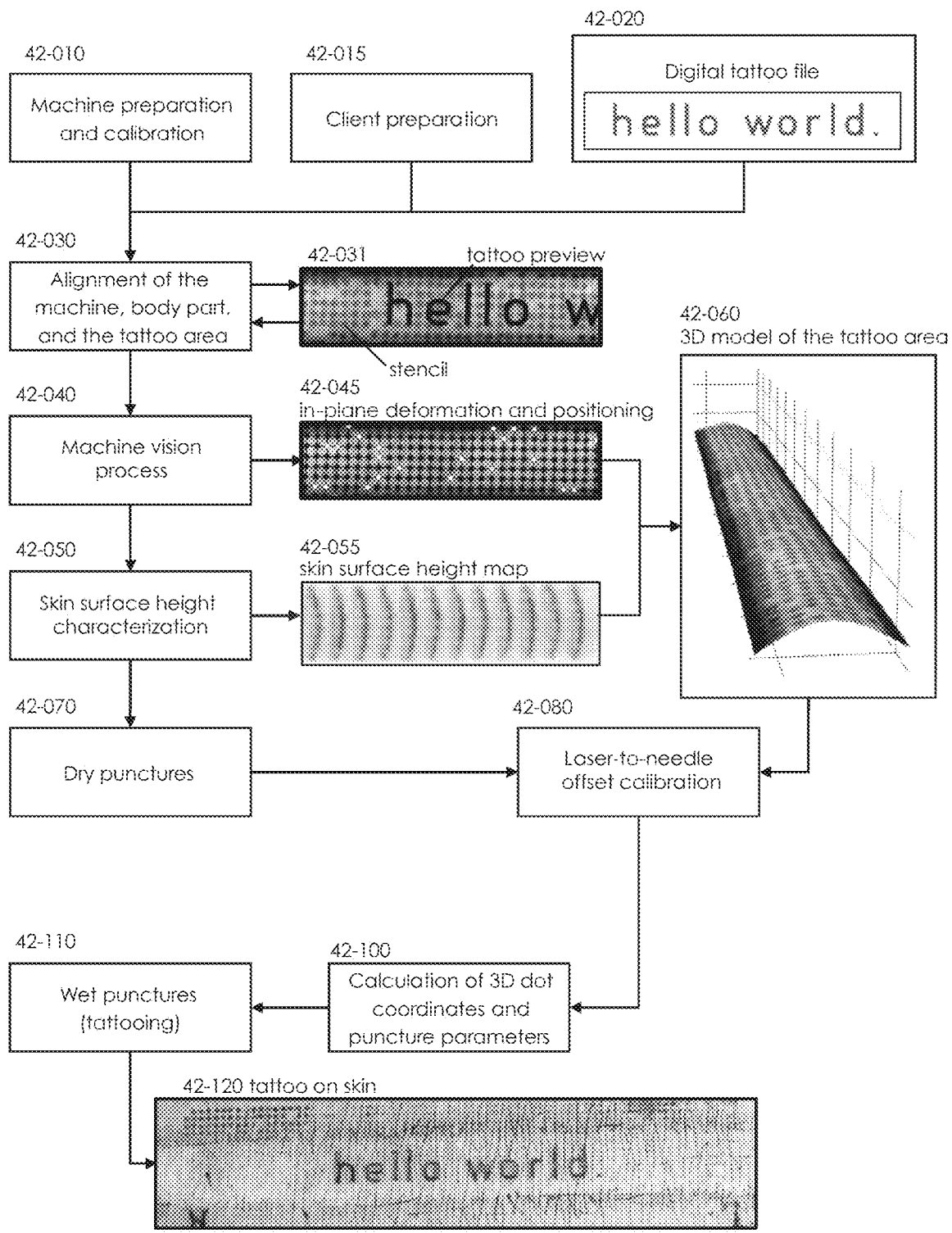
FIG. 42 shows a process of a tattoo operation, in accordance with an embodiment of the disclosure.

FIG. 42 shows the process of an example tattoo operation using the automatic tattoo machine. In step 42-010 the tattoo machine is cleaned and bagged following the procedures described earlier in relation to FIG. 34. The machine is also calibrated at step 42-010 to account for geometric variabilities which occur between each tattoo session, such as position of the needle tip, laser reference line and contactor edge with respect to the camera image. The machine calibration process will be described later in relation to FIG. 43. In step 42-015 the client and the tattoo area are prepared as described earlier in relation to steps 301-304 of FIG. 3A. The digital tattoo file 42-020 (which may be generated by methods 1208 or 2200 and contains the dot-based tattoo design, stencil, puncture settings per each dot, and other metadata) is loaded into the controller 108. In step 42-030 the tattooing apparatus 100 is positioned appropriately relative to the area to be tattooed (step 307 of FIG. 3A), and the contactor 1704 (or 420) and/or the tattoo frame 403 are lowered to hold the skin in place. During the positioning step, a preview 42-031 of the tattoo design may be displayed in real-time via display 1422 or display 99 to aid the alignment process. The real-time preview 42-031 may be generated using the machine vision method 357 (FIG. 7), wherein: (i) the machine vision system 1702 or machine vision device 430 acquires images of the tattoo area; (ii) a machine vision algorithm detects the stencil on the camera image (step 365), (iii) a machine vision algorithm calculates the skin deformation (step 366), (iv) a machine vision algorithm calculates the coordinates of the tattoo dots on the image (FIG. 6B); and (v) appearance of the tattoo dots as they would appear on skin are simulated and overlaid on the acquired images to generate the tattoo preview 42-031. During the alignment step 42-030, the tattoo design may also be translated and rotated with respect to the skin as desired by the client or the operator using a controller interface (for example, a touch-screen interface, mouse, or other inputs discussed in connection with FIG. 20) and the results of this operation reflected on the preview 42-031 in real time to provide feedback to the user via display 1422 or display 99.

After the alignment step 42-030, the tattooing operation may start. A series of measurements and analyses are performed on the tattoo area (the area within the contactor 1704 window) between steps 42-040 and 42-070. At step 42-040, the in-plane deformation of the skin 42-045 is calculated using the machine vision methodology described earlier in relation to FIGS. 5A, 5B, 6A, 6B, 7. One embodiment of this process will be described later in detail in relation to FIG. 44. At step 42-050, the skin surface height map 42-055 over the tattoo window is calculated using the laser-based skin height characterization methodology described earlier in relation to FIGS. 24ABC, 25ABC, 26ABC. One embodiment of the skin height characterization process will be described later in detail in relation to FIG. 45. Combining the in-plane deformation 42-045 and skin surface height map 42-055, a 3D model of the skin surface 42-060 may be constructed. At step 42-070 "dry punctures" (punctures without ink) are applied on the patch of skin within the tattoo window to sense skin puncture characteristics using methods described earlier in relation to FIGS. 12A, 12B. Dry puncture data from step 42-070 also contain information needed to determine the distance of the skin surface from the needle tip. At step 42-080, the puncture data collected at step 42-070 and the skin surface height map 42-055 are analyzed to calibrate an offset $z_0$ which can be defined as the distance between (i) the position of the needle tip corresponding to a reference machine setting and (ii) the reference plane (FIG. 25A) used in skin height calculations. Once the calibration 42-080 is performed, the offset may be used in adjusting the needle height for tattoo dots on a new patch of skin based on the skin surface height map 42-055. Adjusting the needle height based on laser height maps will be described later in relation to FIG. 45.

Next, ink is pushed into the cartridge using one embodiment of the ink delivery systems described in relation to FIGS. 16 and 30. Machine vision process 42-040 and skin surface height characterization step 42-050 may be repeated before applying tattoo dots, to update the 3D model of the skin surface 42-060 in the computer memory. This update may be necessary if the skin surface or the contactor window has moved since steps 42-040 and 42-050 were last executed. At step 42-100, for each tattoo dot in the tattoo window, the spatial coordinates (x,y,z) of the needle tip are calculated by mapping the 2D coordinates of the dots in the tattoo design to coordinates in 3D space, using the most recent 3D model 42-060 of the skin as a mapping function. A method for needle height adjustment based on skin height maps will be described in detail in relation to FIG. 45. The needle height and number of punctures per dot may be further adjusted to achieve the desired visual characteristics using method 808 (FIG. 13). The result of the operation is the tattoo applied on skin 42-120, which visually represents the design in the digital tattoo file 42-020. In the embodiment of the tattoo process shown in FIG. 42, the dimensions of the window of the contactor 120 or contactor 1702 is 3 mm height by 50 mm width. In the shown example of resulting tattoo on skin 42-120; the height of the letters "h", "l", "d" are 2 mm, the total number of tattoo dots of "Hello World." is 207. In other embodiments, the height of the contactor window may be between 1 mm and 20 mm, and dimensions of the tattoo may be larger than the example shown in FIG. 42. Larger tattoos may be created by moving the contactor window to another patch of skin and repeating steps 42-040, 42-050, 42-100, 42-110 as necessary in the process of completing the entire tattoo. Processes of tattooing which may require moving the contactor window are described in relation to FIG. 3C and FIG. 40.

Machine Calibration

Figure 43:
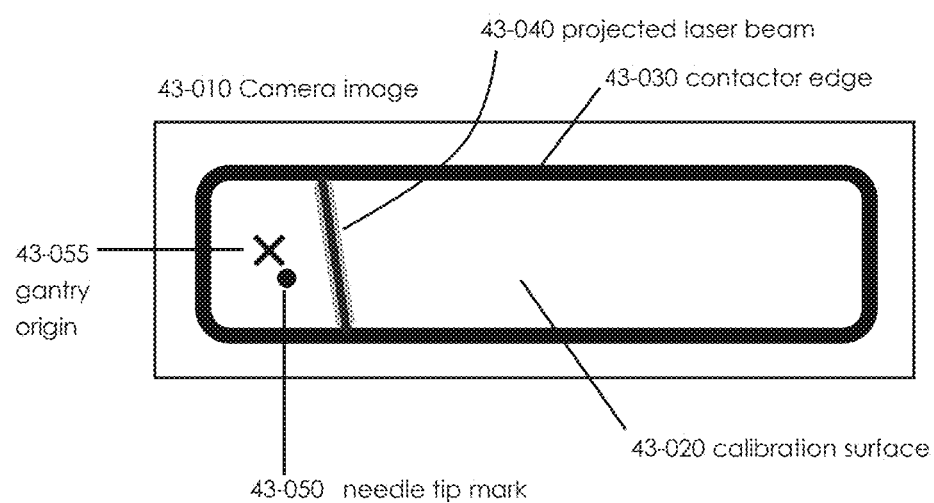
FIG. 43 is an illustrative diagram of calibrating a tattoo machine, in accordance with an embodiment of the disclosure.

FIG. 43 describes a process of calibrating the automatic tattoo machine before each tattoo operation. This calibration process allows the automatic tattooing process to adjust its operation to account for unintended geometric variations in the system between tattoo operations. For example, variations in (i) position of the contactor edge, (ii) position of the needle tip, and (iii) position of the laser beam, may need to be determined with respect to a common reference frame (such as the field of view of the machine vision system 1702 or machine vision device 430), to account for these variations in the generation of machine instructions for automatic tattooing.

The calibration process may include placing a disposable calibration surface 43-020 under the contactor 1704, and acquiring an image 43-010 of the contactor window using the machine vision system 1702 or machine vision device 430, to view the positions of the contactor window edge 43-030, needle tip 43-050 (or a mark placed on the calibration surface by the needle tip), and the projection of the laser beam 43-040 on the reference calibration surface 43-020.

Contactor window edge 43-030 may be detected automatically by image analysis, and the detected position then used to define the limits of the needle position during the tattoo operation, in order to avoid impacting the contactor 120 or 1704 with the tattoo needle 142. In one embodiment of the tattoo machine, a disposable needle cartridge 141 is mounted on the machine. Due to manufacturing variabilities, or potential interference of disposable bagging, the location of the needle 142 tip on the camera image may vary between each tattoo operation. A mark 43-050 may be robotically applied on the calibration surface 43-020 via the needle 142, and the mark 43-050 identified on the camera image 43-010 to calculate the correspondence between the coordinates of the X gantry 107 and Y gantry 106 and the actual position of the needle tip on the camera image. This correspondence is then used when generating machine coordinates to apply a given tattoo dot in step 326 of the process 320 (FIG. 3C). In one embodiment of the tattoo machine, a planar laser beam is used to characterize the height map of the skin surface, as described in relation to FIGS. 24ABC, 25ABC. During the calibration process of FIG. 43, the projection of the planar laser beam 43-040 on the flat calibration surface 43-020 is identified on the image 43-010. The identified location and orientation of the projected beam on the image is stored in memory, which serves as the reference laser line when calculating the skin height during a tattoo operation as described earlier in relation to FIG. 25B.

Stencil-Based Machine Vision Process for Deformation and Position Analysis

FIG. 44 illustrates an embodiment of the machine vision process 42-040 for calculating the deformation (e.g., in-plane deformation), contours, topology, etc. of the skin and/or positioning on skin. In one embodiment, the field of view of the machine vision system 1702 or device 430 (e.g., a machine vision camera) may be smaller than the tattoo window (e.g., the window of contactor 1704). In this case, multiple images are robotically collected at different locations of the tattoo window as shown in step 44-010. The images may overlap to ensure complete coverage of the tattoo window. The collected images are then combined using image stitching, mosaicking, and blending methods (for example, using SIFT for feature-based correspondence, cross-correlation methods for featureless correspondence, or using camera coordinates for direct correspondence, and using linear interpolation for blending images) to obtain a complete image of the tattoo window 44-020. In another embodiment, the field of view of the camera may be large enough to cover the entire tattoo window 44-020. In this case the image of the entire tattoo window 44-020 may be collected with a single image acquisition.

In step 44-030, the stencil and a pattern on stencil 44-031 is detected on the image 44-020, and a deformation map 44-040 is calculated using methods described in relation to FIGS. 6A and 6B and step 366 in FIG. 7. Positioning on the skin is also determined using the detected pattern on the stencil 44-031, using methods described in relation to Step 367 in FIG. 7. In step 44-050, using the deformation map 44-040 and positioning information, the machine gantry coordinates ($x_i$, $y_i$) for any tattoo dot i in the tattoo window is calculated. Adjustments to the gantry coordinates may be made to account for certain geometric variables of the tattoo environment, such as (i) the deviation of the needle tip position from the gantry origin, as discussed in relation to FIG. 43, and (ii) the deviation of the needle's point of contact with the skin from the coordinates ($x_i$, $y_i$) on the image 44-050 which results from the inclination of the needle axis from the camera axis and height of the skin h at coordinates ($x_i$, $y_i$). For the correction (ii), the height of the skin is calculated using the skin height characterization method illustrated in relation to FIG. 45.

Skin Height Characterization by Laser Projection

Figure 45:
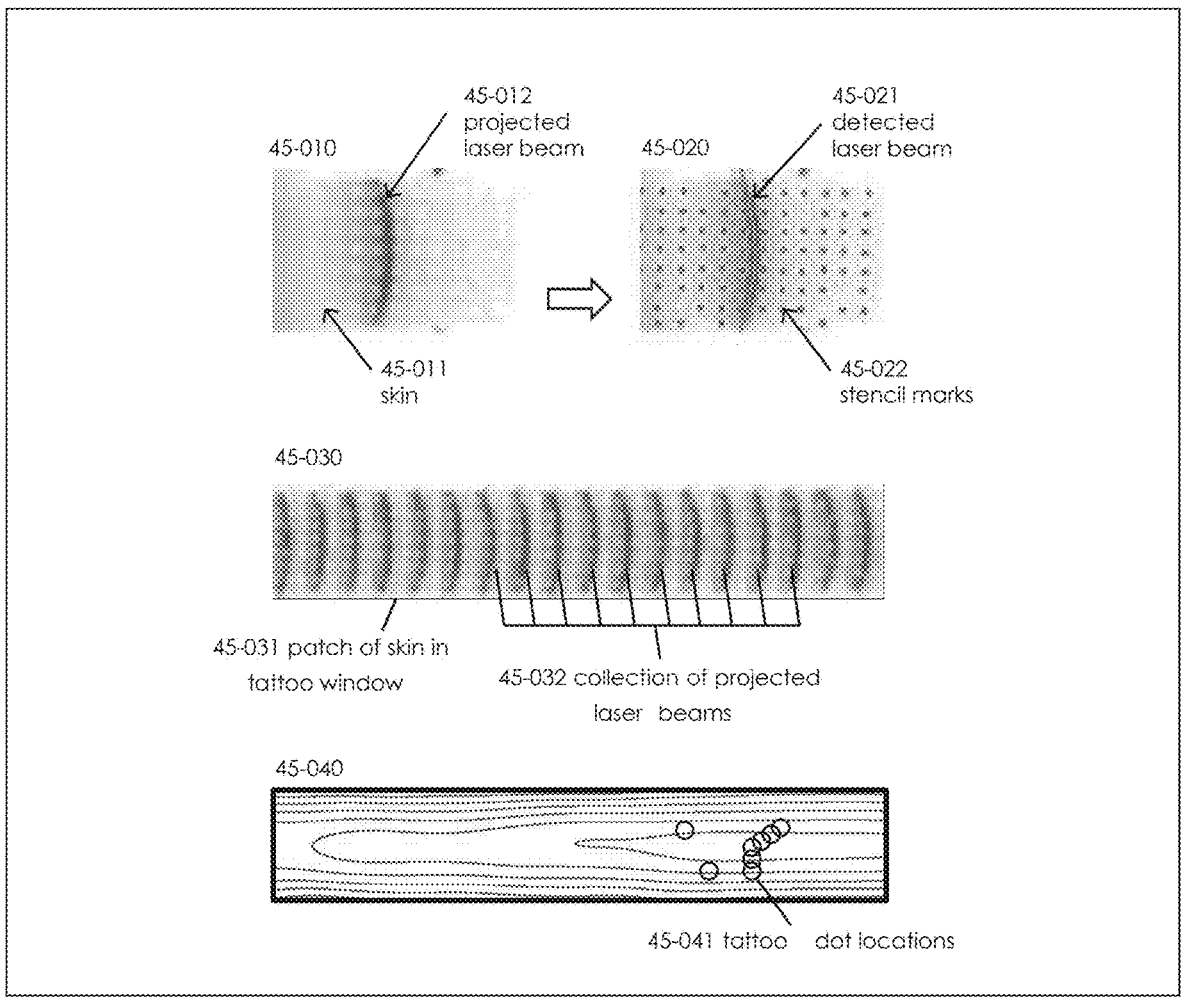
FIG. 45 is an illustrative diagram of an embodiment of a skin height characterization process, in accordance with an embodiment of the disclosure.

FIG. 45 illustrates an embodiment of the skin surface height characterization process 42-050 using a laser beam. Skin surface height characterization step 42-050 is executed during an automatic tattooing process (FIG. 42) to identify variations in the skin surface height map, which may be due to natural bumps on the skin, curvature of the skin surface due to underlying bone or tissue, out-of-plane deformation or skin bulge due to force applied by the contactor, etc. The skin surface height map information is used in adjusting the needle extension to achieve desired puncture depths across the tattoo window. For example, the machine instructions for needle extension (or needle height) $z_i$ for a dot i may be calculated as:

$$z_i = z_0 - h(x_i, y_i) + \Delta z_i$$

where $z_0$ is a constant offset parameter calibrated at step 42-080, and h ($x_i$, $y_i$) is the skin height calculated at the targeted location of the tattoo dot (at coordinates $x_i$, $y_i$), and $\Delta z_i$ is the desired maximum extension of the needle from the skin surface to deposit tattoo ink at a certain target depth, which may be calculated using method 808.

An embodiment of the skin height characterization process 42-050 is described in FIG. 45. This embodiment employs a single planar laser beam (e.g., as described in FIG. 25A,B,C) that is successively moved across the tattoo window to calculate the skin surface height map of the patch of skin within the tattoo window. Positioning of the laser beam may be done by actuating the robotic implement of FIG. 22 over the skin, or by actuation of the optical elements 1708. At each step, the laser beam is projected on the skin and an image 45-010 is acquired from the machine vision system 1702. The image contains the skin 45-011, which may or may not be visible due to lighting conditions, and the projection of the laser beam 45-012 on the skin, which generally follows a curved path on a curved skin surface as discussed earlier in relation to FIG. 25B. In image analysis 45-020, the projected laser beam is detected on the camera image using computer algorithms (e.g., using Sobel or Gabor filters, other feature detection methods, line tracing methods, etc.). The displacement δ of this detected projection 45-021 from the reference line 43-040 (FIG. 43), is used to calculate the height of the skin along the projection as described earlier in relation to FIG. 25B. Certain features on the skin, such as the applied stencil 338*b* (FIG. 5B) or other natural features on the skin (e.g., hair roots, moles etc.), may interact with the laser beam. For example, an applied stencil may absorb the laser light more than bare skin, which may alter the appearance of the projected laser beam. Any features on the skin (including stencil) which may alter the projected laser beam may be identified during the machine vision process in step 42-040 prior to laser-based characterization in step 42-050. The locations of the identified features (for example, the identified stencil marks 45-022) may be accounted for by excluding, masking, or by other means during image analysis 45-020. A single planar laser beam may provide information only along a single path of its projection across the skin. To create a two-dimensional (2D) topological surface height map of the patch of skin 45-031 within the tattoo window, either (i) multiple beams may be projected at once, or (ii) a single beam may be sequentially moved to various locations on the skin. In either embodiment of the skin height characterization process, the analysis 45-020 is repeated for each location of the beam. In one embodiment of the process described in FIG. 45, a single planar beam is moved across the patch of skin 45-031 in the tattoo window, and a camera image for each projected beam is collected and the set of such images combined into a stitched image 45-030. The detection step 45-021 is repeated for each projection in the collection of projected beams 45-032, yielding a collection of skin height measurements along the patch of skin 45-031 in the window. The spacing of the projected laser beams on the skin is shown as "scan step size" on the image 45-030. In a preferred embodiment, the scan step size is 1 mm. The scan step size may be chosen to be between 100 μm and 3 mm, based on the desired resolution for the skin height map. In step 45-040, an interpolation is performed on the collection of skin height measurements to create a 2D map of skin height. The interpolation operation at step 45-040 may be done using parametric methods such as least-squares fit of a deformation model, or non-parametric methods such as Gaussian stochastic fields, Kriging, etc., or by distance-based weighted averaging of the skin height measurements. The resulting skin height map can be evaluated at any arbitrary point within the domain of interpolation, for example at tattoo dot locations 45-041, in order to adjust the height of the needle $z_i$ as discussed earlier.

Puncture Density Adjustment

Figure 46:
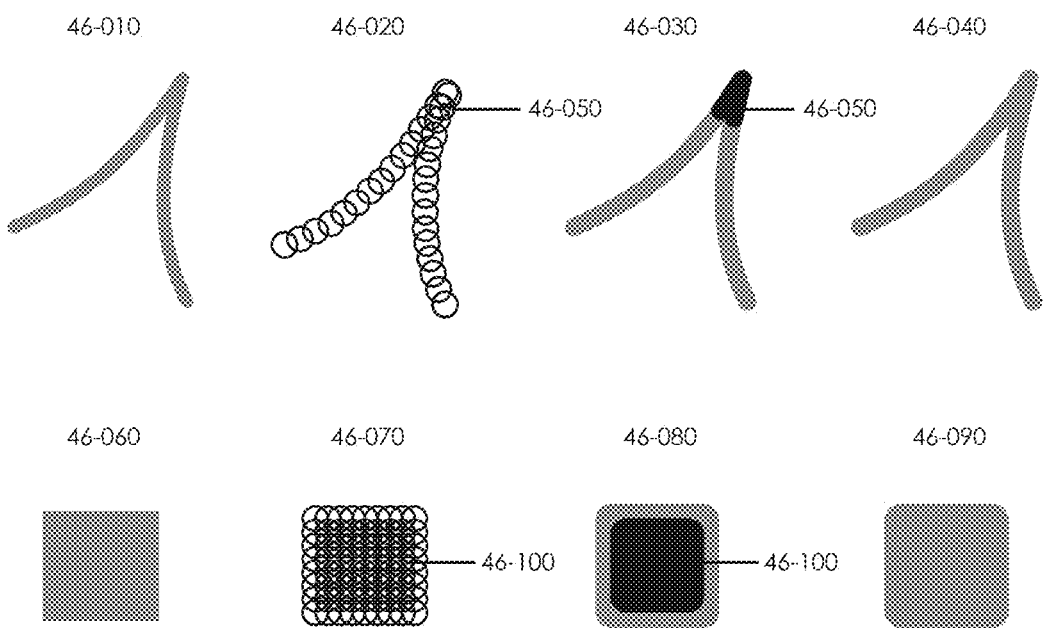
FIG. 46 is an illustrative diagram of a process of adjusting puncture number settings in a digital tattoo design, in accordance with an embodiment of the disclosure.

The procedure for generating dot-based tattoo designs was described in previous paragraphs in relation to step 1215 of FIG. 19 for single-tone tattoos, and in relation to step 2206 of FIG. 29 for multi-color tattoos. A method for improving the visual outcome of the dot-based tattoo design, by means of adjusting the spatial density of needle punctures, is further described here. Consider a graphical artwork 1211 that is to be converted into a digital tattoo file by following the procedure in FIG. 19. Graphical elements, such as individual dots, lines, and shades, etc. are detected in step 1214, and collections of dots are generated to visually represent these visual design features in step 1215. Now referring to FIG. 46, a curve 46-010 and a filled area 46-060 are shown which may be parts of the artwork 1211. FIG. 46 also shows a collection of dots 46-020 visually representing the curve 46-010, and a collection of dots 46-070 visually representing the square 46-060. Each circle in FIG. 46 represents a tattoo dot, which corresponds to a distinct location on the skin where the needle is piloted robotically to puncture the skin a prescribed number of times. Due to geometric limitations, the collections of tattoo dots 46-020 and 46-070, will in general exhibit varying degrees of overlap. For example, regions with relatively high overlap of dots are shown with 46-050 on the curve and with 46-100 on the filled square. If an equal number of needle punctures per dot is applied on the skin, on the regions with relatively high overlap 46-050 on the curve and 46-100 on the filled square, a higher concentration of tattoo ink may be deposited due to the higher density of needle punctures. The resulting tattoo outcome in this case is shown with 46-030 for the curve and 46-080 for the filled square. To better match the ink density of the intended designs 46-010 and 46-060, the number of punctures applied for each dot may be adjusted. This adjustment controls the spatial density of needle punctures (e.g., number of punctures per unit surface area), and in consequence aims to match the ink density deposited on the skin with the shade or color intensity at the corresponding location in the design. For example, the number of punctures per dot may be reduced for the regions 46-050 and 46-100 to achieve the tattoo outcomes 46-040 and 46-090 on the skin.

Adjustment of dot puncture density requires a forward simulation of the tattoo on skin, for example, based on methods described herein. One method for calculating the adjustment is given here as an example. i=1, 2, ... ,m can denote the index for dots, where m is the total number of dots in the dot-based design generated in step 1215. The baseline number of punctures per dot is $n_0$, for example, $n_0$=5 punctures per dot. The adjusted number of punctures per dot, denoted as $n_i$, may be calculated as:
$n_i$=int($n_0 f_i$) where int(·) is the operator of rounding to the nearest integer, and $f_i$ is the density adjustment factor.
Based on a linear relationship between puncture density and ink density, the adjustment factor $f_i$ for each dot i may be calculated as:

$$f_i = \frac{\int \phi_i(x, y) D(x, y) dx dy}{\int \phi_i(x, y) D_S(x, y) dx dy}$$

where D(x, y) is the grayscale image of the design (output of step 1213 in FIG. 19), $\phi_i(x, y)$ is a simulated image of the dot i at its coordinates $x_i$, $y_i$ (for example, a Gaussian function centered at $x_i$, $y_i$ and a scale parameter equal to dot size), and $D_S(x, y)$ is a simulated image of the design, which may be approximated as:

$$D_S(x, y) = \sum_i \phi_i(x, y)$$

The adjustment method can account for varying degrees of overlap in the dot-based design, variations of shading in the target design, etc. The adjustment method may be executed in conjunction with the dot-based design generation in step 1215, to optimize the locations and number of punctures in order to reduce tattoo operation time, improve visual similarity to the design, reduce ink consumption, and/or the like.

Puncture Setting Refinement for a Client

Figure 47:
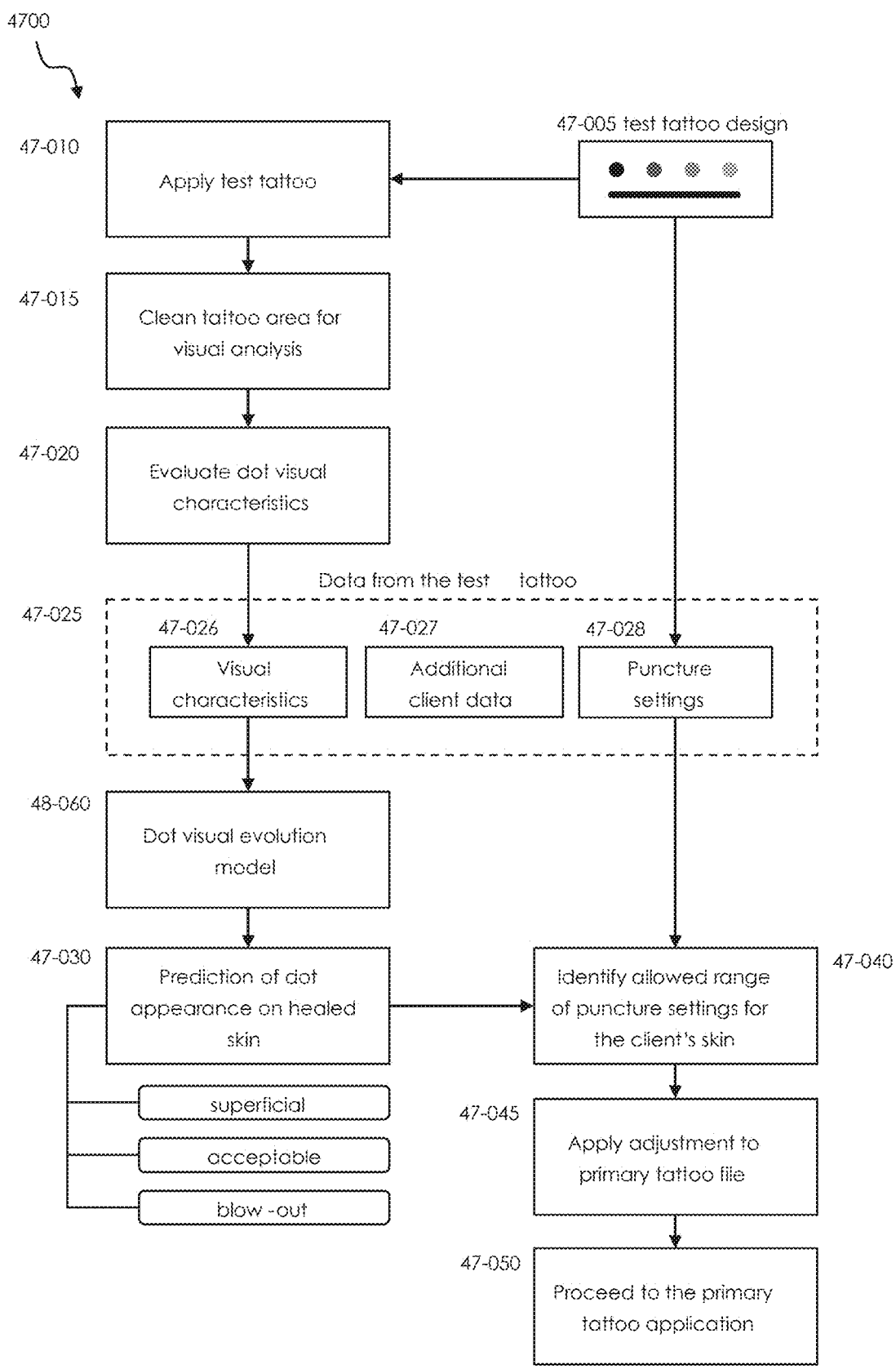
FIG. 47 shows a process for adjusting puncture settings based upon a test tattoo analysis, in accordance with an embodiment of the disclosure.

FIG. 47 illustrates a method for adjusting puncture settings for an individual's skin based on application of a test tattoo. The output of this process is an adjustment to puncture settings (depth of punctures, number of punctures per dot, density of punctures per area, etc.) and/or allowed range of puncture settings for the individual's skin, in order to: (i) avoid superficial dots; (ii) avoid blow-out dots; (iii) improve accuracy of puncture settings to produce the intended ink density; and (iv) generally improve the visual similarity of the applied tattoo to the intended tattoo design. This adjustment process may improve the puncture settings predicted by the skin puncture database method 808 (FIG. 13). The adjustment process may be particularly useful for tattooing on certain skin types that are not represented in the dataset collected in step 811 (FIG. 13), or to account for any skin variables that may not be adequately represented by the database. The test tattoo design 47-005 may include a collection of dots and lines created to test a range of puncture settings (depth of punctures, number of punctures per dot, density of punctures per area, etc.). The dots and lines in the test design may be spatially configured in order to visually blend in with the final tattoo design that will be applied after the test tattoo. In step 47-010 of the process, the test tattoo is applied on the skin, for example, using the procedure illustrated in FIG. 42. At step 47-015, the tattoo area is cleaned (manually using alcohol wipes, etc., or automatically using the suction system in FIG. 33) in order to prepare for visual inspection of the test tattoo. At step 47-020, the visual characteristics 47-026 of the dots and lines in the applied test tattoo are analyzed using image analysis methods described within the application. The visual characteristics of a test tattoo dot quantified from image analysis may include size, darkness (ink intensity), deposited ink amount, etc. For example, a test tattoo dot may look like one of the dots illustrated in FIG. 49. For a test line, the quantified visual characteristics 47-026 may be its width, contrast, darkness (intensity), ink uniformity, etc. The quantified visual characteristics 47-026 and the puncture settings 47-028 of test tattoo dots, and optionally additional client-specific data 47-027 (e.g., age, sex, skin moisture content, other measurements made on skin, etc.) constitute the data collected from the test tattoo session 47-025. At step 47-030, the data collected from the test tattoo session 47-025 are used as inputs to a dot visual evolution model 48-060, to classify each test tattoo dot as a superficial dot, acceptable dot, or a blow-out, in terms of their predicted appearance in the future. The experimental process of creating a dot visual evolution model 48-060 will be explained later in relation to FIGS. 50 and 51. The predicted classification of the test tattoo dots 47-030 are then used to classify the applied puncture settings for each dot (e.g., needle height, number of punctures, etc.), as either (i) superficial, (ii) acceptable, or (iii) blowout. Repeating step 47-030 for all dots of the test tattoo provides an allowed range of puncture settings for the client's skin 47-040 (e.g., minimum/maximum depth, minimum/maximum puncture density, etc.). The identified range 47-040 can be used to avoid superficial and blow-out dots during the primary tattoo session. In step 47-045 the identified range of allowed settings 47-040 and optionally additional client-specific data 47-027 and/or the puncture setting prediction method 808, are used to automatically adjust the puncture settings for the primary tattoo, in order to avoid superficial dots and blow-outs, and to improve accuracy of the ink density, shade, or grayscale effect. After applying the adjustment 47-045 to primary tattoo file, primary tattoo application 47-050 may be initiated.

Predictive Model of Dot Visual Evolution

Figure 48:
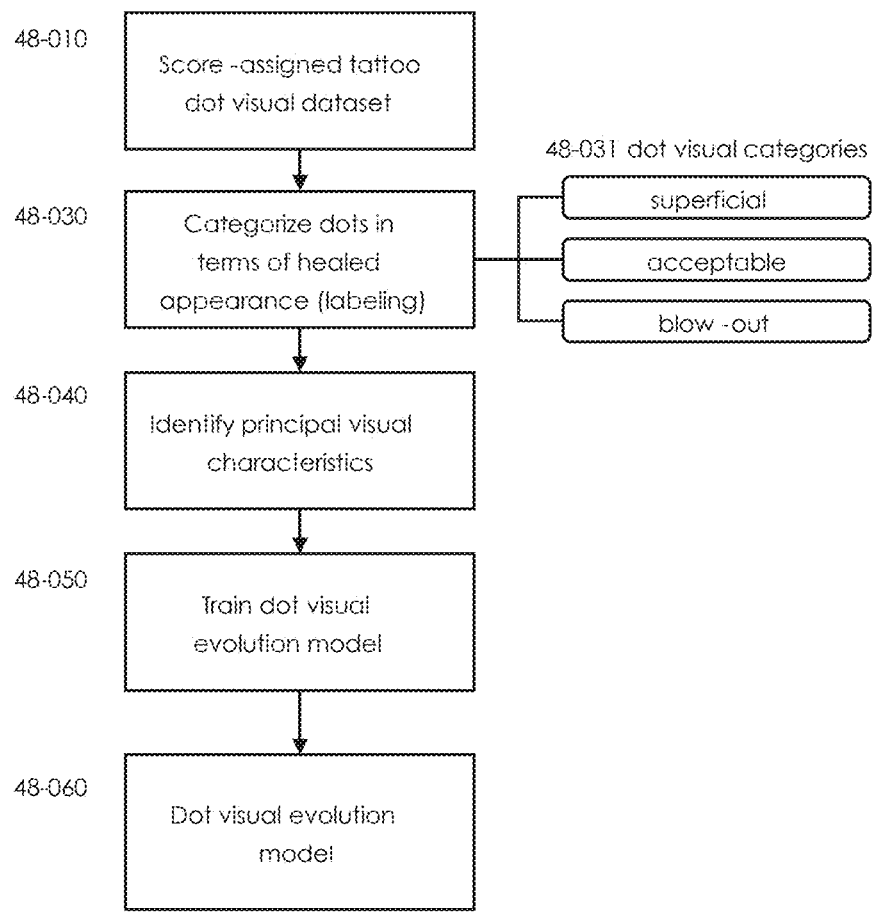
FIG. 48 shows a process for generation of a dot visual evolution model predicting the healed appearance of a tattoo dot, in accordance with an embodiment of the disclosure.

FIG. 48 illustrates the development of a method for predicting the healed appearance of a tattoo dot based on its visual characteristics shortly after tattooing (for example, within the same day). First, a dataset 48-010 is generated for training the model. The dataset 48-010 contains, at minimum, images of experimental tattoo dots collected at multiple points in time after tattooing, including images: of (i) initial appearance after tattooing (e.g., on the day of tattooing); and (ii) after a sufficient time has passed for the tattoo area to heal (e.g., 120 days after tattooing). The images in the dataset 48-010 are analyzed (e.g., as in step 812 of FIG. 13) to assign quantitative measurement scores of visual characteristics (size, ink amount, circularity, sharpness of the edges, etc.) to each tattoo dot in each image. In a preferred embodiment, the dataset 48-010 is the set of tattoo data and pictures 816 (FIG. 13), collected and processed as described in relation to steps 811-812 (FIG. 13). Referring again to FIG. 48, at step 48-030 the dataset 48-010 is processed using automated image analysis or classification methods or by manual inspection, in order to assign each tattoo dot in the dataset to a visual category 48-031 based on its appearance after the tattooed skin is healed; for example, as (i) superficial, (ii) acceptable, or (iii) blow-out. For example, see FIG. 49 for illustrations and photos of (i) a superficial dot 49-020, (ii) acceptable dots 49-030 and 49-040, and (iii) a blowout dot 49-050. The evolution of visual characteristics of these dots over time will also be discussed in relation to FIG. 50. At step 48-040, the principal visual characteristics are identified. Here, "principal visual characteristics" is defined as the set or combination of visual characteristics which may be used to predict the visual category of a dot 48-031 when the skin is healed. For example, the principal visual characteristics may be the dot size and ink amount, as discussed in relation to FIG. 49. In step 48-050 a dot visual evolution model is trained to score and predict the visual category 48-031 (superficial, acceptable, blowout) from the principal visual characteristic of a dot on the day of tattooing. The resulting dot visual evolution model 48-060 is utilized by method 4700 (FIG. 47) to evaluate the outcome of test tattoos and adjust puncture parameters for a primary tattoo operation. In one embodiment, the model 48-060 may be a classification model (for example, a support vector classifier model), or a nearest neighbor classifier model. In another embodiment, the model 48-060 may be a regression model to predict the dot visual characteristics (size, ink amount, etc.) after the skin is healed, rather than predicting a visual category (superficial, acceptable, blowout).

Visual Inspection and Categorization of Tattoo Dots

Figure 49:
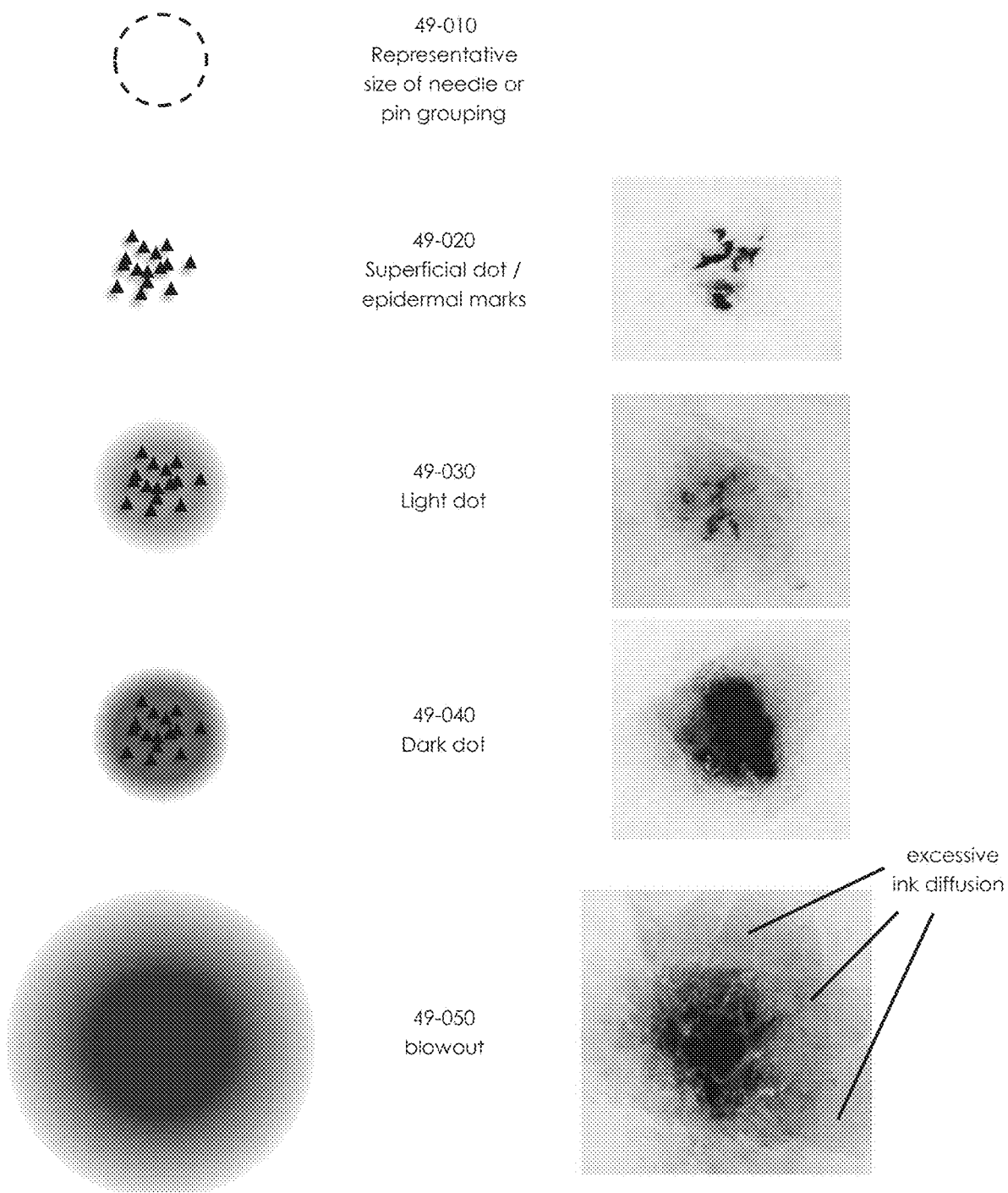
FIG. 49 is an illustrative diagram of a collection of tattoo dots, in accordance with an embodiment of the disclosure.

FIG. 49 illustrates various tattoo dots belonging to different visual categories 48-031. The circle 49-010 represents the size of the tattoo needle or pin grouping, and is provided as a reference in interpreting the tattoo dots 49-020 through 49-050. Photos of dots are given on the right, and representative drawings corresponding to each dot photo are given on the left of FIG. 49. The tattoo dots shown in the figure may be applied using different puncture settings (e.g., number of punctures per dot, needle extension, etc.) on different individuals. The superficial dot 49-020 exhibits small individual ink marks on the epidermis (the topmost layer of skin). This visual outcome is the result of insufficient penetration of the tattoo needle into the skin. Most of the deposited ink in the superficial dot 49-020 is in the epidermis, and the ink is removed from skin typically over the course of a few weeks as the epidermis is naturally renewed. A distinguishing visual characteristic of the superficial dot 49-020 is the low amount of ink content, and ink marks being localized to individual points where the tip penetrates resulting in a fragmented appearance. Because a superficial dot 49-020 disappears over time, it is an undesirable tattoo dot. The method 4700 is proposed to avoid this type of dots in the primary tattoo application. The blowout dot 49-050 is characterized by: (i) large size relative to the size of the needle grouping 49-010; (ii) appearance of a gray shade around the dark circular core (an indicator of ink diffusing at the lower layers of the dermis); and (iii) a high total ink content. The blowout dot 49-050 is an undesirable tattoo dot, because the excessive ink diffusion in the dermis reduces the contrast and fidelity of the applied tattoo design. Acceptable dots 49-030 and 49-040 have moderate amounts of ink content and sizes comparable to the size of the needle grouping 49-010. In summary, certain visual characteristics measured shortly after tattooing, such as dot size and ink content as shown here, may be used to predict the appearance of dots after the skin heals.

Figure 50:
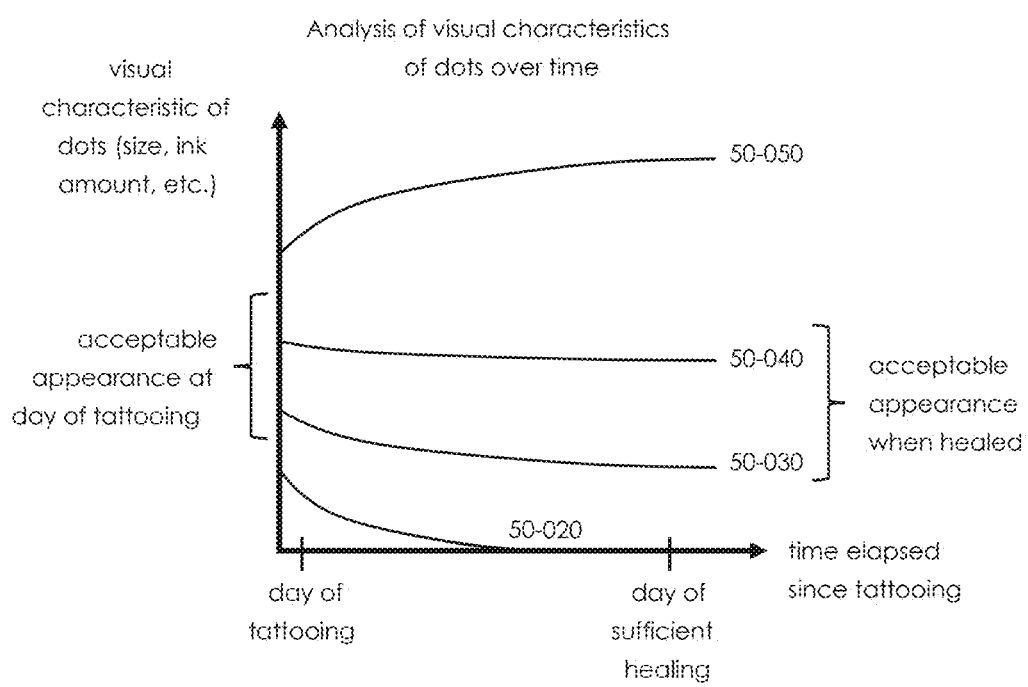
FIG. 50 is an illustrative diagram of time evolution of visual characteristics of tattoo dots, in accordance with an embodiment of the disclosure.

FIG. 50 illustrates the time evolution of visual characteristics (e.g., dot size or ink amount) of various tattoo dots. The four curves 50-020 through 50-050 in this figure correspond to the four dots 49-020 through 49-050 illustrated in FIG. 49. The horizontal axis is the time elapsed since the day of tattooing. The vertical axis shows a quantified visual characteristic of the tattoo dots at a particular time after tattooing, for example dot size or ink amounts saved in the dataset 48-010. The curve 50-020 (FIG. 50) for the superficial dot 49-020 (FIG. 49) shows that the dot initially has a low ink content, which decreases over several days until no visible ink is present. As discussed in relation to FIG. 49, most of this visible ink consists of ink marks left on the epidermis by the slight penetration (up to approximately 100-200 um) of the needle tip, and these marks disappear over time as the skin heals. Therefore 49-020 is a superficial dot, which should be avoided in tattooing. In one embodiment, superficial dots 49-020 may be classified on the day of tattooing based on the small amount of ink content. On the other hand, the curve 50-050 (FIG. 50) for dot 49-050 shows a high initial ink content and large size, both of which may increase over time as the ink diffuses out from the core region. The high ink content, large size, and excessive diffusion are also shown by the photo of the blowout dot 49-050 in FIG. 49. The curves 50-030 and 50-040 in FIG. 50 correspond to the acceptable dots 49-030 and 49-040 in FIG. 49. These acceptable dots may be characterized by: (i) a slight reduction in the visible ink due to natural processes of ink removal from the skin (e.g. by macrophages in the dermis); (ii) a dot size that remains similar in comparison to the needle size 49-010 of FIG. 49; and (iii) most of the ink being retained in the skin after a time of sufficient healing has passed (for example, after 120 days). Time of sufficient healing may be defined as the turnover time for the renewal of the epidermal cells of the skin (on the order of a month in humans), or the time after which the appearance of the tattoo does not change significantly. The analysis of the curves 50-020 through 50-050 in FIG. 50 suggests that there is an "acceptable" range of values for visual characteristics on the day of tattooing (shown along the vertical axis on the figure), which may be used to predict the visual outcome of the tattoo dots when the skin is healed.

Method of Predicting Tattoo Dot Evolution Based on Early Visual Characteristics

Figure 51:
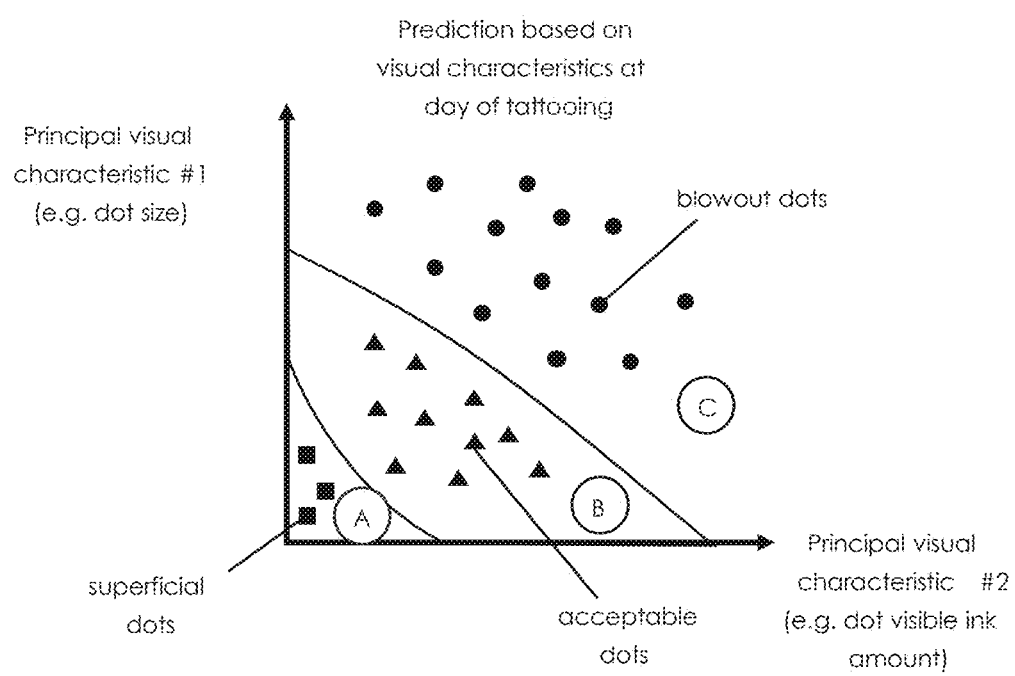
FIG. 51 is an illustrative diagram of an embodiment of a model of dot visual evolution, in accordance with an embodiment of the disclosure.

FIG. 51 illustrates one embodiment of the model of dot visual evolution 48-060, which is used to predict the healed appearance of tattoo dots based on its their visual characteristics shortly after tattooing (for example, on the same day of tattooing). The axes of the graph are principal visual characteristics identified in step 48-040 (FIG. 48), which are the dot size and dot visible ink amount in this embodiment of the model 48-060. In another embodiment, the number of principal visual characteristics may be more than two; for example also including dot circularity, sharpness of the edges, etc. The data points on the graph represent the dots in the dataset 48-010 which are categorized in step 48-030 as (i) superficial dots, (ii) acceptable dots, (iii) blowout dots, and drawn on the graph at coordinates corresponding to their dot size and dot visible ink amount measured on the day of tattooing. An optimal selection of the set of principal visual characteristics at step 48-040 results in the sets of dots in each visual category to cover separate domains on the space of principal visual characteristics. However, in practice, some overlap may occur. The domains for superficial, acceptable, and blow-out dots are shown with regions A, B, C on the graph. In one embodiment, the steps 48-040 and 48-050 may constitute training a support vector classifier (SVC) model with an appropriate kernel function (linear, polynomial, exponential, etc.) to automatically select the principal visual characteristics and their mapping which best separate the dot visual categories. Then, such SVC model may be used as the dot visual evolution model 48-060. In another embodiment, the model 48-060 is a nearest neighbor classifier based on the dataset obtained after labeling in step 48-030. After establishing the model 48-060, it may be used in step 47-030 of the test tattoo session (FIG. 47) to predict the future appearance of the test tattoo dots. Each test tattoo dot is inspected in step 47-020 and its visual characteristics 47-026 are used as inputs to the model 48-060. The model may then predict the future appearance of the test tattoo dot as (A) superficial, (B) acceptable, or (C) blowout based on its visual characteristics 47-026.

Examples

The present technology is illustrated, for example, according to various aspects described below. Various examples of aspects of the present technology are described as numbered examples (1, 2, 3, etc.) for convenience. These are provided as examples and do not limit the present technology. It is noted that any of the dependent examples can be combined in any suitable manner, and placed into a respective independent example. The other examples can be presented in a similar manner.

1. A computer-implemented method for identifying skin features in a robotic tattooing operation, the method comprising:
   performing a scan of skin of a subject to detect skin features of the subject;
   analyzing at least one of the detected skin features;
   assigning each analyzed skin feature to a feature category based on the analysis; and
   determining at least one puncture setting for applying tattoo dots to the subject based on the detected skin features and respective feature category.

2. The method of example 1, wherein analyzing the at least one of the detected skin features includes analyzing one or more skin properties or characteristics of the detected skin features, wherein the feature category includes at least one of color, texture, morphology, collagen area, hair root, or lesion.

3. The method of any of example 1 and 2, further comprising:
   generating a tattoo puncture setting map of a target site along the subject, wherein the tattoo puncture setting map corresponds to a tattoo to be applied,
   modifying the tattoo puncture setting map based on the detected skin features and their respective feature category.

4. The method of any of examples 1-3, wherein determining the at least one puncture setting includes:
   for at least one of the detected skin features, determining whether to (A) modify a tattoo puncture setting map for robotically applying at least one tattoo dot proximate the detected feature, (B) maintain a portion of the tattoo puncture setting map associated with the at least one of the detected skin features, and/or (C) avoid applying tattoo dots at the detected feature; and
   robotically applying tattoo dots to the subject according to the determination.

5. The method of any of examples 1-4, further comprising:
   modifying a location of at least one of the tattoo dots to be applied to the subject based on the detected skin features.

6. The method of examples 1-5, further comprising:
   modifying the at least one puncture setting for applying the tattoo dots based on spatial variations in skin properties of the skin.

7. The method of any of examples 1-6, wherein the at least one puncture setting includes one or more of puncture location, needle height, volume of ink applied, and/or needle speed.

8. The method of any of examples 1-7, further comprising:
   obtaining one or more optical characteristics of the skin of the subject at a target site;
   simulating an appearance of the tattoo applied to the target site; and
   displaying, via a display, the simulated appearance of the tattoo.

9. The method of any of examples 1-8, further comprising:
   generating a tattoo puncture setting map of a target site along the subject, wherein the tattoo puncture setting map includes ink color and location information;
   mixing inks of different colors based on the ink color and the location information; and
   applying the mixed inks at the target site based on the ink color and the location information.

10. The method of any of examples 1-9, wherein the ink color and location information includes ink color data for dots and coordinates for the respective dots.

11. The method of any of examples 1-10, further comprising:
   optically analyzing a target site along the skin to determine one or more optical characteristics of the skin; and
   generate at least one optical value for the skin based on the one or more optical characteristics, wherein the at least one puncture setting is selected based on the at least one optical value and target appearance of dot to be applied.

12. The method of any of examples 1-11, wherein the at least one optical value includes at least one of a reflection coefficient or spectrum, a transmission coefficient or spectrum, an absorption coefficient or spectrum, or a scattering coefficient or spectrum.

13. A computer-implemented method for positioning a tattoo machine for applying a tattoo, the method comprising:
   capturing a series of images of skin of a recipient of the tattoo;
   analyzing the series of images to detect features on the skin and identify at least one of a position, shape, or size of each feature;
   calculating coordinates for each feature in the series of images;
   assigning a coordinate to each detected feature on the skin; and generating a digital representation of the detected features and associated coordinates.
14. The method of example 13, further comprising:
identifying spatial patterns formed by the detected features; and
storing the spatial patterns in the digital representation.
15. The method of any of example 13 and 14, further comprising:
capturing an image of the skin;
identifying the spatial patterns on the skin;
retrieving, from the digital representation, the coordinates associated with the spatial patterns; and
calculating a deformation of the skin based on a change in the spatial patterns in the image and the spatial patterns in the digital representation, wherein the calculated deformation of the skin is used to update tattooing instructions.
16. The method of any of examples 13-15, further comprising:
analyzing the skin to determine a color of ink to be applied;
automatically mixing two or more inks within a fluid system to produce an ink mixture with the determined color of ink; and
delivering the ink mixture through the fluid system to apply the ink mixture to the skin.
17. The method of any of examples 13-16, wherein the fluid system includes a plurality of ink containers fluidically coupled to a hub configured to mix the two or more inks.
18. The method of any of examples 13-17, further comprising:
analyzing the ink mixture within the fluid system; and
applying the analyzed ink mixture to the skin based on the analysis of the ink mixture.
19. The method of any of examples 13-18, further comprising:
optically analyzing the ink mixture within the fluid system; and
adjusting a composition of ink mixture based on the optical analysis.
20. The method of any of examples 13-19, further comprising:
automatically mixing a plurality of inks within a robotic tattooing apparatus to produce an ink mixture while the robotic tattooing apparatus tattoos the skin.
21. A method for removing a tattoo using a tattoo removal machine, the method comprising:
retrieving tattoo session data for a tattoo applied to recipient;
performing a scan of the skin to identify pigment in the skin, a reflective spectrum of tattooed portion of the skin, and/or a reflective spectrum of clear portions of the skin;
determining a removal area on the skin based on the scan and/or the tattoo session data; and
selecting a laser wavelength for removing the tattoo at the removal area based on pigments in the skin and/or skin absorbance data.
22. The method of example 21, further comprising:
identifying a condition of the skin, a position of pigments, and/or a depth of the pigments; and
determining a tattoo removal plan based on the identification.
23. The method of any of example 21 and 22, further comprising:
determining an angle and focal distance of laser beam of the tattoo removal machine and the removal area based on a pigment depth and a pigment position in the skin.
24. The method of any of examples 21-23, further comprising:
determining a laser spot position and a laser spot geometry for a laser of the tattoo removal machine based on the removal area.
25. The method of any of examples 21-24, wherein the tattoo removal machine includes at least one of a laser pulse generator, an optical transfer arm, or an effector assembly.
26. A method for applying a tattoo with a tattoo machine, the method comprising:
lowering a frame and a contactor of the tattoo machine onto a skin of a subject;
controlling a frame load of the frame on the skin by measuring the frame load and movement of the frame in a direction normal to the skin that is contacted;
controlling a contactor load of the contactor on the skin by measuring the contactor load and movement of the contactor in the direction normal to the skin that is contacted; and
maintaining the contactor load and the frame load constant, while applying the tattoo to the skin.
27. The method of example 26, further comprising:
moving the contactor and the frame along the skin by:
lifting the frame off the skin while the contactor holds the skin;
moving the frame along a surface of the skin;
lowering the frame into contact with the skin;
lifting the contactor off the skin while the frame holds the skin;
moving the contactor along the surface of the skin; and/or
lowering the contactor into contact with the skin.
28. The method of any of example 26 and 27, further comprising:
measuring a force that the contactor applies to the skin;
measuring a force that the frame applies to the skin; and
positioning the contactor and/or the frame relative to the subject based on at least one of the measured forces.
29. The method of any of examples 26-28, further comprising:
confirming or correcting the positioning of the contactor along the skin based on camera data of the skin.
30. The method of any of examples 26-29, wherein the tattoo machine is encased by an aseptic barrier including a microscopic slide.
31. A method for applying a tattoo with a tattoo machine, the method comprising:
calibrating the tattoo machine by adjusting machine instructions to account for a position of at least one of a needle tip, a laser beam on a calibration surface, or a contactor edge with respect to a camera image;
loading a digital file of an image of the tattoo to a controller of the tattoo machine, wherein the digital file includes at least one of a dot-based tattoo design, a stencil, or puncture settings per each dot of ink;
aligning the tattoo machine with an area of skin of a recipient of the tattoo;
puncturing the skin without ink to identify puncture characteristics of the skin, wherein the puncture characteristics includes information to determine a distance of the skin surface from the needle tip;

calibrating the distance between the needle tip and a reference plane of laser-based height measurements based on the puncture characteristics and a laser-based surface height map;

calculating spatial coordinates of the needle tip for each tattoo dot; and applying the tattoo to the skin.

32. The method of example 31, further comprising:

adjusting a needle height for a tattoo dot on the skin based on calibrating the distance between the needle tip and the reference plane of laser-based height measurements.

33. The method of any of example 31 and 32, further comprising:

calculating an in-plane deformation of the skin by stencil scanning; and calculating a surface height map of the skin by laser scanning.

34. The method of any of examples 31-33, further comprising:

calibrating the tattoo machine to account for variations in at least one of the position of the contactor edge, the needle tip, or the laser beam on a calibration surface.

35. A method for adjusting puncture settings of a tattoo machine, the method comprising:

applying a tattoo to skin of a recipient, wherein the tattoo includes a collection of at least one of dots, lines, or areas to test the puncture settings;

evaluating dot characteristics of the collection of dots of the tattoo, wherein the dot characteristics include at least one of width, contrast, density, intensity, ink uniformity, deposited ink amount, or size;

classifying each dot in the tattoo according to appearance on the skin of the recipient; and adjusting the puncture settings based on the classification of each dot, wherein the puncture settings include at least one of needle height, number of punctures, or puncture density.

36. The method of example 35, further comprising using a trained machine learning module to classify each of the dots.

37. The method of any of example 35 and 36, further comprising:

determining an appearance score for one or more of the dots based on corresponding dot characteristics, wherein the appearance score is used to classify the one or more of the dots.

38. The method of any of examples 35-37, wherein the dots are classified as at least one of superficial dots, acceptable dots, or blowouts.

39. The method of any of examples 35-38, further comprising predicting an appearance of the dots over a period of time.

40. The method of any of examples 35-39, further comprising determining whether the dots meet one or more visual appearance criteria.

41. A computing system for identifying skin features in a robotic tattooing operation, the computing system comprising:

one or more processors; and one or more memories storing instructions that, when executed by the one or more processor, cause the computing system to perform a process comprising:

performing a scan of skin of a recipient to detect skin features of a subject;

analyzing at least one of the detected skin features;

assigning each analyzed skin feature to a feature category based on the analysis; and determining at least one puncture setting for applying tattoo dots to the subject based on the detected skin features and respective feature category.

42. The computing system of example 41, wherein analyzing the at least one of the detected skin features includes analyzing one or more skin properties or characteristics of the detected skin features, wherein the feature category includes at least one of color, texture, morphology, collagen area, hair root, or lesion.

43. The computing system of examples 41 and 42, wherein the process further comprises:

generating a tattoo puncture setting map of a target site along the subject, wherein the tattoo puncture setting map corresponds to a tattoo to be applied, modifying the tattoo puncture setting map based on the detected skin features and their respective feature category.

44. The computing system of any of examples 41-43, wherein determining the at least one puncture setting includes:

for at least one of the detected skin features, determining whether to (A) modify a tattoo puncture setting map for robotically applying at least one tattoo dot proximate the detected feature, (B) maintain a portion of the tattoo puncture setting map associated with the at least one of the detected skin features, and/or (C) avoid applying tattoo dots at the detected feature; and robotically applying tattoo dots to the subject according to the determination.

45. The computing system of any of examples 41-44, wherein the process further comprises:

modifying a location of at least one of the tattoo dots to be applied to the subject based on the detected skin features.

46. The computing system of any of examples 41-45, wherein the process further comprises:

modifying the at least one puncture setting for applying the tattoo dots based on spatial variations in skin properties of the skin.

47. The computing system of any of examples 41-46, wherein the at least one puncture setting includes one or more of puncture location, needle height, volume of ink applied, and/or needle speed.

48. The computing system of any of examples 41-47, wherein the process further comprises:

obtaining one or more optical characteristics of the skin of the subject at a target site;

simulating an appearance of the tattoo applied to the target site; and displaying, via a display, the simulated appearance of the tattoo.

49. The computing system of any of examples 41-48, wherein the process further comprises:

generating a tattoo puncture setting map of a target site along the subject, wherein the tattoo puncture setting map includes ink color and location information;

mixing inks of different colors based on the ink color and the location information; and applying the mixed inks at the target site based on the ink color and the location information.

50. The computing system of any of examples 41-49, wherein the ink color and location information includes ink color data for dots and coordinates for the respective dots.

51. The computing system of any of examples 41-50, wherein the process further comprises:

optically analyzing a target site along the skin to determine one or more optical characteristics of the skin; and generate at least one optical value for the skin based on the one or more optical characteristics, wherein the at least one puncture setting is selected based on the at least one optical value and target appearance of dot to be applied.

52. The computing system of any of examples 41-51, wherein the at least one optical value includes at least one of a reflection coefficient or spectrum, a transmission coefficient or spectrum, an absorption coefficient or spectrum, or a scattering coefficient or spectrum.

53. A computing system for positioning a tattoo machine for applying a tattoo, the computing system comprising:
one or more processors; and
one or more memories storing instructions that, when executed by the one or more processor, cause the computing system to perform a process comprising:
capturing a series of images of skin of a recipient of the tattoo;
analyzing the series of images to detect features on the skin and identify at least one of a position, shape, or size of each feature;
calculating coordinates for each feature in the series of images;
assigning a coordinate to each detected feature on the skin; and
generating a digital representation of the detected features and associated coordinates.

54. The computing system of example 53, wherein the process further comprises:
identifying spatial patterns formed by the detected features; and
storing the spatial patterns in the digital representation.

55. The computing system of any of examples 53 and 54, wherein the process further comprises:
capturing an image of the skin;
identifying the spatial patterns on the skin;
retrieving, from the digital representation, the coordinates associated with the spatial patterns; and
calculating a deformation of the skin based on a change in the spatial patterns in the image and the spatial patterns in the digital representation, wherein the calculated deformation of the skin is used to update tattooing instructions.

56. The computing system of any of examples 53-55, wherein the process further comprises:
analyzing the skin to determine a color of ink to be applied;
automatically mixing two or more inks within a fluid system to produce an ink mixture with the determined color of ink; and
delivering the ink mixture through the fluid system to apply the ink mixture to the skin.

57. The computing system of any of examples 53-56, wherein the fluid system includes a plurality of ink containers fluidically coupled to a hub configured to mix the two or more inks.

58. The computing system of any of examples 53-57, wherein the process further comprises:
analyzing the ink mixture within the fluid system; and
applying the analyzed ink mixture to the skin based on the analysis of the ink mixture.

59. The computing system of any of examples 53-58, wherein the process further comprises:

optically analyzing the ink mixture within the fluid system; and
adjusting a composition of ink mixture based on the optical analysis.

60. The computing system of any of examples 53-59, wherein the process further comprises:
automatically mixing a plurality of inks within a robotic tattooing apparatus to produce an ink mixture while the robotic tattooing apparatus tattoos the skin.

61. A computing system for removing a tattoo using a tattoo removal machine, the computing system comprising:
one or more processors; and
one or more memories storing instructions that, when executed by the one or more processor, cause the computing system to perform a process comprising:
retrieving tattoo session data for a tattoo applied to recipient;
performing a scan of the skin to identify pigment in the skin, a reflective spectrum of tattooed portion of the skin, and/or a reflective spectrum of clear portions of the skin;
determining a removal area on the skin based on the scan and/or the tattoo session data; and
selecting a laser wavelength for removing the tattoo at the removal area based on pigments in the skin and/or skin absorbance data.

62. The computing system of example 61, wherein the process further comprises:
identifying a condition of the skin, a position of pigments, and/or a depth of the pigments; and
determining a tattoo removal plan based on the identification.

63. The computing system of any of examples 61-62, wherein the process further comprises:
determining an angle and focal distance of laser beam of the tattoo removal machine and the removal area based on a pigment depth and a pigment position in the skin.

64. The computing system of any of examples 61-63, wherein the process further comprises:
determining a laser spot position and a laser spot geometry for a laser of the tattoo removal machine based on the removal area.

65. The computing system of example 61, wherein the tattoo removal machine includes at least one of a laser pulse generator, an optical transfer arm, or an effector assembly.

66. A computing system for applying a tattoo with a tattoo machine, the computing system comprising:
one or more processors; and
one or more memories storing instructions that, when executed by the one or more processor, cause the computing system to perform a process comprising:
lowering a frame and a contactor of the tattoo machine onto a skin of a subject;
controlling a frame load of the frame on the skin by measuring the frame load and movement of the frame in a direction normal to the skin that is contacted;
controlling a contactor load of the contactor on the skin by measuring the contactor load and movement of the contactor in the direction normal to the skin that is contacted; and
maintaining the contactor load and the frame load constant, while applying the tattoo to the skin.

67. The computing system of example 66, wherein the process further comprises: moving the contactor and the frame along the skin by:

lifting the frame off the skin while the contactor holds the skin;
moving the frame along a surface of the skin;
lowering the frame into contact with the skin;
lifting the contactor off the skin while the frame holds the skin;
moving the contactor along the surface of the skin; and/or
lowering the contactor into contact with the skin.

68. The computing system of any of examples 66-67, wherein the process further comprises:
measuring a force that the contactor applies to the skin;
measuring a force that the frame applies to the skin; and
positioning the contactor and/or the frame relative to the subject based on at least one of the measured forces.

69. The computing system of any of examples 66-68, wherein the tattoo machine is encased by an aseptic barrier including a microscopic slide.

70. A computing system for applying a tattoo with a tattoo machine, the computing system comprising:
one or more processors; and
one or more memories storing instructions that, when executed by the one or more processor, cause the computing system to perform a process comprising:
calibrating the tattoo machine by adjusting machine instructions to account for a position of at least one of a needle tip, a laser beam on a calibration surface, or a contactor edge with respect to a camera image;
loading a digital file of an image of the tattoo to a controller of the tattoo machine, wherein the digital file includes at least one of a dot-based tattoo design, a stencil, or puncture settings per each dot of ink;
aligning the tattoo machine with an area of skin of a recipient of the tattoo;
puncturing the skin without ink to identify puncture characteristics of the skin, wherein the puncture characteristics includes information to determine a distance of the skin surface from the needle tip;
calibrating the distance between the needle tip and a reference plane of laser-based height measurements based on the puncture characteristics and a laser-based surface height map;
calculating spatial coordinates of the needle tip for each tattoo dot; and
applying the tattoo to the skin.

71. The computing system of example 70, wherein the process further comprises:
adjusting a needle height for a tattoo dot on the skin based on calibrating the distance.

72. The computing system of any of examples 70-71, wherein the process further
calculating an in-plane deformation of the skin by stencil scanning; and
calculating an out-of-plane deformation of the skin by laser scanning.

73. The computing system of any of examples 70-72, wherein the process further comprises:
calibrating the tattoo machine to account for variations in at least one of the position of the contactor edge, the needle tip, or the laser beam on a calibration surface.

74. A computing system for adjusting puncture settings of a tattoo machine, the computing system comprising:
one or more processors; and
one or more memories storing instructions that, when executed by the one or more processor, cause the computing system to perform a process comprising:
applying a tattoo to skin of a recipient, wherein the tattoo includes a collection of at least one of dots, lines, or areas to test the puncture settings;
evaluating dot characteristics of the collection of dots of the tattoo, wherein the dot characteristics include at least one of width, contrast, density, intensity, ink uniformity, deposited ink amount, or size;
classifying each dot in the tattoo according to appearance on the skin of the recipient; and
adjusting the puncture settings based on the classification of each dot, wherein the puncture settings include at least one of needle height, number of punctures, or puncture density.

75. The computing system of example 74, wherein the process further comprises:
using a trained machine learning module to classify each of the dots.

76. The computing system of any of examples 74-75, wherein the process further comprises:
determining an appearance score for one or more of the dots based on corresponding dot characteristics, wherein the appearance score is used to classify the one or more of the dots.

77. The computing system of any of examples 74-76, wherein the dots are classified as at least one of superficial dots, acceptable dots, or blowouts.

78. The computing system of any of examples 74-77, wherein the process further comprises:
predicting an appearance of the dots over a period of time.

79. The computing system of any of examples 74-78, wherein the process further comprises:
determining whether the dots meet one or more visual appearance criteria.

80. A non-transitory computer-readable medium storing instructions that, when executed by a computing system, cause the computing system to perform operations for identifying skin features in a robotic tattooing operation, the operations comprising:
performing a scan of skin of a recipient to detect skin features of a subject;
analyzing at least one of the detected skin features;
assigning each analyzed skin feature to a feature category based on the analysis; and
determining at least one puncture setting for applying tattoo dots to the subject based on the detected skin features and respective feature category.

81. The non-transitory computer-readable medium of example 80, wherein analyzing the at least one of the detected skin features includes analyzing one or more skin properties or characteristics of the detected skin features, wherein the feature category includes at least one of color, texture, morphology, collagen area, hair root, or lesion.

82. The non-transitory computer-readable medium of any of examples 80-81, wherein the operations further comprise:
generating a tattoo puncture setting map of a target site along the subject, wherein the tattoo puncture setting map corresponds to a tattoo to be applied,
modifying the tattoo puncture setting map based on the detected skin features and their respective feature category.

83. The non-transitory computer-readable medium of any of examples 80-82, wherein the operations further comprise:
for at least one of the detected skin features, determining whether to (A) modify a tattoo puncture setting map for robotically applying at least one tattoo dot proximate the detected feature, (B) maintain a portion of the tattoo puncture setting map associated with the at least one of the detected skin features, and/or (C) avoid applying tattoo dots at the detected feature; and robotically applying tattoo dots to the subject according to the determination.

84. The non-transitory computer-readable medium of any of examples 80-83, wherein the operations further comprise:
modifying a location of at least one of the tattoo dots to be applied to the subject based on the detected skin features.

85. The non-transitory computer-readable medium of any of examples 80-84, wherein the operations further comprise:
modifying the at least one puncture setting for applying the tattoo dots based on spatial variations in skin properties of the skin.

86. The non-transitory computer-readable medium of any of examples 80-85, wherein the at least one puncture setting includes one or more of puncture location, needle height, volume of ink applied, and/or needle speed.

87. The non-transitory computer-readable medium of any of examples 80-86, wherein the operations further comprise:
obtaining one or more optical characteristics of the skin of the subject at a target site;
simulating an appearance of the tattoo applied to the target site; and
displaying, via a display, the simulated appearance of the tattoo.

88. The non-transitory computer-readable medium of any of examples 80-87, wherein the operations further comprise:
generating a tattoo puncture setting map of a target site along the subject, wherein the tattoo puncture setting map includes ink color and location information;
mixing inks of different colors based on the ink color and the location information; and
applying the mixed inks at the target site based on the ink color and the location information.

89. The non-transitory computer-readable medium of any of examples 80-88, wherein the ink color and location information includes ink color data for dots and coordinates for the respective dots.

90. The non-transitory computer-readable medium of any of examples 80-89, wherein the operations further comprise:
optically analyzing a target site along the skin to determine one or more optical characteristics of the skin; and
generate at least one optical value for the skin based on the one or more optical characteristics, wherein the at least one puncture setting is selected based on the at least one optical value and target appearance of dot to be applied.

91. The non-transitory computer-readable medium of any of examples 80-90, wherein the at least one optical value includes at least one of a reflection coefficient or spectrum, a transmission coefficient or spectrum, an absorption coefficient or spectrum, or a scattering coefficient or spectrum.

92. A non-transitory computer-readable medium storing instructions that, when executed by a computing system, cause the computing system to perform operations for positioning a tattoo machine for applying a tattoo, the operations comprising:
capturing a series of images of skin of a recipient of the tattoo;
analyzing the series of images to detect features on the skin and identify at least one of a position, shape, or size of each feature;
calculating coordinates for each feature in the series of images;
assigning a coordinate to each detected feature on the skin; and generating a digital representation of the detected features and associated coordinates.

93. The non-transitory computer-readable medium of example 92, wherein the operations further comprise:
identifying spatial patterns formed by the detected features; and
storing the spatial patterns in the digital representation.

94. The non-transitory computer-readable medium of any of examples 92-93, wherein the operations further comprise:
capturing an image of the skin;
identifying the spatial patterns on the skin;
retrieving, from the digital representation, the coordinates associated with the spatial patterns; and
calculating a deformation of the skin based on a change in the spatial patterns in the image and the spatial patterns in the digital representation, wherein the calculated deformation of the skin is used to update tattooing instructions.

95. The non-transitory computer-readable medium of any of examples 92-94, wherein the operations further comprise:
analyzing the skin to determine a color of ink to be applied;
automatically mixing two or more inks within a fluid system to produce an ink mixture with the determined color of ink; and
delivering the ink mixture through the fluid system to apply the ink mixture to the skin.

96. The non-transitory computer-readable medium of any of examples 92-95, wherein the fluid system includes a plurality of ink containers fluidically coupled to a hub configured to mix the two or more inks.

97. The non-transitory computer-readable medium of any of examples 92-96, wherein the operations further comprise:
analyzing the ink mixture within the fluid system; and
applying the analyzed ink mixture to the skin based on the analysis of the ink mixture.

98. The non-transitory computer-readable medium of any of examples 92-97, wherein the operations further comprise:
optically analyzing the ink mixture within the fluid system; and
adjusting a composition of ink mixture based on the optical analysis.

99. The non-transitory computer-readable medium of any of examples 92-98, wherein the operations further comprise:
automatically mixing a plurality of inks within a robotic tattooing apparatus to produce an ink mixture while the robotic tattooing apparatus tattoos the skin.

100. A computer-implemented method for removing a tattoo using a tattoo removal machine, the method comprising:
retrieving tattoo session data for a tattoo applied to recipient;
performing a scan of the skin to identify pigment in the skin, a reflective spectrum of tattooed portion of the skin, and/or a reflective spectrum of clear portions of the skin;
determining a removal area on the skin based on the scan and/or the tattoo session data; and
selecting a laser wavelength for removing the tattoo at the removal area based on pigments in the skin and/or skin absorbance data.

101. The non-transitory computer-readable medium of example 100, wherein the operations further comprise:
identifying a condition of the skin, a position of pigments, and/or a depth of the pigments; and
determining a tattoo removal plan based on the identification.

102. The non-transitory computer-readable medium of any of examples 100-101, wherein the operations further comprise:
determining an angle and focal distance of laser beam of the tattoo removal machine and the removal area based on a pigment depth and a pigment position in the skin.

103. The non-transitory computer-readable medium of any of examples 100-102, wherein the operations further comprise:
determining a laser spot position and a laser spot geometry for a laser of the tattoo removal machine based on the removal area.

104. The non-transitory computer-readable medium of any of examples 100-103, wherein the tattoo removal machine includes at least one of a laser pulse generator, an optical transfer arm, or an effector assembly.

105. A non-transitory computer-readable medium storing instructions that, when executed by a computing system, cause the computing system to perform operations for applying a tattoo with a tattoo machine, the operations comprising:
lowering a frame and a contactor of the tattoo machine onto a skin of a subject;
controlling a frame load of the frame on the skin by measuring the frame load and movement of the frame in a direction normal to the skin that is contacted;
controlling a contactor load of the contactor on the skin by measuring the contactor load and movement of the contactor in the direction normal to the skin that is contacted; and
maintaining the contactor load and the frame load constant, while applying the tattoo to the skin.

106. The non-transitory computer-readable medium of example 105, wherein the operations further comprise:
moving the contactor and the frame along the skin by:
lifting the frame off the skin while the contactor holds the skin;
moving the frame along a surface of the skin;
lowering the frame into contact with the skin;
lifting the contactor off the skin while the frame holds the skin;
moving the contactor along the surface of the skin; and/or
lowering the contactor into contact with the skin.

107. The non-transitory computer-readable medium of any of examples 105-106, wherein the operations further comprise:
measuring a force that the contactor applies to the skin;
measuring a force that the frame applies to the skin; and
positioning the contactor and/or the frame relative to the subject based on at least one of the measured forces.

108. The non-transitory computer-readable medium of any of examples 105-107, wherein the operations further comprise:
confirming or correcting the positioning of the contactor along the skin based on camera data of the skin.

109. The non-transitory computer-readable medium of any of examples 105-108, wherein the tattoo machine is encased by an aseptic barrier including a microscopic slide.

110. A non-transitory computer-readable medium storing instructions that, when executed by a computing system, cause the computing system to perform operations for applying a tattoo with a tattoo machine, the operations comprising:
calibrating the tattoo machine by adjusting machine instructions to account for a position of at least one of a needle tip, a laser beam on a calibration surface, or a contactor edge with respect to a camera image;
loading a digital file of an image of the tattoo to a controller of the tattoo machine, wherein the digital file includes at least one of a dot-based tattoo design, a stencil, or puncture settings per each dot of ink;
aligning the tattoo machine with an area of skin of a recipient of the tattoo;
puncturing the skin without ink to identify puncture characteristics of the skin, wherein the puncture characteristics includes information to determine a distance of the skin surface from the needle tip;
calibrating the distance between the needle tip and a reference plane of laser-based height measurements based on the puncture characteristics and a laser-based surface height map;
calculating spatial coordinates of the needle tip for each tattoo dot; and
applying the tattoo to the skin.

111. The non-transitory computer-readable medium of example 110, wherein the operations further comprise:
adjusting a needle height for a tattoo dot on the skin based on calibrating the distance.

112. The non-transitory computer-readable medium of any of examples 110-111, wherein the operations further comprise:
calculating an in-plane deformation of the skin by stencil scanning; and
calculating an out-of-plane deformation of the skin by laser scanning.

113. The non-transitory computer-readable medium of any of examples 110-112, wherein the operations further comprise:
calibrating the tattoo machine to account for variations in at least one of the position of the contactor edge, the needle tip, or the laser beam on a calibration surface.

114. A non-transitory computer-readable medium storing instructions that, when executed by a computing system, cause the computing system to perform operations for adjusting puncture settings of a tattoo machine, the operations comprising:
applying a tattoo to skin of a recipient, wherein the tattoo includes a collection of at least one of dots, lines, or areas to test the puncture settings;
evaluating dot characteristics of the collection of dots of the tattoo, wherein the dot characteristics include at least one of width, contrast, density, intensity, ink uniformity, deposited ink amount, or size;
classifying each dot in the tattoo according to appearance on the skin of the recipient; and
adjusting the puncture settings based on the classification of each dot, wherein the puncture settings include at least one of needle height, number of punctures, or puncture density.

115. The non-transitory computer-readable medium of example 114, wherein the operations further comprise using a trained machine learning module to classify each of the dots.

116. The non-transitory computer-readable medium of any of examples 114-115, wherein the operations further comprise:
determining an appearance score for one or more of the dots based on corresponding dot characteristics, wherein the appearance score is used to classify the one or more of the dots.

117. The non-transitory computer-readable medium of any of examples 114-116, wherein the dots are classified as at least one of superficial dots, acceptable dots, or blowouts.

118. The non-transitory computer-readable medium of any of examples 114-117, wherein the operations further comprise predicting an appearance of the dots over a period of time.

119. The non-transitory computer-readable medium of any of examples 114-118, wherein the operations further comprise determining whether the dots meet one or more visual appearance criteria.

120. Any of examples 1-119, further comprising confirming or correcting the positioning of the contactor along the skin based on camera data of the skin.

CONCLUSION

The construction and arrangement of the elements of the systems and methods as shown in the embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the apparatus may be constructed from any of a wide variety of materials that provide sufficient strength or durability to, for example, repeatedly apply tattoos. Any embodiment or design described herein is not necessarily to be construed as preferred or advantageous over other embodiments or designs. Accordingly, all such modifications are intended to be included within the scope of the present inventions. The order or sequence of any process or method steps, including the steps discussed in connection with the algorithms discussed herein may be varied or re-sequenced according to alternative embodiments. Other substitutions, modifications, changes, and omissions may be made in the design, operating conditions, and arrangement of the embodiments without departing from scope of the present disclosure or from the spirit of the appended claims. For example, the techniques disclosed herein can be used to tattoo different articles, including articles made of natural materials, synthetic materials, or the like.

The present disclosure contemplates systems and methods which may be implemented or controlled by one or more controllers to perform the actions as described in the disclosure. For example, in some embodiments, the controller, whether part of a tattooing apparatus or a separate controller, may be configured to process the measured data from the sensors, perform the recording, appending, or storing of the data (e.g., puncture data, ink data, needle data, skin data, etc.) and/or any calculated values within the different tables or maps described, perform all described and any similarly suitable algorithms, and control operation of any disclosed parts or components in a manner necessary or appropriate for proper function, operation, and/or performance of any disclosed systems or methods. For example, the controllers (e.g., controller 108, controller 109, etc.) can store data and calculate values based on the stored data.

The controllers can include machine-readable media and one or more processors, Programmable Logic Controllers, Distributed Control Systems, secure processors, memory, and the like. Secure storage may also be implemented as a secure flash memory, secure serial EEPROM, secure field programmable gate array, or secure application-specific integrated circuit. Processors can be standard central processing units or secure processors. Secure processors can be special-purpose processors (e.g., reduced instruction set processors) that can withstand sophisticated attacks that attempt to extract data or programming logic. A secure processor may not have debugging pins that enable an external debugger to monitor the secure processor's execution or registers. In other embodiments, the system may employ a secure field programmable gate array, a smartcard, or other secure devices. Other types of computing devices can also be used.

Memory can include memory, such as standard memory, secure memory, or a combination of both memory types. By employing a secure processor and/or secure memory, the system can ensure that both data and instructions are highly secure. Memory can be incorporated into the other components of the controller system and can store computer-executable or processor-executable instructions, including routines executed by a programmable computing device. In some embodiments, the memory can store programs for preset configurations. Stored programs (e.g., tattooing programs, calibration programs, graphic mapping programs, etc.) can be modified by a subject, operator, or tattoo artist to provide flexibility. Tattooing programs can be configured for tattooing animals, articles, goods, or the like. For example, some tattooing programs can be for tattooing animals (e.g., living humans or farm animals) and other tattooing programs can be for tattooing articles (e.g., purses, footwear, clothing, automobile seats, etc.).

Controllers can be in communication with the components of the tattooing apparatus via, for example, a direct wired connection, a wireless connection, or a network connection. The controller 108 of FIG. 1B, for example, can be a handheld electronic device, such as a tablet, smart phone, or the like, and it can include digital electronic circuitry, firmware, hardware, memory, a computer storage medium, a computer program, processor(s) (including programmed processors), or the like. In other embodiments, the controller 108 is a computer (e.g., a tower, a desktop, or a laptop) connected to the apparatus 100 via a wired or wireless connection. The controller 108, or the controller 109, can be used to modify stencils, as discussed in connection with FIG. 3A. The controller 109 (illustrated schematically in FIG. 1B) can include input elements in the form of buttons or a touch screen for individually controlling the apparatus. In one embodiment, controllers 108 and 109 can include a user interface for inputting, modifying, and/or controlling any system component or process step described in this disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM, or other optical disk storage, magnetic disk storage or other magnetic storage devices, or any other medium which can be used to carry or store desired program code in the form of machine-executable instructions or data structures, and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The headings provided herein are for convenience only and are not intended to limit or interpret the scope or meaning of the technology. Although the figures may show a specific order of method steps, the order of the steps may differ from what is depicted. Also, two or more steps may be performed concurrently or with partial concurrence. All such variations are within the scope of the disclosure. Likewise, software implementations could be accomplished with standard programming techniques with rule based logic and other logic to accomplish the various measuring steps, calculating steps, storing steps, calibrating steps, and any other steps for proper coordination and operation of the systems and methods described above. Aspects of the described technology can be modified, if necessary, to employ the systems, functions, and concepts of the various references described above to provide yet further embodiments. For purposes of this disclosure, the terms customer and subject are interchangeable. Tattoos can be applied to animals (e.g., skin of mammals, including humans, pigs, cattle, farm animals, etc.), articles, natural materials (e.g., leather), synthetic materials, or other tattooable items. For example, tattoos can be applied to leather goods (e.g., belts, wallets, backpacks, etc.) using the systems, tattoo apparatus, and methods disclosed herein. In one embodiment, the tattooing system 90 of FIG. 1B can be configured to tattoo a leather boot, bag, or other article, for example.

Additional apparatuses, components, controllers, software, methods of operation, methods for manufacturing, and other features are disclosed in the following patents and applications: U.S. Provisional Application No. 63/141,438; U.S. Provisional Application No. 62/878,673, U.S. Provisional Application No. 62/964,579, U.S. application Ser. No. 17/157,935, and App. No. PCT/US2020/043588. All patents, applications, and other references cited herein are hereby incorporated by reference in their entirety. Any and all priority claims identified in the Application Data Sheet, or any correction thereto, are also hereby incorporated by reference in their entirety.

While the above description details certain embodiments and describes the best mode contemplated, no matter how detailed, various changes can be made. Implementation details may vary considerably, while still being encompassed by the technology disclosed herein. The various aspects and embodiments disclosed herein are for purposes of illustration and are not intended to be limiting, with the true scope and spirit being indicated by the following claims.

What is claimed is:

1. A computer-implemented method for identifying skin features in a robotic tattooing operation, the method comprising:

performing a scan of skin of a subject to detect skin features of the subject;
analyzing at least one of the detected skin features;
assigning each analyzed skin feature to a feature category based on the analysis;
generating a tattoo puncture setting map of a target site on the subject based on the detected skin features and respective feature category, wherein the tattoo puncture setting map corresponds to a tattoo to be applied;
determining at least one puncture setting for applying tattoo dots to the subject according to the tattoo puncture setting map; and
robotically applying the tattoo dots to the subject according to the determination.

2. The computer-implemented method of claim 1, wherein analyzing the at least one of the detected skin features includes analyzing one or more skin properties or characteristics of the detected skin features, wherein the feature category includes at least one of color, texture, morphology, collagen area, hair root, or lesion.

3. The computer-implemented method of claim 1, further comprising:
modifying the tattoo puncture setting map based on the detected skin features and their respective feature category.

4. The computer-implemented method of claim 1, wherein determining the at least one puncture setting includes:
for at least one of the detected skin features, determining whether to (A) modify the tattoo puncture setting map for robotically applying at least one tattoo dot proximate the detected feature, (B) maintain a portion of the tattoo puncture setting map associated with the at least one of the detected skin features, and/or (C) avoid applying tattoo dots at the detected feature.

5. The computer-implemented method of claim 1, further comprising:
modifying a location of at least one of the tattoo dots to be applied to the subject based on the detected skin features.

6. The computer-implemented method of claim 1, further comprising:
modifying the at least one puncture setting for applying the tattoo dots based on spatial variations in skin properties of the skin.

7. The computer-implemented method of claim 1, wherein the at least one puncture setting includes one or more of puncture location, needle height, volume of ink applied, and/or needle speed.

8. The computer-implemented method of claim 1, further comprising:
obtaining one or more optical characteristics of the skin of the subject at the target site;
simulating an appearance of the tattoo applied to the target site; and
displaying, via a display, the simulated appearance of the tattoo.

9. The computer-implemented method of claim 1, further comprising:
wherein the tattoo puncture setting map includes ink color and location information;
mixing inks of different colors based on the ink color and the location information; and
applying the mixed inks at the target site based on the ink color and the location information.

10. The computer-implemented method of claim 9, wherein the ink color and the location information includes ink color data for dots and coordinates for the respective dots.

11. The computer-implemented method of claim 1, further comprising:
- optically analyzing the target site along the skin to determine one or more optical characteristics of the skin; and
- generate at least one optical value for the skin based on the one or more optical characteristics, wherein the at least one puncture setting is selected based on the at least one optical value and target appearance of dot to be applied.

12. The computer-implemented method of claim 11, wherein the at least one optical value includes at least one of a reflection coefficient or spectrum, a transmission coefficient or spectrum, an absorption coefficient or spectrum, or a scattering coefficient or spectrum.

13. A computer-implemented method for identifying skin features in a robotic tattooing operation, the method comprising:
- receiving image data of skin of a subject;
- analyzing a skin feature in the image data of the subject;
- assigning the skin feature to a feature category based on the analysis of the skin feature;
- generating a tattoo puncture setting map of a target site on the subject based on the skin feature and the feature category, wherein the tattoo puncture setting map corresponds to a tattoo to be applied;
- determining at least one puncture setting for applying tattoo dots to the subject at a region of the skin according to the tattoo puncture setting map; and
- robotically applying the tattoo dots to the subject according to the determination.

14. The computer-implemented method of claim 13, wherein analyzing the skin feature includes analyzing one or more skin properties or characteristics of the skin feature, wherein the feature category includes at least one of color, texture, morphology, collagen area, hair root, or lesion.

15. The computer-implemented method of claim 13, further comprising:
- modifying the tattoo puncture setting map based on the skin feature and their respective feature category.

16. The computer-implemented method of claim 13, wherein determining the at least one puncture setting includes:
- for the skin feature, determining whether to (A) modify the tattoo puncture setting map for robotically applying at least one tattoo dot proximate the skin feature, (B) maintain a portion of the tattoo puncture setting map associated with the skin feature, and/or (C) avoid applying tattoo dots at the skin feature.

17. The computer-implemented method of claim 13, further comprising:
- modifying a location of at least one of the tattoo dots to be applied to the subject based on the skin feature.

18. The computer-implemented method of claim 13, further comprising:
- modifying the at least one puncture setting for applying the tattoo dots based on spatial variations in skin properties of the skin.

19. The computer-implemented method of claim 13, wherein the at least one puncture setting includes one or more of puncture location, needle height, volume of ink applied, and/or needle speed.

* * * * *